United States Patent
Lee et al.

(10) Patent No.: US 9,363,010 B2
(45) Date of Patent: *Jun. 7, 2016

(54) MOBILE TERMINAL AND METHOD OF CONTROLLING FUNCTION OF THE MOBILE TERMINAL

(71) Applicant: Samsung Electronics Co., Ltd., Suwon-si, Gyeonggi-do (KR)

(72) Inventors: Ju-youn Lee, Seongnam-si (KR); Sang-hyup Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

This patent is subject to a terminal disclaimer.

(21) Appl. No.: 14/077,840

(22) Filed: Nov. 12, 2013

(65) Prior Publication Data

US 2014/0154987 A1  Jun. 5, 2014

(30) Foreign Application Priority Data

Dec. 3, 2012  (KR) .................. 10-2012-0139248
Mar. 13, 2013  (KR) .................. 10-2013-0026825

(51) Int. Cl.
*H04B 7/00*  (2006.01)
*H04B 7/26*  (2006.01)
*H04M 1/725*  (2006.01)

(52) U.S. Cl.
CPC ............... *H04B 7/26* (2013.01); *H04M 1/7253* (2013.01); *H04M 2250/02* (2013.01)

(58) Field of Classification Search
CPC ..... H04W 76/02; H04W 84/18; H04W 8/005; H04M 2250/02; H04M 1/7253
USPC .................. 455/41.2, 41.3, 432.3, 422.1
See application file for complete search history.

(56) References Cited

U.S. PATENT DOCUMENTS

| | | | |
|---|---|---|---|
| 2001/0045454 A1* | 11/2001 | Gangi | 235/380 |
| 2007/0015504 A1 | 1/2007 | Kusuda et al. | |
| 2008/0085740 A1* | 4/2008 | Lee | 455/566 |
| 2010/0108756 A1 | 5/2010 | Denis | |
| 2010/0304674 A1* | 12/2010 | Kim et al. | 455/41.2 |
| 2011/0021142 A1 | 1/2011 | Desai et al. | |
| 2011/0143669 A1* | 6/2011 | Farrell et al. | 455/41.2 |
| 2011/0191764 A1 | 8/2011 | Piorecki | |
| 2012/0142271 A1 | 6/2012 | Zhodzishsky et al. | |

(Continued)

FOREIGN PATENT DOCUMENTS

JP  2005-143075 A  6/2005
KR  10-2010-0048942 A  5/2010

(Continued)

OTHER PUBLICATIONS

Bluetooth Specification Version 4.0, Current Master TOC, Jun. 30, 2010, pp. 1-2302, vol. 0.

*Primary Examiner* — Sonny Trinh
(74) *Attorney, Agent, or Firm* — Jefferson IP Law, LLP

(57) ABSTRACT

A method of controlling a function of a mobile terminal is provided. The method includes placing the mobile terminal within a communication range of a Bluetooth Low Energy (BLE) device previously registered in the mobile terminal, receiving identification information of the BLE device from the BLE device, extracting function information corresponding to the received identification information of the BLE device, and performing a previously set function corresponding to the extracted function information.

23 Claims, 94 Drawing Sheets

(56) References Cited

U.S. PATENT DOCUMENTS

2012/0213134 A1 8/2012 Woo et al.
2012/0213135 A1 8/2012 Woo et al.

FOREIGN PATENT DOCUMENTS

KR 10-2010-0077687 A 7/2010
KR 20120096864 A 8/2012

* cited by examiner

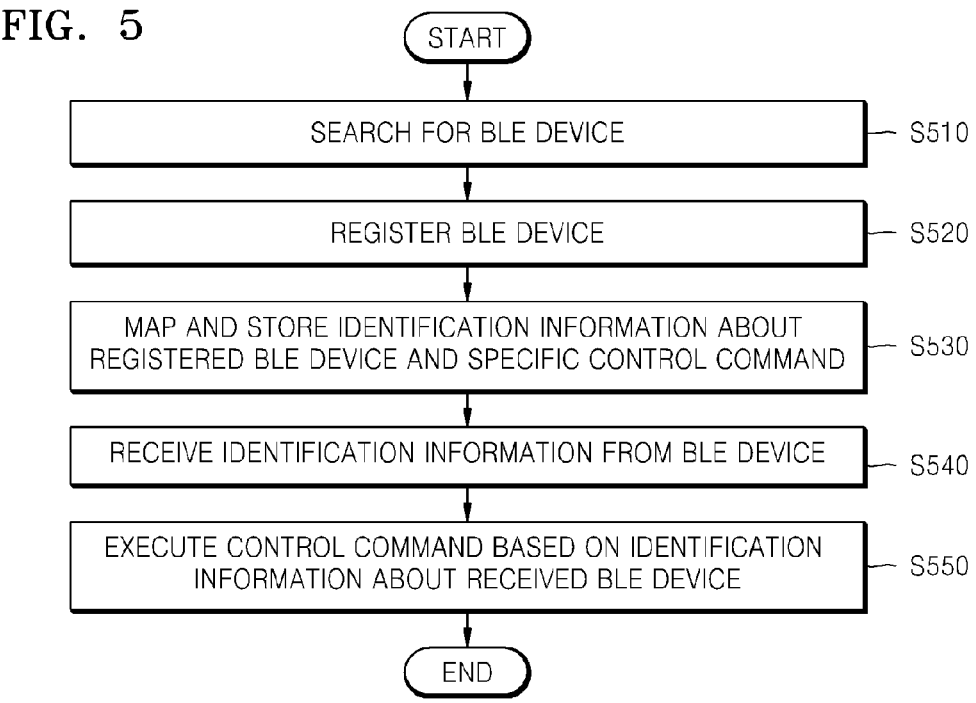
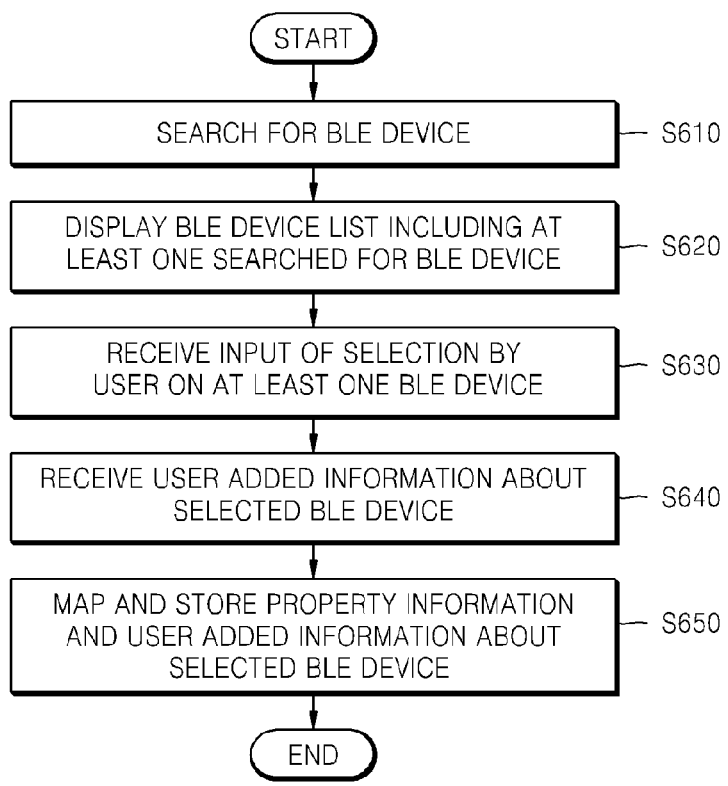

FIG. 8A
FIG. 8B
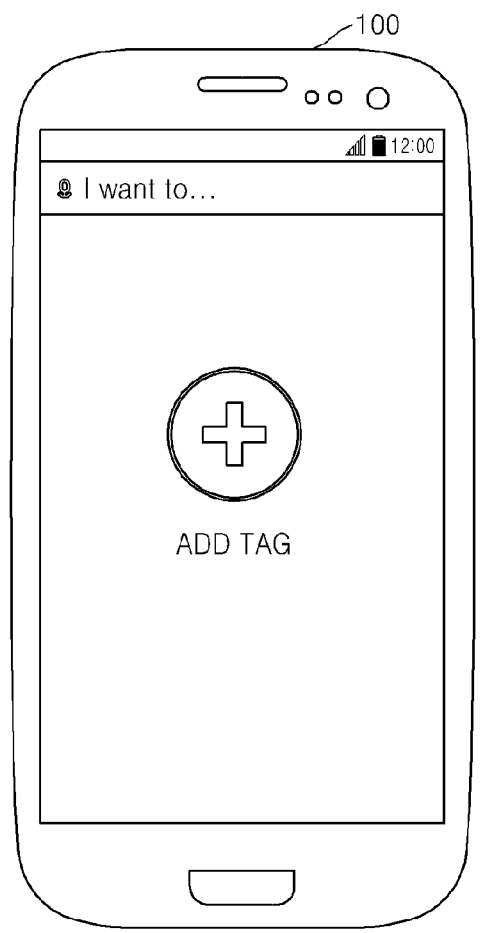
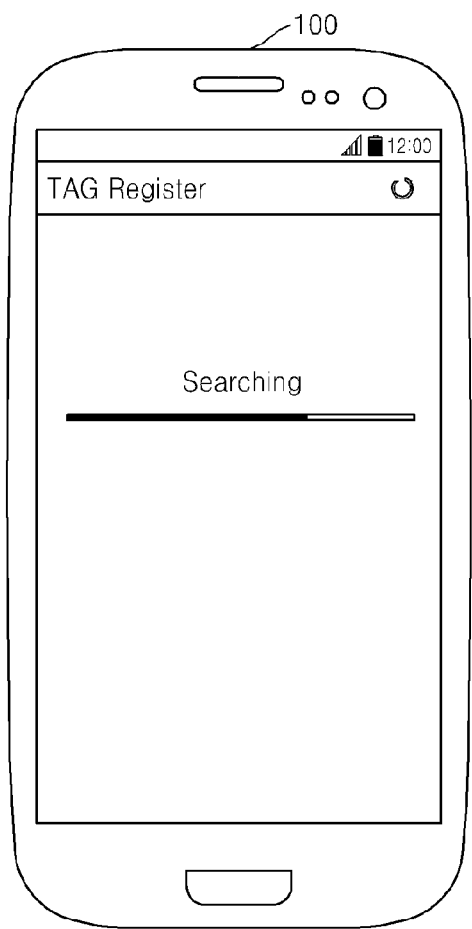

FIG. 11C
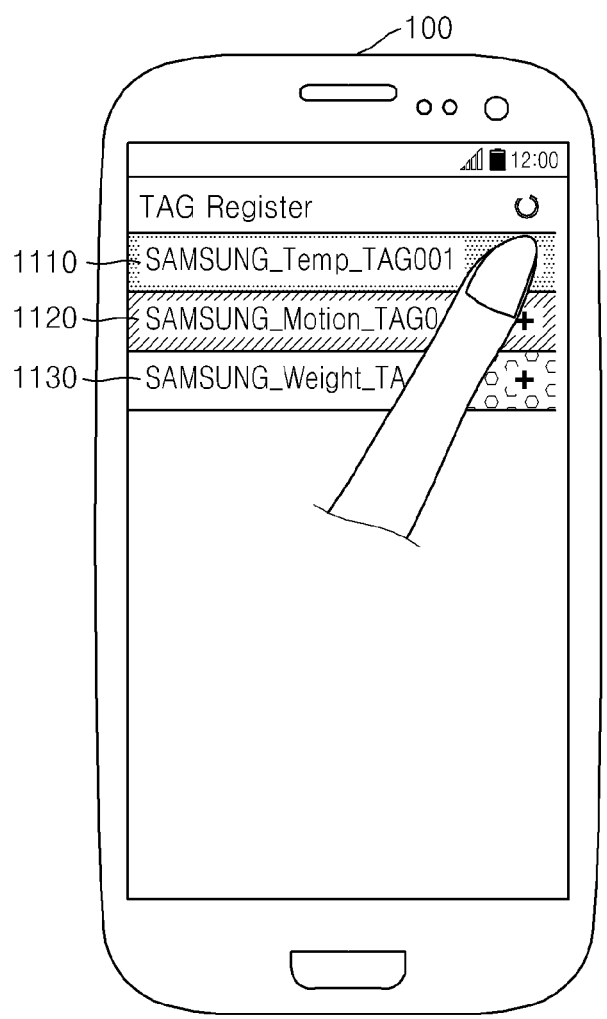
SAMSUNG_Temp_TAG001_blue
—1110
SAMSUNG_Motion_TAG002_sky
—1120
SAMSUNG_Weight_TAG003_red
—1130

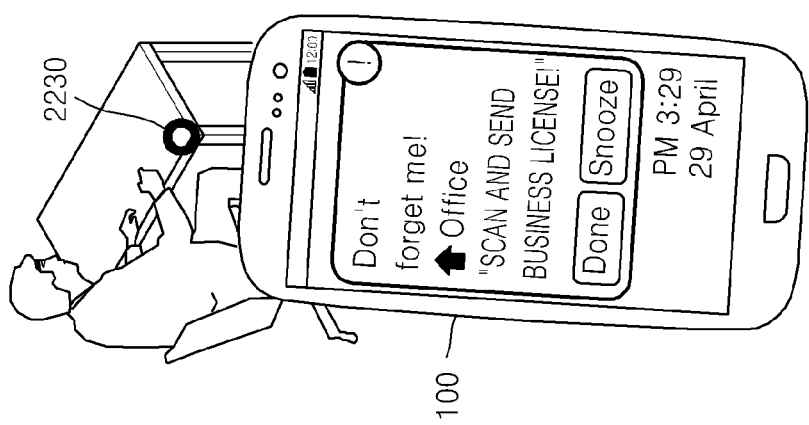
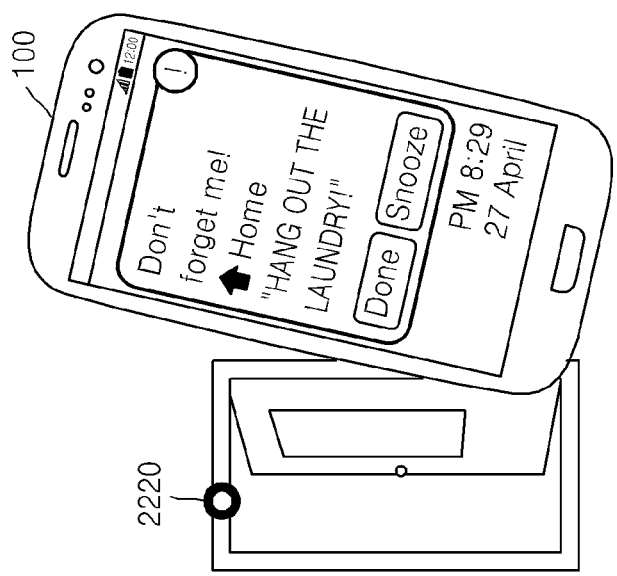
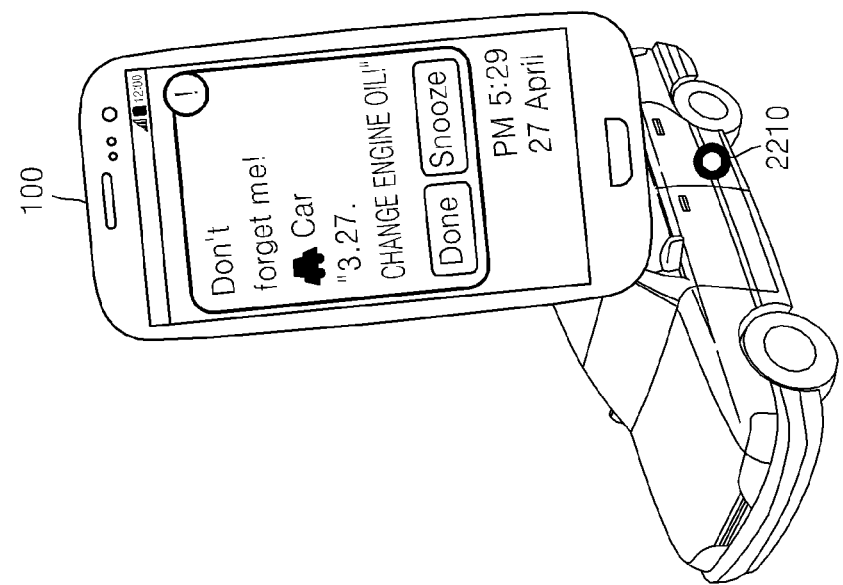

FIG. 27B
FIG. 27C
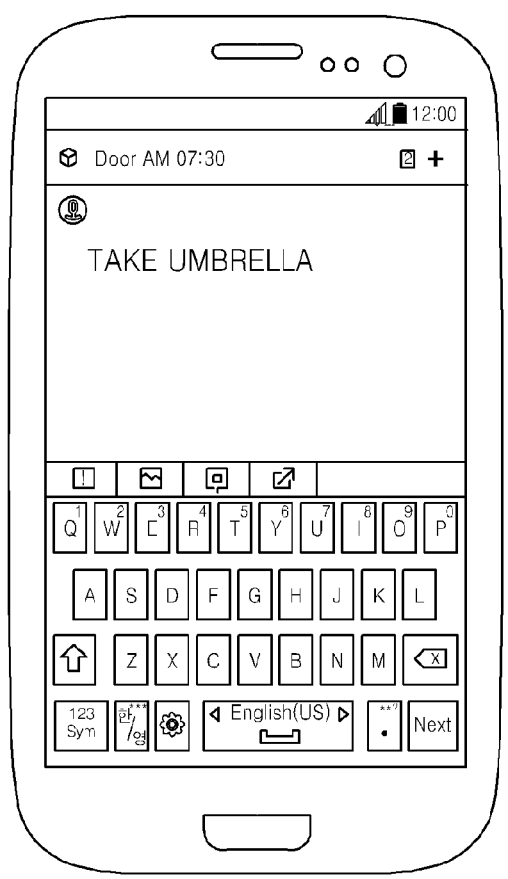
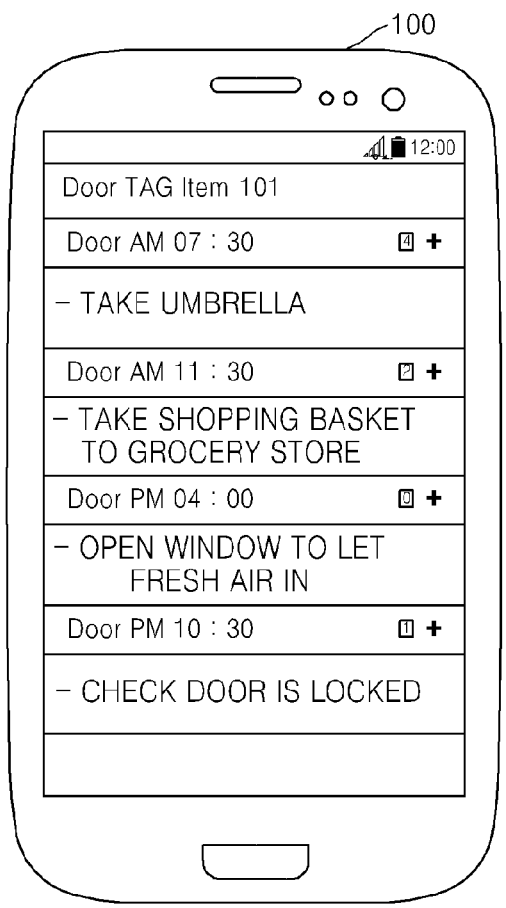

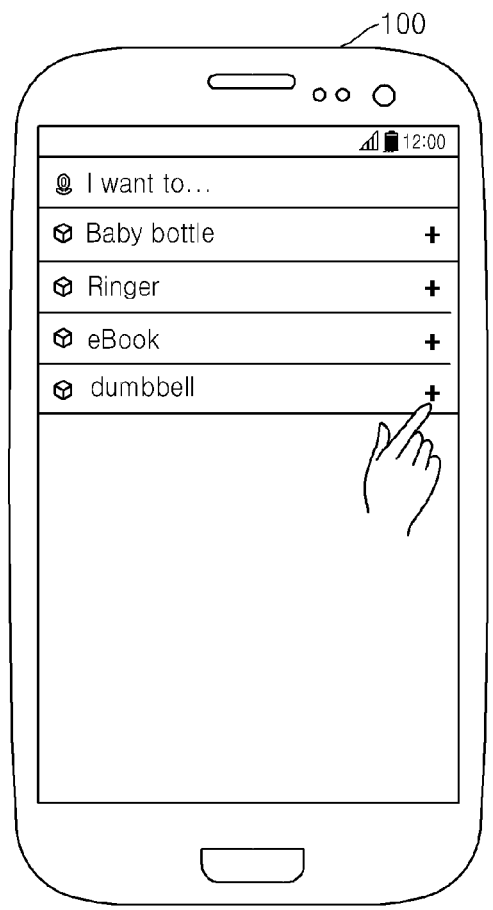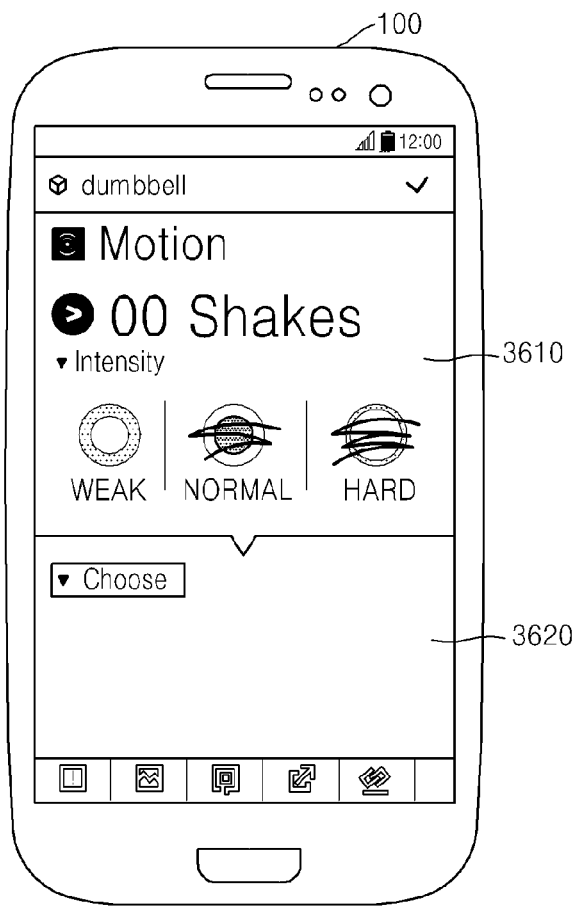

FIG. 41
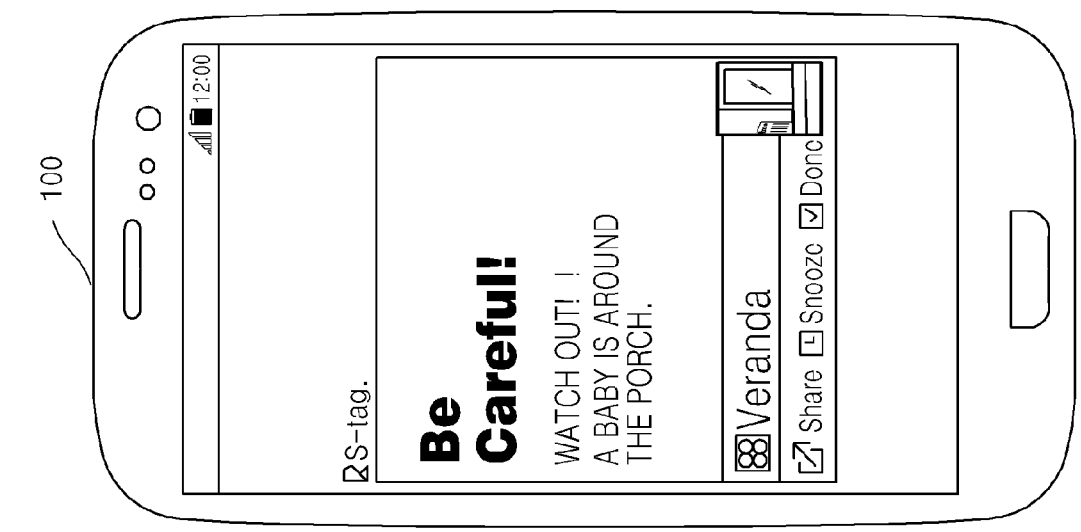
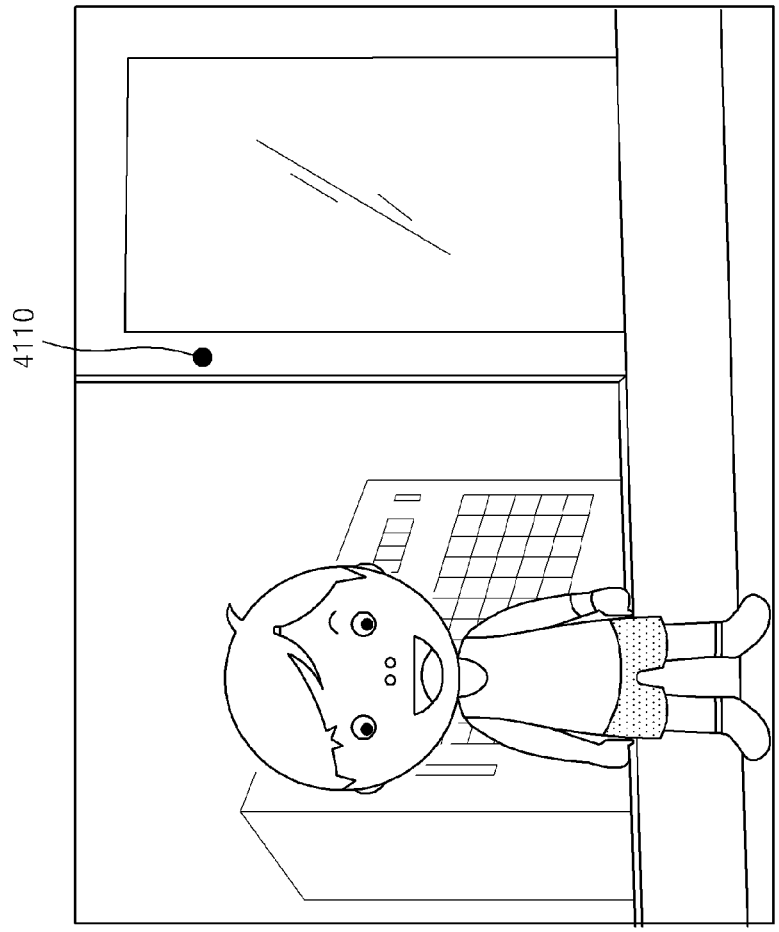

FIG. 61

| Value (6110) | Data Type Name (6120) | Definition (6130) |
|---|---|---|
| 0x01 | «Flags» | (0); LE Limited Discoverable Mode<br>(1) LE General Discoverable Mode<br>(2) BR/EDR Not Supported<br>(3) LE AND BR/EDR SIMULTANEOUS AVAILABILITY (Controller)<br>(4) LE AND BR/EDR SIMULTANEOUS AVAILABILITY (Host) |
| 0x02 | «Incomplete List of 16-bit Service Class UUIDs» | More 16-bit UUIDs available |
| 0x03 | «Complete List of 16-bit Service Class UUIDs» | Complete list of 16-bit UUIDs available |
| 0x04 | «Incomplete List of 32-bit Service Class UUIDs» | More 32-bit UUIDs available |
| 0x05 | «Complete List of 32-bit Service Class UUIDs» | Complete list of 32-bit UUIDs available |
| 0x06 | «Incomplete _is_ of 128-bit Service Class UUIDs» | More 128-bit UUIDs available |
| 0x07 | «Complete List of 128-bit Service Class UUIDs» | Complete list of 128 bit UUIDs available |
| 0x08 | «Shortened Local Name» | |
| 0x09 | «Complete Local Name» | Max 248 bytes, 82 characters |
| 0x0A | «Tx Power Level» | 0xXX; −127 to +127dBm |
| 0x0D | «Class of Device» | Optional OOB Tags |
| 0x0E | «Simple Pairing Hash C» | Optional OOB Tags |
| 0x0F | «Simple Pairing Randomizer R» | Optional OOB Tags |
| 0x10 | «Device ID» | |
| 0x10 | «Security Manager TK Value» | Temporary Key (TK): a 128-bit temporary key used in the pairing process |
| 0x11 | «Security Manager Out of Band Flags» | (0); OOB data not present = 0, present = 1<br>(1) LE supported (Host)<br>(2) LE AND BR/EDR SIMULTANEOUS AVAILABILITY (Host)<br>(3) Address type (0=Public, 1=Random) |
| 0x12 | «Slave Connection Interval Range» | Conn_Interval_Min and Conn_Interval_Max (range : 0x0006 to 0x0C80, 7.5ms ~ 4s) |
| 0x14 | «List of 16-bit Service Solicitation UUIDs» | REQUEST FOR LIST OF 16 BIT SERVICE UUIDs SERVICE |
| 0x15 | «List of 128-bit Service Solicitation UUIDs» | REQUEST FOR LIST OF 128 BIT SERVICE UUIDs SERVICE |
| 0x16 | «Service Data» | 16 bit Service UUID + Service Data |
| 0x17 | «Public Target Address» | |
| 0x18 | «Random Target Address» | |
| 0x19 | «Appearance» | |
| 0xFF | «Manufacturer Specific Data» | Company ID Code + MSD |

FIG. 62A

| NECESSARY AD TYPE | Byte | PURPOSE | EMBODIMENT |
|---|---|---|---|
| TX Power Level | 1 | MEASURE PREDETERMINED DISTANCE(Signal Strength) pathloss = TX PL − Adv_RSSI | TX Power level = +4 (dBm) RSSI on Adv packet = −60 (dBm) passloss = +65 dB |
| Shortened Local Name | 29 ↓ | Broadcast Name or Msg | REPLACEMENT TO SCAN RESPONSE IS POSSIBLE ex) GT-N8000, Samsung Mobile |
| Class of Device (Cod) | 3 | Major Device Class Minor Device Class Service Class (24bit bit-mask) | ex) CoD = Major : Phone Minor : Smart phone Service : Object Transfer |
| Random Target Address | 6 | 48-bit address | ex) PREDEFINED ADDRESS SUCH AS SAMSUNG MOBILE, STARBUCKS, ETC. IS USED |
| List of Service Solicitation UUIDs | 2 ↑ | May be sent to invite | ex) 0x1105 <<Object Push Profile>> 0x1106 <<File Transfer Profile>> |
| Manufacturer Specific Data <<Protocol>> | 4 | Company Identifier Code and Protocol Identifier Code | (0x0075) Samsung Electronics (0x0201) SSSP 1.1 |
| Manufacturer Specific Data <<Capability>> | 2 | Capability State (16bit bit-mask) | <<Communcation Bitmasks>> (01) Bluetooth BR/EDR (02) Bluetooth AMP (03) Bluetooth LE (04) WiFi (05) WiFi Direct (06) WiFi Display (07) DLNA (All-Share) (08) NFC, RFID (09) ZigBee, RF4CE |

FIG. 62B

| NECESSARY AD TYPE | Byte | PURPOSE | EMBODIMENT |
|---|---|---|---|
| Manufacturer Specific Data <<Capability>> | 2 | Capability State (16bit bit-mask) | (10) Ant, Ant+ <br> (11) Proprietary 2.4Ghz <br> (12) Sub-1Ghz <br> (13~16) Reserved <br> ex] 0x00FF (01~08 Supported) |
| Manufacturer Specific Data <<Sensor>> | 8 | Sensor ID and Value | <<Sensor Raw Value>> <br> (01) GPS <br> 02) Accelerometer <br> (03) Gyroscope <br> (04) Geomagnetic <br> (05) Pressure <br> (06) Temperature <br> (07) Humidity <br> (08) Grip <br> (09) Proximity <br> (10) Light <br> ex] 0x06000024 (Temperature 36°C) |
| Manufacturer Specific Data <<Others>> | 2 | Phone State | <<Phone State Bitmasks>> <br> (01) Silent mode <br> (02) Screen Rotation <br> (03) Power Saving <br> (04) Notification <br> (05) Mobile Data <br> (06) Driving mode <br> (07) Sync mode <br> (08) Privacy/Flight mode <br> (09~16) Reserved |

FIG. 63

AdvData: 0x0000FFFF040201FF030075FF03840A0230303038 4E5F5471080904 0102 (29 Bytes)

| ① | ② | ③ | ④ | ⑤ | ⑥ |
|---|---|---|---|---|---|
| 02 01 04 | 09 08 71 54 5F 4E 38 30 30 30 | 02 0A 84 | 03 FF 75 00 | 03 FF 01 02 | 04 FF FF 00 00 |

① Flags
② Shortened Local Name "GT-N8000"
③ Tx Power Level=132 (+4dBm)
④ [MSD] Company ID (0x0075)
⑤ [MSD] Protocol ID (0x0201)
⑥ [MSD] Capability State (0x0000FF)

MOBILE TERMINAL AND METHOD OF CONTROLLING FUNCTION OF THE MOBILE TERMINAL

CROSS-REFERENCE TO RELATED PATENT APPLICATION(S)

This application claims the benefit under 35 U.S.C. §119(a) of a Korean patent application filed on Dec. 3, 2012, in the Korean Intellectual Property Office and assigned Serial No. 10-2012-0139248, and a Korean patent application filed on Mar. 13, 2013 in the Korean Intellectual Property Office and assigned Serial No. 10-2013-0026825, the entire disclosures of which are hereby incorporated by reference.

TECHNICAL FIELD

The present disclosure relates to a mobile terminal that allows a user to control the mobile terminal by using a Bluetooth Low Energy (BLE) device and a method of controlling a function of the mobile terminal. More particularly, the present disclosure relates to a mobile terminal that automatically performs a previously set function corresponding to identification information of a BLE device by performing BLE communication with the BLE device.

BACKGROUND

Bluetooth technology enables short-range wireless communication, rather than having to use several cables to connect devices to each other. For example, when the Bluetooth wireless technology is implemented in a cellular phone or a laptop computer, the cellular phone or the laptop computer may be connected to a wireless communication network without having to make a cable connection. Actually, all digital devices, including printers, Personal Digital Assistants (PDAs), desktop computers, fax machines, keyboards, and joysticks, can be a part of a Bluetooth system. In addition to removing the necessity of making cable connections, the Bluetooth wireless technology can also be used to form an interface between an existing data network and peripheral devices and to form a special group between devices which are located far from a fixed network infrastructure.

The Bluetooth technology provides a strong wireless connection based on quick recognition and by using a frequency hopping method. A Bluetooth module prevents interference with other signals by hopping to a new frequency after transmission or reception of a packet. In contrast, to other systems which operate within the same frequency range, the Bluetooth technology uses a specially short and fast packet. Because Bluetooth version 4.0, which has all of the functions provided by Classic Bluetooth, Bluetooth high speed, and Bluetooth Low Energy (BLE), was released, interest in the BLE technology has been growing.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mobile terminal that automatically performs a previously set function corresponding to identification information of a Bluetooth Low Energy (BLE) device by performing BLE communication with the BLE device, and a method of controlling a function of the mobile terminal.

In accordance with an aspect of the present disclosure, a method of controlling a function of a mobile terminal is provided, The method includes placing the mobile terminal within a communication range of a Bluetooth Low Energy (BLE) device previously registered in the mobile terminal, receiving identification information of the BLE device from the BLE device, extracting function information corresponding to the received identification information of the BLE device, and performing a previously set function corresponding to the extracted function information.

In accordance with an aspect of the present disclosure, the method may further include receiving a user input for connecting at least one function supported by the mobile terminal with the BLE device, and mapping and storing the identification information of the BLE device and the at least one function based on the user input.

In accordance with an aspect of the present disclosure, the receiving of the user input may include receiving a user input for connecting the BLE device with a plurality of functions, and wherein the mapping and storing of the identification information includes mapping and storing the identification information of the BLE device and the plurality of functions.

In accordance with an aspect of the present disclosure, the receiving of the user input may include receiving a user input for classifying and connecting the BLE device with the plurality of functions according to time.

In accordance with an aspect of the present disclosure, the previously set function may include at least one of a text sending function, a call connection function, and a content playback function.

In accordance with an aspect of the present disclosure, the performing of the previously set function may include extracting an application for performing the previously set function, and executing the extracted application.

In accordance with an aspect of the present disclosure, the extracting of the function information may include receiving sensing information detected by the BLE device from the BLE device, and extracting the function information additionally in consideration of the received sensing information.

In accordance with an aspect of the present disclosure, the sensing information may include at least one from among motion information, weight information, illuminance information, temperature information, humidity information, acceleration information, and proximity information which are detected by the BLE device.

In accordance with an aspect of the present disclosure, the motion information may include at least one of a motion pattern, a motion frequency, a motion occurrence time, a motion speed, and a motion direction.

In accordance with an aspect of the present disclosure, the extracting of the function information may include confirming mode information corresponding to the identification information of the BLE device, and wherein the performing of the previously set function includes: automatically setting a mode of the mobile terminal based on the confirmed mode information.

In accordance with an aspect of the present disclosure, the automatic setting of the mode may include setting at least one of a communication mode related to a communication method of the mobile terminal, a sound output mode, a vibration mode, an airplane mode, a driving mode, and a data transmission/reception mode in which data is transmitted and received to and from a previously determined external device based on the confirmed mode information.

In accordance with another aspect of the present disclosure, a mobile terminal is provided. The mobile terminal includes a communication unit configured to, when the mobile terminal is disposed within a communication range of a Bluetooth Low Energy (BLE) device previously registered in the mobile terminal, receive identification information from the BLE device, a control unit configured to extract function information corresponding to the received identification information of the BLE device and to perform a previously set function corresponding to the extracted function information, and a memory configured to map and store the identification information of the BLE device and at least one function supported by the mobile terminal.

In accordance with an aspect of the present disclosure, the mobile terminal may further include a user input unit configured to receive a user input for connecting the at least one function supported by the mobile terminal with the BLE device.

In accordance with an aspect of the present disclosure, the user input unit may receive a user input for classifying and connecting the BLE device and a plurality of functions according to time.

In accordance with an aspect of the present disclosure, the control unit may extract an application for performing the previously set function and executes the extracted application.

In accordance with an aspect of the present disclosure, the communication unit may further receive sensing information detected by the BLE device from the BLE device, and wherein the control unit extracts the function information additionally in consideration of the received sensing information.

In accordance with an aspect of the present disclosure, the control unit may request a call connection to a previously set external device based on the identification information and sensing information of the BLE device.

In accordance with an aspect of the present disclosure, the control unit may confirm mode information corresponding to the identification information of the BLE device, and automatically set a mode of the mobile terminal based on the confirmed mode information.

In accordance with an aspect of the present disclosure, the control unit may set at least one of a communication mode related to a communication method of the mobile terminal, a sound output mode, a vibration mode, an airplane mode, a driving mode, and a data transmission/reception mode in which data is transmitted and received to and from a previously determined external device based on the confirmed mode information.

In accordance with another aspect of the present disclosure, a non-transitory computer-readable recording medium having recorded thereon a computer program for executing the method of controlling a function of a mobile terminal is provided.

In accordance with another aspect of the present disclosure, a method of controlling a function of a mobile terminal is provided. The method includes detecting a BLE device previously registered in the mobile terminal, receiving identification information from the BLE device, and performing a previously set function corresponding to the received identification information of the BLE device, wherein the previously set function is previously set by a user.

In accordance with an aspect of the present disclosure, the BLE device may include a sensor based BLE device. The method further includes when the sensor based BLE device is detected, receiving identification information and sensing information from the sensor based BLE device.

In accordance with an aspect of the present disclosure, the previously set function may include a mode changed and performed by the mobile terminal, wherein the mode includes at least one of a communication mode related to a communication method of the mobile terminal, a sound output mode, a vibration mode, an airplane mode, a driving mode, and a data transmission/reception mode in which data is transmitted and received to and from a previously determined external device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a flowchart illustrating a method in which a mobile terminal provides a service by using a BLE device according to an embodiment of the present disclosure;

FIG. 6 is a flowchart illustrating a method in which a mobile terminal registers and controls at least one BLE device according to an embodiment of the present disclosure;

FIGS. 8A, 8B, and 8C are diagrams illustrating a list of BLE devices which include color information according to an embodiment of the present disclosure;

FIGS. 11A, 11B, and 11C are diagrams illustrating the list of BLE devices which include sensor information according to an embodiment of the present disclosure;

FIGS. 22A, 22B, and 22C are diagrams illustrating a screen for outputting a notification message according to an embodiment of the present disclosure;

FIGS. 27A, 27B, and 27C are diagrams illustrating a screen for receiving an input of a plurality of pieces of notification information regarding a single BLE device according to an embodiment of the present disclosure;

FIGS. 36A, 36B, and 36C are diagrams illustrating a screen of a mobile terminal for receiving an input of a fitness management message and reference motion information according to an embodiment of the present disclosure;

FIG. 41 is a diagram illustrating a screen for outputting a baby care management message according to an embodiment of the present disclosure;

FIG. 61 is a table for explaining an Advertising Data (AD) type according to an embodiment of the present disclosure;

FIGS. 62A and 62B are tables for explaining data broadcasted by a BLE device according to an embodiment of the present disclosure; and FIG. 63 is a diagram illustrating an example of an AD packet according to an embodiment of the present disclosure.

The same reference numerals are used to represent the same elements throughout the drawings.

DETAILED DESCRIPTION

Figure 1:
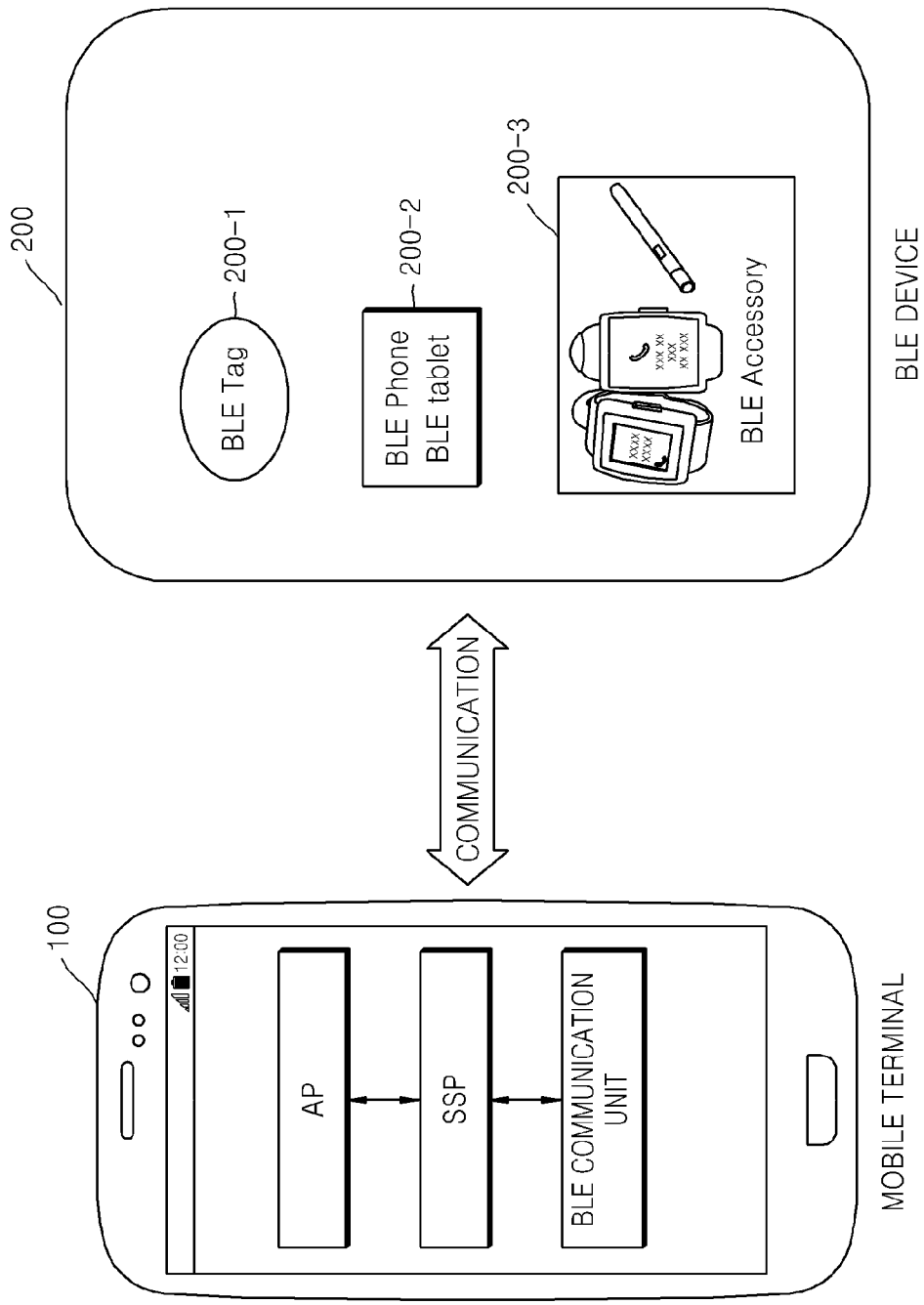
FIG. 1 is a diagram illustrating a Bluetooth Low Energy (BLE) communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be further understood that the terms "comprises," "comprising," "includes," and/or "including," when used herein, specify the presence of components, but do not preclude the presence or addition of one or more other components, unless otherwise specified. Additionally, terms used herein, such as 'unit' or 'module', mean entities for processing at least one function or operation. These entities may be implemented by hardware, software, or a combination of hardware and software.

Bluetooth Low Energy (hereinafter referred to as 'BLE'), in the description of the present disclosure, is one of short-range wireless communication technologies and is an important function of Bluetooth version 4.0. The BLE has a relatively small duty cycle, relative to classic or traditional Bluetooth technology. The BLE may be produced at low cost and may operate using a coin-sized battery for several years by reducing average power and standby power.

According to various embodiments of the present disclosure, a communication range of a BLE device corresponds to a distance across which a mobile terminal may receive data which may be broadcast from the BLE device in the form of an advertising packet. For example, the distance may be 50 m to 100 m. Additionally, the communication range of the BLE device may be arbitrarily set by a user. For example, the user may set a certain area, such as a living room, a kitchen, or an entire house, as the communication range of the BLE device. As another example, the user may set a certain distance (e.g., 5 m), as the communication range of the BLE device.

An application, as referred to in the description of the present disclosure, is a set of computer programs designed for executing a particular operation, task, or the like. Applications provided in the description of various embodiments of the present disclosure may vary. For example, the applications provided in the description of the present disclosure may include a schedule management application, an address application, a video playback application, a map application, a fitness application, a payment application, a baby care application, a healthcare application, an e-book application, and/or the like. However, various embodiments of the present disclosure are not limited thereto.

Embodiments of the present disclosure will now be described more fully with reference to the accompanying drawings, in which various embodiments of the present disclosure are shown. However, embodiments of the present disclosure may be embodied in many different forms and should not be construed as being limited to the various embodiments set forth herein. In the description of the present disclosure, certain detailed explanations of the related art are omitted when such a description may unnecessarily obscure the essence of the present disclosure. Like numbers refer to like elements throughout the description of the figures.

FIG. 1 is a diagram illustrating a BLE communication system according to an embodiment of the present disclosure.

Referring to FIG. 1, the BLE communication system, according to an embodiment of the present disclosure, may include a mobile terminal 100 and a BLE device 200.

The mobile terminal 100 may be a terminal for providing a user with a predetermined service via BLE communication with an external BLE device 200. For example, the mobile terminal 100 may register and manage information about the external BLE device 200 such as, for example, identification information, in a memory. Additionally, the mobile terminal 100 may provide a reminder service, a mode change service, and a remote control service, via the BLE communication with the external BLE device 200. Examples of the various services that the mobile terminal 100 may provide will be described in detail later.

According to various embodiments of the present disclosure, the mobile terminal 100 may be implemented in various forms. For example, the mobile terminal 100 may be a cellular phone, a smart phone, a laptop Personal Computer (PC), a tablet PC, an e-book terminal, a digital broadcasting terminal, a Personal Digital Assistant (PDA), a Portable Multimedia Player (PMP), a navigation system, a portable game console, an MP3 player, and/or the like. However, the mobile terminal 100 is not limited thereto.

According to various embodiments of the present disclosure, the mobile terminal 100 a Seamless Sensing Platform (SSP) that may operate independently from an Application Process (AP). The mobile terminal 100 may collect information about the BLE device 200 and recognize a context by connecting a sensor hub of the SSP to a BLE communication unit without having to wake up the AP from a sleep mode. In the case of a predetermined situation, the SSP wakes up the AP from the sleep mode. According to various embodiments of the present disclosure, the SSP, the AP, and the BLE communication unit may be implemented by hardware, software, or a combination of hardware and software. Examples of an implementation or configuration of the SSP, the AP, and the BLE communication unit will be described in detail later with reference to FIG. 3.

The BLE device 200 may broadcast identification information via BLE communication. The BLE device 200 may broadcast the identification information in advertising packet form. According to various embodiments of the present disclosure, the BLE device 200 may broadcast sensing information, obtained by a sensor (e.g., to external recipients). For example, the BLE device 200 may include identification information (e.g., "SAMSUNG_Temp_TAG001_blue") in a Universally Unique Identifier (UUID) Field of the advertising packet or in a Manufacturer Specific Data (MSD) field thereof and may broadcast the identification information. A detailed description of the BLE device 200 broadcasting data in advertising packet form will be provided later with reference to FIGS. 60 through 63. For convenience of description, hereinafter, a BLE device 200 which includes a sensor is referred to as a sensor-based BLE device 200.

According to various embodiments of the present disclosure, the BLE device 200 may broadcast the sensing information detected by the BLE device 200 for a certain period of time. If the sensing information is updated or when a specific event is generated, the BLE device 200 may also broadcast the sensing information by using an event trigger method.

Additionally, according to various embodiments of the present disclosure, he BLE device 200 may broadcast the identification information in advertising packet form. The sensing information detected by the BLE device 200 may be transmitted to the mobile terminal 100 via a communication channel after the BLE device 200 is paired with the mobile terminal 100. For security of the sensing information, according to various embodiments of the present disclosure, the BLE device 200 may encrypt the sensing information by using a negotiated encryption key or a pre-defined encryption key, and may transmit the encrypted sensing information to the mobile terminal 100.

According to various embodiments of the present disclosure, the BLE device 200 may be implemented in various forms. For example, according to various embodiments of the present disclosure, the BLE device 200 may be implemented in a format of a simple BLE tag 200-1, mobile equipment 200-2 such as for example, a BLE phone or a BLE tablet PC, or an accessory such as a BLE wristwatch or a BLE earphone 200-3. The configuration of the BLE device 200 will be described later with reference to FIGS. 4A and 4B.

Figure 2:
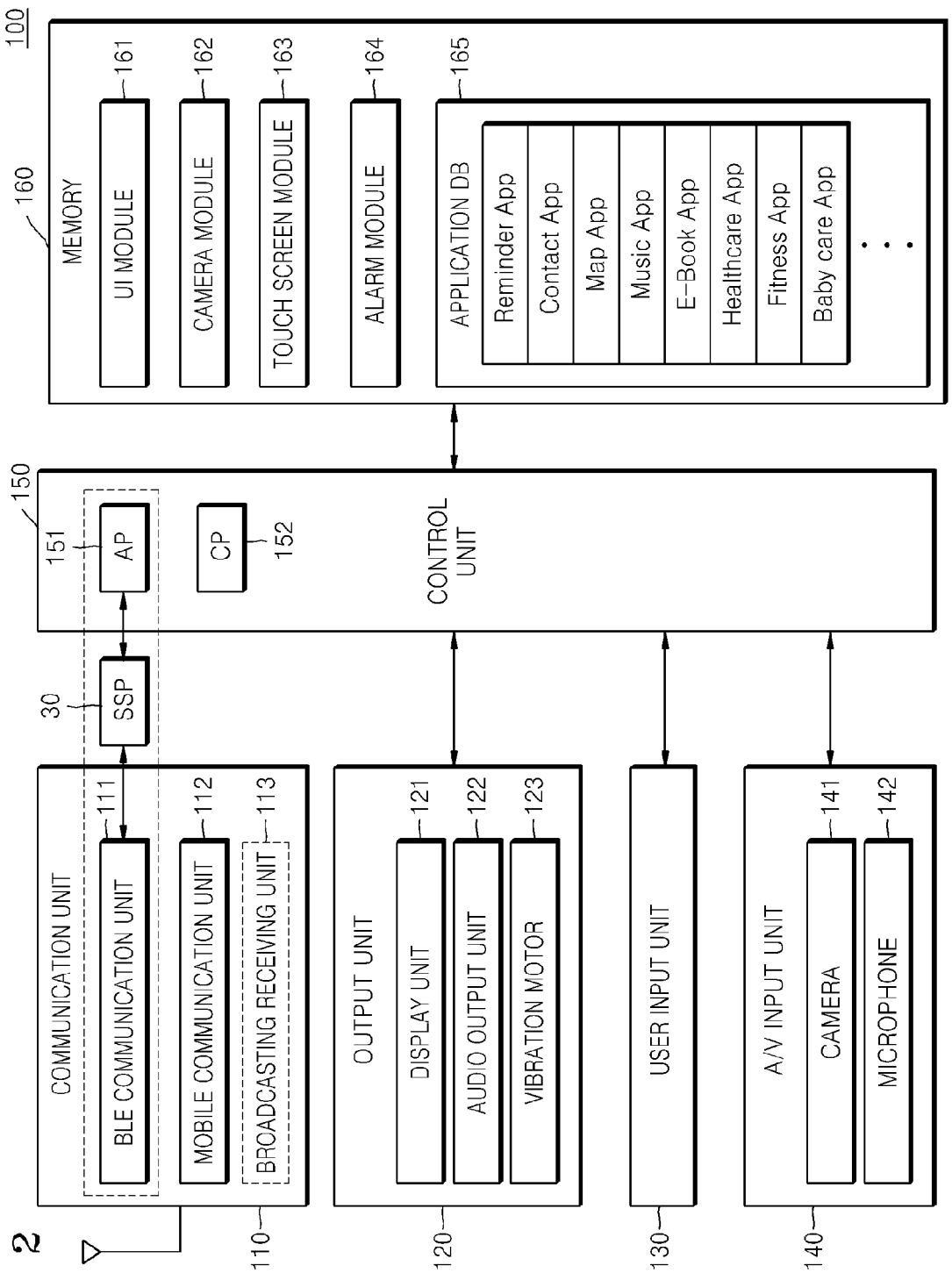
FIG. 2 is a block diagram illustrating a mobile terminal according to an embodiment of the present disclosure.

FIG. 2 is a block diagram illustrating the mobile terminal 100 according to an embodiment of the present disclosure.

Referring to FIG. 2, the mobile terminal 100, according to various embodiments of the present disclosure, may include a communication unit 110, an output unit 120, a user input unit 130, an Audio-Video (A/V) input unit 140, a control unit 150, and a memory 160. However, the illustrated units are not always essential elements of various embodiments of the present disclosure. The mobile terminal 100 may be implemented by using more or less units than those shown in FIG. 2.

Hereinafter, the above-stated units will be described.

The communication unit 110 may include one or more units for communication between the mobile terminal 100 and the BLE device 200 or between the mobile terminal 100 and a server. For example, the communication unit 110 may include a BLE communication unit 111, a mobile communication unit 112, and a broadcasting receiving unit 113.

The BLE communication unit 111 supports a BLE communication function. For example, the BLE communication unit 111 may receive a signal which is broadcast from the external BLE device 200 in the form of an advertising packet. The BLE communication unit 111 may scan the BLE device 200 for a predetermined period of time or upon a request from a user.

The BLE communication unit 111 may be connected to an SSP 30. The SSP 30 may include a sensor hub and an SSP manager. The sensor hub is a type of Micro Controller Unit (MCU) and may be connected to various types of sensors. According to various embodiments of the present disclosure, the sensor hub may be connected to the BLE communication unit 111, and collect information about the external BLE device 200 via the BLE communication unit 111. The SSP manager may receive data from the sensor hub and wake up an AP 151 from a sleep mode based on the data received from the sensor hub. The SSP 30 will be described later with reference to FIG. 3.

The communication unit 110 may also support other short-range wireless communication functions, in addition to the BLE communication function. Short-range wireless technology may include a wireless Local Area Network (LAN) which may be a Wi-Fi, a Bluetooth technology, a Zigbee technology, a Wi-Fi Direct (WFD) technology, a Near Field Communication (NFC) technology, a Ultra Wideband (UWB) technology, an Infrared Data Association (IrDA) network technology, and/or the like. According to various embodiments of the present disclosure, the short-range wireless technology is not limited thereto.

The mobile communication unit 112 transmits and receives a wireless signal to and from with at least one of a base station, an external terminal, and a server on a mobile communication network. The wireless signals may include a voice call signal, a video phone call signal, various forms of data used to transmit and receive text or multimedia messages, and/or the like.

The broadcasting receiving unit 113 receives broadcasting signals and/or broadcasting-related information, via a broadcasting channel. The broadcasting channel may include a satellite channel and a terrestrial broadcast channel. According to various embodiments of the present disclosure, the mobile terminal 100 may not include a broadcasting receiving unit 113.

The output unit 120 functions to output an audio signal, a video signal, or a vibration signal, and/or the like. The output unit 120 may include a display unit 121, an audio output unit 122, and a vibration motor 123.

The display unit 121 displays and outputs information processed by the mobile terminal 100. For example, while in a phone call mode, the display unit 121 may display a User Interface (UI) or a Graphic User Interface (GUI) related to the phone call. Otherwise, while in a mode of searching for the BLE device 200, the display unit 121 may display a list of the searched for BLE devices. The display unit 121 may also display BLE devices which are registered in the mobile terminal 100, separately from those which are not registered in the mobile terminal 100.

Additionally, while in a setting mode of the BLE device 200, the display unit 121 may display a UI or a GUI, regarding a setting of the BLE device 200. While in a photographing mode, the display unit 121 may display a captured image.

If the display unit 121 and a touch pad form a layered structure to correspond to a touch screen, the display unit 121 may also be used as an input device as well as an output unit. The display unit 121 may include at least one from among a Liquid Crystal Display (LCD), a Thin-Film Transistor-Liquid Crystal Display (TFT-LCD), an Organic Light-Emitting Diode (OLED), a flexible display, a 3-Dimensional (3D) display, an electrophoretic display, and/or the like. According to various embodiments of the present disclosure, the mobile terminal 100 may include two or more display units 121. The two or more display units 121 may be disposed to face each other by using a hinge.

The audio output unit 122 outputs audio data which may be received from the communication unit 110 or stored in the memory 160. The audio output unit 122 outputs an audio signal related to functions performed at the mobile terminal 100 such as, for example, a call signal reception sound, a message reception sound and/or the like. The sound output unit 122 may include a speaker, a buzzer, and/or the like.

The vibration motor 123 may output a vibration signal. For example, the vibration motor 123 may output a vibration signal which corresponds to an output of audio data or video data such as, for example, a call signal reception sound, a message reception sound, and/or the like. Additionally, the vibration motor 123 may output a vibration signal, if a touch is input to a touch screen.

The user input unit 130 is a unit for inputting data so that the user may control the mobile terminal 100. For example, the user input unit 130 may include a key pad, a dome switch, a touch pad, which may be a capacitive overlay type, a resistive overlay type, an infrared beam type, a surface acoustic wave type, an integral strain gauge type, a piezo electric type, a jog wheel, a jog switch, and/or the like. However, various embodiments of the present disclosure are not limited thereto.

The A/V input unit 140 functions to input audio or video signals, and may include a camera 141 and/or a microphone 122. The camera 141 may obtain an image frame such as a still image or a moving image through an image sensor, in a video phone mode or a photographing mode. An image captured through the image sensor may be processed through the control unit 150 or an additional image processing unit (not illustrated). The processed image frame may be displayed in the display unit 121, stored in the memory 160, and/or transmitted through the communication unit 110. The A/V input unit 140 may include two or more cameras 141 according to a configuration type of the mobile terminal 100.

The microphone 142 receives external sound signals in a telephone mode, a recording mode, or a voice recognition mode, and processes the external sound signals into electrical voice data. If in a telephone mode, the processed voice data may be converted into a transmittable form and output to the mobile communication base station via the mobile communication unit 112.

The control unit 150 operatively controls all operations of the mobile terminal 100. For example, the control unit 150 executes programs stored in the memory 160 so as to control the communication unit 110, the output unit 120, the user input unit 130, the AN input unit 140, and the memory 160.

The control unit 150 may include the AP 151 and a Communication Processor (CP) 152. The AP 151 may control execution of various applications which are stored in the memory 160. For example, if identification information of the BLE device 200 is received, the AP 151 may extract and execute an application for executing a control command which corresponds to the received identification information. The communication processor 152 may control various communication functions.

According to various embodiments of the present disclosure, the control unit 150 may map and register property information regarding the BLE device 200 and user added information, which is input from a user, and manage the registered information. Additionally, the control unit 150 may compare identification information about a searched for BLE device to a list of registered BLE devices which are stored in the memory 160. Thus, the control unit 150 may extract a BLE device, which is not registered in the mobile terminal 100, from among the searched for BLE devices. Based on the user input, the control unit 150 may capture an image of an object, for example, an image of the BLE device 200 or an image of an object or place to which the BLE device 200 is attached, by using the camera 141.

Additionally, the control unit 150 may obtain information about a distance between the BLE device 200 and the mobile terminal 100, by using the strength of a signal received from the BLE device 200. For example, the control unit 150 may obtain the distance between the BLE device 200 and the mobile terminal 100 by using information about a relationship between the strength of the received signal and the distance.

The memory 160 may store a program for processing and controlling the control unit 150. The memory 160 may also store data, which is input or output, such as identification information of the BLE device, property information regarding the BLE device, user added information input from a user, sensing information obtained by a sensor included in the BLE device, and/or the like.

The memory 160 may include at least one storage medium from among a flash memory, a hard disk, a multimedia card micro, a card-type memory such as a Secure Digital (SD) or Extreme Digital (XD) memory, a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, an optical disc, and/or the like. Additionally, the mobile terminal 100 may operate web storage for performing a storage function of the memory 160 on the internet.

The programs, stored in the memory 160, may be classified into a plurality of modules according to functions. For example, the programs may be classified into a User Interface (UI) module 161, a camera module 162, a touch screen module 163, an alarm module 164, an application Database (DB) 165, or the like.

The UI module 161 may provide a specialized UI or GUI which interworks with the BLE device 200 according to applications. The camera module 162 may capture and process an image of an object which corresponds to the BLE device 200. Functions of the UI module 161 and the camera module 162 may be intuitively inferred from the name of the modules by those of ordinary skill in the art. Thus, a detailed description thereof will not be provided here.

The touch screen module 163 may detect a touch gesture on a touch screen by a user and transmit information about the touch gesture to the control unit 150. According to various embodiments of the present disclosure, the touch screen module 163 may be formed of a hardware controller.

Various types of sensors may be disposed inside or near the touch screen, in order to detect a touch or a proximity touch on the touch screen. An example of a sensor for detecting a touch on the touch screen may be a tactile sensor. The tactile sensor is a sensor for detecting a contact of a specific object to such a degree that humans may feel the contact with the specific object or to a higher degree. The tactile sensor may detect various types of information such as information about a roughness of a contact surface, a hardness of a contact object, a temperature at a contact point, and/or the like.

Additionally, an example of a sensor for detecting a touch on the touch screen is a proximity sensor. The proximity sensor is a sensor for detecting an object which is approaching a predetermined detection surface or a neighboring object by using the strength of an electromagnetic field or an infrared light. Examples of the proximity sensor include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, an infrared proximity sensor, and/or the like. Touch gestures of a user may include a tap, a touch and hold, a double-tap, a drag, panning, a flick, a drag-and-drop, a swipe, and/or the like.

A "tap" is a gesture in which a user touches a screen by using a finger or a touch tool, for example, an electronic pen, and then, immediately lifts the touch off from the screen without dragging on the screen.

A "touch and hold" is a gesture in which a user touches a screen by using a finger or a touch tool, for example, an electronic pen and holds the touch for more than a critical period of time, for example, 2 seconds. For example, a difference in time between time points of a touch on and a lift-off from the screen is longer than the critical period of time, for example, 2 seconds. If the touch input is held for more than the critical period of time to make a user recognize whether the touch input is a tap or a touch and hold, a feedback signal may be visually, aurally, or tactually provided. The critical period of time may vary according to various embodiments of the present disclosure.

A "double tap" is a gesture in which a user touches a screen twice by using a finger or a touch tool which may be a stylus.

A "drag" is a gesture in which a user touches a screen by using a finger or a touch tool and moves the finger or the touch tool to another location in the screen while holding the touch. When the drag is performed, an object moves, or a panning gesture, which is described below, is performed.

A "panning" gesture is a gesture in which a user performs a drag without selecting an object. As the panning does not select a specific object, an object does not move in a page, and the page moves in the screen or a group of objects moves in the page.

A "flick" is a gesture in which a user performs a drag at a critical speed or at a higher speed (e.g., 100 pixels/s), by using a finger or a touch tool. The flick may be distinguished from the drag or the panning based on whether a moving speed of a finger or a touch tool is equal to or higher than the critical speed (e.g., 100 pixels/s).

A "drag and drop" is a gesture in which a user drags an object to a predetermined place in a screen by using a finger or a touch tool, and then, lifts the finger or touch tool off the screen.

A "pinch" is a gesture in which a user touches a screen with two fingers or the like, and moves the two fingers in different directions. The pinch may be a pinch-open gesture for zooming-in to an object or a page, or a pinch-close gesture for zooming-out from an object or a page. A zoom-in or zoom-out value is determined according to a distance between the two fingers.

A "swipe" is a gesture for touching an object in a screen by using a finger or a touch tool and moving the finger or the touch tool in a horizontal or vertical direction for a certain distance. Moving in a diagonal direction may not be recognized as a swipe event.

The memory 160 may include a voice recognition module (not illustrated) for recognizing a voice of a user by using a voice recognition engine and transmitting the recognized voice signal to the control unit 150.

The alarm module 164 may generate a signal for notifying generation of an event in the mobile terminal 100. Examples of the event generated in the mobile terminal 100 may include call signal reception, message reception, key signal input, schedule notification, and/or the like. The alarm module 164 may output an alarm signal in a form of a video signal via the display unit 121 or in a form of an audio signal via the audio output unit 122. The alarm module 164 may also output an alarm signal in a form of a vibration signal via the vibration motor 123.

The alarm module 164 may provide a snooze function. For example, if a user sets the number of alarm repetition to be, for example, 5 times, or an alarm interval to be, for example, 3 minutes, the alarm module 164 may output an alarm signal a predetermined number of times (e.g., 5 times), or at a predetermined interval (e.g., every 3 minutes).

Applications stored in the memory 160 may vary. For example, the application Database (DB) 165 may include a reminder application, a contact application, a map application, a music application, an e-book application, a healthcare application, a fitness application, a baby care application, or the like. However, according to various embodiments of the present disclosure, the applications stored in the application DB 165 are not limited thereto.

Figure 3:
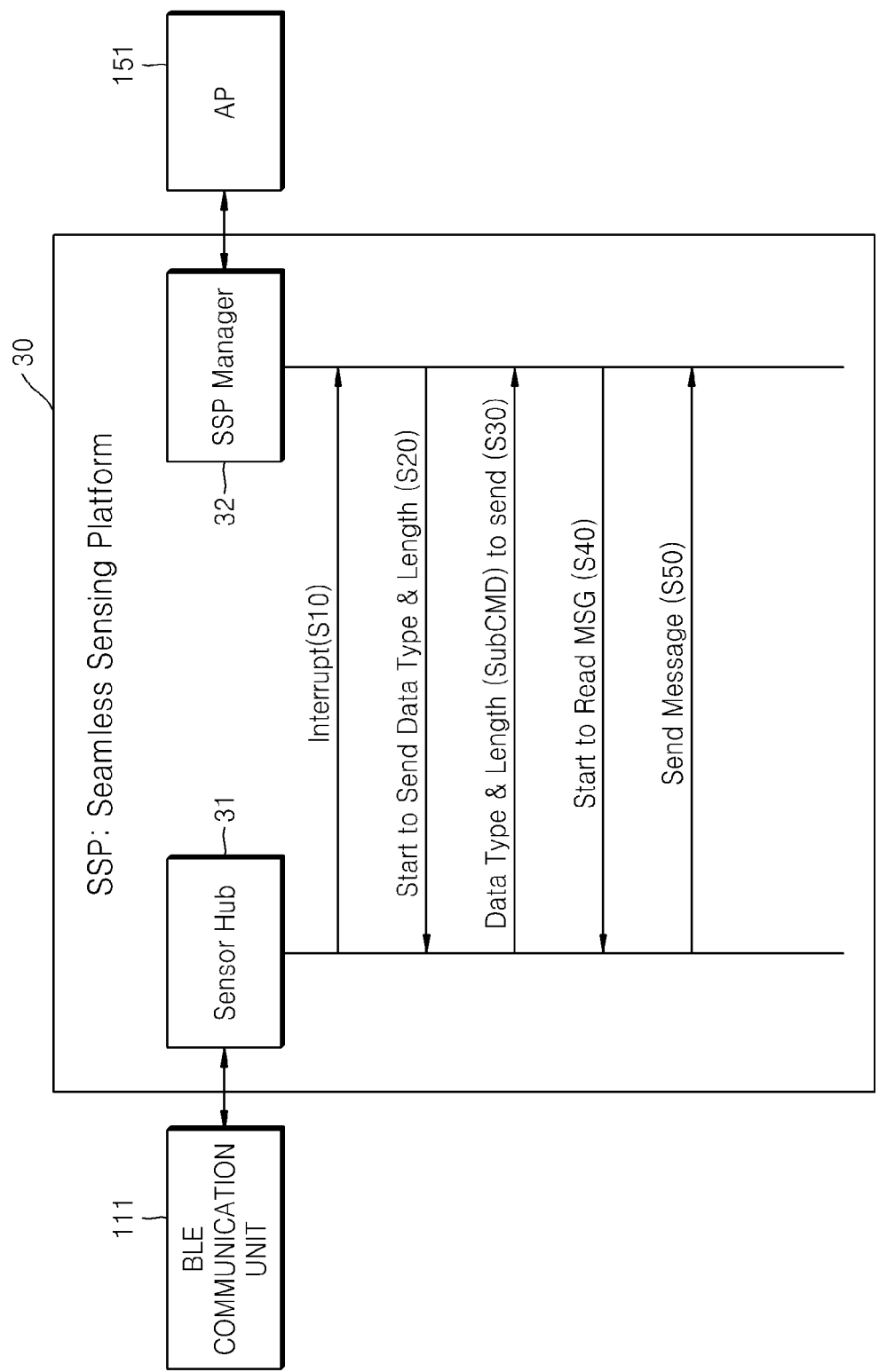
FIG. 3 is a diagram illustrating a data communication protocol of a Seamless Sensing Platform (SSP) according to an embodiment of the present disclosure.

FIG. 3 is a diagram illustrating a data communication protocol of an SSP according to an embodiment of the present disclosure.

Referring to FIG. 3, the SSP 30 may include a sensor hub 31 and an SSP manager 32. The BLE communication unit 111 may be attached to the sensor hub 31, and the SSP manager 32 may be included in a framework of the AP 151.

According to various embodiments of the present disclosure, the sensor hub 31 may receive identification information about the BLE device 200 such as a tag Identification (ID) a device name, and/or the like which is broadcast from the external BLE device 200 via the BLE communication unit 111, and also receive a measurement value detected at the BLE device 200. If waking up the AP 151 from a sleep mode is necessary (e.g., if executing a predetermined application with regard to the received identification information of the BLE device 200 is necessary), then at operation S10, the sensor hub 31 may send an interrupt signal in order to provide a notification that data to be transmitted to the SSP manager 32 exists.

At operation S20, the SSP manager 32 may send, to the sensor hub 31, a signal for requesting a data type and a length which are to be sent by the sensor hub 31.

In this case, at operation S30, the sensor hub 31 may send details on the data type and the length to the SSP manager 32.

At operation S40, the SSP manager 32 may send a start-to-read message (MSG) to the sensor hub 31.

At operation S50, when the start-to-read MSG is received, the sensor hub 31 may process BLE signal strength data into a predetermined packet and send the processed BLE signal strength data to the SSP manager 32.

Figure 4A:
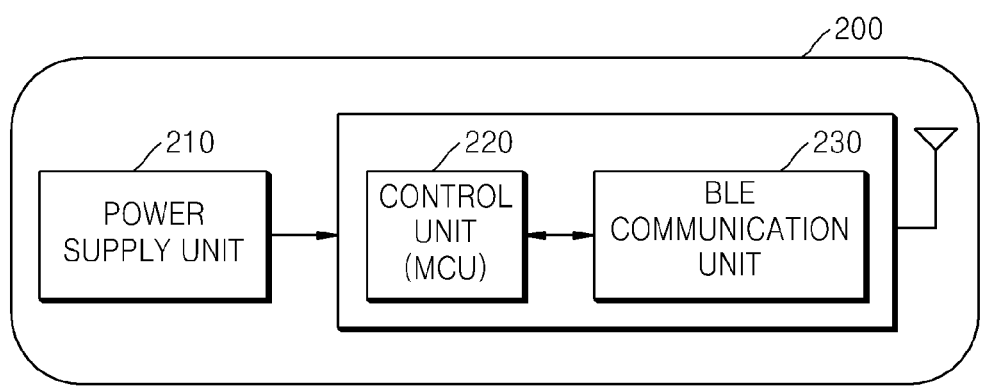
FIGS. 4A and 4B are block diagrams illustrating a BLE device according to an embodiment of the present disclosure.
Figure 4B:
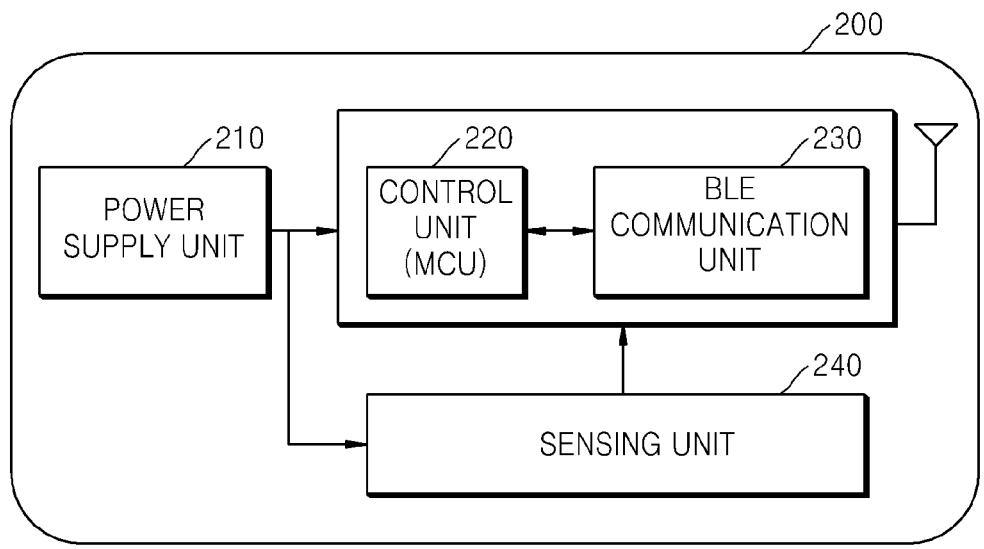

FIGS. 4A and 4B are block diagrams illustrating a BLE device according to an embodiment of the present disclosure.

Referring to FIG. 4A, the BLE device 200, according to various embodiments of the present disclosure, may include a power supply unit 210, a control unit 220, and a BLE communication unit 230. However, the illustrated units are not always essential elements of the present disclosure. The BLE device 200 may be implemented by using more or less units than those shown in FIG. 4A.

The power supply unit 210 supplies power to the BLE device 200. For example, the power supply unit 210 may be a battery. The power supply unit 210 may be recharged or replaced.

The control unit 220 may broadcast the identification information of the BLE device 200 for a predetermined period of time (e.g., for one second). Then, the control unit 220 may transmit the identification information of the BLE device 200, stored in a memory, to the mobile terminal 100 via the BLE communication unit 230. The identification information of the BLE device 200 is unique information for distinguishing the BLE device 200 from other devices. For example, the identification information may be a tag ID, a device name, a serial number, a Media Access Control (MAC) address, and/or the like.

Meanwhile, according to various embodiments of the present disclosure, the control unit 220 may broadcast the identification information of the BLE device 200 in an advertising data packet. In this regard, according to various embodiments of the present disclosure, the control unit 220 may include the identification information of the BLE device 200 in a UUID field of the advertising data packet or in an MSD field thereof and may broadcast the identification information.

Referring to FIG. 4B, the BLE device 200, according to various embodiments of the present disclosure, may further include a sensing unit 240.

The sensing unit 240 may detect a status of the BLE device 200 or a status of an object to which the BLE device 200 is attached, and transmit the sensing information to the control unit 220.

The sensing unit 240 may include at least one from among a temperature sensor, a humidity sensor, a weight sensor, an acceleration sensor, a tilt sensor, a gyro sensor, a 3-axis magnetic sensor, a pressure sensor, an illuminance sensor, a proximity sensor, and the like. Additionally, it will be obvious to those of ordinary skill in the art that the sensing unit 240 may include various other sensors in addition to the sensors described above.

If the BLE device 200 further includes the sensing unit 240, the control unit 220 may broadcast the sensing information via the BLE communication unit 230 for a predetermined period of time (e.g., one second). The predetermined period of time may be changed.

According to various embodiments of the present disclosure, the BLE device 200 may include the sensing information measured by the sensor in the MSD field of the advertising data packet and may broadcast the sensing information. For example, in a case in which the BLE device 200 includes the temperature sensor and a current temperature measured by the temperature sensor is 36° C., the BLE device 200 may include a code ("0X06000024") indicating that the temperature is 36° C. in the MSD <Sensor> field and may broadcast the code.

Hereinafter, with reference to FIG. 5, a method in which the mobile terminal 100 provides a predetermined service based on information, which is received from the BLE device 200, will be briefly described.

FIG. 5 is a flowchart illustrating the method in which a mobile terminal provides a service by using a BLE device according to an embodiment of the present disclosure.

Referring to FIG. 5, at operation S510, a mobile terminal 100 may search for a nearby BLE device 200.

At operation S520, the mobile terminal 100 may register the searched for BLE device 200. For example, the mobile terminal 100 may search for a new BLE device 200 which is not registered in the mobile terminal 100, and register information about the searched for BLE device 200 in a memory 160. In this case, the mobile terminal 100 may map and register the searched for BLE device 200 and user added information which is input from a user. This will be described in detail with reference to FIG. 6.

At operation S530, the mobile terminal 100 may map and store identification information of the registered BLE device and a control command in a memory 160. The mobile terminal 100 may map and store the identification information of the registered BLE device and the control command, based on a user input.

For example, if a user's work-to-do such as, for example, if a user is to attend an office meeting is mapped with identification information of a first BLE device (e.g., an ID 'XXX'), then the mobile terminal 100 may map and store the identification information of the first BLE device (e.g., the ID 'XXX'), and a notification command or a reminder application execution command regarding the user's work-to-do.

Additionally, if a user maps and inputs specific music and identification information of a second BLE device (e.g., an ID 'YYY'), then the mobile terminal 100 may map and store the identification information of the second BLE device (e.g., the ID 'YYY'), and a playback command regarding the specific music or a music application execution command.

The mobile terminal 100 may map and store the identification information of the BLE device 200 and mode change information. For example, the mobile terminal 100 may map and store identification information of a third BLE device (e.g., an ID 'AAA'), with a Wi-Fi mode. Then, the mobile terminal 100 may map and store the identification information of the third BLE device (e.g., an ID 'BBB'), with a Bluetooth mode.

At operation S540, if the mobile terminal 100 is located within a communication range of the BLE device 200, the mobile terminal 100 may receive identification information from the BLE device 200. According to various embodiments of the present disclosure, the mobile terminal 100 may receive sensing information from the BLE device 200.

The mobile terminal 100 compares the identification information received from the BLE device 200 to a list of registered BLE devices which are stored in the memory 160, thus determining whether the BLE device 200 which has transmitted the identification information is registered. In addition, the mobile terminal 100 may determine whether a control command which is mapped with the identification information has been received from the BLE device 200.

If the mobile terminal 100 determines that a control command which is mapped with the identification information has been received from the BLE device 200 then at operation S550, the mobile terminal 100 may execute the control command, based on the received identification information of the BLE device.

For example, if identification information (e.g., an ID 'XXX'), is received from the first BLE device, the mobile terminal 100 may search for control information stored in the memory 160. In this case, if the identification information of the first BLE device (e.g., an ID 'XXX') is mapped with a command for controlling output of a notification message (e.g., attend office meeting), then the mobile terminal 100 may execute a predetermined application such as, for example, a reminder application to output the notification message (e.g., attend office meeting).

Additionally, if identification information (e.g., an ID 'XXX'), is received from a third BLE device, then the mobile terminal 100 may search for control information stored in the memory 160 and find 'Set a Wi-Fi mode' which is a control command mapped with the ID 'AAA'. In this case, the mobile terminal 100 may automatically activate a Wi-Fi module.

The mobile terminal 100 may also execute the control command, based on sensing information received from the BLE device 200. The sensing information received from the BLE device 200 may be data detected at the BLE device 200 or information which is obtained by post-processing the data detected at the BLE device 200.

For example, the mobile terminal 100 may receive temperature information regarding the BLE device 200 attached to a baby bottle, which was detected by a temperature sensor for a predetermined period of time, thus monitoring a temperature of the baby bottle. If, during the monitoring, the temperature of the baby bottle reaches a temperature which is defined (e.g., set or otherwise configured) by a user, then the mobile terminal 100 may output a notification message such as "the temperature of the baby bottle is appropriately set."

Additionally, if motion information detected by a motion sensor is received from the BLE device 200, then the mobile terminal 100 may execute an application which corresponds to the motion information. For example, if motion information regarding shaking the baby bottle twice is received, then the mobile terminal 100 may execute a call application and attempt to make a phone call to a device of another person (e.g., a parent), which is predefined (e.g., set or otherwise configured) with regard to a motion of shaking the baby bottle twice.

For example, according to various embodiments of the present disclosure, the mobile terminal 100 may provide various services, such as a reminder service, a mode change service, a monitoring service, a remote control service, and/or the like by using a BLE device 200 located in a near field range.

FIG. 6 is a flowchart illustrating a method in which a mobile terminal registers and controls a BLE device according to an embodiment of the present disclosure.

Referring to FIG. 6, according to various embodiments of the present disclosure, the method of registering and managing the BLE device 200 includes the method of using the mobile terminal 100 shown in FIGS. 1 through 3. Therefore, even if omitted below, the description given above with respect to the mobile terminal 100 shown in FIGS. 1 through 3 may also be applied to the method shown in FIG. 6.

At operation S610, the mobile terminal 100 may search for the BLE device 200. For example, when a request for registering or adding a new BLE device 200 is received from a user, the mobile terminal 100 may receive identification information in advertising packet form from a nearby BLE device 200. According to various embodiments of the present disclosure, the mobile terminal 100 may also receive identification information in a form of an advertising packet from the nearby BLE device 200, independently from a user input.

For example, according to various embodiments of the present disclosure, the BLE device 200 may include the identification information of the BLE device 200 in a UUID field of an advertising packet or in an MSD field thereof and may broadcast the identification information.

According to an embodiment of the present disclosure, the identification information may include property information regarding the BLE device 200. The property information is information about a property of the corresponding BLE device, such as an appearance of the corresponding BLE device. For example, the property information may be color information such as red, yellow, blue, orange, purple, black, or the like, shape information such as a rectangle, a triangle, a circle, a starfish, a heart, or the like, and image information such as a water drop, a diamond, a clover, a bear, a sunflower, or the like, or label information providing a description of the label on the corresponding BLE device. Additionally, according to various embodiments of the present disclosure, the property information may include sensor information, regarding a sensor included in the BLE device 200, such as a sensor ID, a type of the sensor, a name of the sensor, and/or the like.

The mobile terminal 100 may receive the property information from the BLE device 200, separately from the identification information. For example, according to various embodiments of the present disclosure, the BLE device 200 may include the property information in the MSD field of the advertising data packet and may broadcast the property information, separately from the identification information.

At operation S620, the mobile terminal 100 may display a list of the BLE devices which include the property information regarding a searched for BLE device.

The mobile terminal 100 may determine whether the searched for BLE device is a registered BLE device, based on the identification information of the searched for BLE device. In addition, the mobile terminal 100 may create a list of unregistered BLE devices, by using identification information of at least one unregistered BLE device from among the searched for BLE devices. According to various embodiments of the present disclosure, in the list of the BLE devices may display the property information regarding the BLE devices, such as color information, shape information, image information, sensor information, and/or the like. Therefore, a user may distinguish several BLE devices from each other easily.

At operation S630, the mobile terminal 100 may receive a selection made by a user regarding at least one BLE device from the list of the BLE devices. For example, the user may select at least one BLE device to be registered from the list of the searched for BLE devices. The user may tap, swipe, or flick a certain area in a touch screen which displays a BLE device to be selected, in order to select at least one BLE device from the list of the BLE devices.

At operation S640, the mobile terminal 100 may receive user added information from a user regarding the selected BLE device. According to various embodiments of the present disclosure, the mobile terminal 100 may provide a Graphic User Interface (GUI) which may receive the user added information regarding the BLE device selected by the user. The user may input the user added information via the GUI.

The user added information may mean arbitrary information or detailed information, about the BLE device 200, which is input by the user. Furthermore, the user added information may include information obtained by adding information provided to the mobile terminal 100 by the searched for BLE device 200 to information provided by the user via the GUI.

For example, the user added information may include an ID arbitrarily set by the user, a nickname, a category, a memo, notification information, an image of an object which corresponds to the BLE device 200 such as, for example, an object to which the BLE device is attached or a place in which the BLE device is located, but is not limited thereto.

At operation S650, the mobile terminal 100 may register a selected BLE device 200. For example, the mobile terminal 100 may map and store the property information regarding the BLE device 200 (e.g., color information, shape information, image information and sensor information, and/or the like) and the user added information in the memory 160. Thus, the mobile terminal 100 may register the selected BLE device 200.

The mobile terminal 100 may store the property information regarding the selected BLE device 200 and the user added information as profile information regarding the BLE device 200. Accordingly, the user may easily manage the BLE device 200 by identifying the profile information regarding the registered BLE device 200. If a sensor is included in the BLE device 200, a value measured by the sensor may be automatically reflected in the profile information.

Figure 7:
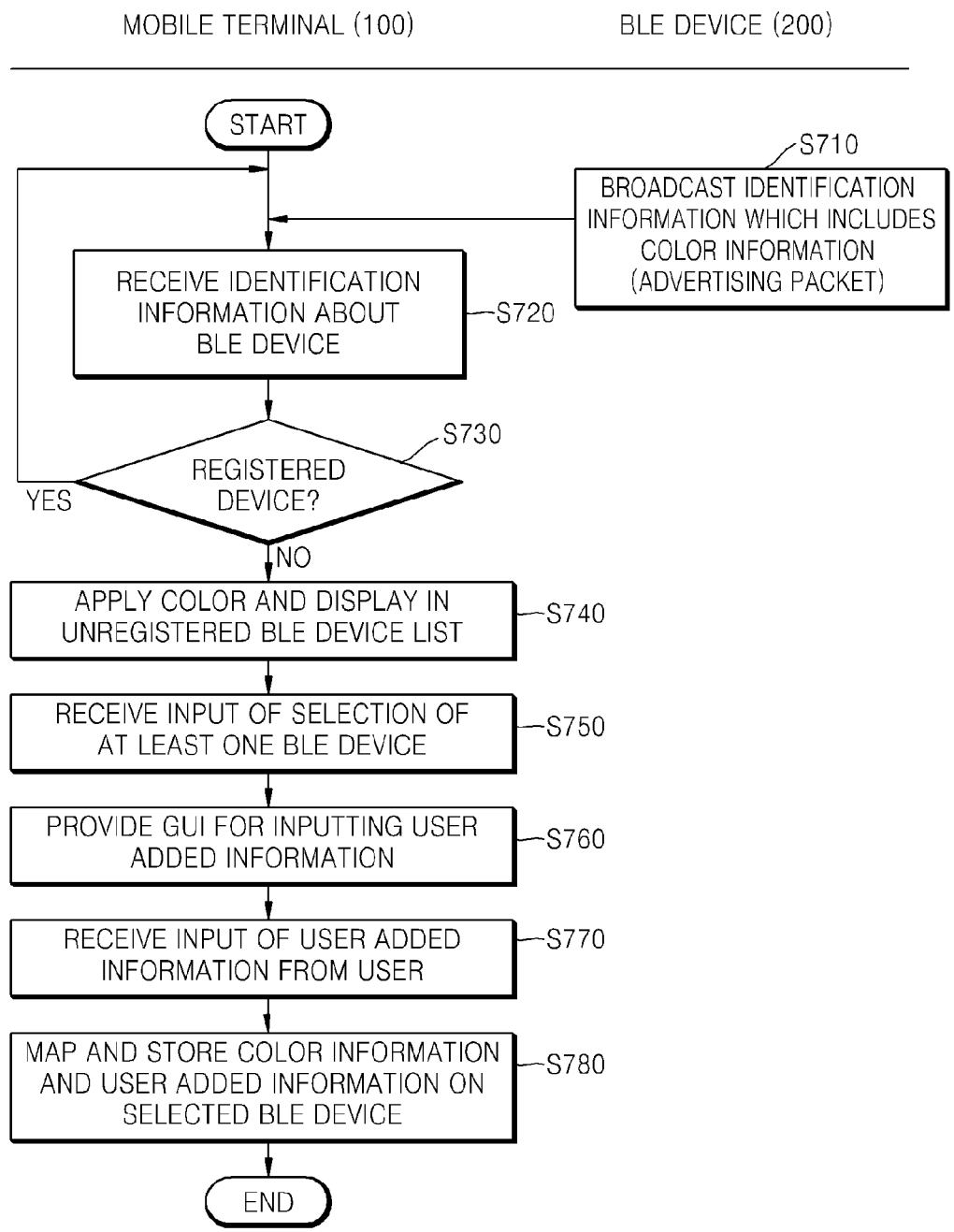
FIG. 7 is a flowchart illustrating a method of applying color information of a BLE device to a list of BLE devices according to an embodiment of the present disclosure.

FIG. 7 is a flowchart illustrating a method of applying color information of a BLE device to a list according to an embodiment of the present disclosure.

At operation S710, the BLE device 200 may broadcast identification information, which includes appearance color information, via BLE communication. For example, in a case in which the BLE device 200 is a BLE tag having a blue color, the BLE device 200 may include identification information (e.g., "SAMSUNG_TAG001_blue") including color information in a UUID field of an advertising data packet or in an MSD field thereof and may broadcast the identification information.

At operation S720, the mobile terminal 100 may receive identification information which includes the color information from the nearby BLE device 200.

At operation S730, the mobile terminal 100 determines whether the nearby BLE device 200 corresponds to the registered device. For example, the mobile terminal 100 may compare the identification information of the received BLE device 200 to a list of registered BLE devices, which is stored in the memory 160, in order to determine whether the searched for BLE device 200 is the registered device.

If the mobile terminal 100 determines that the searched for BLE device is the registered device at operation S730, then the mobile terminal 100 returns to operation S710 and awaits reception of broadcast identification information from a nearby BLE device 200.

In contrast, if the mobile terminal 100 determines that the searched for BLE device is an unregistered BLE device at operation S730, then the mobile terminal 100 proceeds to operation S740 at which the mobile terminal 100 may display identification information of the searched for device in the list of unregistered BLE devices by applying colors to the list of unregistered BLE devices. For example, if a searched for BLE device is yellow, the mobile terminal 100 may add identification information of the searched for BLE device in the list of the unregistered BLE devices by applying yellow to the identification information of the searched for BLE device.

Operations S750 through S780 correspond to the operations S630 through S650 of FIG. 6. Therefore, a detailed description thereof will not be provided here. For example, at operation S750, the mobile terminal 100 may receive an input of a selection of at least one BLE device. At operation S760, the mobile terminal 100 may provide a GUI with which a user may input user added information. At operation S770, the mobile terminal 100 may receive an input of user added information from the user. Thereafter, at operation S780, the mobile terminal 100 may map and store color information and user added information on the selected BLE device.

The detailed description will be provided with reference to FIGS. 8 and 9.

Figure 8C:
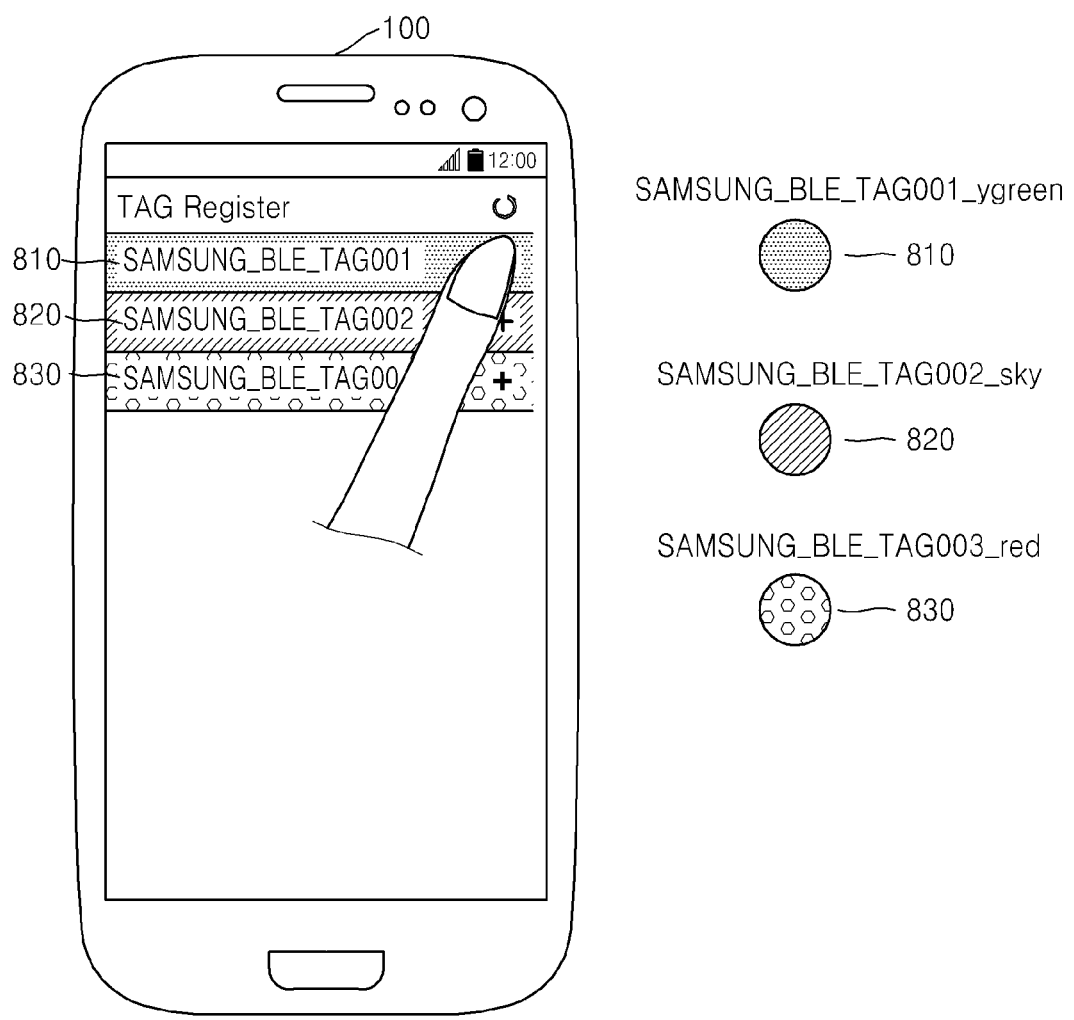

FIGS. 8A to 8C are diagrams illustrating a list of BLE devices which include color information according to an embodiment of the present disclosure.

Referring to FIGS. 8A, 8B, and 8C, if a user selects a BLE add tag menu as illustrated in FIG. 8A, the mobile terminal 100 may search for a nearby BLE tag as illustrated in FIG. 8B. In this case, as illustrated in FIG. 8C, the mobile terminal 100 may receive first identification information, which is 'SAMSUNG_BLE_TAG001_yellow-green', from a first BLE tag 810, second identification information, which is 'SAMSUNG_BLE_TAG002_sky', from a second BLE tag 820, and third identification information, which is 'SAMSUNG_BLE_TAG003_red', from a third BLE tag 830.

The first identification information, second identification information, and third identification information respectively include a color value of the BLE tag, such as yellow-green, sky, and red. Accordingly, the mobile terminal 100 may display the list of the searched for BLE devices by applying yellow-green to the first identification information, sky-blue to the second identification information, and red to the third identification information. Therefore, the user may distinguish the identification information between nearby several BLE devices.

According to various embodiments of the present disclosure, if the identification information received from the BLE tag includes a shape value, the mobile terminal 100 may display the list of the BLE devices by applying a shape to the list of the BLE devices.

Referring to FIG. 8C, if the user selects a specific BLE device 810 from the list of the BLE devices, the mobile terminal 100 may provide an input window for receiving an input of user added information regarding the selected BLE device 810. This will be described with reference to FIGS. 9A and 9B.

Figure 9A:
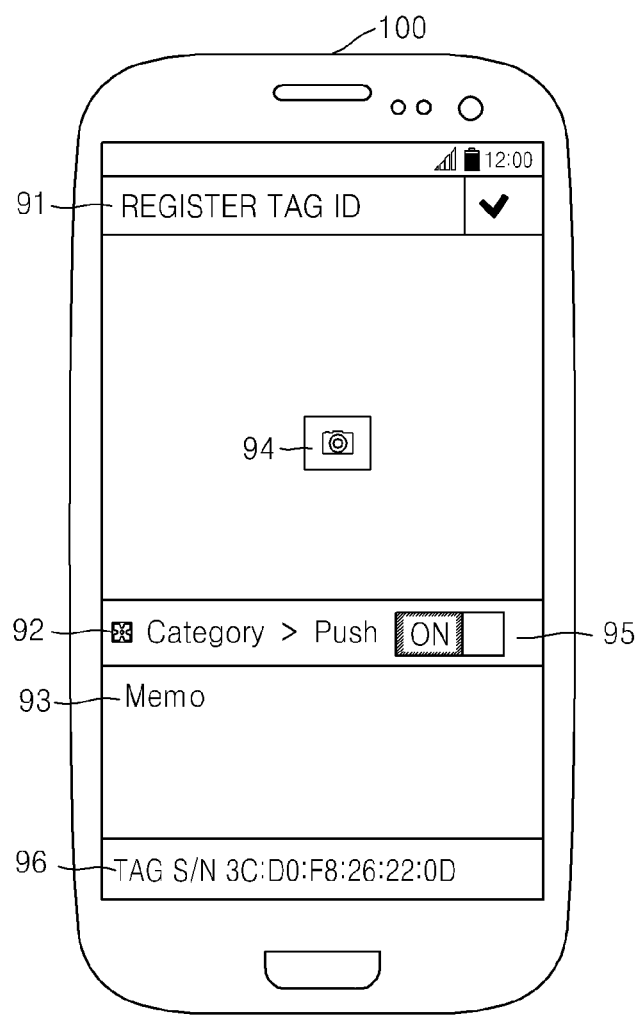
FIGS. 9A and 9B are diagrams illustrating an input window for receiving an input of user added information according to an embodiment of the present disclosure.
Figure 9B:
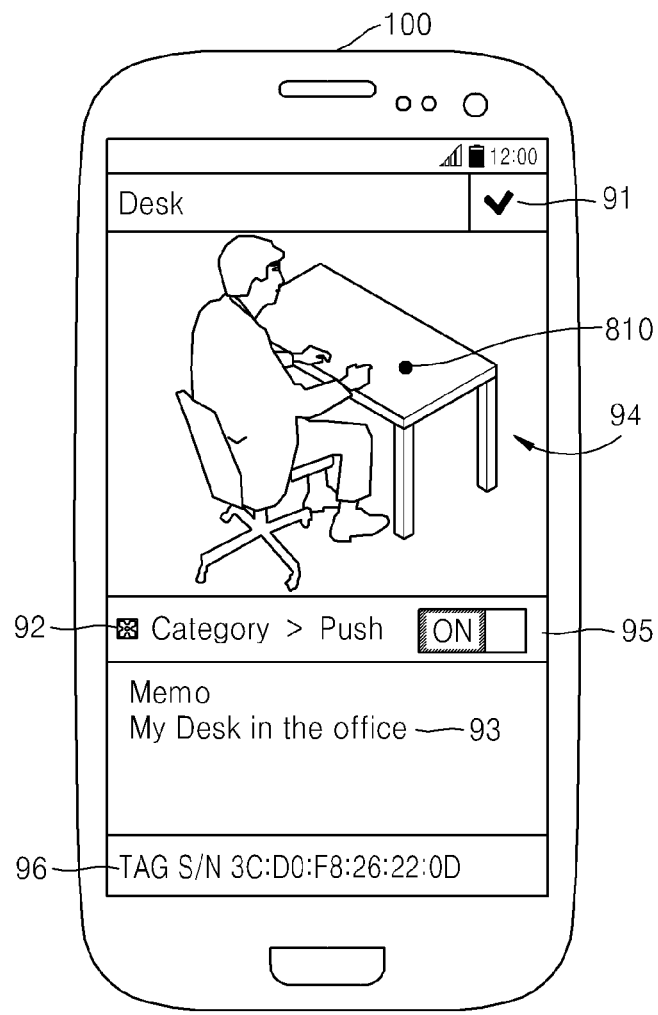

FIGS. 9A and 9B are diagrams illustrating an input window for receiving an input of user added information according to an embodiment of the present disclosure.

Referring to FIG. 9A, the mobile terminal 100 may provide the input window for receiving an input of user added information regarding the selected BLE device 810. The input window may include an ID input field 91, a category input field 92, a memo field 93, an image insertion field 94, and a notification selection field 95. The ID input field 91 is a field in which a user may input an arbitrary ID for convenience of use. The ID input field 91 may be distinguished from a field 96 for displaying unique identification information of the BLE device 810, for example, TAG S/N 3C:D0:F8:26:22:0D.

Referring to FIG. 9B, if the user selects and registers a BLE device 900 to be attached to an office desk, the user may set an ID of the selected BLE device 900 as 'Desk' and take a simple memo (e.g., 'My desk in the office), for easy reminding.

Additionally, the user may insert at least one from among an image of the desk to which the BLE device 900 is attached and an image of the BLE device 900. Upon a user request, the mobile terminal 100 may read a stored image or photograph a desk by activating a photographing mode.

According to various embodiments of the present disclosure, the mobile terminal 100 may map and store user added information, which is input by the user during registration of the BLE device, and property information regarding the BLE device 900 as profile information.

Figure 10:
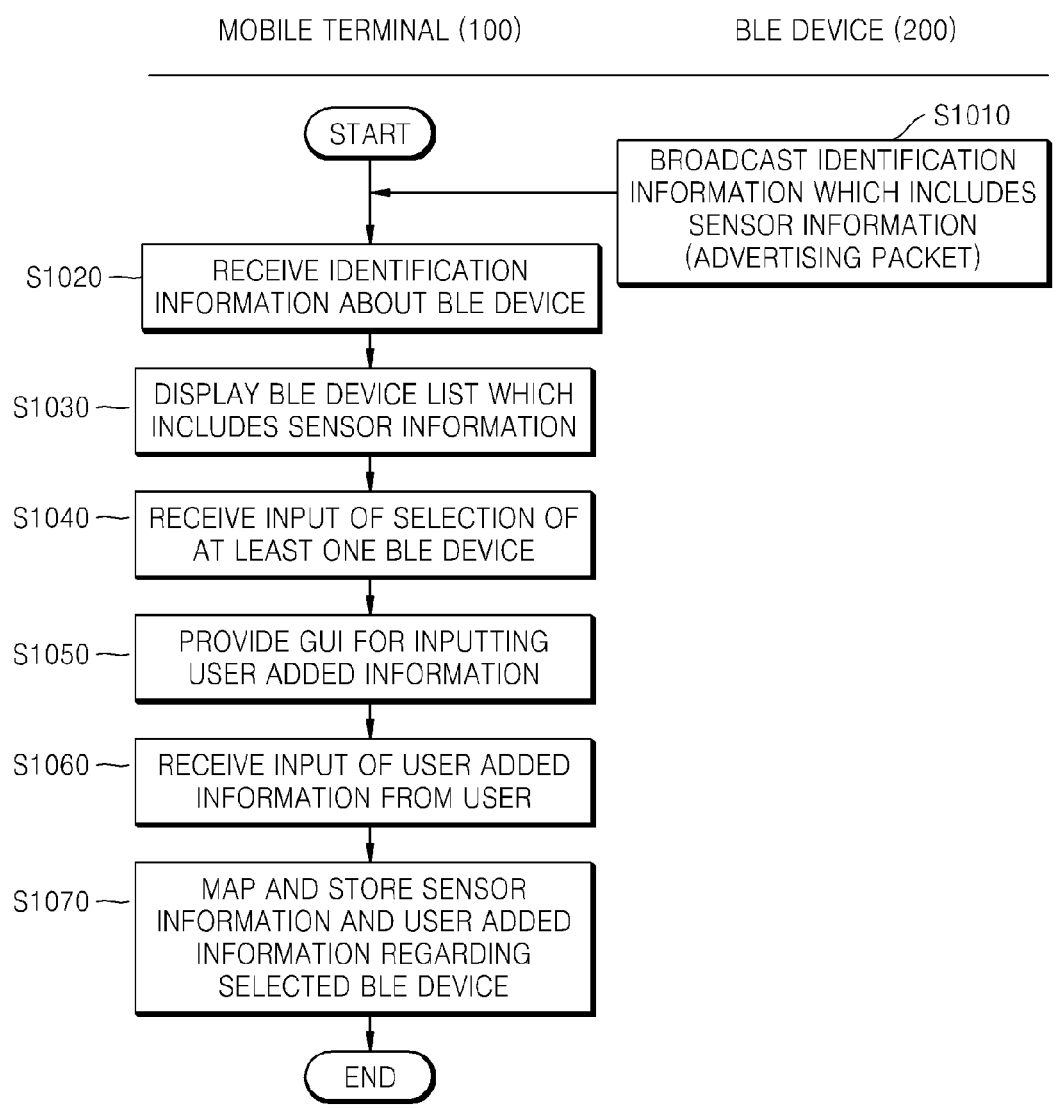
FIG. 10 is a flowchart illustrating a method of displaying a BLE device list which includes sensor information according to an embodiment of the present disclosure.

FIG. 10 is a flowchart illustrating a method of displaying a BLE device list which includes sensor information according to an embodiment of the present disclosure.

At operation S1010, the BLE device 200 may broadcast identification information which includes sensor information. For example, in a case in which the BLE device 200 is a BLE tag including a temperature sensor, the BLE device 200 may include identification information (e.g., "SAMSUNG_Temp_TAG001_blue") including sensor information in a UUID field of an advertising data packet or in an MSD field thereof and may broadcast the identification information.

At operation S1020, the mobile terminal 100 may receive the identification information of the BLE device 200.

At operation S1030, the mobile terminal 100 may create and display a list of the BLE devices which include the sensor information.

Operations S1040 through S1070 correspond to the operations S630 through S650 of FIG. 6. Therefore, a detailed description thereof will not be provided here. For example, at operation S1040, the mobile terminal 100 may receive an input corresponding to a selection of at least one BLE device. At operation S1050, the mobile terminal 100 may provide a GUI with which a user may input user added information. At operation S1060, the mobile terminal 100 may receive an input of user added information from the user. Thereafter, at operation S1070, the mobile terminal 100 may map and store color information and user added information on the selected BLE device.

Operations S1040 through S1070 will be described with reference to FIGS. 11 and 13.

Figure 11A:
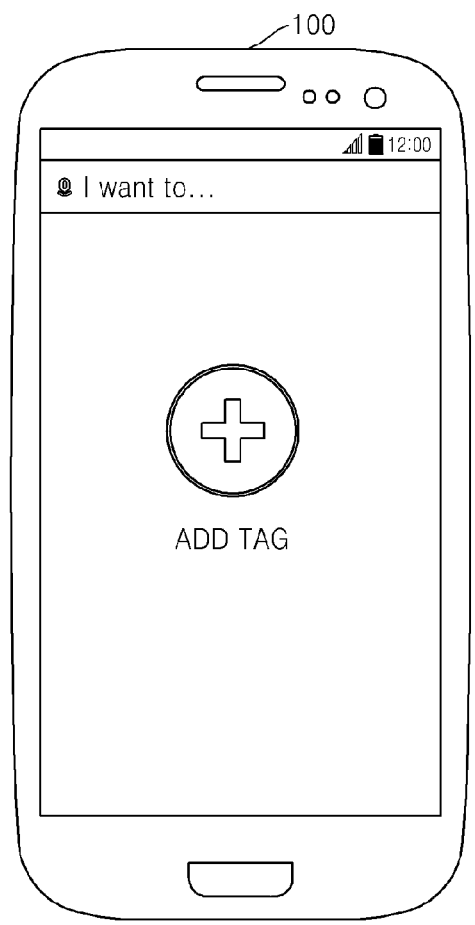
Figure 11B:
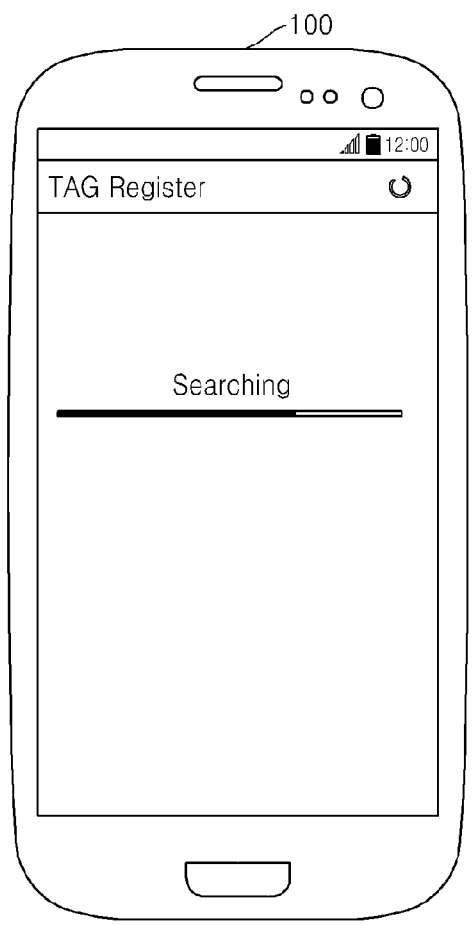

FIGS. 11A to 11C are diagrams illustrating the list of the BLE devices which include the sensor information according to an embodiment of the present disclosure.

If a user selects a BLE add tag menu as illustrated in FIG. 11A, the mobile terminal 100 may search for a nearby BLE tag as illustrated in FIG. 11B. In this case, as illustrated in FIG. 11C, the mobile terminal 100 may receive first identification information which is 'SAMSUNG_Temp_TAG001_blue' from a first BLE tag 1110, second identification information which is 'SAMSUNG_Motion_TAG002_sky' from a second BLE tag 1120, and third identification information which is 'SAMSUNG_Weight_TAG003_red' from a third BLE tag 1130.

The first identification information, second identification information, and third identification information respectively include a color value implemented in the BLE device, for example temp, motion, and weight. Accordingly, the mobile terminal 100 may display the list of the BLE devices which includes sensor information such as, for example, a temperature sensor, a motion sensor, a weight sensor, and/or the like. Therefore, the user may easily determine the BLE tag to be registered, by identifying the sensor information of the BLE tag in the list of the BLE devices. For example, if a BLE tag to be used for a baby bottle is necessary, the user may select the first BLE tag 1110 which includes the temperature sensor and register the first BLE tag 1110 in the mobile terminal 100.

Figure 12:
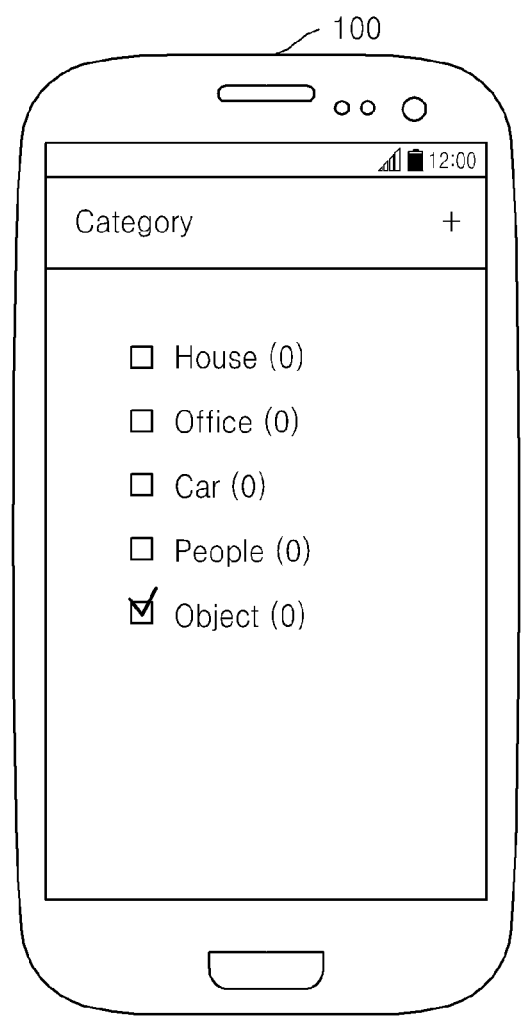
FIG. 12 is a diagram illustrating a configuration window for setting a category according to an embodiment of the present disclosure.

FIG. 12 is a diagram illustrating a configuration window for setting a category according to an embodiment of the present disclosure.

Referring to FIG. 12, when the mobile terminal 100 receives a selection of at least one BLE device 200 from the user, the mobile terminal 100 may display a configuration window for setting a category. The category may be classified according to a location of the BLE device 200 such as a house, an office, and a car, an object which is monitored via the BLE device 200, or people who possess the BLE device 200, or the like. However, various embodiments of the present disclosure are not limited thereto.

Figure 13A:
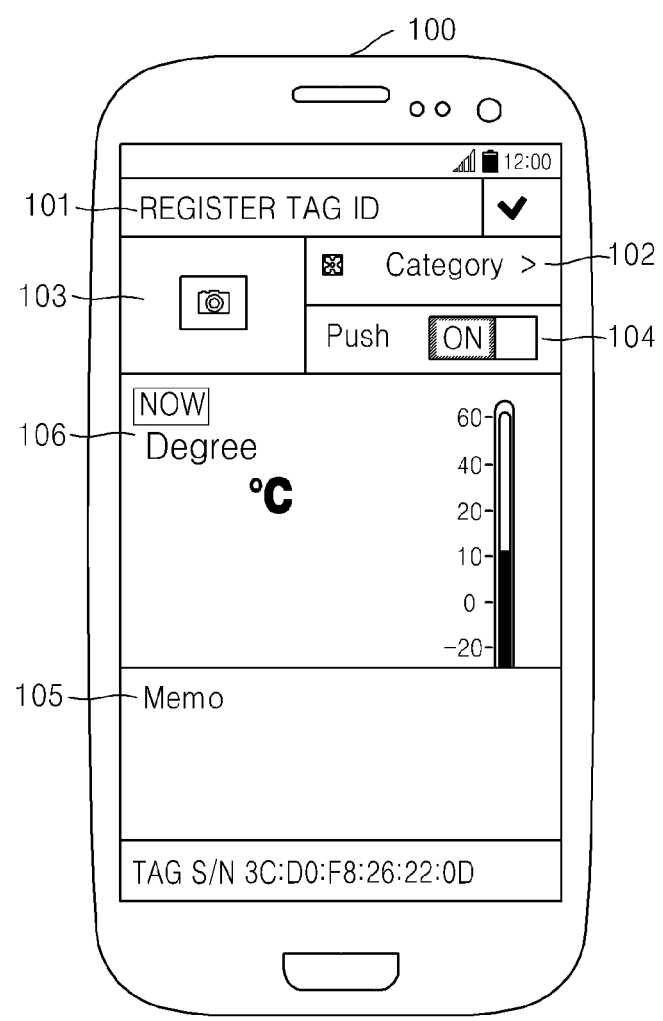
FIGS. 13A and 13B are diagrams illustrating an input window for receiving an input of user added information regarding a BLE device which includes a sensor according to an embodiment of the present disclosure.
Figure 13B:
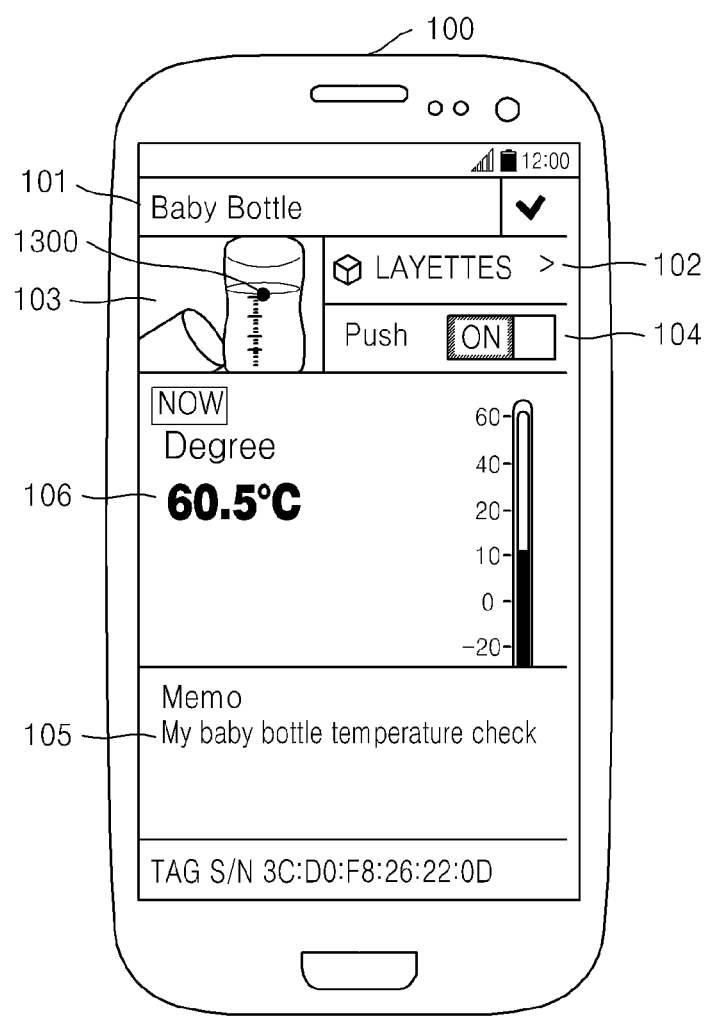

FIGS. 13A and 13B are diagrams illustrating an input window for receiving an input of user added information regarding a BLE device which includes a sensor, according to an embodiment of the present disclosure.

Referring to FIG. 13A, according to various embodiments of the present disclosure, the mobile terminal 100 may display an input window for inputting user added information. The input window for inputting user added information may include an ID input field 101, a category input field 102, an image insertion field 103, a notification selection field 104, a memo field 105, a sensing information display field 106, and/or the like.

Referring to FIG. 13B, if the user decides to register a BLE device 1300 which includes a temperature sensor, so as to attach the BLE device 200 to a baby bottle, the user may input 'baby bottle' as an ID of the BLE device 1300, set a category as 'layettes', and take a simple memo such as, for example, 'My baby bottle temperature check'. Additionally, the user may set the input window to display a notification message when a sensor value, received from the BLE device, reaches a predetermined value.

Sensing information received from the BLE device 200 (e.g., a current temperature of 60.5° C.), may be automatically reflected and displayed in the sensing information display field 106, independently from a user input.

According to various embodiments of the present disclosure, the mobile terminal 100 may map and register user added information and property information regarding the BLE device 1300, such as sensor information and appearance color information, which are input by the user during registration of the BLE device 1300.

Figure 14:
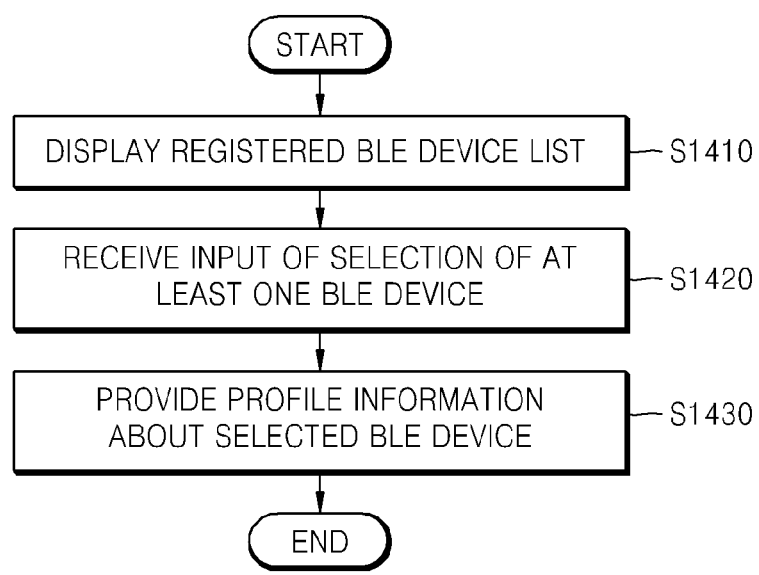
FIG. 14 is a flowchart illustrating a method in which a mobile terminal provides profile information regarding a registered BLE device according to an embodiment of the present disclosure.
Figure 15:
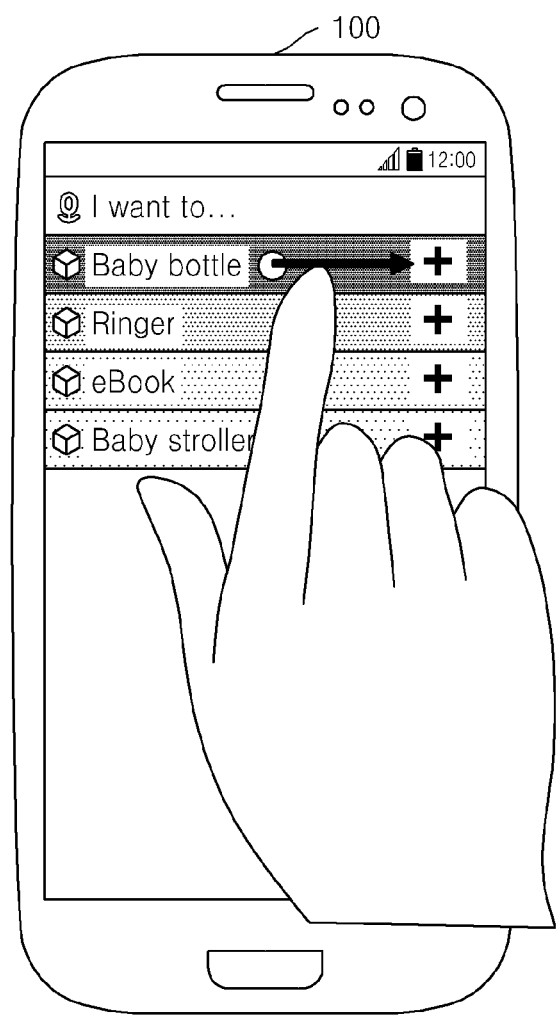
FIG. 15 is a diagram illustrating a list of registered BLE devices according to an embodiment of the present disclosure.

FIG. 14 is a flowchart illustrating a method of providing profile information regarding a registered BLE device according to an embodiment of the present disclosure. FIG. 15 is a diagram illustrating a list of registered BLE devices according to an embodiment of the present disclosure.

Referring to FIG. 14, at operation S1410, the mobile terminal 100 may display a list of BLE devices which are registered in the mobile terminal 100. According to various embodiments of the present disclosure, the mobile terminal 100 may display the list of registered BLE devices, based on respective profile information regarding the registered BLE devices. For example, the mobile terminal 100 may configure the list of registered BLE devices by using identification information which is received from the at least one BLE device. Otherwise, the mobile terminal 100 may configure the list of registered BLE devices by using user added information which is input by the user such as, for example, an ID.

For example, referring to FIG. 15, if a user input for requesting a list of registered BLE devices is received, the mobile terminal 100 may display the list of registered BLE devices on a screen. The mobile terminal 100 may configure and display a list of registered BLE devices, which includes an ID, a nickname, and category information which are input by the user to easily identify each of the registered BLE devices.

At operation S1420, the mobile terminal 100 may receive a selection made by a user for at least one registered BLE device from the list of registered devices. According to various embodiments of the present disclosure, the user may select at least one registered BLE device by using a tap gesture, a swipe gesture, a flick gesture, or a voice command.

At operation S1430, the mobile terminal 100 may provide profile information regarding the registered BLE device which is selected by the user. The profile information may include at least one from among unique identification information such as a device ID, a Serial Number (S/N), and a MAC Address, property information such as appearance color information, image information, and sensor information, and user added information such as an ID, a nickname, a category, and a memo which are set by the user, with regard to the selected registered BLE device, or the like.

For example, the mobile terminal 100 may provide an ID, a nickname, a category, a memo, notification information regarding the registered BLE device as profile information, and/or the like. Additionally, according to various embodiments of the present disclosure, if the registered BLE device includes a sensor, the mobile terminal 100 may receive sensing information detected by the selected registered BLE device from the selected registered BLE device for a predetermined period and may display the sensing information as profile information. This will be described with reference to FIGS. 16A, 16B, 16C, 16D, and 16E.

FIGS. 16A, 16B, 16C, 16D, and 16E are diagrams for displaying profile information regarding a registered BLE device according to an embodiment of the present disclosure.

Figure 16A:
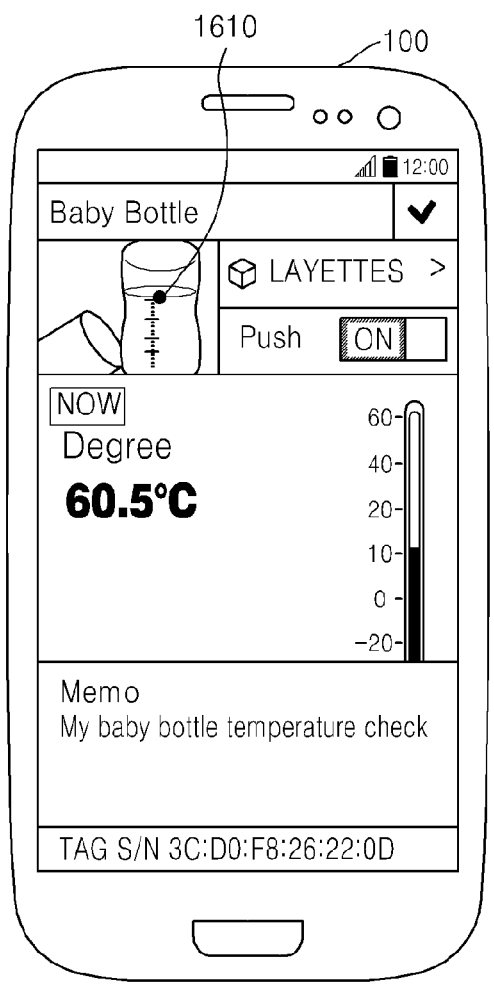
FIGS. 16A, 16B, 16C, 16D, and 16E are diagrams for displaying profile information regarding a registered BLE device according to an embodiment of the present disclosure.

Referring to FIG. 16A, if a registered BLE device 1610 includes a temperature sensor, the mobile terminal 100 may further display temperature information (e.g., 60.5° C.), as the profile information which corresponds to the registered BLE device 1610, in addition to user added information, which are input by the user during registration, such as an ID (e.g., a baby bottle), a category (e.g., layettes), a description of a memo (e.g., 'My baby bottle temperature check'), and an image (e.g., a photograph of a baby bottle), and/or the like.

Figure 16B:
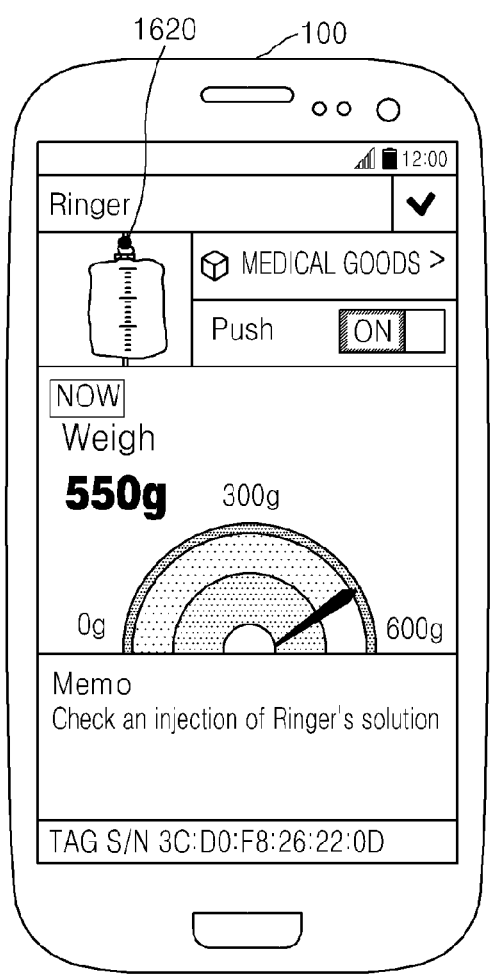

Referring to FIG. 16B, if a registered BLE device 1620 further includes a weight sensor, the mobile terminal 100 may further display weight information (e.g., 550 g), as the profile information which corresponds to the registered BLE device 1620, in addition to user added information which is input by the user during registration, such as an ID (e.g., Ringer), a category (e.g., medical goods), a description of a memo (e.g., 'check an injection of Ringer's solution'), and an image (e.g., a photograph of Ringer's solution), and/or the like.

Figure 16C:
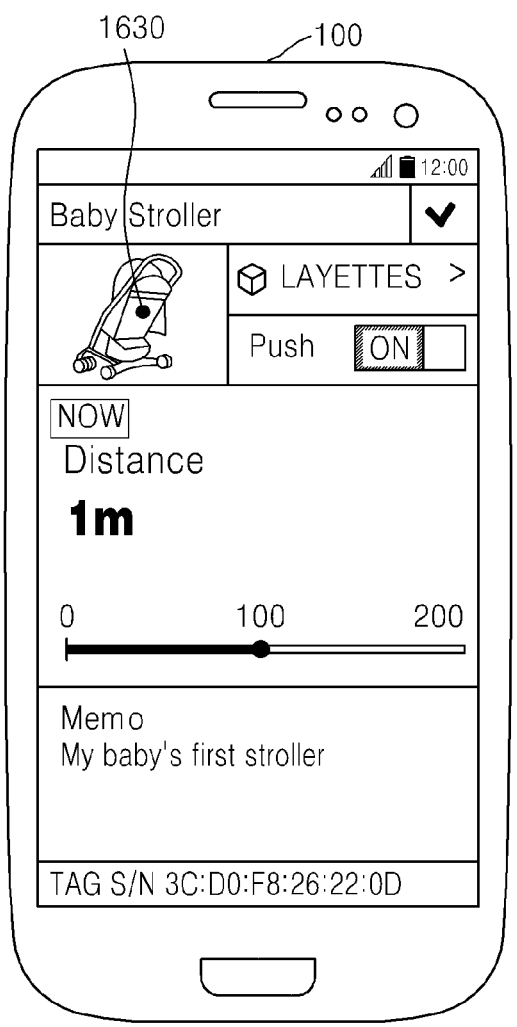

Referring to FIG. 16C, if a registered BLE device 1630 includes a proximity sensor, the mobile terminal 100 may further display information about a distance between the mobile terminal 100 and the registered BLE device 1630 (e.g., 1 m), as the profile information which corresponds to the registered BLE device 1630, in addition to user added information which is input by the user during registration, such as an ID (e.g., a baby stroller), a category (e.g., layettes), a description of a memo (e.g., 'My baby's first stroller'), and an image (e.g., an image of a baby stroller), and/or the like.

According to various embodiments of the present disclosure, the mobile terminal 100 may determine information about the distance between the registered BLE device 1630 and the mobile terminal 100, based on the strength of a signal which is received from the registered BLE device 1630. For example, the mobile terminal 100 may determine the distance between the registered BLE device 1630 and the mobile terminal 100, by using a relationship between the strength of the signal and the distance. For example, when the signal becomes weaker, a distance between the registered BLE device and the mobile terminal 100 becomes farther. In contrast, when the signal becomes stronger, the distance therebetween becomes nearer. The mobile terminal 100 may display the determined distance information as profile information regarding the registered BLE device 1630.

Figure 16D:
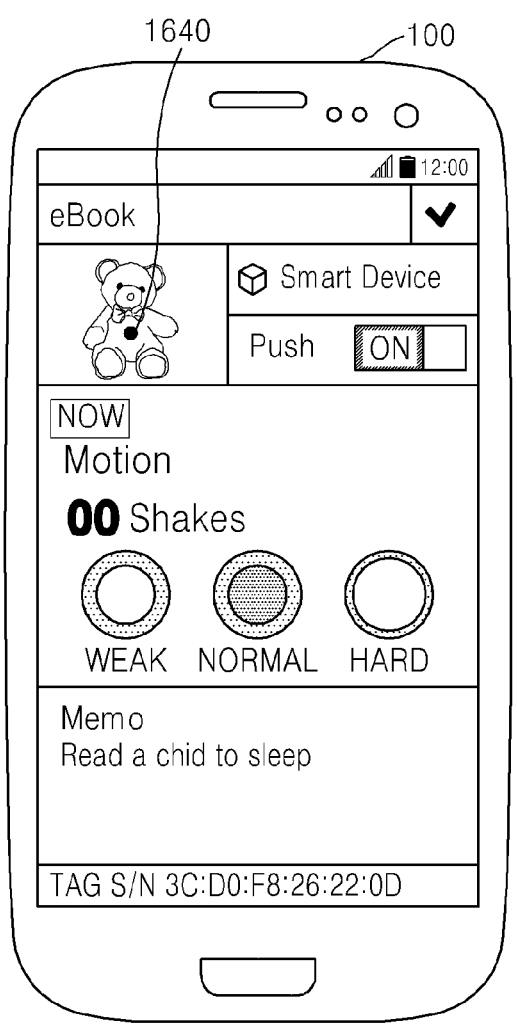

Referring to FIG. 16D, if a registered BLE device 1640 includes a motion sensor, the mobile terminal 100 may further display motion information (e.g., 2 Shakes), as the profile information which corresponds to the registered BLE device 1640, in addition to user added information which is input by the user during registration, such as an ID (e.g., eBook), a category (e.g., Smart Device), a description of a memo (e.g., 'Read a child to sleep'), and an image (e.g., a photograph of a teddy bear).

Figure 16E:

Referring to FIG. 16E, if a registered BLE device 1650 does not include a sensor, the mobile terminal 100 may display an ID (e.g., Desk), a category (e.g., office), a description of a memo (e.g., 'My desk in the office'), and an image (e.g., a photograph of a desk), which are input by the user during registration, as the profile information which corresponds to the registered BLE device 1650.

According to various embodiments of the present disclosure, the mobile terminal 100 may update user added information input from a user regarding a registered BLE device. For example, if a place at which the registered BLE device is attached is changed, the mobile terminal 100 may receive from the user new inputs of an ID, a category, a description of a memo, and an image with regard to the registered BLE device and update the additional user information.

In addition, when sensing information is changed, the mobile terminal 100 may update the user added information regarding the registered BLE device. In this regard, sensing information may be included in an MSD field of an advertising packet broadcasted from the BLE device 200.

A method of providing a predetermined service in the mobile terminal 100 by using identification information of the registered BLE device will now be described in detail. For descriptive convenience, the BLE device 200 mentioned hereinafter means the BLE device 200 that is previously registered in the mobile terminal 100, except for a special case (e.g., in a case in which the BLE device 200 is referred to as a separately unregistered BLE device).

Figure 17:
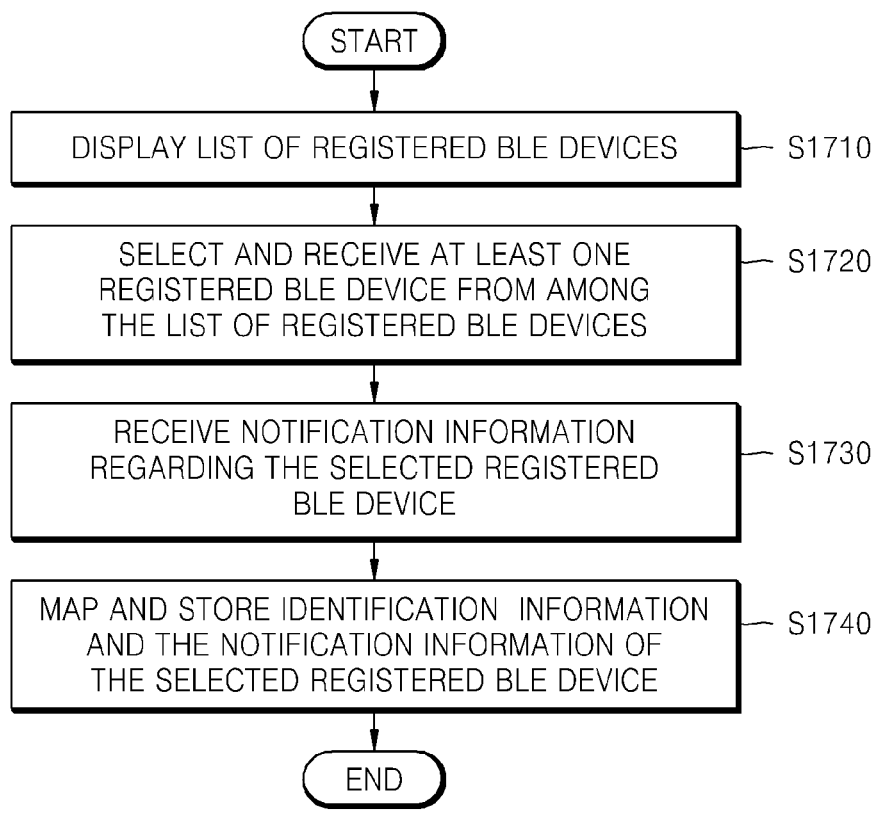
FIG. 17 is a flowchart illustrating a method in which a mobile terminal receives an input of notification information from a user according to an embodiment of the present disclosure.

FIG. 17 is a flowchart illustrating a method in which a mobile terminal 100 receives an input of notification information from a user according to an embodiment of the present disclosure.

Referring to FIG. 17, at operation S1710, the mobile terminal 100 may display a list of registered BLE devices that are previously registered in the mobile terminal 100. For example, in a case in which the mobile terminal 100 receives a user input that requests a list of registered BLE devices, the mobile terminal 100 may display the list of previously registered BLE devices on a screen. In this regard, the mobile terminal 100 may configure and display a list of registered devices including an ID, a nickname, category information, and/or the like that are input by the user in such a manner that the user may easily identify the registered BLE devices.

At operation S1720, the mobile terminal 100 may receive a selection of at least one registered BLE device from among the list of registered BLE devices. For example, the mobile terminal 100 may detect a tap gesture, which is applied by the user, or a swipe gesture, a flick gesture, and/or the like, or recognize a voice command of the user so as to select the at least one registered BLE device from among the list of registered BLE devices.

At operation S1730, the mobile terminal 100 may receive an input of notification information regarding the registered BLE device selected by the user.

According to various embodiments of the present disclosure, the notification information may include a notification message set by the user for notification through the mobile terminal 100 in a case in which the mobile terminal 100 comes within a communication range of the selected registered BLE device (or in a case in which the mobile terminal 100 goes beyond the communication range).

For example, the notification information may include at least one of a notification message regarding a place at which a BLE device is disposed, a notification message regarding an object that is present at the place at which the BLE device is disposed, a notification message regarding an object to which the BLE device is attached, and a notification message regarding another user that owns the BLE device, and/or the like. However, various embodiments of the present disclosure are not limited thereto.

According to various embodiments of the present disclosure, the notification message may be in the form of at least one of a text message, a sound message, a still image, a moving image, a map, and/or the like. For example, the user may input the notification message in text form or in sound form. The user may also add an image (e.g., an image of the object to which the BLE device is attached or an image of an object related to the notification message) of an object or location information (e.g., a map indicating a location of the object, a layout of a plan view indicating the location of the object, and/or the like) of the object to the notification message.

According to various embodiments of the present disclosure, the notification information may include notification condition information regarding an output of the notification message. According to various embodiments of the present disclosure, the notification condition information may include a condition (e.g., a case in which the mobile terminal 100 comes within a communication range of the BLE device, in a case in which the mobile terminal 100 goes beyond the communication range, and/or the like) regarding a situation in which the notification message is output, a condition (e.g., morning, daytime, evening, from 3 to 5 pm, and/or the like) regarding a time when the notification message is output, a condition regarding a distance (e.g., less than 3 m) between the mobile terminal 100 that outputs the notification message and the BLE device, and/or the like. According to various embodiments of the present disclosure, the mobile terminal 100 may receive an input of one piece of notification information regarding one BLE device or an input of the same notification information regarding two or more BLE devices.

For example, the user may set a notification by mapping one-to-one a notification message "Order a book at an Internet bookstore" with a first BLE device attached to an office desk. In addition, the user may set a notification by mapping the notification message "Order a book at an Internet bookstore" with the first BLE device attached to the office desk and a second BLE device attached to a front door.

Meanwhile, the mobile terminal 100 may receive an input of a plurality of pieces of notification information regarding a single BLE device. This will be described in detail with reference to FIGS. 26 to 28.

According to various embodiments of the present disclosure, the mobile terminal 100 may receive an input of notification information regarding a BLE device through various applications such as an address book application, a schedule application, a message application, a memo application, and/or the like. For example, the mobile terminal 100 may provide a GUI that executes the address book application and inputs a notification message in the address book application. In addition, if the mobile terminal 100 receives a text message, the mobile terminal 100 may provide a GUI that executes the message application and sets a notification regarding the text message.

At operation S1740, the mobile terminal 100 may map and store the identification information of the registered BLE device and the notification information in the memory 160. According to various embodiments of the present disclosure, the mobile terminal 100 may further map and store the notification information and property information (e.g., color information of an appearance, shape information, sensor information, etc.) or user added information (e.g., an ID, a nickname, a category, a memo, etc. set by the user) in addition to unique identification information (e.g., a device ID, S/N, MAC address, and/or the like) in the memory 160.

Meanwhile, in a case in which the user changes the notification message regarding the registered BLE device, the mobile terminal 100 may update the notification information regarding the registered BLE device stored in the memory 160.

According to various embodiments of the present disclosure, the mobile terminal 100 may map and store notification information regarding the registered BLE device through the address book application, the schedule application, the message application, the memo application, and/or the like, and the identification information of the registered BLE device.

For example, in a case in which the mobile terminal 100 receives a text message "Complete a delivery to a security office", the mobile terminal 100 may execute the message application and further display a notification setting button on a message window displayed on a screen. In a case in which the user selects the notification setting button, the mobile terminal 100 may provide the list of registered BLE devices. In a case in which the user selects at least one BLE device (e.g., the BLE device attached to the front door) from the list of registered BLE devices, the mobile terminal 100 may map and store identification information of the selected BLE device (e.g., the BLE device attached to the front door) and the text message "Complete a delivery to a security office" as notification information regarding the selected BLE device (e.g., the BLE device attached to the front door) in the memory 160.

Figure 18A:
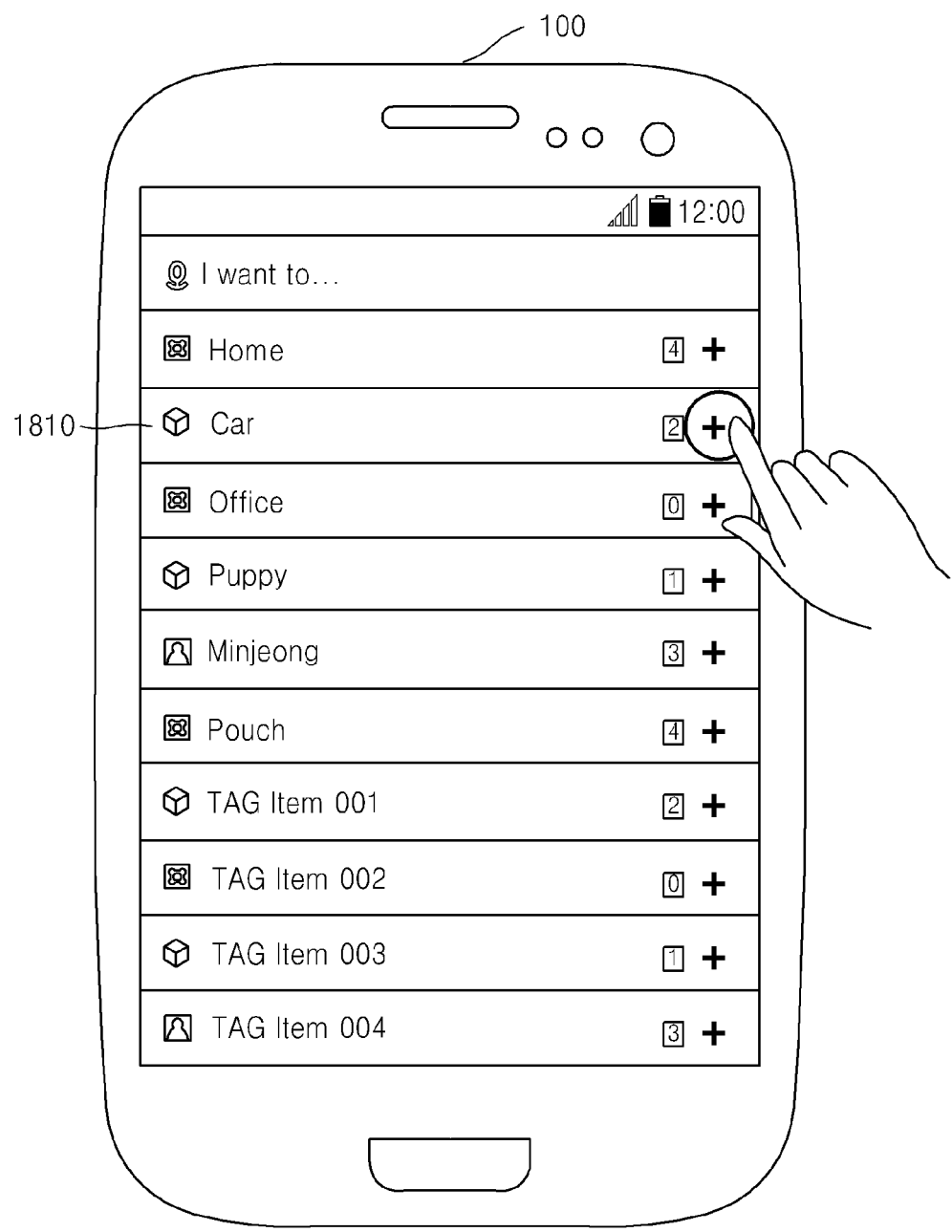
FIGS. 18A and 18B are diagrams illustrating a screen for setting a notification regarding a registered BLE device according to an embodiment of the present disclosure.
Figure 18B:
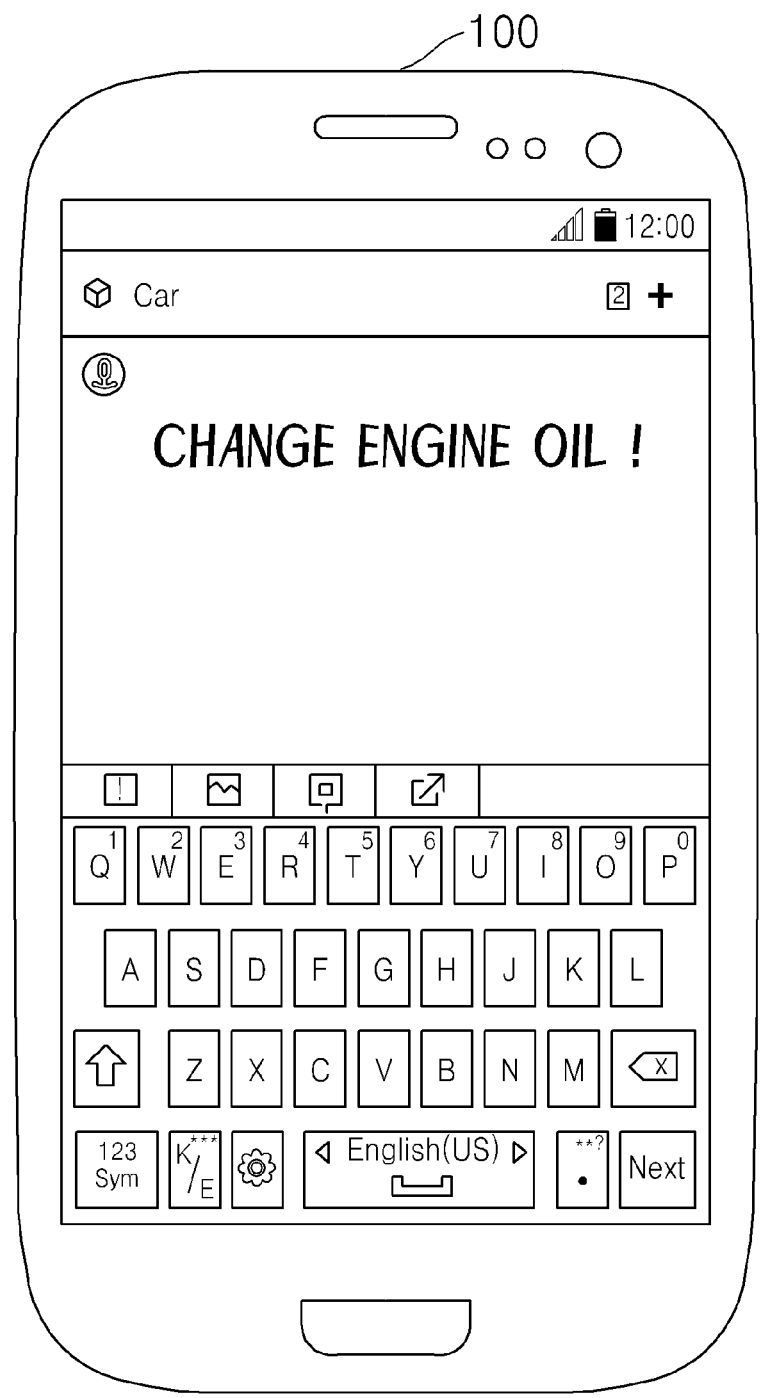

FIGS. 18A and 18B are diagrams illustrating a screen for setting a notification regarding a registered BLE device according to an embodiment of the present disclosure.

Referring to FIG. 18A, the mobile terminal 100 may provide a list of registered BLE devices. The mobile terminal 100 may display the list of registered BLE devices as an ID, a nickname, a category, and/or the like, which are set by a user for user convenience. For example, the mobile terminal 100 may display a registered BLE device 1810 attached to a car as "car", a registered BLE device located at home as "home", and a registered BLE device attached to a pet dog as "puppy" from among the list of registered BLE devices. The mobile terminal 100 may detect a user's selection of the registered BLE device 1810 attached to the car from among the list of registered BLE devices.

In this case, referring to FIG. 18B, the mobile terminal 100 may provide a notification setting window for setting a notification regarding the registered BLE device 1810 attached to the car. The user may input a notification message "Change engine oil" that the user wants to output as a notification message in the notification setting window when the user gets into the car. The mobile terminal 100 may map and store the notification message "Change engine oil" input by the user and identification information (e.g., a device ID, S/N, a MAC address, and/or the like) of the registered BLE device 1810 attached to the car as notification information regarding the registered BLE device 1810 attached to the car in the memory 160.

Figure 19A:
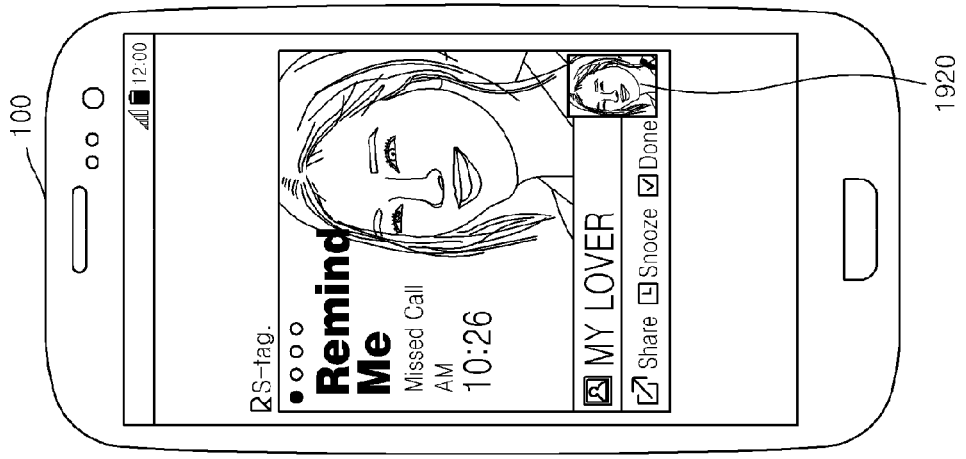
FIGS. 19A, 19B, and 19C are diagrams illustrating a screen for setting a notification regarding a registered BLE device according to an embodiment of the present disclosure.
Figure 19B:
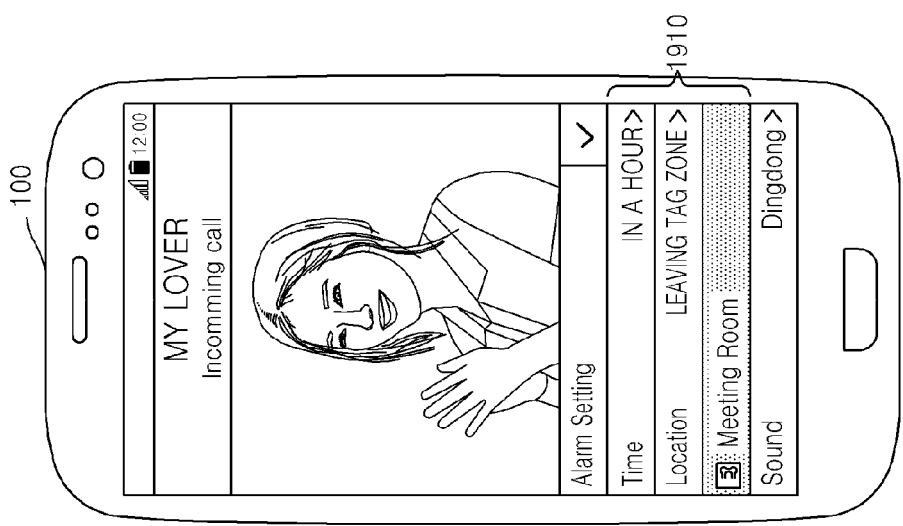
Figure 19C:

FIGS. 19A, 19B, and 19C are diagrams illustrating a screen for setting a notification regarding a registered BLE device according to an embodiment of the present disclosure.

Referring to FIG. 19A, the mobile terminal 100 may execute a phone call application and receive an input of a user's call block regarding a call connection request. For example, in a case in which the user cannot answer the phone because the user is in a business meeting, the user may block (e.g., reject) the call of the call connection request. The mobile terminal 100 may block the call and set a notification regarding the call block.

Referring to FIG. 19B, the mobile terminal 100 may not form a call path with an external terminal in response to the input of the user's call block and may display a notification setting window for setting the notification regarding the call block on the screen.

According to various embodiments of the present disclosure, the mobile terminal 100 may display information regarding a registered BLE device searched for at a current location of the mobile terminal 100 on the notification setting window. For example, in a case in which the user is in the business meeting in a meeting room ABC, the mobile terminal 100 may display an ID (e.g., meeting room ABC) of a registered BLE device attached to the meeting room ABC. In this regard, in a case in which the mobile terminal 100 comes out of the meeting room ABC (e.g., a case in which the mobile terminal 100 goes beyond a communication range of the registered BLE device attached to the meeting room ABC), the mobile terminal 100 may receive an input of a notification condition 1910 whereby a notification message regarding the call block is displayed.

Meanwhile, the mobile terminal 100 may receive an input of an output time condition of the notification message regarding the call block through the notification setting window. For example, the user may set the notification message regarding the call block to be output in one hour.

Referring to FIG. 19C, in a case in which a notification condition (e.g., when the mobile terminal 100 goes beyond the communication range of the registered BLE device attached to the meeting room ABC) input by the user is satisfied, the mobile terminal 100 may output the notification message regarding the call block. The notification message regarding the call block may include information regarding the other party who requests a call connection, a call block time, and/or the like. In this regard, in a case in which the user selects a call icon (not shown) or an image 1920 of the other party who requests the call connection, the mobile terminal 100 may immediately try the call connection to a device of the other party.

Meanwhile, although not shown in FIGS. 19A, 19B, and 19C, according to various embodiments of the present disclosure, the mobile terminal 100 may provide a list of registered BLE devices through the notification setting window, and may receive a selection of at least one registered BLE device from the list of registered BLE devices. For example, in a case in which the user blocks a call during the business meeting, the user may want the notification message regarding the call block to be output when the user returns to his/her desk. In this case, the mobile terminal 100 may receive a user's selection of a registered BLE device attached to the desk from among the list of registered BLE devices. The mobile terminal 100 may map and store identification information of the registered BLE device attached to the desk and the notification message regarding the call block as notification information regarding the registered BLE device attached to the desk.

Figure 20:
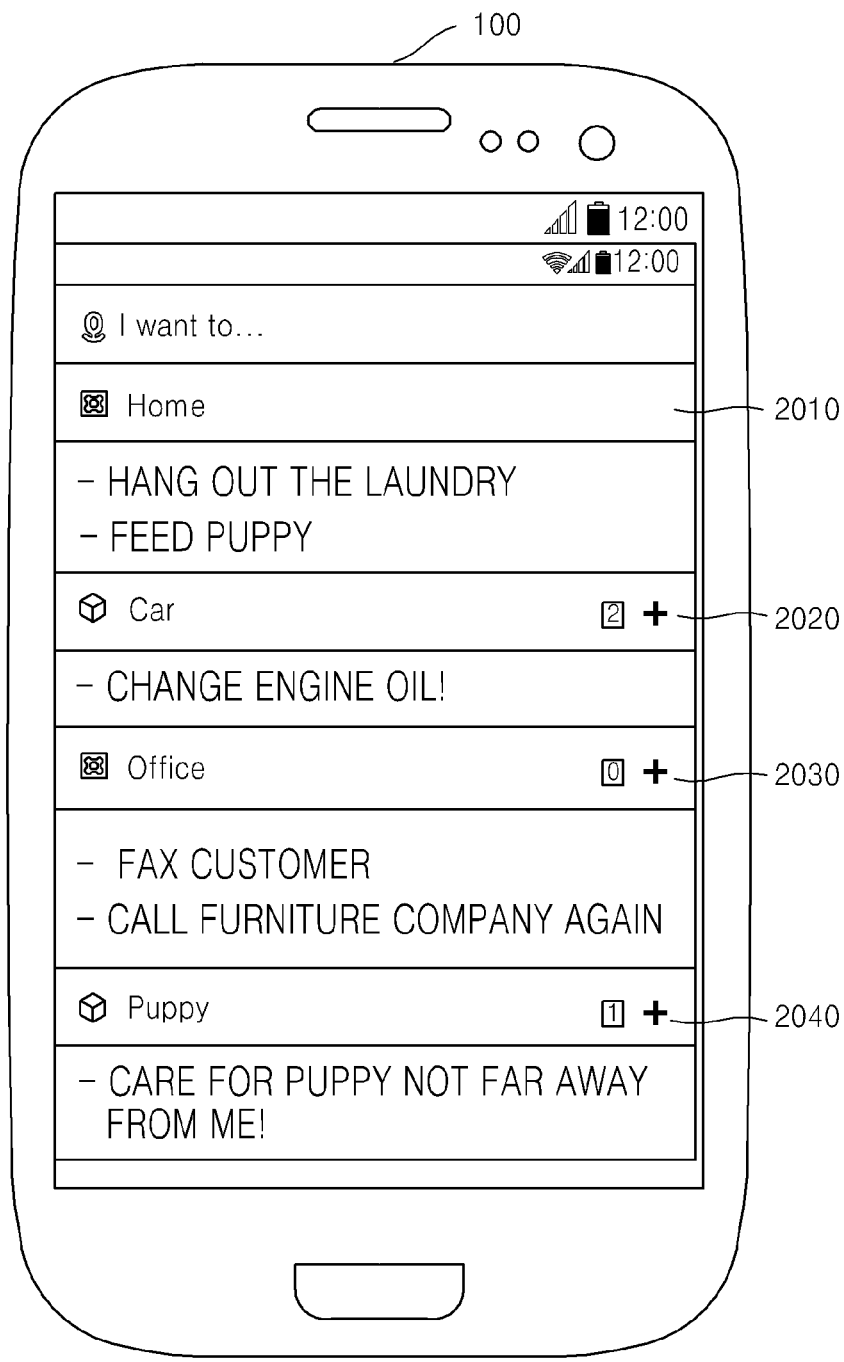
FIG. 20 is a diagram illustrating a plurality of notification information lists according to an embodiment of the present disclosure.

FIG. 20 is a diagram illustrating a plurality of notification information lists according to an embodiment of the present disclosure.

Referring to FIG. 20, in a case in which the mobile terminal 100 detects a users' request for a notification information list, the mobile terminal 100 may output the notification information list on a screen. According to various embodiments of the present disclosure, the mobile terminal 100 may display a notification message set for each of registered BLE devices 2010, 2020, 2030, and 2040 in the notification information list. In this regard, the mobile terminal 100 may display the registered BLE devices 2010, 2020, 2030, and 2040 as an ID, a nickname, a category, and/or the like set by the user for convenience of distinction.

Figure 21:
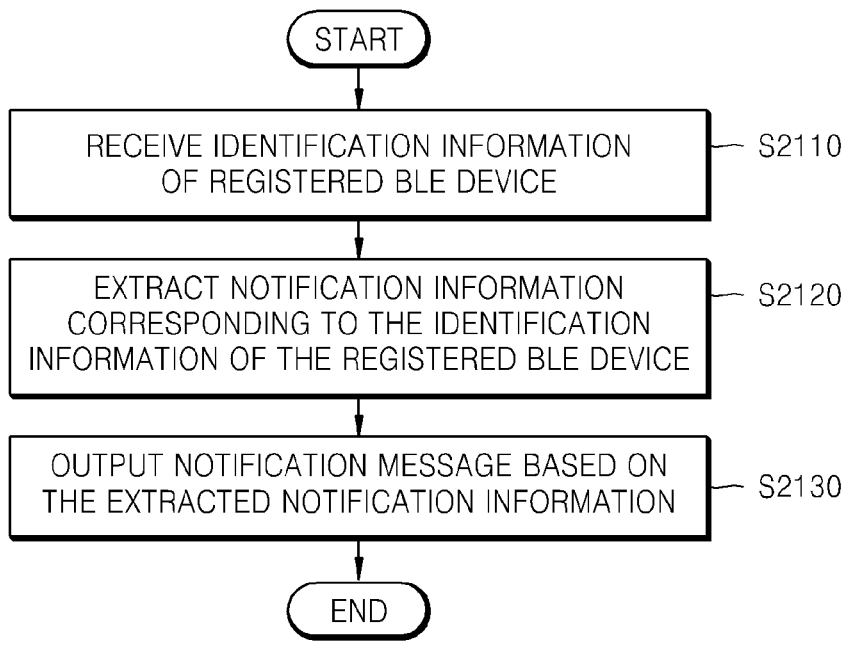
FIG. 21 is a flowchart illustrating a method in which a mobile terminal provides information according to an embodiment of the present disclosure.

FIG. 21 is a flowchart illustrating a method in which a mobile terminal provides information according to an embodiment of the present disclosure.

Referring to FIG. 21, at operation S2110, in a case in which the mobile terminal 100 is located within a communication range of a registered BLE device, the mobile terminal 100 may receive identification information from the registered BLE device. For example, in a case in which a user carries the mobile terminal 100 and approaches the registered BLE device, the mobile terminal 100 may receive identification information (e.g., a device ID, an S/N, a MAC address, and/or the like) of a first registered BLE device, which is broadcast by the first registered BLE device.

In this regard, the BLE device 200 may include identification information of the registered BLE device in a UUID field of an advertising packet or in an MSD field thereof and may broadcast the advertising packet.

According to various embodiments of the present disclosure, in a case in which the mobile terminal 100 receives identification information of a BLE device, the mobile terminal 100 may compare the received identification information of the BLE device and a list of registered BLE devices previously stored in the memory 160 and may determine whether the BLE device that transmits the identification information is one of the list of registered BLE devices.

At operation S2120, the mobile terminal 100 may extract notification information corresponding to the identification information of the registered BLE device. For example, the mobile terminal 100 may search for a notification information list by using the identification information of the registered BLE device. In this regard, the mobile terminal 100 may extract the notification information stored after being mapped with the identification information of the registered BLE device.

According to various embodiments of the present disclosure, the mobile terminal 100 may extract the notification information corresponding to the identification information of the registered BLE device from the memory 160, and receive the notification information from an external server (e.g., a cloud server) linked to the mobile terminal 100.

At operation S2130, the mobile terminal 100 may output a notification message based on the extracted notification information. According to various embodiments of the present disclosure, the notification information may include a notification message, notification condition information, and/or the like. For example, the mobile terminal 100 may confirm the notification condition information and output the notification message included in the notification information.

For example, in a case in which the mobile terminal 100 comes within a communication range of the registered BLE device and receives the identification information of the registered BLE device, the notification condition may be set in such a way that the notification message is output within a previously set time (e.g., within 3 seconds) from a time when the identification information is received. In this case, the mobile terminal 100 may output the notification message mapped with the identification information of the registered BLE device on a screen when the mobile terminal 100 receives the identification information of the registered BLE device.

In addition, in a case in which the mobile terminal 100 goes beyond the communication range of the registered BLE device, the notification condition may be set in such a way that the notification message is output. In this case, the mobile terminal 100 may output the notification message corresponding to the identification information of the registered BLE device when the mobile terminal 100 goes beyond the communication range of the registered BLE device and no longer receives the identification information of the registered BLE device.

Meanwhile, according to various embodiments of the present disclosure, in a case in which a user does not set the notification condition (e.g., a condition regarding a time when the notification message is not output), the mobile terminal 100 may output the notification message immediately when receiving the identification information of the registered BLE device. According to various embodiments of the present disclosure, the mobile terminal 100 may output the notification message in a case in which a distance between the mobile terminal 100 and the registered BLE device is equal to and smaller than a previously set distance (e.g., 3 m). For example, although the mobile terminal 100 is within the communication range of the registered BLE device, the mobile terminal 100 may output the notification message only when a distance condition (e.g., the distance between the mobile terminal 100 and the registered BLE device is equal to and smaller than 3 m) is satisfied. The previous set distance (e.g., 3 m) may be changed by the user or a system. Meanwhile, a method (such as a method that uses an intensity of a signal received from the registered BLE device) of measuring the distance between the mobile terminal 100 and the registered BLE device is a well-known technology, and thus a detailed description thereof will be omitted here.

Meanwhile, the mobile terminal 100 may output the notification message in a case in which the distance between the mobile terminal 100 and the registered BLE device is equal to and greater than the previously set distance. For example, based on an intensity of a signal received from a BLE device attached to a pet dog, in a case in which a distance between the mobile terminal 100 and the BLE device attached to the pet dog is equal to and smaller than a previously set distance (e.g., 7 m), the mobile terminal 100 may output a notification message "There is no pet dog around here. Please look for it".

The mobile terminal 100 may output the notification message by using at least one of a video signal, an audio signal, a vibration signal, and/or the like. For example, the mobile terminal 100 may display the notification message on the screen. In addition, the mobile terminal 100 may output a voice message in a case in which the notification message is input in a voice format. Meanwhile, the mobile terminal 100 may generate the vibration signal while outputting the notification message as the video signal or the audio signal.

Meanwhile, the mobile terminal 100 may provide a snooze function. For example, in a case in which the user sets a notification repetition number (e.g., 5 repetitions) or a notification repetition interval (e.g., 3 minutes), the mobile terminal 100 may output the notification message a predetermined number of times (e.g., 5 times) or at predetermined intervals (e.g., every 3 minutes), or the like.

Therefore, according to various embodiments of the present disclosure, the mobile terminal 100 may notify a list of things to do that needs to be previously input when the user goes by a previously registered BLE device.

FIGS. 22A, 22B, and 22C are diagrams illustrating a screen for outputting a notification message according to an embodiment of the present disclosure.

Referring to FIG. 22A, identification information of a first BLE device 2210 attached to a car and notification information "Change engine oil" are mapped and stored in the memory 160 of the mobile terminal 100. In this regard, in a case in which a user carries the mobile terminal 100 and approaches the car, the mobile terminal 100 may receive identification information (e.g., BLE_TAG_001) from the first BLE device 2210. According to various embodiments of the present disclosure, the identification information (e.g., BLE_TAG_001) may be included in a UUID field of an advertising packet broadcasted by the first BLE device 2210 or in an MSD field thereof.

The mobile terminal 100 may extract notification information corresponding to the received identification information (e.g., BLE_TAG_001) from the first BLE device 2210. The mobile terminal 100 may confirm notification condition information included in the extracted notification information and output a notification message. For example, in a case in which no special condition is included in the notification information, the mobile terminal 100 may output a notification message "Change engine oil" immediately when receiving the notification information.

In the same manner as stated above, referring to FIG. 22B, in a case in which the user gets near the house, the mobile terminal 100 may receive identification information (e.g., BLE_TAG_002) of a second BLE device 2220 attached to a front door of the house. In this regard, the mobile terminal 100 may output a notification message (e.g., "Hang out the laundry") corresponding to the identification information (e.g., BLE_TAG_002) of the second BLE device 2220.

In addition, referring to FIG. 22C, in a case in which the user arrives at the office, the mobile terminal 100 may receive identification information (e.g., BLE_TAG_003) of a third BLE device 2230 disposed at a desk of the office. In this regard, the mobile terminal 100 may output a notification message (e.g., "Scan and send a business license") corresponding to the identification information (e.g., BLE_TAG_003) of the third BLE device 2230.

Therefore, according to various embodiments of the present disclosure, the mobile terminal 100 may provide the user with a previously set notification message in a case in which the user approaches within a communication range of a BLE device even though the user does not intentionally touch the BLE device.

Figure 23:
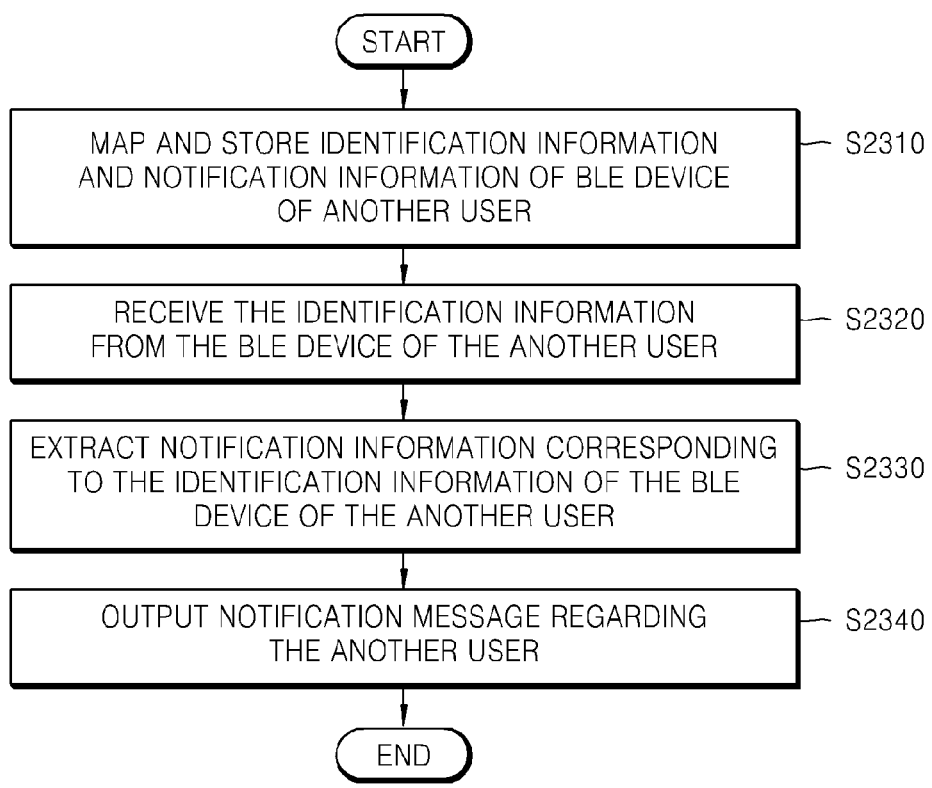
FIG. 23 is a flowchart illustrating a method of providing a notification regarding another user that carries a BLE device according to an embodiment of the present disclosure.

FIG. 23 is a flowchart illustrating a method of providing a notification regarding another user that carries a BLE device according to an embodiment of the present disclosure.

Referring to FIG. 23, at operation S2310, the mobile terminal 100 may map and store identification information and notification information of a BLE device of another user. For example, in a case in which the mobile terminal 100 receives an input of the notification information of the BLE device of another user from a user, the mobile terminal 100 may map and store the identification information of the BLE device of the other user and the notification information received from the user in the memory 160. According to various embodiments of the present disclosure, the mobile terminal 100 may receive the input of the notification information of the BLE device of the other user through an address book application. This will be described in detail with reference to FIGS. 24A, 24B, and 24C.

At operation S2320, the mobile terminal 100 may receive identification information from the BLE device of another user. For example, in a case in which the mobile terminal 100 approaches a communication range of the BLE device of the other user, the mobile terminal 100 may receive identification information broadcasted from the BLE device of the other user.

At operation S2330, the mobile terminal 100 may extract notification information corresponding to the identification information of the BLE device of the other user. For example, the mobile terminal 100 may execute the address book application and extract the notification information mapped with the identification information of the BLE device of the other user. According to various embodiments of the present disclosure, the identification information of the BLE device of the other user may be included in a UUID field of an advertising packet broadcasted by the BLE device of the other user or an MSD field thereof.

At operation S2340, the mobile terminal 100 may output a notification message regarding the other user based on the extracted notification information. For example, in a case in which the mobile terminal 100 stores information regarding an item that needs to be returned from the other user when seeing the other user as the notification information regarding the BLE device of the other user, the mobile terminal 100 may output a name, an image, and/or the like of the item that needs to be returned from the other user when receiving the identification information from the BLE device of the other user as the notification message.

According to various embodiments of the present disclosure, the mobile terminal 100 may provide information regarding a Social Networking Service (SNS) that another user is using when receiving the identification information from the BLE device of the other user. For example, the mobile terminal 100 may display text or an image that the other user has recently posted on an SNS server, emotional state information set by the other user on the SNS server, and/or the like on a screen. In this regard, according to various embodiments of the present disclosure, the mobile terminal 100 may receive information regarding the SNS from the SNS server or the BLE device of the other user.

According to various embodiments of the present disclosure, the mobile terminal 100 may output communication history information between the BLE device of another user and the mobile terminal 100 when receiving the identification information from the BLE device of the other user. For example, the mobile terminal 100 may display a recent call history in regard to the other user, a recently transmitted and received text message, and/or the like.

Figure 24A:
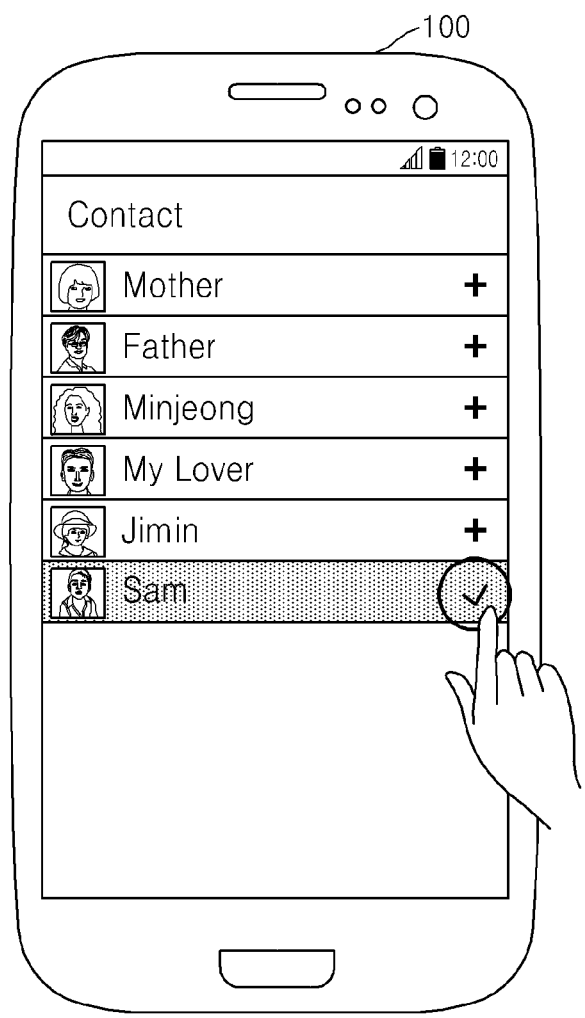
FIGS. 24A, 24B, and 24C are diagrams illustrating a screen for setting a notification regarding another user that carries a BLE device according to an embodiment of the present disclosure.
Figure 24B:
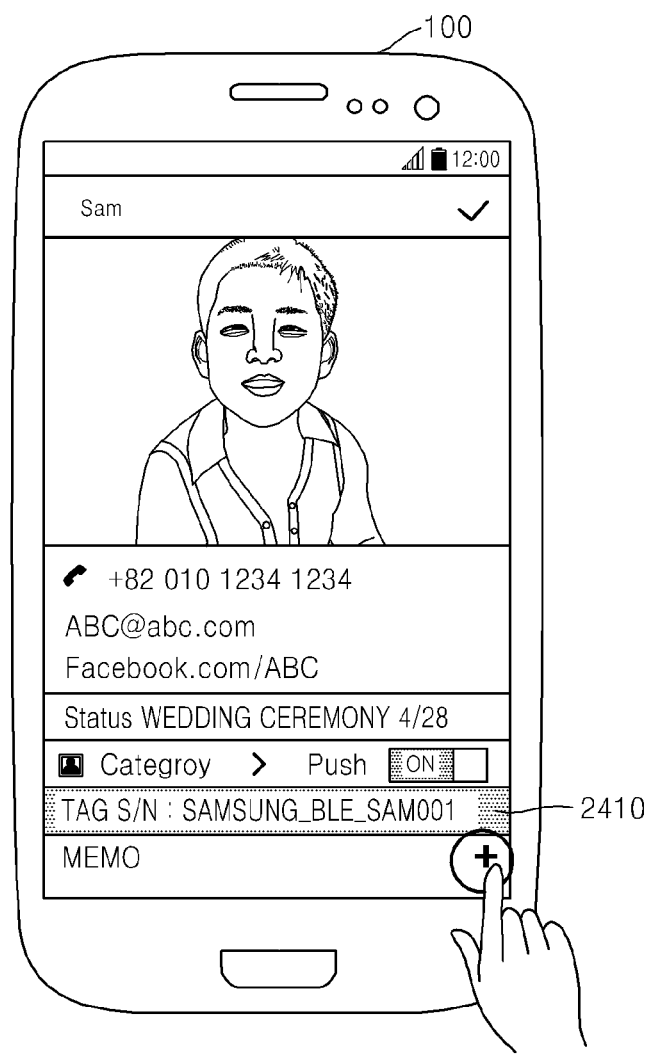
Figure 24C:

FIGS. 24A, 24B, and 24C are diagrams illustrating a screen for setting a notification regarding another user that carries a BLE device according to an embodiment of the present disclosure.

Referring to FIG. 24A, the mobile terminal 100 may execute an address book application. In this regard, the mobile terminal 100 may detect a user's selection of another user (e.g., Sam) included in an address book.

Referring to FIG. 24B, the mobile terminal 100 may provide information regarding another user (e.g., Sam) selected by the user through the address book application. For example, the mobile terminal 100 may display basic information (e.g., a name, a job, an age, a photo, a relationship between the user and the other user, an address of an SNS server that the other user is using, SNS account information, and/or the like) regarding the other user selected by the user and identification information (e.g., TAG S/N: SAMSUNG_BLE_SAM001) of a BLE device carried by the other user.

Meanwhile, the user may select a notification setting button 2410 displayed on the screen. For example, the mobile terminal 100 may detect a tap gesture, which is applied by the user, or a swipe gesture, a flick gesture, and/or the like, or recognize a voice command and thus detect a user's selection of the notification setting button 2410.

Referring to FIG. 24C, the mobile terminal 100 may provide a notification setting window in response to the user's selection of the notification setting button 2410. In this regard, the mobile terminal 100 may receive an input of a notification message (e.g., get performance costume delivered) regarding the other user through the notification setting window. The mobile terminal 100 may map and store the notification message (e.g., get performance costume delivered) regarding the other user and the identification information (e.g., TAG S/N: SAMSUNG_BLE_SAM001) of the BLE device carried by the other user as notification information regarding the other user (e.g., Sam).

Figure 25:
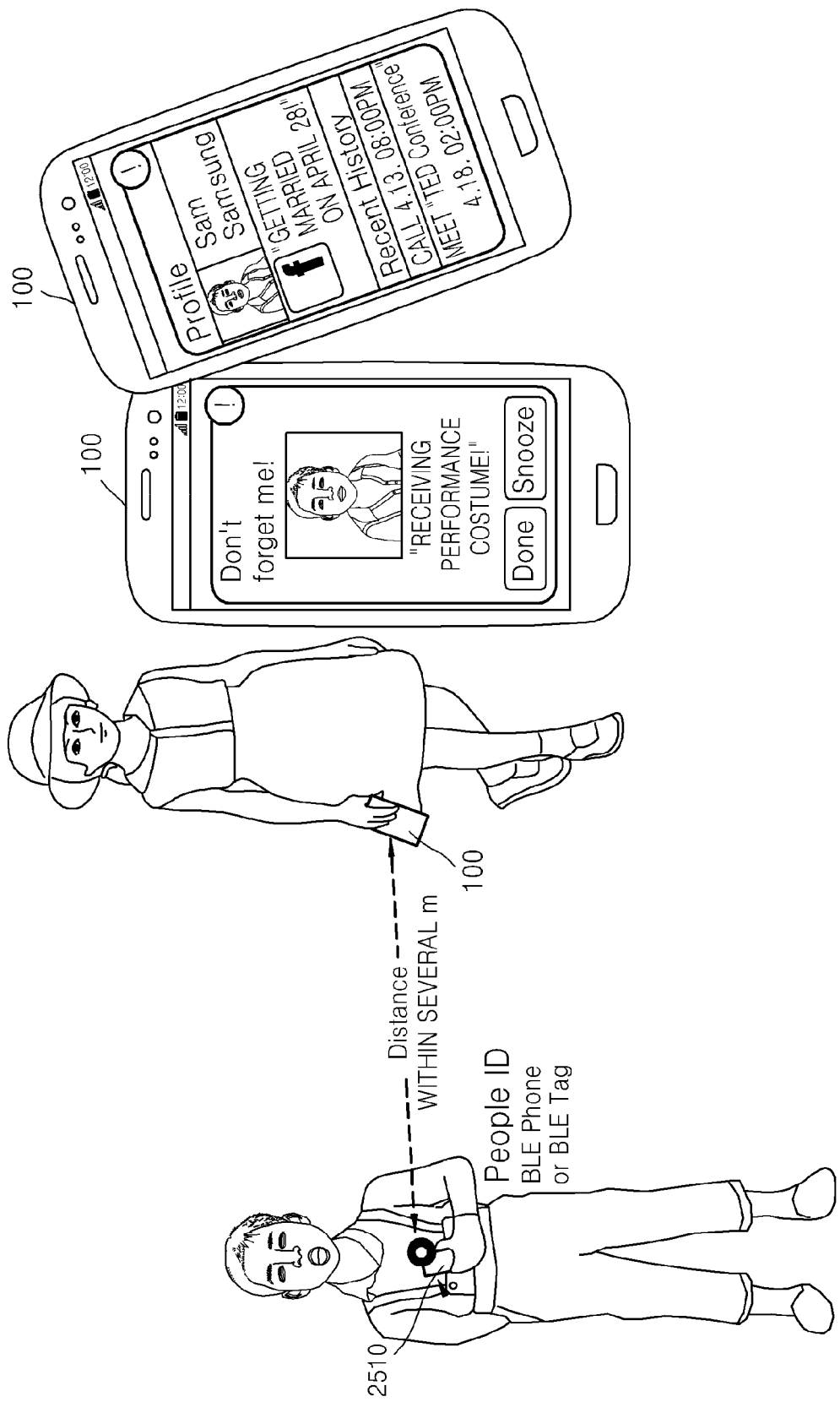
FIG. 25 is a diagram illustrating a screen for outputting a notification message regarding another user that carries a BLE device according to an embodiment of the present disclosure.

FIG. 25 is a diagram illustrating a screen for outputting a notification message regarding another user that carries a BLE device according to an embodiment of the present disclosure.

Referring to FIG. 25, in a case in which a user carrying the mobile terminal 100 is located a near distance (e.g., within 3 m) from another user carrying a BLE device 2510, the mobile terminal 100 may receive identification information (e.g., TAG S/N: SAMSUNG_BLE_SAM001) from the BLE device 2510 of the other user. According to various embodiments of the present disclosure, the identification information (e.g., TAG S/N: SAMSUNG_BLE_SAM001) may be included in a UUID field of an advertising packet broadcasted by the BLE device 2510 of the other user or in an MSD field thereof.

In this regard, the mobile terminal 100 may extract notification information corresponding to the identification information (e.g., TAG S/N: SAMSUNG_BLE_SAM001) of the BLE device 2510 of the other user.

The mobile terminal 100 may output a notification message (e.g., receiving performance costume) included in the extracted notification information on the screen. In addition, the mobile terminal 100 may further output status information (e.g., getting married on April 28) of an SNS that the other user (e.g., Sam) is using, a recent call history (e.g., CALL 4.13 08:00 PM) in regard to the other user (e.g., Sam), recent meeting information (e.g., TED Conference 4.18 02:00 PM) in regard to the other user (e.g., Sam), and/or the like.

Therefore, according to various embodiments of the present disclosure, the mobile terminal 100 may confirm a previously set notification message regarding another user or recent state information of the other user in advance, before the user meets the other user who is carrying a registered BLE device.

Figure 26:
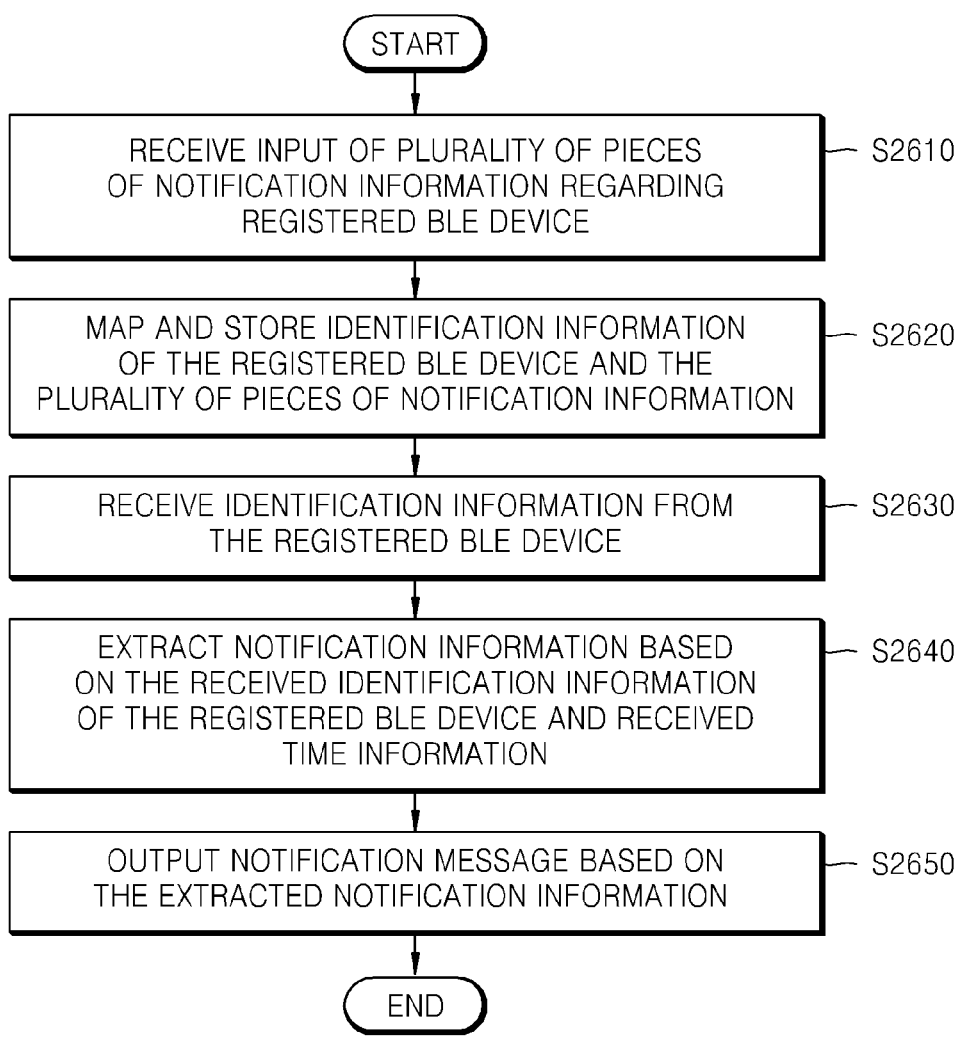
FIG. 26 is a flowchart illustrating a method of providing a plurality of notifications by using a single BLE device according to an embodiment of the present disclosure.

FIG. 26 is a flowchart illustrating a method of providing a plurality of notifications by using a single BLE device according to an embodiment of the present disclosure.

Referring to FIG. 26, at operation S2610, the mobile terminal 100 may receive an input of a plurality of pieces of notification information regarding a registered BLE device. For example, the user may set at least two notifications regarding a single registered BLE device.

According to various embodiments of the present disclosure, the mobile terminal 100 may receive the input of the plurality of pieces of notification information regarding the single registered BLE device, which are classified with respect to time. For example, a user may classify and set the plurality of notifications regarding the single registered BLE device as morning/afternoon, morning/noon/evening, 7-9

AM/11-12 AM/3-5 PM/8-10 PM, or the like. However, various embodiments of the present disclosure are not limited thereto.

At operation S2620, the mobile terminal 100 may map and store identification information of the registered BLE device and the plurality of pieces of notification information in the memory 160.

At operation S2630, the mobile terminal 100 may receive identification information from the registered BLE device. For example, in a case in which the mobile terminal 100 is disposed within a communication range of the registered BLE device, the mobile terminal 100 may receive the identification information that was broadcast from the registered BLE device. According to various embodiments of the present disclosure, the mobile terminal 100 may receive the identification information at previously set intervals (e.g., every 1 second). In addition, according to various embodiments of the present disclosure, the mobile terminal 100 may receive, from the registered BLE device, an advertising packet in which the identification information is included in a UUID field or an MSD field.

At operation S2640, the mobile terminal 100 may extract notification information corresponding to the identification information of the registered BLE device based on the received identification information of the registered BLE device and received time information. For example, in a case in which the mobile terminal 100 receives the identification information from the registered BLE device, the mobile terminal 100 may search for the notification information regarding the registered BLE device by using the received identification information. In this regard, in a case in which a plurality of pieces of notification information regarding the registered BLE device exist, the mobile terminal 100 may extract one piece of notification information from the plurality of pieces of notification information regarding the registered BLE device additionally in consideration of time information regarding a time when the identification information is received from the registered BLE device.

At operation S2650, the mobile terminal 100 may output a notification message based on the extracted notification information. Operation S2650 corresponds to operation S2130 of FIG. 21, and thus a detailed description thereof will be omitted here.

Figure 27A:
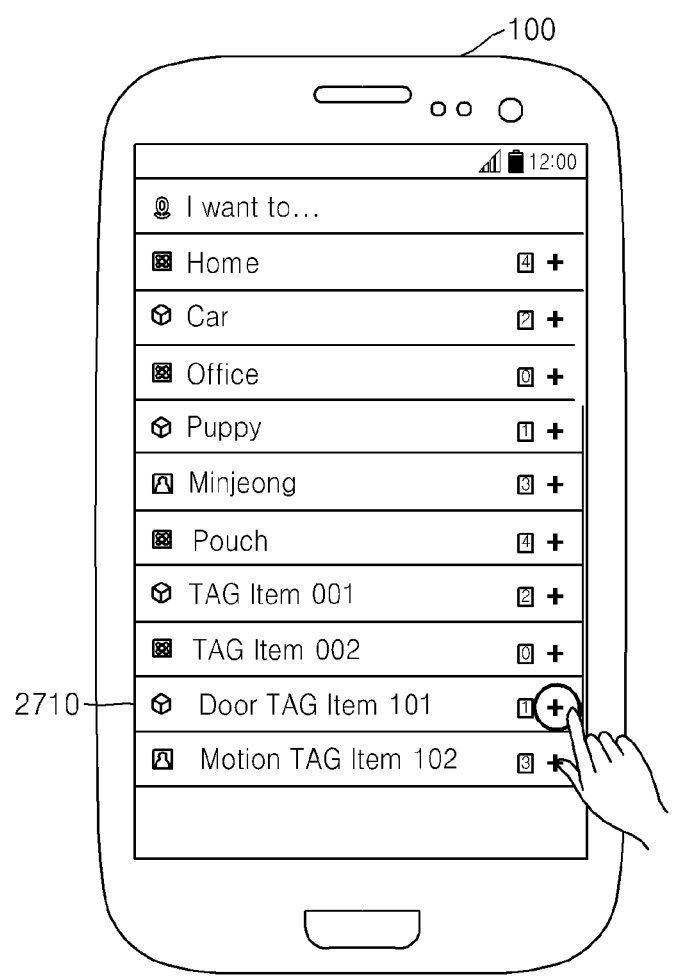

FIGS. 27A 27B, and 27C are diagrams illustrating a screen for receiving an input of a plurality of pieces of notification information regarding a single BLE device according to an embodiment of the present disclosure.

Referring to FIG. 27A, the mobile terminal 100 may display a list of registered BLE devices on the screen according to a user's request. The mobile terminal 100 may display the list of registered BLE devices as an ID, a nickname, a category, and/or the like, which are set by a user for user convenience. For example, the mobile terminal 100 may display a registered BLE device 2710 attached to a front door as "Door_TAG Item 101". The mobile terminal 100 may detect a user's selection of the registered BLE device 2710 attached to the front door from among the list of registered BLE devices.

In this case, referring to FIG. 27B, the mobile terminal 100 may provide a notification setting window for setting a notification regarding the registered BLE device 2710 attached to the front door. In this regard, the mobile terminal 100 may receive an in input of a plurality of pieces of notification information regarding the registered BLE device 2710 attached to the front door, which are classified with respect to time. The mobile terminal 100 may map and store the plurality of pieces of notification information and identification information regarding the registered BLE device 2710 attached to the front door, in the memory 160.

For example, referring to FIG. 27C, the mobile terminal 100 may map and store first notification information (in a case in which the identification information is received at 7:30 AM, the mobile terminal 100 outputs "take an umbrella"), second notification information (in a case in which the identification information is received at 11:30 AM, the mobile terminal 100 outputs "take a shopping basket to a grocery store"), third notification information (in a case in which the identification information is received at 4:00 PM, the mobile terminal 100 outputs "open a window to let fresh air in"), and fourth notification information (in a case in which the identification information is received at 10:30 PM, the mobile terminal 100 outputs "check the door is locked") and the identification information (e.g., TAG S/N: SAMSUNG_BLE_Item101) of the registered BLE device 2710 attached to the front door.

Figure 28A:
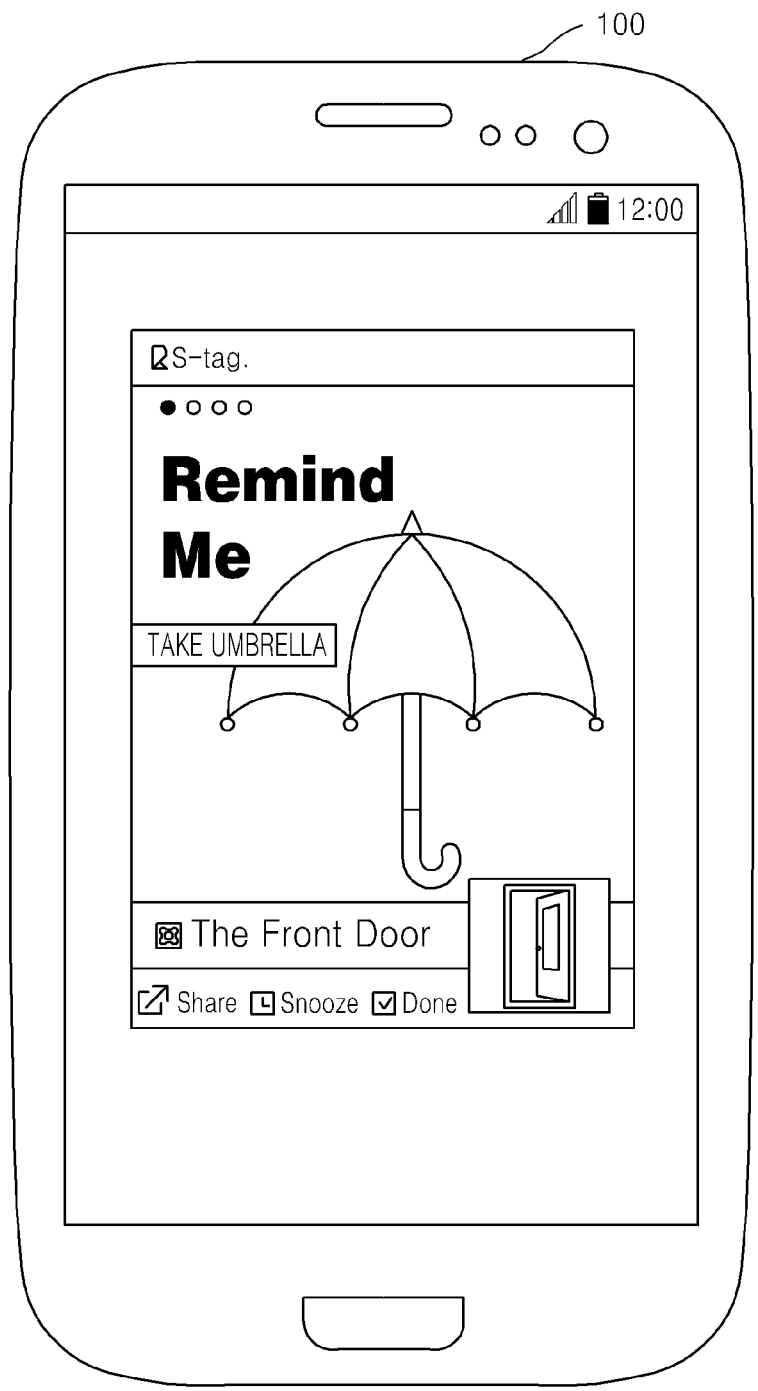
FIGS. 28A and 28B are diagrams illustrating a screen for displaying a notification message according to an embodiment of the present disclosure.
Figure 28B:
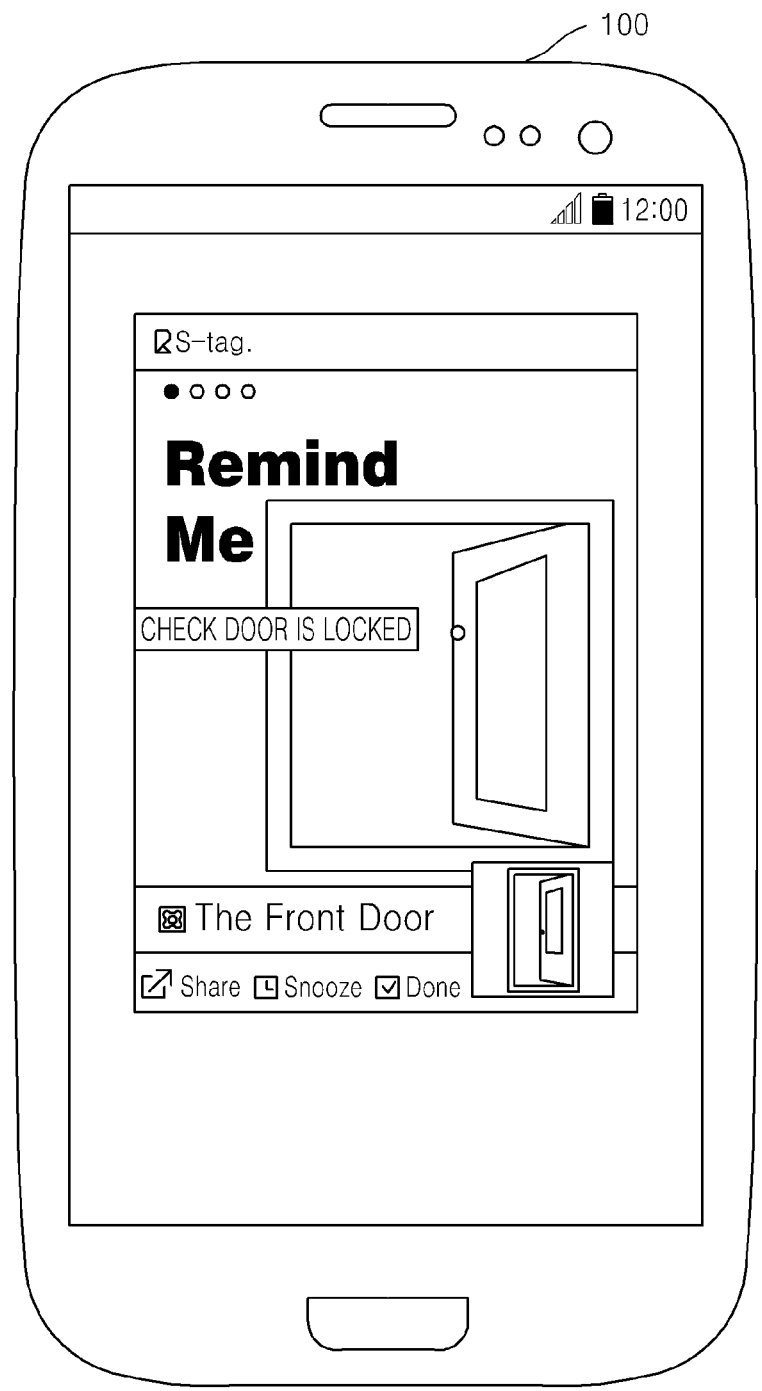

FIGS. 28A and 28B are diagrams illustrating a screen for displaying a notification message according to an embodiment of the present disclosure.

In this regard, referring to FIG. 28A, in a case in which the user approaches the front door to come to the office at 7:30 AM, the mobile terminal 100 may receive the identification information (e.g., TAG S/N: SAMSUNG_BLE_Item101) from the registered BLE device 2710 attached to the front door. According to various embodiments of the present disclosure, the identification information (e.g., TAG S/N: SAMSUNG_BLE_Item101) may be included in a UUID field of an advertising packet broadcasted by the BLE device 2710 attached to the front door or in an MSD field thereof.

The mobile terminal 100 may extract the first notification information (in a case in which the identification information is received at 7:30 AM, the mobile terminal 100 outputs "take an umbrella") from the plurality of pieces of notification information corresponding to the identification information of the registered BLE device 2710 attached to the front door based on the identification information (e.g., S/N: SAMSUNG_BLE_Item101) of the registered BLE device 2710 attached to the front door and time information (e.g., 7:30 AM) regarding a time when the identification information is received. The mobile terminal 100 may output a notification message "take an umbrella" according to the first notification information.

Referring to FIG. 28B, in a case in which the mobile terminal 100 receives the identification information (e.g., TAG S/N: SAMSUNG_BLE_Item101) of the registered BLE device 2710 attached to the front door at 10:30 PM, the mobile terminal 100 may output the fourth notification information (in a case in which the identification information is received at 10:30 PM, the mobile terminal 100 outputs "check the door is locked") from the plurality of pieces of notification information corresponding to the identification information of the registered BLE device 2710 attached to the front door based on the identification information (e.g., TAG S/N: SAMSUNG_BLE_Item101) of the registered BLE device 2710 attached to the front door and time information (e.g., 10:30 PM) regarding a time when the identification information is received. The mobile terminal 100 may output a notification message "checking the door is locked up" according to the fourth notification information.

Figure 29:
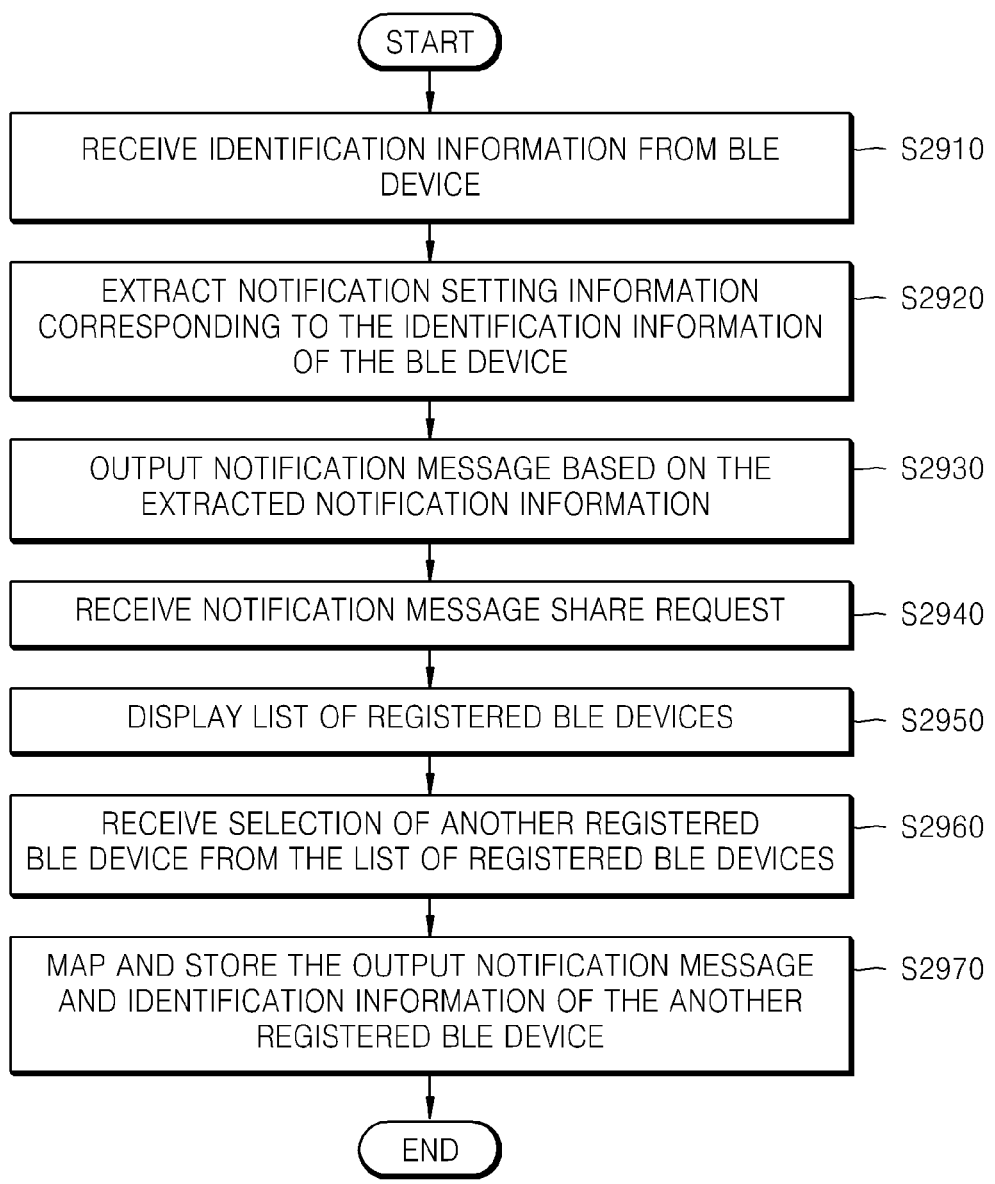
FIG. 29 is a flowchart illustrating a method of mapping a notification message to another BLE device according to an embodiment of the present disclosure.

FIG. 29 is a flowchart illustrating a method of mapping a notification message to another BLE device according to an embodiment of the present disclosure.

Referring to FIG. 29, at operation S2910, the mobile terminal 100 may receive identification information (e.g., a device ID, a nickname, a MAC address, and/or the like) from a registered BLE device when the mobile terminal 100 is located within a communication range of the registered BLE device. In this regard, the identification information of the registered BLE device may be included in a UUID field of an advertising packet broadcasted by the registered BLE device or in an MSD field thereof.

At operation S2920, the mobile terminal 100 may extract notification information corresponding to identification information of the registered BLE device.

At operation S2930, the mobile terminal 100 may output a notification message based on the extracted notification information.

Operations S2910 to S2930 correspond to operations S2110 to S2130 of FIG. 21, and thus detailed descriptions thereof will be omitted here.

At operation S2940, the mobile terminal 100 may receive a notification message share request from a user. For example, the mobile terminal 100 may output a share button on a window that outputs the notification message regarding the registered BLE device. In this regard, the user may select the share button to send the notification message share request to the mobile terminal 100 in such a way that a notification message that is being currently output may be output in a case in which identification information of another BLE device is received.

At operation S2950, the mobile terminal 100 may display a list of registered BLE devices in response to the notification message share request.

At operation S2960, the mobile terminal 100 may detect a user's selection of another registered BLE device from the list of registered BLE devices. For example, the mobile terminal 100 may detect the user's selection of the other registered BLE device in addition to a registered BLE device mapped to the notification message that is being currently output.

At operation S2970, the mobile terminal 100 may map and store the output notification message and identification information of the other registered BLE device as notification information regarding the other registered BLE device. Thereafter, in a case in which the mobile terminal 100 approaches a communication range of the other registered BLE device, the mobile terminal 100 may output a notification message that is requested to be shared.

Figure 30A:
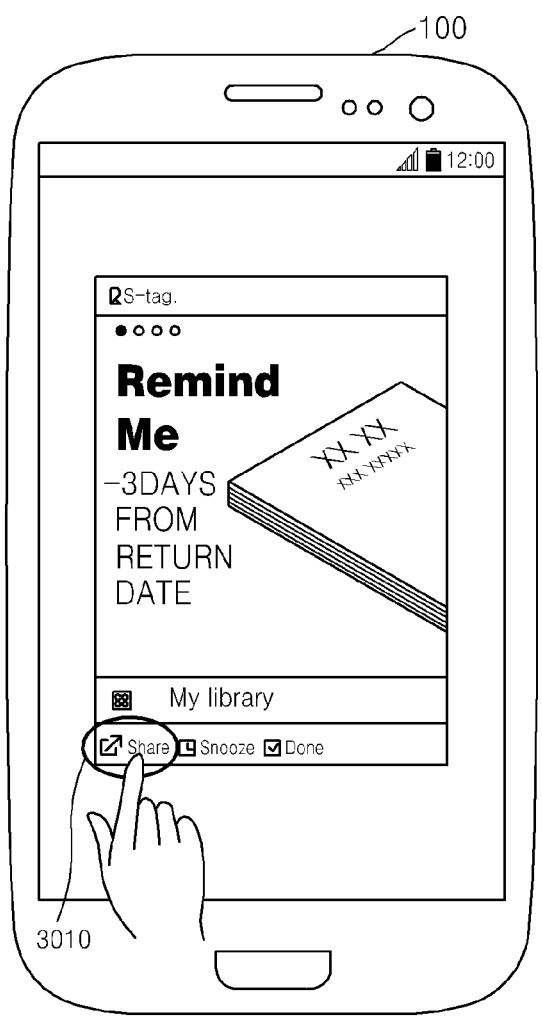
FIGS. 30A, 30B, and 30C are diagrams illustrating a screen for mapping a notification message to another BLE device according to an embodiment of the present disclosure.
Figure 30B:
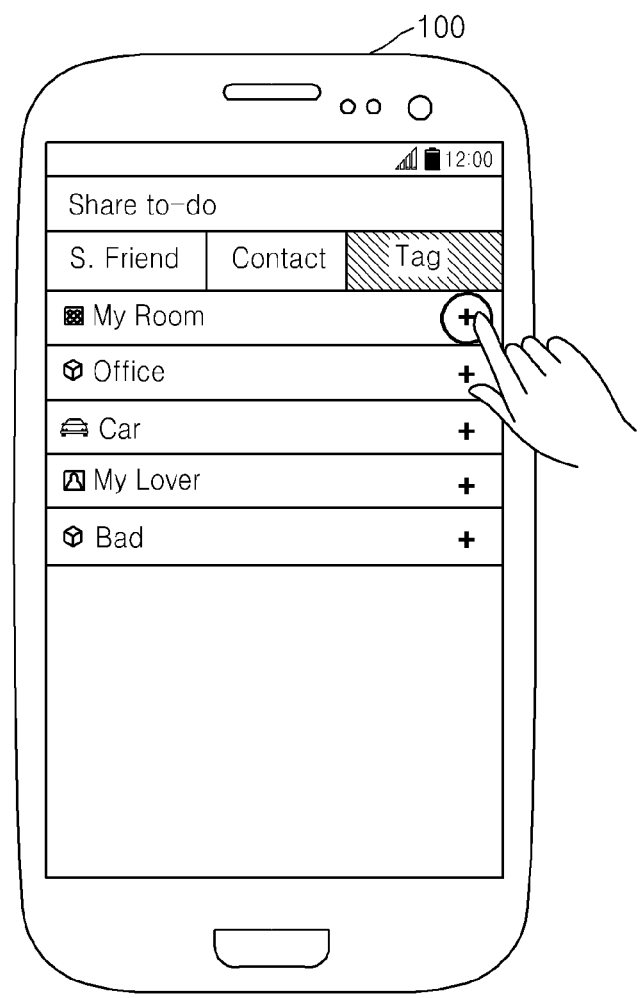
Figure 30C:
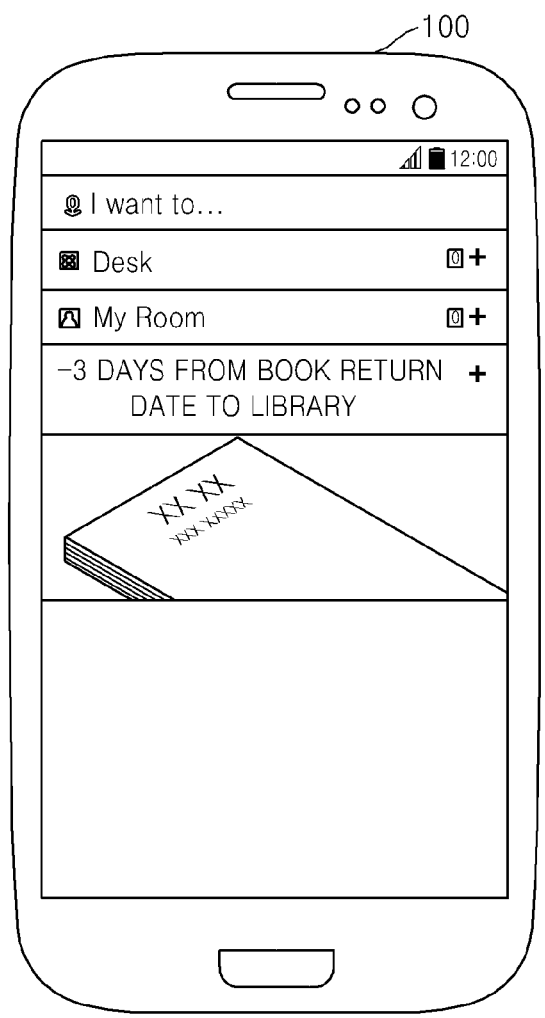

FIGS. 30A through 30C are diagrams illustrating a screen for mapping a notification message to another BLE device according to an embodiment of the present disclosure.

Referring to FIG. 30A, in a case in which the mobile terminal 100 receives identification information from a first registered BLE device located at a library, the mobile terminal 100 may extract notification information (e.g., output a notification message regarding a return date of a book). The mobile terminal 100 may output a notification message (e.g., an image of the book +−3 days from a return date) based on the extracted notification information. In this regard, the mobile terminal 100 may additionally display a share button 3010 in a notification message output window.

Referring to FIG. 30B, in a case in which the user touches the share button 3010, the mobile terminal 100 may display a list of registered BLE devices. According to various embodiments of the present disclosure, the mobile terminal 100 may receive an input of a selection of a second registered BLE device disposed in a room of the user from the list of registered BLE devices. The mobile terminal 100 may map and store identification information of the second registered BLE device and the notification message (e.g., an image of the book +−3 days from a return date) that is being currently output as new notification information regarding the second registered BLE device.

Referring to FIG. 30C, in a case in which the user goes back home, the mobile terminal 100 may receive the identification information of the second registered BLE device and output the notification message (e.g., an image of the book +−3 days from a return date) that is stored after being mapped with the identification information of the second registered BLE device.

In this regard, the identification information of the second registered BLE device may be included in a UUID field of an advertising packet broadcasted by the second registered BLE device or in an MSD field thereof.

Figure 31:
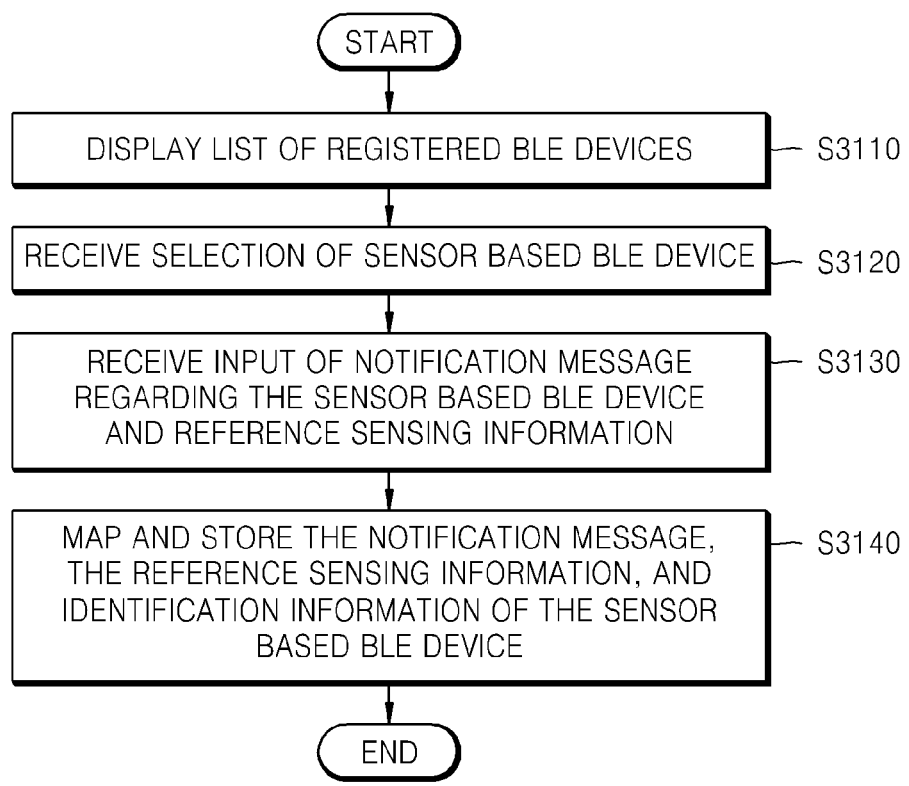
FIG. 31 is a flowchart illustrating a method in which a mobile terminal receives an input of a notification message and reference sensing information from a user according to an embodiment of the present disclosure.

FIG. 31 is a flowchart illustrating a method in which a mobile terminal receives an input of a notification message and reference sensing information from a user according to an embodiment of the present disclosure.

Referring to FIG. 31, at operation S3110, the mobile terminal 100 may display a list of registered BLE devices. The list of registered BLE devices may include identification information of a registered BLE device including a sensor and identification information of a registered BLE device not including the sensor.

For example, in a case in which the mobile terminal 100 receives a user input that requests the list of registered BLE devices, the mobile terminal 100 may display the list of registered BLE devices on a screen. In this regard, the mobile terminal 100 displays the list of registered BLE devices including an ID, a nickname, a category, and/or the like input by the user in such a way that the user may easily identify the registered BLE devices.

According to various embodiments of the present disclosure, the mobile terminal 100 may display property information (e.g., color information, shape information, pattern information, sensor information, and/or the like) of the registered BLE devices on the list of registered BLE devices. For example, the mobile terminal 100 may display the color information (e.g., red, yellow, blue, orange, purple, black, and/or the like), the shape information (e.g., a rectangle, a triangle, a circle, a starfish, a heart, and/or the like), and the pattern information (e.g., a water drop, a diamond, a checker, a bear, a sunflower, and/or the like) in the list of registered BLE devices as information regarding appearances of the registered BLE devices. The mobile terminal 100 may also display the sensor information (e.g., a sensor ID, a type of the sensor, a name of the sensor, and/or the like) regarding a sensor included in a sensor based BLE device in the list of registered BLE devices.

At operation S3120, the mobile terminal 100 may receive a selection of at least one registered BLE device from the list of registered BLE devices. For example, the mobile terminal 100 may detect a tap gesture, which is applied by the user, or a swipe gesture, a flick gesture, and/or the like, or recognize a voice command of the user so as to select the at least one registered BLE device from the list of registered BLE devices. In this regard, the registered BLE device selected by the user may be a BLE device including the sensor. For convenience of description, the BLE device including the sensor will now be referred as a sensor based BLE device.

At operation S3130, the mobile terminal 100 may receive an input of a notification message of the sensor based BLE device selected by the user and the reference sensing information.

The reference sensing information means information regarding a sensing value (a threshold value) that is a reference for outputting a notification message. For example, the user may set the sensing value used to output the notification message as the reference sensing information. For example, according to various embodiments of the present disclosure, the reference sensing information may include at least one of a reference temperature value (e.g., 36.5° C.), a reference weight value (e.g., 5 g), a reference illuminance value (e.g., 10 lux), and a reference proximity value (e.g., within 50 cm), and/or the like. However, various embodiments of the present disclosure are not limited thereto.

According to various embodiments of the present disclosure, the notification message means a message set by the user to be notified through the mobile terminal 100 in a case in which sensing information received from the registered BLE device and sensing information previously set by the user are identical to each other.

For example, the notification message may include at least one of a notification message regarding a location where the sensor based BLE device is disposed, a notification message regarding an object that is present at the location where the sensor based BLE device is disposed, a notification message regarding an object to which the sensor based BLE device is attached, a notification message regarding another user carrying the sensor based BLE device, and/or the like. However, various embodiments of the present disclosure are not limited thereto.

According to various embodiments of the present disclosure, the notification message may be in the form of at least one of a text message, a voice message, a still image, a moving image, a map, and the like. For example, the user may input the notification message in text form or in voice form. The user may add an image (e.g., an image of the object to which the sensor based BLE device is attached or an image of an object related to the notification message) or location information (e.g., a map indicating a location of the object, a layout of a plan view indicating the location of the object, and/or the like) of the object to the notification image.

Meanwhile, according to various embodiments of the present disclosure, the mobile terminal 100 may receive an input of a plurality of notification messages regarding the sensor based BLE device and a plurality of pieces of reference sensing information. This will be described later in detail with reference to FIGS. 42 to 45.

According to various embodiments of the present disclosure, the mobile terminal 100 may receive an input of the notification message of the sensor based BLE device and the reference sensing information through various applications such as a healthcare application, a fitness application, a baby care application, and/or the like. For example, if the mobile terminal 100 executes the fitness application, the fitness application may provide a GUI used to input a fitness management message (e.g., complete dead lift 20 reps) and reference sensing information (e.g., motion: 20 shakes).

At operation S3140, the mobile terminal 100 may map and store the identification information (e.g., a device ID, a S/N, a MAC address, and/or the like) and the notification message of the sensor based BLE device and the reference sensing information as notification information regarding the sensor based BLE device in the memory 160. In this regard, according to various embodiments of the present disclosure, the mobile terminal 100 may further map and store the notification message, the reference sensing information, and property information (e.g., color information regarding an appearance, pattern information, sensor information, and/or the like) of the sensor based BLE device in the memory 160. The mobile terminal 100 may also further map and store the notification message, the reference sensing information, and user added information (e.g., an ID, a nickname, a category, a memo, and/or the like that are set by the user) regarding the sensor based BLE device in the memory 160.

Meanwhile, in a case in which the user changes the notification message regarding the sensor based BLE device or the reference sensing information, the mobile terminal 100 may update the notification information regarding the sensor based BLE device stored in the memory 160.

Figure 32A:
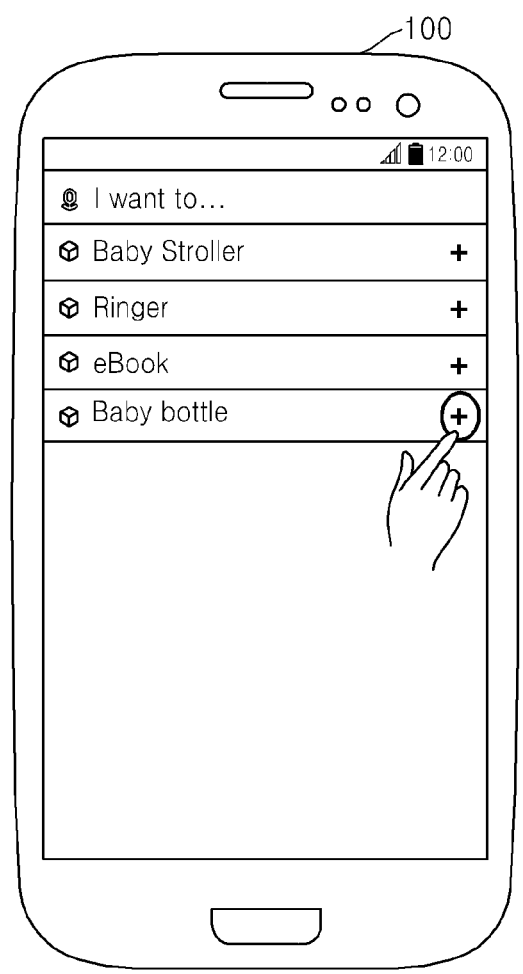
FIGS. 32A, 32B, and 32C are diagrams illustrating a screen for setting a notification regarding a sensor based BLE device according to an embodiment of the present disclosure.
Figure 32B:
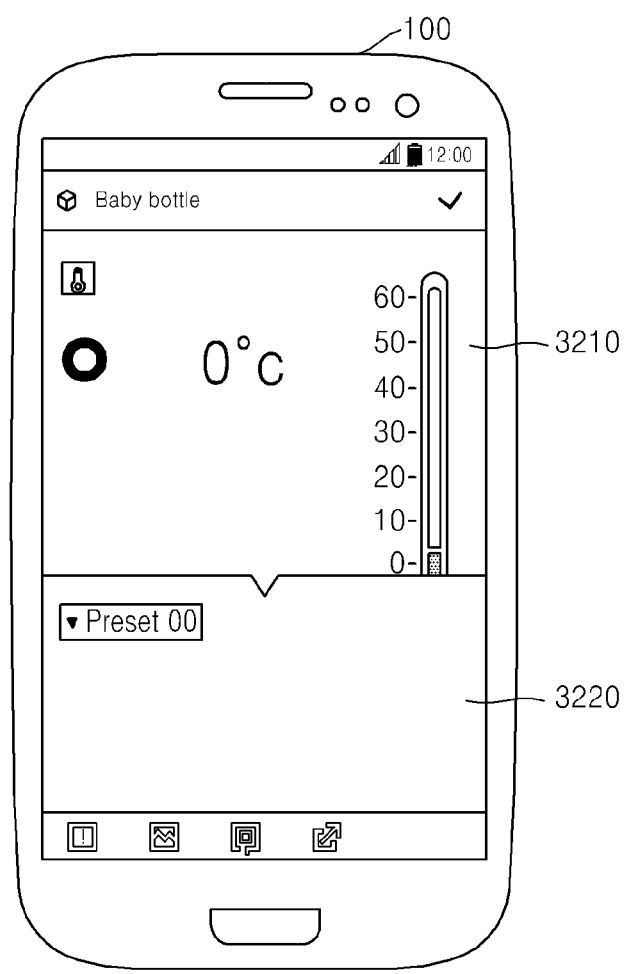
Figure 32C:
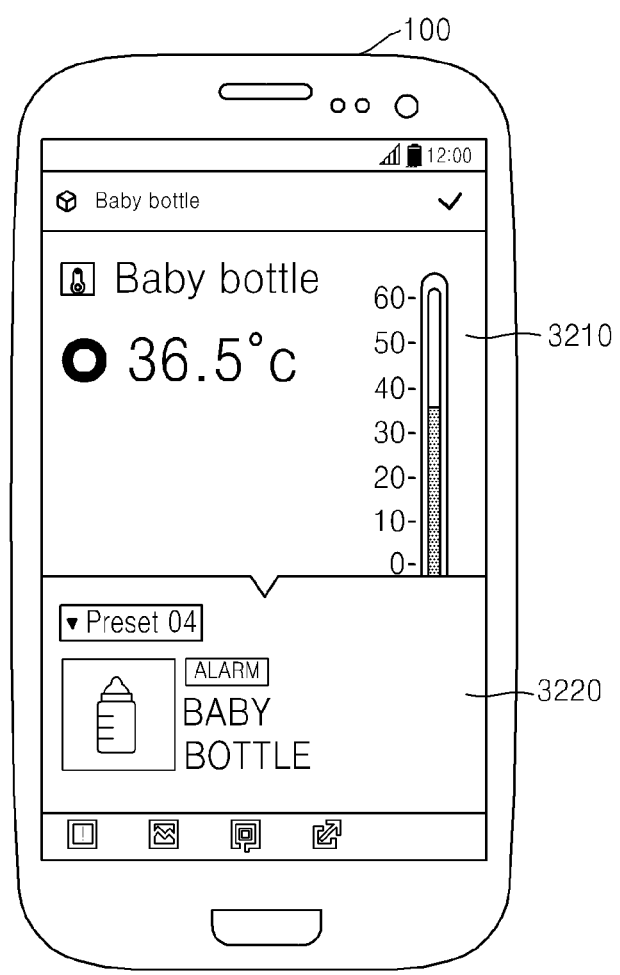

FIGS. 32A, 32B, and 32C are diagrams illustrating a screen for setting a notification regarding a sensor based BLE device according to an embodiment of the present disclosure.

According to various embodiments of the present disclosure, a user may select a BLE device used to remotely control at least one function of the mobile terminal 100. In this regard, the user may select at least one registered BLE device from a list of BLE devices previously registered in the mobile terminal 100 or may select at least one registered BLE device by personally inputting identification information of registered BLE devices. An example of a case in which the user selects at least one registered BLE device from the list of BLE devices previously registered in the mobile terminal 100 will now be described. However, a method of selecting a registered BLE device is not limited thereto but may vary.

Referring to FIG. 32A, the mobile terminal 100 may provide a list of registered BLE devices. The mobile terminal 100 may display the list of registered BLE devices as an ID, a nickname, a category, and/or the like, which are set by the user for convenience of description. For example, the mobile terminal 100 may display a registered BLE device attached to a baby stroller as "Baby stroller", a registered BLE device attached to the bag of the Ringer's solution as "Ringer's solution", a registered BLE device attached to an e-Book terminal as "eBook", a registered BLE device attached to a baby bottle as "Baby bottle," and/or the like.

The mobile terminal 100 may detect a user's selection regarding the registered BLE device attached to the baby bottle from among the list of registered BLE devices. The registered BLE device attached to the baby bottle may include a temperature sensor. For convenience of description, the registered BLE device including the temperature sensor will now be referred as a temperature sensor based BLE device.

In this case, referring to FIG. 32B, the mobile terminal 100 may provide a notification setting window used to set a notification regarding the temperature sensor based BLE device attached to the baby bottle. According to various embodiments of the present disclosure, the notification setting window may include at least one of a reference sensing information input field 3210 used to input reference sensing information and a notification message input field 3220 for inputting a notification message.

Referring to FIG. 32C, the user may input reference sensing information (e.g., temperature: 36.5° C.) and a notification message (e.g., the temperature of the baby bottle is appropriately set) in such a way that the notification message may be output in a case in which a temperature of milk contained in the baby bottle is 36.5° C.

The mobile terminal 100 may map and store the reference sensing information (e.g., temperature: 36.5° C.) and the notification message (e.g., the temperature of the baby bottle is appropriately set) that are input by the user and identification information (e.g., a device ID, an S/N, a MAC address, and/or the like) of the temperature sensor based BLE device attached to the baby bottle in the memory 160 as notification information regarding the temperature sensor based BLE device.

Figure 33:
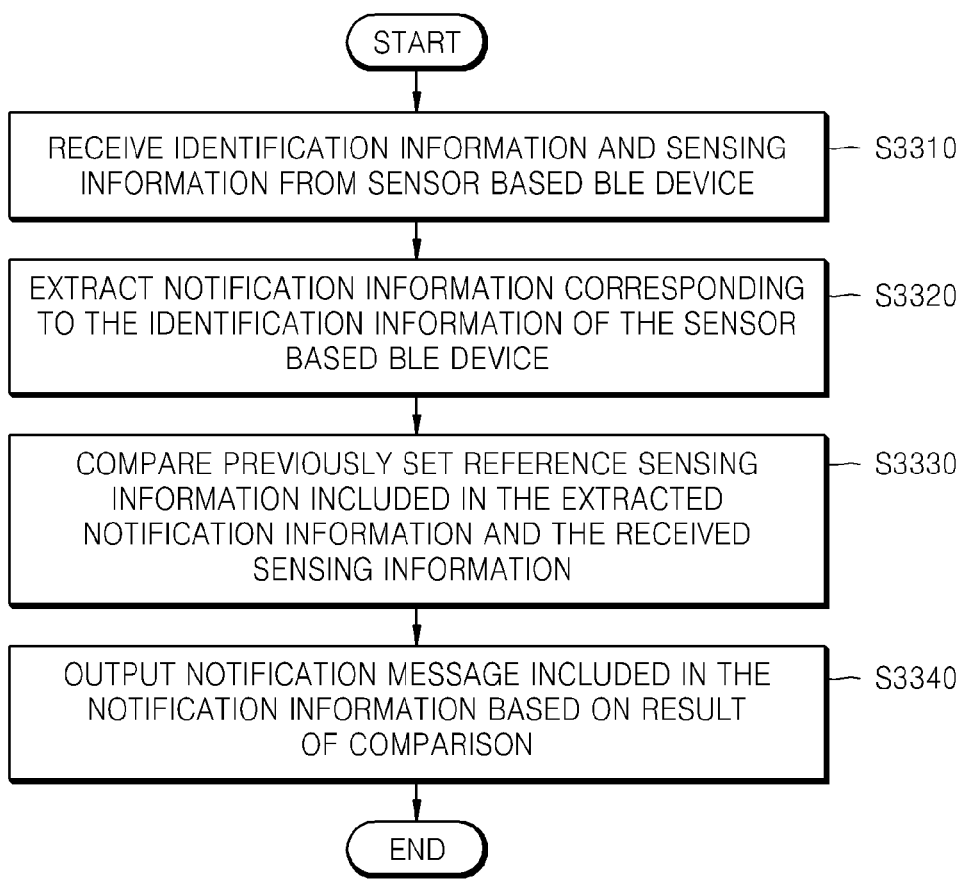
FIG. 33 is a flowchart illustrating a method in which a mobile terminal provides information using a sensor based BLE device according to an embodiment of the present disclosure.

FIG. 33 is a flowchart illustrating a method in which a mobile terminal provides information using a sensor based BLE device according to an embodiment of the present disclosure.

Referring to FIG. 33, at operation S3310, in a case in which the mobile terminal 100 is disposed within a communication range of the sensor based BLE device, the mobile terminal 100 may receive identification information and sensing information from the sensor based BLE device. For example, in a case in which a user carrying the mobile terminal 100 approaches the communication range of the sensor based BLE device, the mobile terminal 100 may receive identification information (e.g., a device ID, an S/N, a MAC address, and/or the like) of the sensor based BLE device and sensing information, which are broadcast by the sensor based BLE device.

Sensing information means information detected by the sensor based BLE device through a sensor. For example, the sensing information may include at least one from among temperature information, humidity information, motion information, weight information, proximity information, acceleration information, illuminance information, and/or the like. However, various embodiments of the present disclosure are not limited thereto.

Meanwhile, the sensing information received from the BLE device 200 may be actual data obtained by sensing by the BLE device 200 or may be information obtained by post-processing the data obtained by the BLE device 200.

According to various embodiments of the present disclosure, the mobile terminal 100 may receive the sensing information from the sensor based BLE device according to a previously set period. In this regard, the previously set period may be changed. According to various embodiments of the present disclosure, the mobile terminal 100 may concurrently receive the identification information and the sensing information of the sensor based BLE device within a predetermined time (e.g., 1 second) or may receive the identification information and the sensing information of the sensor based BLE device at separate times.

Meanwhile, according to various embodiments of the present disclosure, the mobile terminal 100 may receive the identification information and the sensing information of the sensor based BLE device in advertising packet form. For example, in a case in which the sensor based BLE device is a tag having a blue color and including a temperature sensor, the mobile terminal 100 may receive the identification information (e.g., "SAMSUNG_Temp_TAG001_blue") of the sensor based BLE device included in a UUID field of the advertising packet or in an MSD field thereof. In addition, the mobile terminal 100 may receive the sensing information (e.g., "0X06000024" in a case in which a current temperature measured by the temperature sensor is 36° C.) included in the MSD field of the advertising packet.

According to various embodiments of the present disclosure, in a case in which the mobile terminal 100 receives the identification information of the sensor based BLE device, the mobile terminal 100 may compare the received identification information of the sensor based BLE device and a list of BLE devices previously stored in the memory 160 to determine whether the sensor based BLE device that transmits the identification information is one of the registered BLE devices.

At operation S3320, the mobile terminal 100 may extract notification information corresponding to the received identification information of the sensor based BLE device. For example, the mobile terminal 100 may search for a notification information list by using the identification information of the sensor based BLE device. In this regard, the mobile terminal 100 may extract the notification information that is stored after being mapped with the identification information of the sensor based BLE device. According to various embodiments of the present disclosure, the notification information may include a notification message, reference sensing information, and/or the like.

According to various embodiments of the present disclosure, the mobile terminal 100 may extract the notification information corresponding to the identification information of the sensor based BLE device from the memory 160 or may receive the notification information from an external server (e.g., a cloud server) linked to the mobile terminal 100.

At operation S3330, the mobile terminal 100 may compare previously set reference sensing information included in the notification information with the sensing information received from the sensor based BLE device.

At operation S3340, the mobile terminal 100 may output a notification message included in the notification information based on a result of the comparison.

For example, the mobile terminal 100 may output the notification message in a case in which a difference between the reference sensing information and sensing information received at a predetermined period is within a previously set range (e.g., a temperature difference is ±0.01° C.) by continuously comparing the reference sensing information with the received sensing information. The previously set range means an error range and may be changed by the user or a system. For example, the mobile terminal 100 may output the notification message in a case in which the reference sensing information and the received sensing information are identical to each other or in a case in which the difference between the reference sensing information and the received sensing information is within a previously set error range.

The mobile terminal 100 may output the notification message by using at least one of a video signal, an audio signal, and a vibration signal. In this regard, the mobile terminal 100 may provide a snooze function. For example, in a case in which the user sets a notification repetition number (e.g., 5 repetitions) or a notification repetition interval (e.g., 3 minutes), the mobile terminal 100 may output the notification message a predetermined number of times (e.g., 5 times) or at predetermined intervals (e.g., every 3 minutes).

Meanwhile, according to various embodiments of the present disclosure, the notification message may include at least one of a fitness management message, a healthcare management message, and a baby care management message, and/or the like. However, various embodiments of the present disclosure are not limited thereto.

Figure 34A:
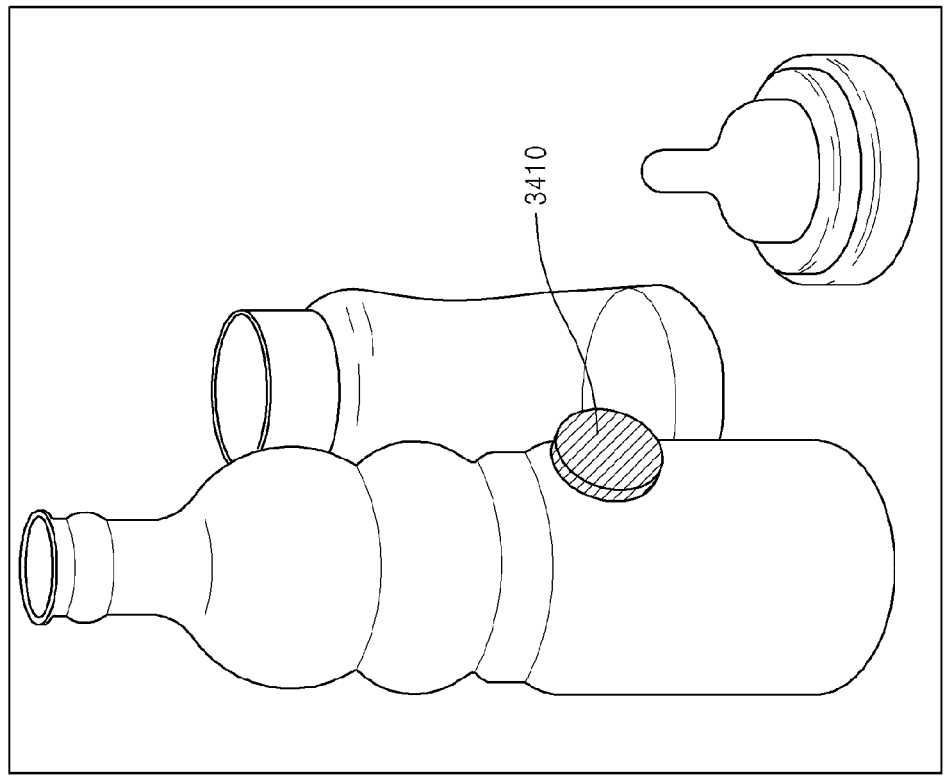
FIGS. 34A and 34B are diagrams illustrating a screen for outputting a notification message based on sensing information according to an embodiment of the present disclosure.
Figure 34B:
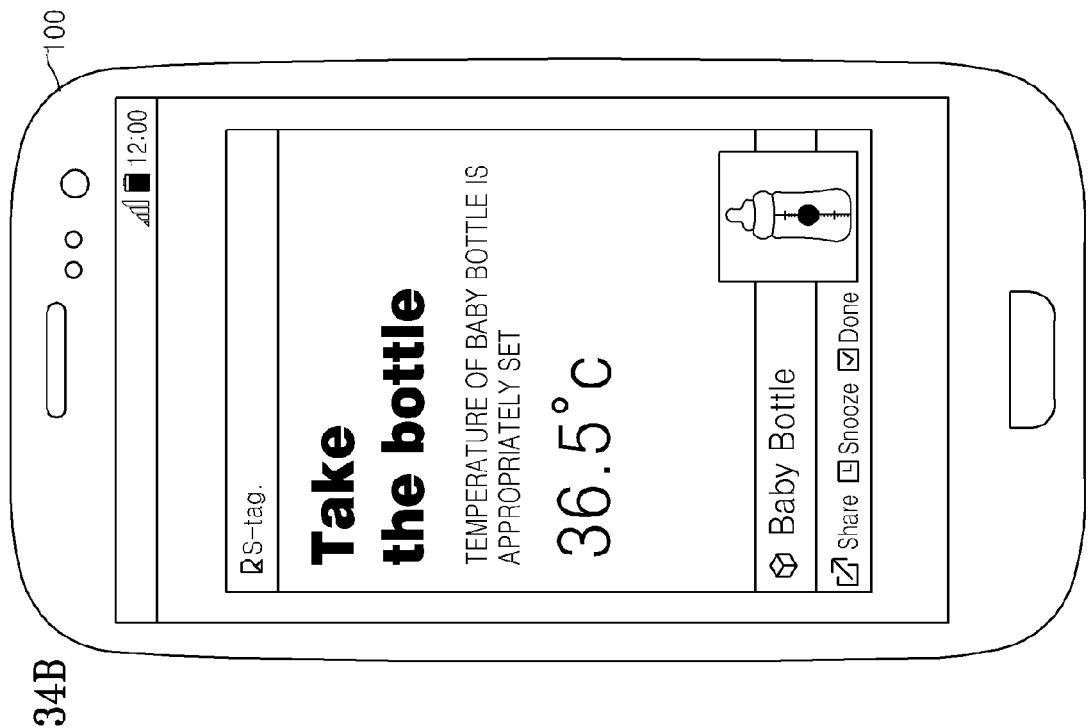

FIGS. 34A and 34B are diagrams illustrating a screen for outputting a notification message based on sensing information according to an embodiment of the present disclosure.

According to various embodiments of the present disclosure, identification information (e.g., BLE_Temp_001) of a temperature sensor based BLE device 3410 attached to a baby bottle, reference sensing information (e.g., 36.5° C.), and notification information including a notification message (e.g., 'Take the bottle, the temperature of the baby bottle is appropriately set') are mapped and stored in the memory 160 of the mobile terminal 100.

Referring to FIG. 34A, the temperature sensor based BLE device 3410 may be attached to the baby bottle and detect temperature information of the baby bottle. The temperature sensor based BLE device 3410 may broadcast the detected temperature information and the identification information (e.g., BLE_Temp_001) in advertising packet form. For example, the temperature sensor based BLE device 3410 may include the temperature information in an MSD field, include the identification information (e.g., BLE_Temp_001) in a UUID field or the MSD field, and broadcast the temperature information and the identification information.

In this regard, the mobile terminal 100 disposed within a communication range of the temperature sensor based BLE device 3410 may receive the temperature information and identification information (e.g., BLE_Temp_001) broadcast by the temperature sensor based BLE device 3410. The mobile terminal 100 may extract and confirm notification information corresponding to the received identification information (e.g., BLE_Temp_001).

In a case in which the reference sensing information "36.5° C." is previously set in the extracted notification information, the mobile terminal 100 may compare the temperature information and the reference sensing information (e.g., 36.5° C.) received from the temperature sensor based BLE device 3410.

Referring to FIG. 34B, in a case in which the sensing information received from the temperature sensor based BLE device 3410 is "36.5° C.", the mobile terminal 100 may output the notification message "Take the bottle, the temperature of the baby bottle is appropriately set" included in the notification information.

Meanwhile, in a case in which an error range is previously set, the mobile terminal 100 may output a notification message if the temperature information received from the temperature sensor based BLE device 3410 is within the error range even if the temperature is not exactly "36.5° C.". For example, in a case in which the previously set error range is ±0.05° C., if the temperature information received from the temperature sensor based BLE device 3410 is within a range of "36.55° C.~36.45° C.", the mobile terminal 100 may output the notification message "Take the bottle, the temperature of the baby bottle is appropriately set".

Therefore, although a user does not personally check the temperature of the baby bottle, in a case in which the temperature of the baby bottle is a previously set appropriate temperature, the user may receive a notification through the mobile terminal 100.

Figure 35:
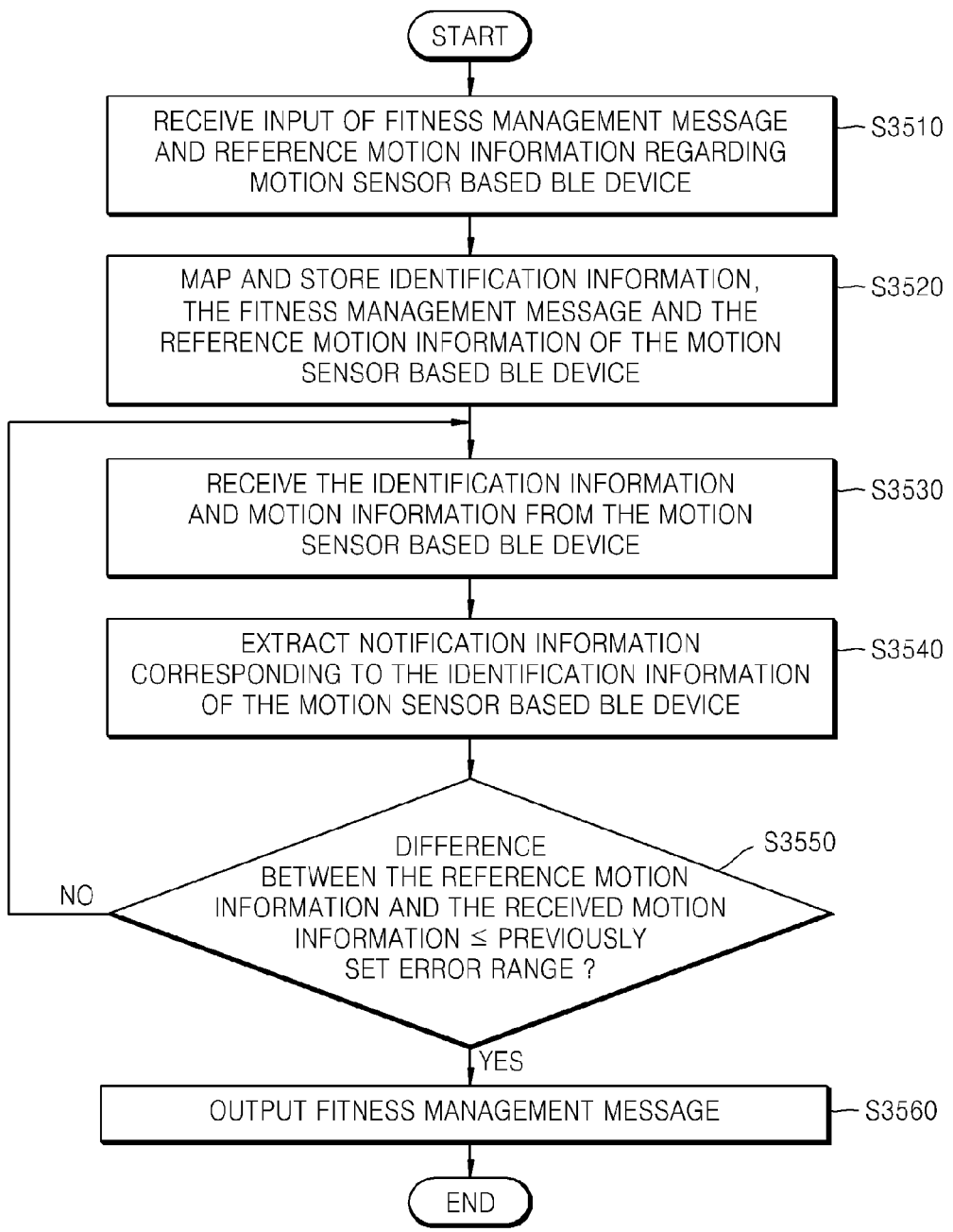
FIG. 35 is a flowchart illustrating a method in which a mobile terminal provides fitness management information according to an embodiment of the present disclosure.

FIG. 35 is a flowchart illustrating a method in which a mobile terminal provides fitness management information according to an embodiment of the present disclosure.

Referring to FIG. 35, at operation S3510, the mobile terminal 100 may receive an input of a fitness management message regarding a BLE device including a motion sensor (hereinafter referred to as a "motion sensor based BLE device") and reference motion information. In this regard, according to various embodiments of the present disclosure, the mobile terminal 100 may receive an input of notification information regarding the motion sensor based BLE device through a fitness management application.

The fitness management message is a message used to manage a fitness schedule of a user, a quantity of an exercise, and/or the like and may include a name of a fitness product to which the motion sensor based BLE device is attached, a fitness type, a fitness number, information regarding an exercise to do next time, and/or the like. However, various embodiments of the present disclosure are not limited thereto. The reference motion information may be set as the number of detected motions (e.g., shake motion: 20 times), a period of time (e.g., 10 minutes) when a motion is detected, but is not limited thereto.

At operation S3520, the mobile terminal 100 may map and store identification information and the fitness management message of the motion sensor based BLE device and the reference motion information as fitness notification information in the memory 160.

At operation S3530, the mobile terminal 100 may receive the identification information and motion information detected by the motion sensor based BLE device from the motion sensor based BLE device. For example, in a case in which the mobile terminal 100 is disposed within a communication range of the motion sensor based BLE device, the mobile terminal 100 may receive the identification information and the motion information broadcast by the motion sensor based BLE device.

In this regard, according to various embodiments of the present disclosure, the mobile terminal 100 may receive the identification information and the motion information of the motion sensor based BLE device in advertising packet form. For example, the mobile terminal 100 may receive the identification information of the motion sensor based BLE device included in a UUID field of the advertising packet or in an MSD field thereof. In addition, the mobile terminal 100 may receive the motion information included in the MSD field of the advertising packet.

At operation S3540, the mobile terminal 100 may extract the notification information corresponding to the received identification information of the motion sensor based BLE device from the memory 160. The extracted notification information may include a previously set fitness management message and reference motion information.

At operation S3550, the mobile terminal 100 may compare the previously set reference motion information and the motion information received from the motion sensor based BLE device. For example, according to various embodiments of the present disclosure, at operation S3550, the mobile terminal 100 may determine whether a difference between the reference motion information and the received motion information is less than or equal to the previously set error range.

If the mobile terminal 100 determines that a difference between the reference motion information and the received motion information is outside a previously set error range at operation S3550, then the mobile terminal 100 proceeds to operation S3530 at which the mobile terminal 100 may not output a notification message and receive the motion information from the motion sensor based BLE device again.

In contrast, if the mobile terminal 100 determines that the difference between the reference motion information and the received motion information is within the previously set error range at operation S3550, then the mobile terminal 100 proceeds to operation S3560 at which the mobile terminal 100 may output the fitness management message included in the extracted notification information. According to various embodiments of the present disclosure, the fitness management message may be output in at least one form of a text, a voice, a vibration, and the like. Various elements of the method in which a mobile terminal provides fitness management information according to various embodiments of the present disclosure will be described in more detail with reference to FIGS. 36A through 36C and FIGS. 37A and 37B.

Figure 36C:
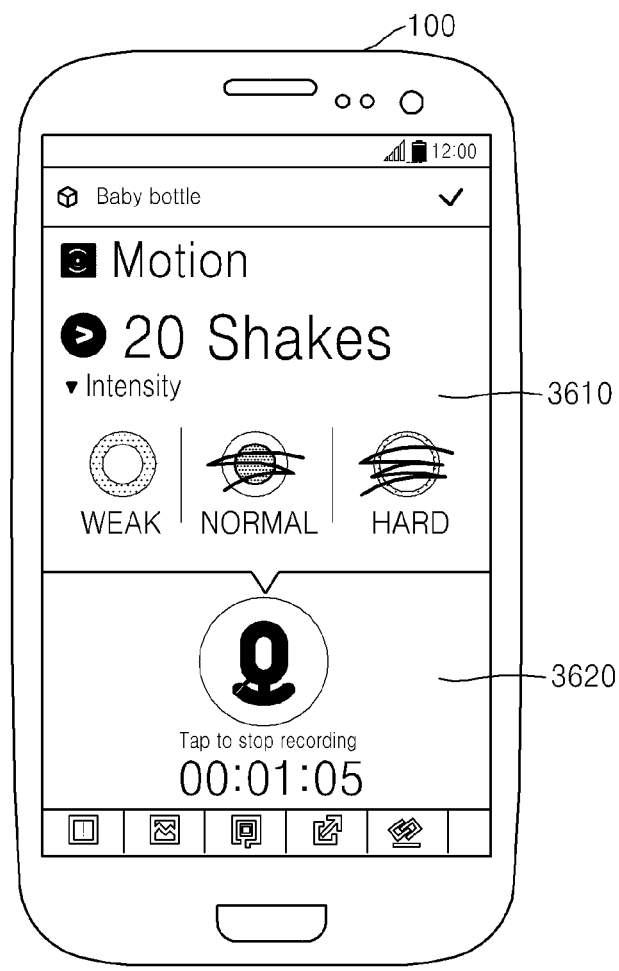

FIGS. 36A, 36B, and 36C are diagrams illustrating a screen of a mobile terminal for receiving an input of a fitness management message and reference motion information according to an embodiment of the present disclosure.

Referring to FIG. 36A, the mobile terminal 100 may provide a list of registered BLE devices. The mobile terminal 100 may display the list of registered BLE devices as an ID, a nickname, a category, and/or the like set by the user for convenience of the user.

The mobile terminal 100 may detect a user's selection of a motion sensor based BLE device attached to a dumbbell from among the list of registered BLE devices.

Referring to FIG. 36B, the mobile terminal 100 may provide a notification setting window for setting a notification regarding the motion sensor based BLE device. According to various embodiments of the present disclosure, the notification setting window may include at least one of a field 3610 for inputting reference motion information and a field 3620 for inputting a fitness management message.

Referring to FIG. 36C, the user may input the reference motion information (e.g., motion: 20 Shakes) and the fitness management message (e.g., Dumbbell curls 20 reps are complete. Next, hula-hooping 50 reps start) in such a way that the mobile terminal 100 may output a notification message when dumbbell curls 20 reps have been completed by using the dumbbell. According to various embodiments of the present disclosure, the user may input the fitness management message in text or voice form.

The mobile terminal 100 may map and store the reference motion information (e.g., motion: 20 Shakes) and the fitness management message (e.g., Dumbbell curls 20 reps are complete. Next, hula-hooping 50 reps start) that are input by the user and identification information (e.g., BLE_motion_002) of the motion sensor based BLE device attached to the dumbbell as notification information regarding the motion sensor based BLE device attached to the dumbbell in the memory 160.

Figure 37B:
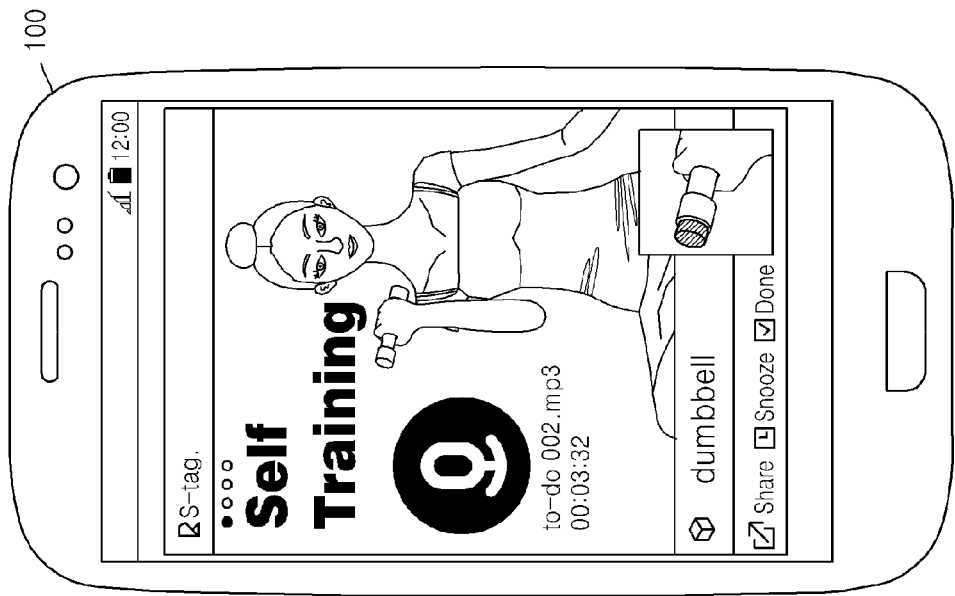
FIGS. 37A and 37B are diagrams illustrating a screen for outputting a fitness management message according to an embodiment of the present disclosure.
Figure 37A:
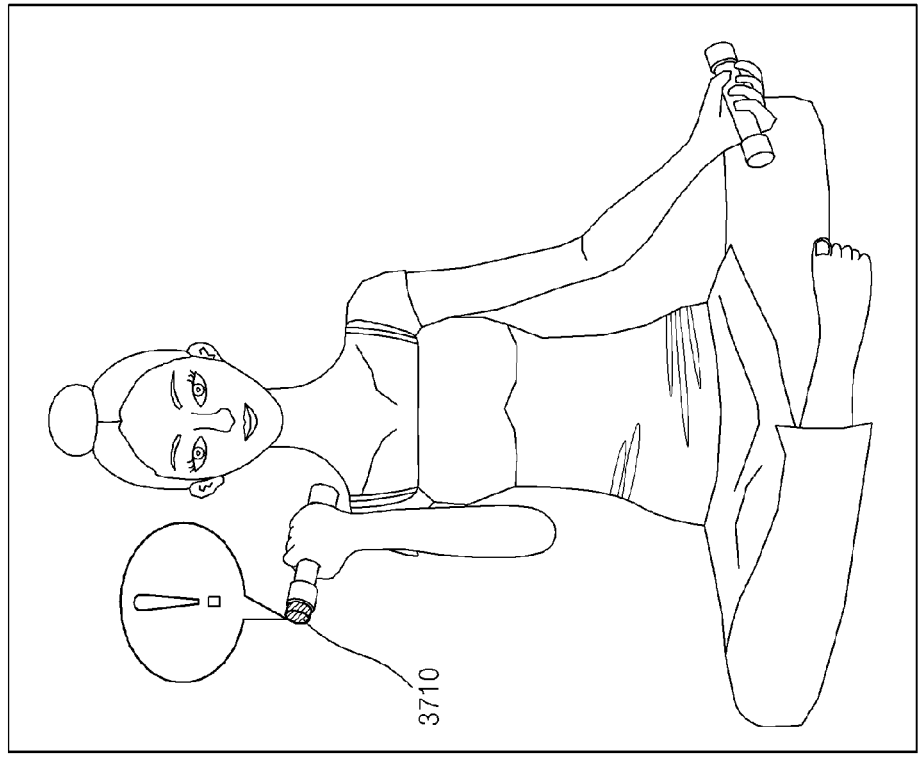

FIGS. 37A and 37B are diagrams illustrating a screen for outputting a fitness management message according to an embodiment of the present disclosure.

Referring to FIG. 37A, a motion sensor based BLE device 3710 attached to a dumbbell may detect motion information regarding the dumbbell through a motion sensor while a user does exercise by using the dumbbell.

The motion sensor based BLE device 3710 may broadcast the detected motion information and identification information (e.g., BLE_motion_002). In this regard, according to various embodiments of the present disclosure, the motion sensor based BLE device 3710 may broadcast the detected motion information and identification information (e.g., BLE_motion_002) in advertising data packet form. For example, the motion sensor based BLE device 3710 may include the motion information in an MSD field, include the identification information (e.g., BLE_motion_002) in a UUID field or the MSD field, and broadcast the motion information and the identification information.

In this regard, the mobile terminal 100 disposed within a communication range of the motion sensor based BLE device 3710 may receive the motion information and identification information (e.g., BLE_motion_002) broadcasted by the motion sensor based BLE device 3710. The mobile terminal 100 may extract and check notification information corresponding to the received identification information (e.g., BLE_motion_002).

In a case in which reference motion information "motion: 20 Shakes" is previously set in the extracted notification information, the mobile terminal 100 may compare the motion information received from the motion sensor based BLE device 3710 and the reference motion information (e.g., motion: 20 Shakes).

In this regard, according to various embodiments of the present disclosure, the mobile terminal 100 may output current motion status information. For example, the mobile terminal 100 may provide a message "This is the 15$^{th}$ rep. Five more are left".

Referring to FIG. 37B, in a case in which the motion information received from the motion sensor based BLE device 3710 is "20 Shakes", the mobile terminal 100 may output a fitness management message "Dumbbell curls 20 reps are complete. Next, hula-hooping 50 reps start" included in the notification information.

Meanwhile, in a case in which the user starts hula-hooping, the mobile terminal 100 may receive identification information (e.g., BLE_motion_003) from another motion sensor based BLE device attached to a hula-hoop and motion information detected by another motion sensor based BLE device.

In this regard, the mobile terminal 100 according to an embodiment of the present disclosure may receive the identification information (e.g., BLE_motion_003) and the motion information of another motion sensor based BLE device in advertising packet form. For example, the mobile terminal 100 may receive the identification information (e.g., BLE_motion_003) of another motion sensor based BLE device included in a UUID field of the advertising packet or in an MSD field thereof. In addition, the mobile terminal 100 may receive the motion information included in the MSD field of the advertising packet.

The mobile terminal 100 may extract notification information corresponding to the identification information (e.g., BLE_motion_003) of another motion sensor based BLE device and compare reference motion information (e.g., 50 rotations) included in the extracted notification information and the received motion information.

In a case in which the motion information received another motion sensor based BLE device is "50 rotations", the mobile terminal 100 may output a notification message (e.g., "Hula-hooping 50 reps are complete. Next is "Walking for ten minutes on a treadmill") included in the notification information.

Therefore, according to various embodiments of the present disclosure, the mobile terminal 100 may manage a fitness schedule of a user, a quantity of an exercise, and/or the like by using the motion sensor based BLE device.

Figure 38:
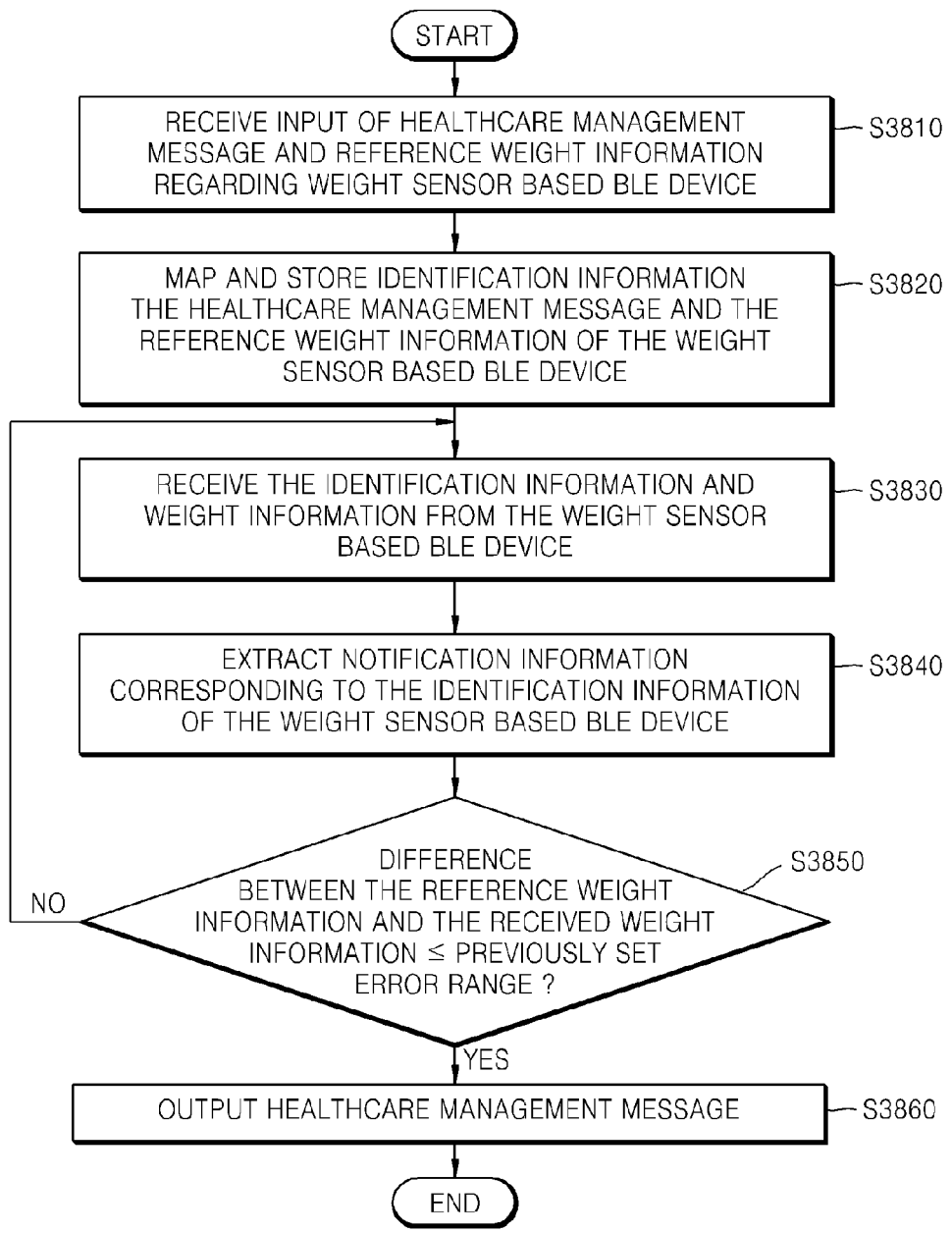
FIG. 38 is a flowchart illustrating a method in which a mobile terminal provides healthcare management information according to an embodiment of the present disclosure.

FIG. 38 is a flowchart illustrating a method in which a mobile terminal provides healthcare management information according to an embodiment of the present disclosure.

Referring to FIG. 38, at operation S3810, the mobile terminal 100 may receive an input of a healthcare management message regarding a BLE device including a weight sensor (hereinafter referred to as a "weight sensor based BLE device") and reference weight information. In this regard, according to various embodiments of the present disclosure, the mobile terminal 100 may receive an input of notification information regarding a weight sensor based BLE device through a healthcare management application.

The healthcare management message may include a name (e.g., a bag of Ringer's solution, a urine bag, and/or the like) of an object to which a BLE device is attached, a Ringer's solution type, a diagnosis target, a diagnosis purpose, a Ringer's solution injection complete message, and/or the like. However, various embodiments of the present disclosure are not limited thereto.

At operation S3820, the mobile terminal 100 may map and store identification information of the weight sensor based BLE device and the healthcare management message and reference weight information that are input by a user as notification information in the memory 160.

At operation S3830, the mobile terminal 3830 may receive the identification information and weight information detected by the weight sensor based BLE device from the weight sensor based BLE device. For example, in a case in which the mobile terminal 100 is disposed within a communication range of the weight sensor based BLE device, the mobile terminal 100 may receive the identification information and the weight information broadcast by the weight sensor based BLE device.

In this regard, according to various embodiments of the present disclosure, the mobile terminal 100 may receive the identification information and the weight information of the weight sensor based BLE device in advertising packet form. For example, the mobile terminal 100 may receive the identification information of the weight sensor based BLE device included in a UUID field of the advertising packet or in an MSD field thereof. In addition, the mobile terminal 100 may receive the weight information included in the MSD field of the advertising packet.

At operation S3840, the mobile terminal 100 may extract notification information corresponding to the received identification information of the weight sensor based BLE device from the memory 160. The extracted notification information may include a previously set healthcare management message and reference weight information.

At operation S3850, the mobile terminal 100 may compare the previously set reference weight information and the weight information received from the weight sensor based BLE device. For example, according to various embodiments of the present disclosure, at operation S3850, the mobile terminal 100 may determine whether a difference between the reference weight information and the received weight information is less than or equal to the previously set error range.

If the mobile terminal 100 determines that a difference between the reference motion information and the received motion information is outside a previously set error range at operation S3850, then the mobile terminal 100 proceeds to operation S3830 at which the mobile terminal 100 may not output a notification message and receive the weight information from the weight sensor based BLE device again.

In contrast, if the mobile terminal 100 determines that the difference between the reference motion information and the received motion information is within the previously set error range at operation S3850, then the mobile terminal 100 proceeds to operation S3860 at which the mobile terminal 100 may output the healthcare management message included in the extracted notification information. According to various embodiments of the present disclosure, the healthcare management message may be output in at least one form of a text, a voice, and a vibration.

Figure 39A:
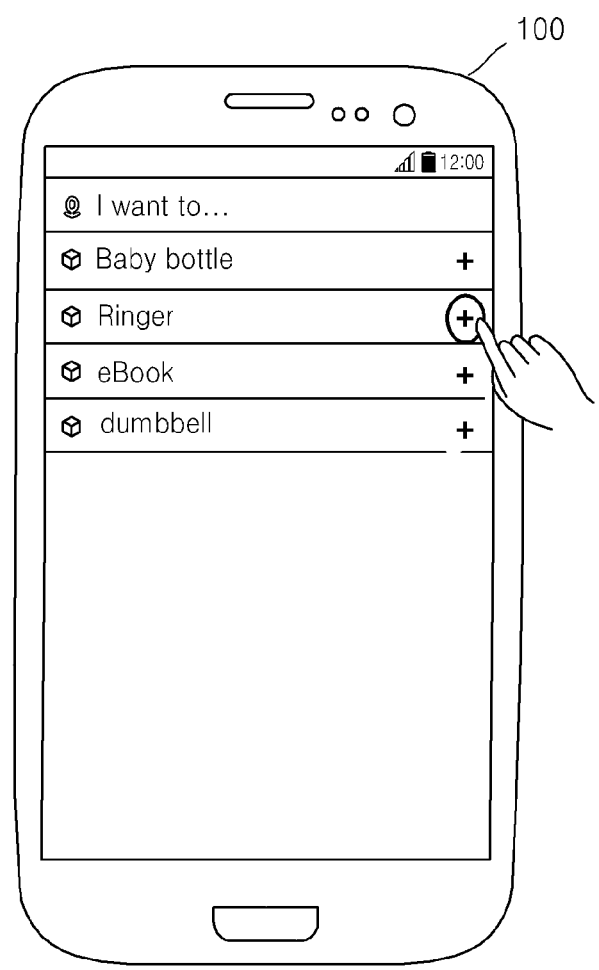
FIGS. 39A, 39B, and 39C are diagrams illustrating a screen for outputting a healthcare management message according to an embodiment of the present disclosure.
Figure 39B:
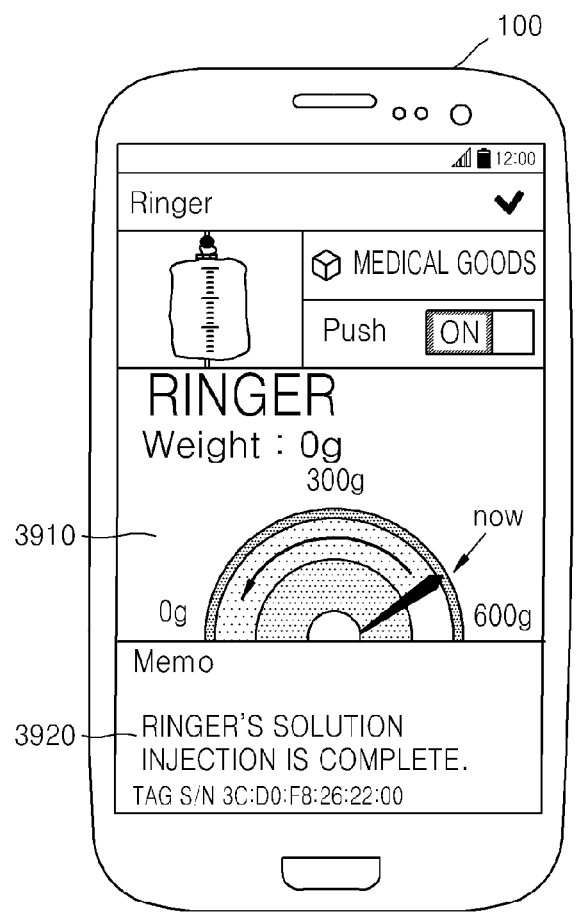
Figure 39C:
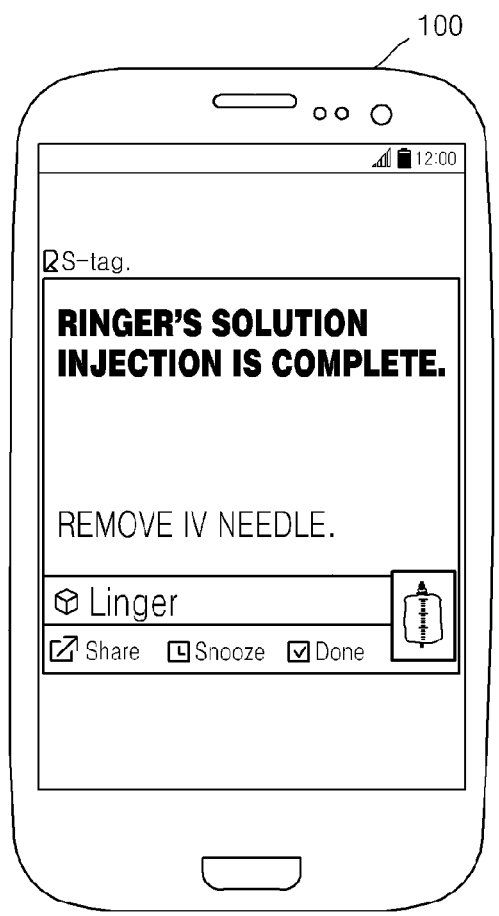

FIGS. 39A, 39B, and 39C are diagrams illustrating a screen for outputting a healthcare management message according to an embodiment of the present disclosure.

Referring to FIG. 39A, the mobile terminal 100 may provide a list of registered BLE devices. In this regard, the mobile terminal 100 may detect a user's selection of a weight sensor based BLE device attached to a container of Ringer's solution from among the list of registered BLE devices.

Referring to FIG. 39B, the mobile terminal 100 may provide a notification setting window for setting a notification regarding the weight sensor based BLE device. According to various embodiments of the present disclosure, the notification setting window may include at least one of a field 3910 for inputting reference weight information and a field 3920 for inputting a healthcare management message.

Referring to FIG. 39C, the user may input the reference motion information and the fitness management message (e.g., "Injection Complete! Ringer's solution injection is complete. Remove IV needle.") in such a way that the mobile terminal 100 may output a notification message in a case in which the Ringer's solution is completely injected. If the weight sensor based BLE device detects a weight of the Ringer's solution only, the user may input reference weight information regarding the Ringer's solution as "0 g", whereas, if the weight sensor based BLE device detects a weight of a bag of the Ringer's solution as well as the weight of the ringer solution, the user may input reference weight information as "10 g", for example, the weight of the bag of the Ringer's solution.

According to various embodiments of the present disclosure, the user may input the healthcare management message in text or voice form.

The mobile terminal 100 may map and store the reference weight information (e.g., 0 g) and the healthcare management message (e.g., "Injection Complete! Ringer's solution injection is complete. Remove IV needle.") and identification information (e.g., BLE_weight_004) of the weight sensor based BLE device attached to the bag of the Ringer's solution as notification information regarding the weight sensor based BLE device attached to the bag of the Ringer's solution in the memory 160.

Meanwhile, the weight sensor based BLE device attached to the bag of the Ringer's solution may detect weight information while the Ringer's solution is injected. The weight sensor based BLE device may also broadcast the detected weight information and the identification information (e.g., BLE_weight_004).

According to various embodiments of the present disclosure, the weight sensor based BLE device may broadcast the detected weight information and the identification information (e.g., BLE_weight_004) in advertising data packet form. For example, the weight sensor based BLE device may include the weight information in an MSD field, include the identification information (e.g., BLE_weight_004) in a UUID field or the MSD field, and broadcast the weight information and the identification information.

In this regard, the mobile terminal 100 disposed within a communication range of the weight sensor based BLE device may receive the weight information and the identification information (e.g., BLE_weight_004) broadcast by the weight sensor based BLE device. The mobile terminal 100 may extract and check notification information corresponding to the received identification information (e.g., BLE_weight_004).

In a case in which reference motion information "weight: 0 g" regarding the Ringer's solution is previously set in the extracted notification information, the mobile terminal 100 may compare the motion information received from the weight sensor based BLE device and the reference weight information (e.g., 0 g) regarding the Ringer's solution.

In this regard, according to various embodiments of the present disclosure, the mobile terminal 100 may output current weight status information. For example, the mobile terminal 100 may provide a message "the current weight is 100 g".

Referring to FIG. 39C, in a case in which the weight information regarding the Ringer's solution received from the weight sensor based BLE device is changed from 500 g to 0 g, the mobile terminal 100 may output a healthcare management message "Ringer's solution injection is complete. Remove IV needle." included in the notification information. Meanwhile, in a case in which the weight information regarding the Ringer's solution received from the weight sensor based BLE device is within a predetermined error range even though the weight information is not exactly "0 g", the mobile terminal 100 may output the healthcare management message.

Meanwhile, in the same manner as described above, the mobile terminal 100 may check (e.g., determine) a quantity of urine of a patient by using the weight information received from the weight sensor based BLE device attached to the urine bag. For example, in a case in which the quantity of urine contained in the urine bag exceeds a previously set reference weight (e.g., 100 ml), the mobile terminal 100 may output a notification message (e.g., empty the urine bag). Therefore, according to various embodiments of the present disclosure, the mobile terminal 100 may manage a healthcare management service by using the weight sensor based BLE device.

Figure 40:
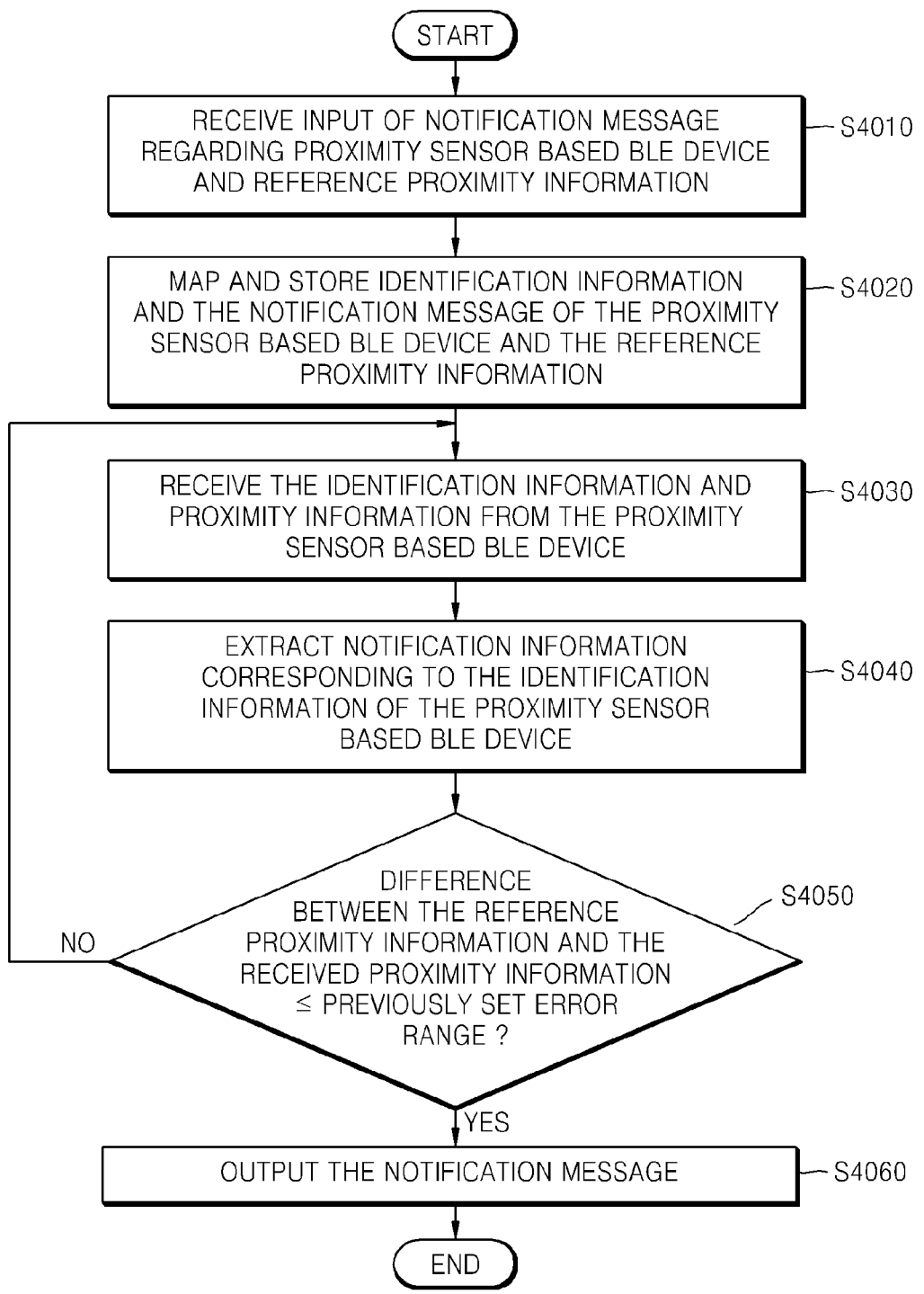
FIG. 40 is a flowchart illustrating a method in which a mobile terminal outputs a notification message based on proximity information according to an embodiment of the present disclosure.

FIG. 40 is a flowchart illustrating a method in which a mobile terminal outputs a notification message based on proximity information according to an embodiment of the present disclosure.

At operation S4010, the mobile terminal 100 may receive an input of a notification message regarding a BLE device including a proximity sensor (hereinafter referred to as a "proximity sensor based BLE device") and reference proximity information regarding an external object. The external object may be a human, a companion animal, a robot cleaner, or the like that approaches the proximity sensor based BLE device. However, various embodiments of the present disclosure are not limited thereto. The reference proximity information may be set to indicate whether the proximity sensor based BLE device detects the external object, a distance (e.g., 1 m) between the proximity sensor based BLE device and the external object, a time (e.g., 3 minutes) when the proximity sensor based BLE device detects the external object, and/or the like. However, various embodiments of the present disclosure are not limited thereto.

At operation S4020, the mobile terminal 100 may map and store identification information and the notification message of the proximity sensor based BLE device and the reference proximity information as notification information in the memory 160.

At operation S4030, the mobile terminal 100 may receive the identification information and proximity information of the external object detected by the proximity sensor based BLE device from the proximity sensor based BLE device. For example, in a case in which the mobile terminal 100 is disposed within a communication range of the proximity sensor based BLE device, the mobile terminal 100 may receive the identification information and the proximity information of the external object, which are broadcast by the proximity sensor based BLE device.

In this regard, according to various embodiments of the present disclosure, the mobile terminal 100 may receive the identification information of the proximity sensor based BLE device and the proximity information of the external object in advertising packet form. For example, the mobile terminal 100 may receive the identification information of the proximity sensor based BLE device included in a UUID field of the advertising packet or in an MSD field thereof. In addition, the mobile terminal 100 may receive the proximity information of the external object included in the MSD field of the advertising packet.

According to various embodiments of the present disclosure, the proximity sensor based BLE device may detect an approach of the external object by using infrared rays, etc.

The proximity information of the external object may include information to indicate that the external object is detected, distance information between the detected external device and the proximity sensor based BLE device, and time information regarding when the external device is detected, and/or the like. However, various embodiments of the present disclosure are not limited thereto.

At operation S4040, the mobile terminal 100 may extract notification information corresponding to the identification information of the proximity sensor based BLE device. The extracted notification information may include a previously set notification message and reference proximity information.

At operation S4050, the mobile terminal 100 may compare the previously set reference proximity information and the proximity information of the external object received from the proximity sensor based BLE device. For example, according to various embodiments of the present disclosure, at operation S4050, the mobile terminal 100 may determine whether a difference between the reference proximity information and the received proximity information is less than or equal to the previously set error range.

If the mobile terminal 100 determines that a difference between the reference proximity information and the received proximity information of the external object is outside a previously set error range at operation S4050, then the mobile terminal 100 proceeds to operation S4030 at which the mobile terminal 100 may not output the notification message and may receive the proximity information of the external object from the proximity sensor based BLE device again.

In contrast, if the mobile terminal 100 determines that the difference between the reference proximity information and the received proximity information of the external object is within the previously set error range (e.g., ±5 m) at operation S4050, then the mobile terminal 100 proceeds to operation S4060 at which the mobile terminal 100 may not output the notification message included in the extracted notification information.

For example, in a case in which a distance condition (e.g., within 50 m) between the external object and a BLE device is set in the reference proximity information, if a distance between the external object and the BLE device is equal to or smaller than a previously set distance (e.g., m) or is within a previously set error range (e.g., 55 m~45 m), the mobile terminal 100 may output the notification message.

In addition, in a case in which a time condition regarding when the external object is detected by a BLE device is set in the reference proximity information, the mobile terminal 100 may output the notification message if the external device is detected by the BLE device for longer than a previously set period of time.

Meanwhile, according to various embodiments of the present disclosure, in a case in which the reference proximity information is set as "detection of the external object", the mobile terminal 100 may output the notification message immediately when the external object is detected by the proximity sensor based BLE device.

FIG. 41 is a diagram illustrating a screen for outputting a baby care management message according to an embodiment of the present disclosure.

Referring to FIG. 41, an example of a case in which identification information (e.g., BLE_proxi_005) of a proximity sensor based BLE device 4110 attached to a porch window, previously set reference proximity information (e.g., less than 1 m), and a notification message (e.g., "Be Careful! Watch out! The baby is around the porch") are mapped and stored in the memory 160 of the mobile terminal 100 will now be described. Wait a moment The proximity sensor based BLE device 4110 attached to the porch window may detect an external object through a proximity sensor. In a case in which the external object approaches the porch window, the proximity sensor based BLE device 4110 may detect an approach of the external object. In this regard, the proximity sensor based BLE device 4110 may broadcast proximity information of the external object and the identification information (e.g., BLE_proxi_005).

According to various embodiments of the present disclosure, the proximity sensor based BLE device 4110 may broadcast only information indicating that the external object is detected or may broadcast distance information between the proximity sensor based BLE device 4110 and the external object, time information regarding a time when the external object is detected, and/or the like.

According to various embodiments of the present disclosure, the proximity sensor based BLE device 4110 may broadcast the proximity information of the external object and the identification information (e.g., BLE_proxi_005) in advertising data packet form. For example, the proximity sensor based BLE device 4110 may include the proximity information of the external object in an MSD field, include the identification information (e.g., BLE_proxi_005) in a UUID field or the MSD field, and broadcast the proximity information of the external object and the identification information (e.g., BLE_proxi_005).

In this regard, the mobile terminal 100 disposed within a communication range of the proximity sensor based BLE device 4110 may receive the proximity information of the external object and the identification information (e.g., BLE_proxi_005), which are broadcast by the proximity sensor based BLE device 4110. The mobile terminal 100 may extract notification information corresponding to the received identification information (e.g., BLE_proxi_005).

In a case in which reference proximity information "less than 1 m" is previously set in the extracted notification information, the mobile terminal 100 may compare the proximity information of the external object and the reference proximity information (e.g., less than 1 m) received from the proximity sensor based BLE device 4110.

The proximity sensor based BLE device 4110 may broadcast a proximity value detected through the proximity sensor or broadcast the distance information by calculating a distance between the external object and the proximity sensor based BLE device 4110. According to various embodiments of the present disclosure, the proximity sensor based BLE device 4110 may broadcast the distance information in advertising data packet form. In a case in which the mobile terminal 100 receives the proximity value from the proximity sensor based BLE device 4110, the mobile terminal 100 may directly calculate the distance between the external object and the proximity sensor based BLE device 4110. A method of calculating the distance between the external object and the proximity sensor based BLE device 4110 is well known, and thus a detailed description thereof will be omitted here.

If the distance between the external object and the proximity sensor based BLE device 4110 is "less than 1 m", the mobile terminal 100 may output the notification message (e.g., "Be Careful! Watch out! The baby is around the porch").

Meanwhile, in a case in which an error range is previously set, the mobile terminal 100 may output the notification message if the distance between the external object (e.g., a baby) and the proximity sensor based BLE device 4110 is within the previously set error range even though the distance is not exactly less than 1 m. For example, in a case in which the distance between the external object (e.g., a baby) and the proximity sensor based BLE device 4110 is less than 1.01 m, the mobile terminal 100 may output the notification message (e.g., "Be Careful! Watch out! The baby is around the porch") based on the proximity information received from the proximity sensor based BLE device 4110.

Figure 42:
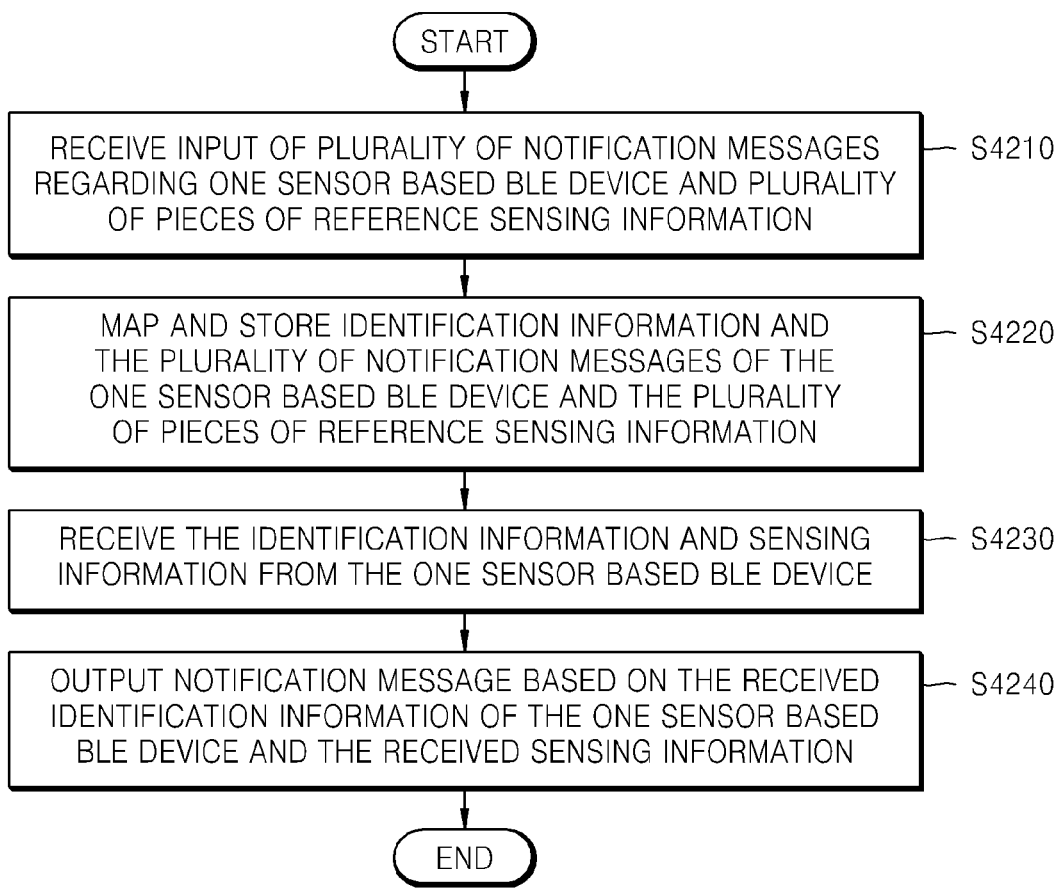
FIG. 42 is a flowchart illustrating a method of providing a plurality of pieces of notification information by using one sensor based BLE device according to an embodiment of the present disclosure.

FIG. 42 is a flowchart illustrating a method of providing a plurality of pieces of notification information by using one sensor based BLE device according to an embodiment of the present disclosure.

According to various embodiments of the present disclosure, one sensor based BLE device may include one type of sensor or a plurality of different type sensors. For convenience of description, a BLE device including one sensor is referred to as a single sensor based BLE device, and a BLE device including multiplex sensors is referred to as a multiplex sensor based BLE device.

At operation S4210, the mobile terminal 100 may receive an input of a plurality of notification messages regarding one sensor based BLE device and a plurality of pieces of reference sensing information. According to various embodiments of the present disclosure, the mobile terminal 100 may receive an input of a plurality of pieces of notification information regarding one single sensor based BLE device that are classified according to the reference sensing information. For example, a user may classify and set the reference motion information as a motion repeated 10 repetitions/20 repetitions/30 repetitions, reference temperature information as 30° C./31° C./32° C., reference proximity information as 1 m/2 m/3 m, and reference illuminance information as 50 lux/100 lux/2 lux, or the like to set a notification message corresponding to each of the plurality of pieces of reference sensing information.

In addition, the mobile terminal 100 may receive an input of the plurality of pieces of notification information regarding one single sensor based BLE device, which are classified according to time. For example, the user may input the reference motion information as 30 repetitions in the morning and as 50 repetitions in the evening to set a notification message corresponding to each piece of the reference motion information.

According to various embodiments of the present disclosure, the mobile terminal 100 may receive an input of a plurality of pieces of notification information regarding one multiplex sensor based BLE device, which are classified according to types of sensors. For example, one multiplex sensor based BLE device may include a temperature sensor, a motion sensor, a weight sensor, and/or the like. In this case, the mobile terminal 100 may receive an input of first notification information (reference temperature information and a notification message corresponding to the reference temperature information) regarding the temperature sensor, second notification information (reference motion information and a notification message corresponding to the reference motion information) regarding the motion sensor, third notification information (reference weight information and a notification message corresponding to the reference weight information) regarding the weight sensor from the user.

At operation S4220, the mobile terminal 100 may store identification information and the plurality of notification messages of one sensor based BLE device and the plurality of pieces of reference sensing information in the memory 160. For example, the mobile terminal 100 may map and store identification information and a plurality of notification messages of one single sensor based BLE device and the plurality of pieces of reference sensing information in the memory 160 or may map and store identification information and a plurality of notification messages of one multiplex sensor based BLE device and the plurality of pieces of reference sensing information in the memory 160.

At operation S4230, the mobile terminal 100 may receive identification information and sensing information from one sensor based BLE device. For example, in a case in which the mobile terminal 100 is disposed within a communication range of one single sensor based BLE device, the mobile terminal 100 may receive the identification information and the sensing information broadcast from one single sensor based BLE device. According to various embodiments of the present disclosure, the identification information may be included in a UUID field or an MSD field of an advertising packet broadcasted from one single sensor based BLE device. According to various embodiments of the present disclosure, the sensing information may be included in the MSD field of the advertising packet broadcasted from one single sensor based BLE device.

In addition, in a case in which the mobile terminal 100 is disposed within a communication range of one multiplex sensor based BLE device, the mobile terminal 100 may receive identification information and a plurality of pieces of sensing information broadcast from one multiplex sensor based BLE device. In this regard, according to various embodiments of the present disclosure, the sensing information may be included in an MSD field of an advertising packet broadcasted from one multiplex sensor based BLE device.

At operation S4240, the mobile terminal 100 may output a notification message based on the received identification information of one single sensor based BLE device and the received sensing information. For example, in a case in which the mobile terminal 100 receives the identification information from one sensor based BLE device, the mobile terminal 100 may search for notification information regarding one sensor based BLE device based on the received identification information. In this regard, in a case in which a plurality of pieces of notification information regarding one sensor based BLE device exists, the mobile terminal 100 may output the notification message by selecting one of the plurality of pieces of notification information based on the received sensing information.

A case in which one single sensor based BLE device is mapped with a plurality of pieces of notification information will now be described with reference to FIGS. 43A, 43B, and 43C, and 44A, 44B, and 44C, and then a case in which one multiplex sensor based BLE device is mapped with a plurality of pieces of notification information will be described with reference to FIGS. 45A, 45B, and 45C.

Figure 43A:
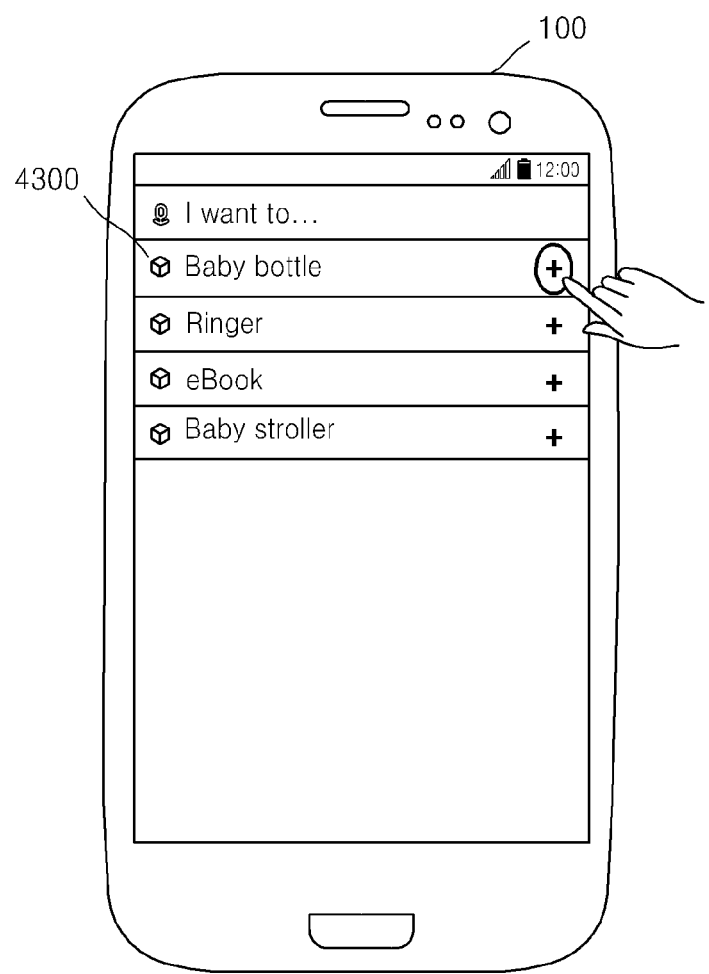
FIGS. 43A, 43B, and 43C are diagrams illustrating a screen for receiving an input of a plurality of pieces of notification information regarding one single sensor based BLE device according to an embodiment of the present disclosure.
Figure 43B:
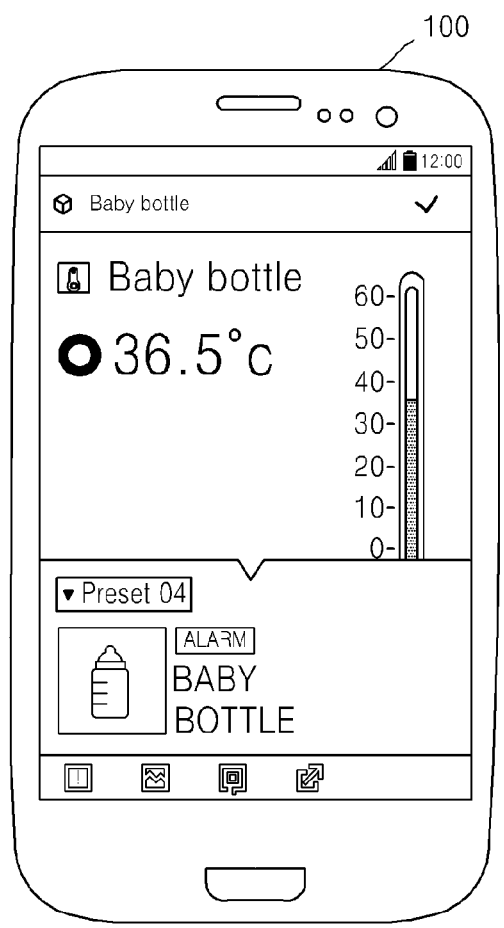
Figure 43C:
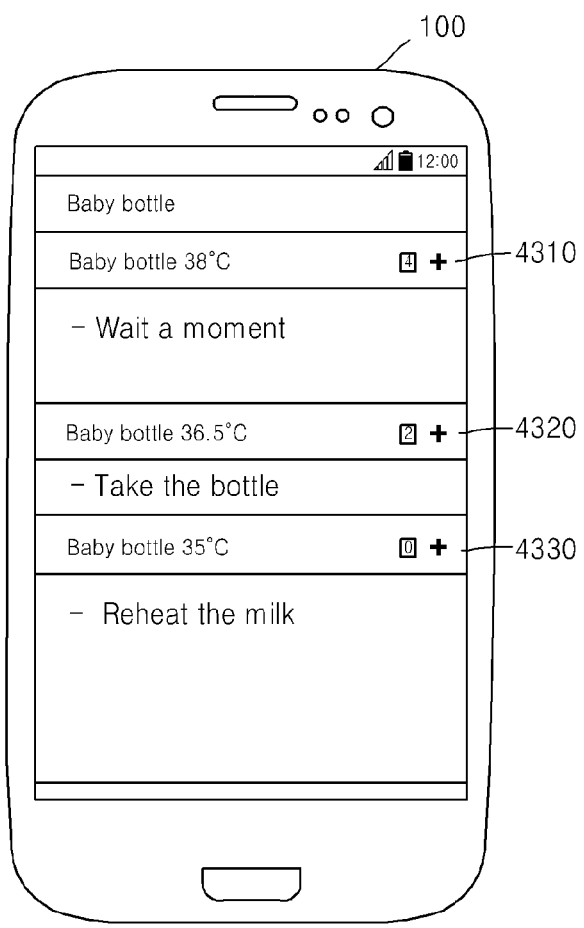

FIGS. 43A, 43B, and 43C are diagrams illustrating a screen for receiving an input of a plurality of pieces of notification information regarding one single sensor based BLE device according to an embodiment of the present disclosure.

Referring to FIG. 43A, the mobile terminal 100 may display a list of registered BLE devices according to a user request. The mobile terminal 100 may display the list of registered BLE devices as an ID, a nickname, a category, and/or the like, which are set by a user for convenience of the user. The mobile terminal 100 may detect a user's selection of a temperature sensor based BLE device 4300 attached to a baby bottle from among the list of registered BLE device.

Referring to FIG. 43B, the mobile terminal 100 may provide a notification setting window for setting a notification regarding the temperature sensor based BLE device 4300 attached to the baby bottle. In this regard, the mobile terminal 100 may receive an input of a plurality of pieces of notification information (a plurality of pieces of reference sensing information and a plurality of notification messages) regarding the temperature sensor based BLE device 4300. The mobile terminal 100 may map and store the plurality of pieces of notification information and identification information of the temperature sensor based BLE device 4300 attached to the baby bottle in the memory 160.

For example, referring to FIG. 43C, the mobile terminal 100 may map and store first notification information 4310 (e.g., "first reference sensing information: 38° C., first notification message: wait a moment"), second notification information 4320 (e.g., "second reference sensing information: 36.5° C., second notification message: take the bottle"), and third notification information 4330 (e.g., "third reference sensing information: 35° C., third notification message: reheat the milk") and identification information (e.g., TAG S/N: SAMSUNG_BLE_Temp_001) of the temperature sensor based BLE device 4300.

Figure 44A:
FIGS. 44A, 44B, and 44C are diagrams illustrating a screen for outputting a plurality of notification messages regarding one single sensor based BLE device according to an embodiment of the present disclosure.
Figure 44B:
Figure 44C:

FIGS. 44A, 44B, and 44C are diagrams illustrating a screen for outputting a plurality of notification messages regarding one single sensor based BLE device according to an embodiment of the present disclosure.

According to various embodiments of the present disclosure, the mobile terminal 100 may receive identification information (e.g., TAG S/N: SAMSUNG_BLE_Temp_001) and detected temperature information from the temperature sensor based BLE device 4300 attached to a baby bottle containing milk of 45° C.

In this regard, according to various embodiments of the present disclosure, the mobile terminal 100 may receive the identification information (e.g., TAG S/N: SAMSUNG_BLE_Temp_001) and the temperature information of the temperature sensor based BLE device 4300 in advertising packet form. For example, the mobile terminal 100 may receive the identification information (e.g., TAG S/N: SAMSUNG_BLE_Temp_001) of the temperature sensor based BLE device 4300 included in a UUID field of the advertising packet or in an MSD field thereof. In addition, the mobile terminal 100 may receive the temperature information (e.g., "0X06000024") included in the MSD<Sensor> field of the advertising packet.

In this regard, the mobile terminal 100 may extract a plurality of pieces of notification information (first notification information, second notification information, and third notification information) corresponding to the identification information (e.g., TAG S/N: SAMSUNG_BLE_Temp_001) of the temperature sensor based BLE device 4300 attached to the baby bottle. The mobile terminal 100 may compare a plurality of pieces of reference sensing information (38° C./36.5° C./35° C.) included in the extracted notification information and the temperature information received from the temperature sensor based BLE device 4300 attached to the baby bottle and may output one notification message.

Referring to FIG. 44A, in a case in which the milk that has a temperature of 45° C. is gradually cooled and the temperature information received from the temperature sensor based BLE device 4300 attached to the baby bottle is "38° C.", the mobile terminal 100 may output a first notification message "Wait a moment".

Referring to FIG. 44B, in a case in which the temperature information received from the temperature sensor based BLE device 4300 attached to the baby bottle is "36.5° C.", the mobile terminal 100 may output a second notification message "Take the bottle. The temperature of the baby bottle is appropriately set".

Referring to FIG. 44C, in a case in which the temperature information received from the temperature sensor based BLE device 4300 attached to the baby bottle is "35° C.", the mobile terminal 100 may output a third notification message "Reheat the milk.".

Meanwhile, according to various embodiments of the present disclosure, the plurality of pieces of reference sensing information may include different sensing values (38° C./36.5° C./35° C.) detected by one sensor (e.g., a temperature sensor) or different types of sensing values detected by at least two types of sensors (e.g., the temperature sensor and an illuminance sensor) as described above.

Figure 45A:
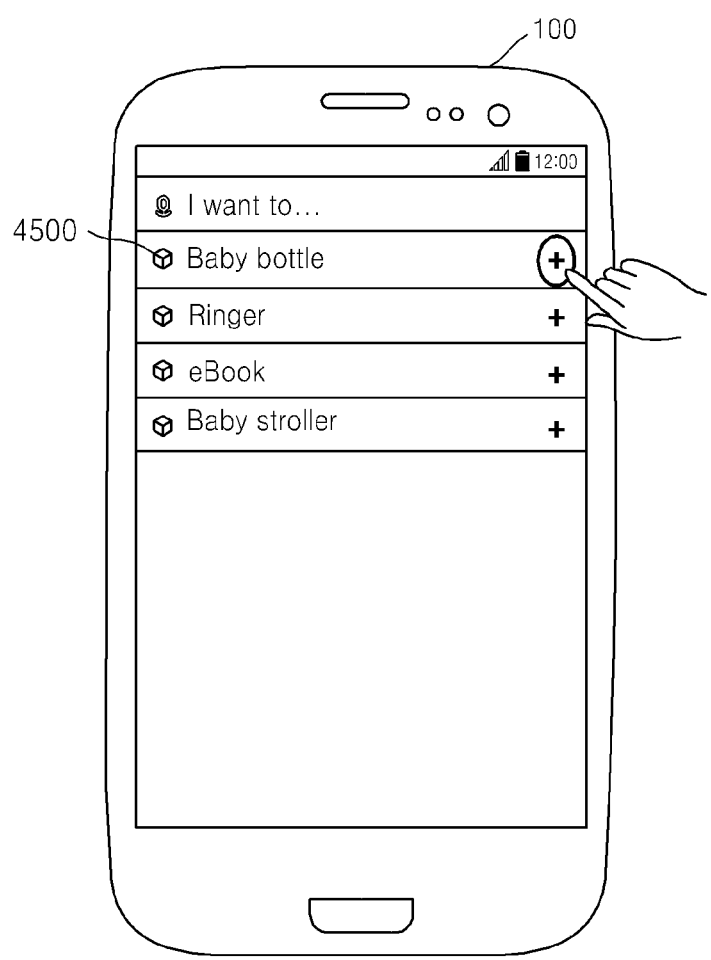
FIGS. 45A, 45B, and 45C are diagrams illustrating a screen for receiving an input of a plurality of pieces of notification information regarding one multiplex sensor based BLE device according to an embodiment of the present disclosure.
Figure 45B:
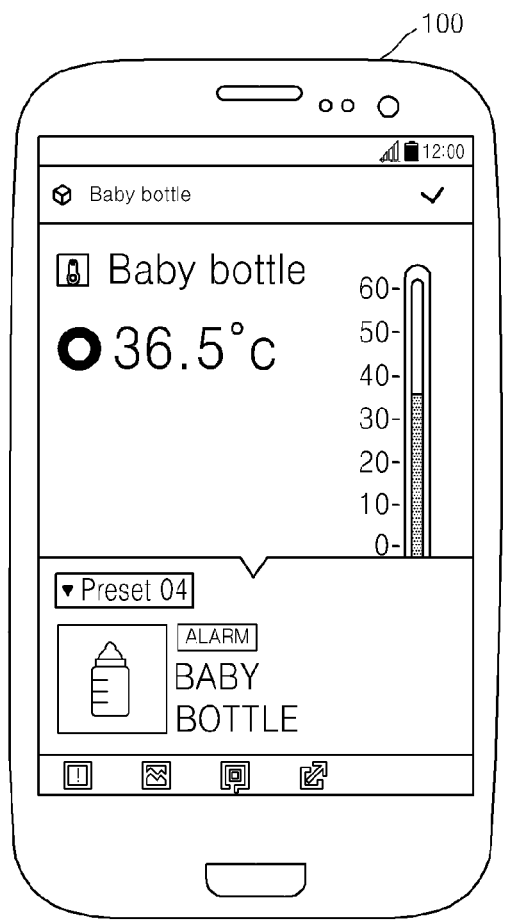
Figure 45C:
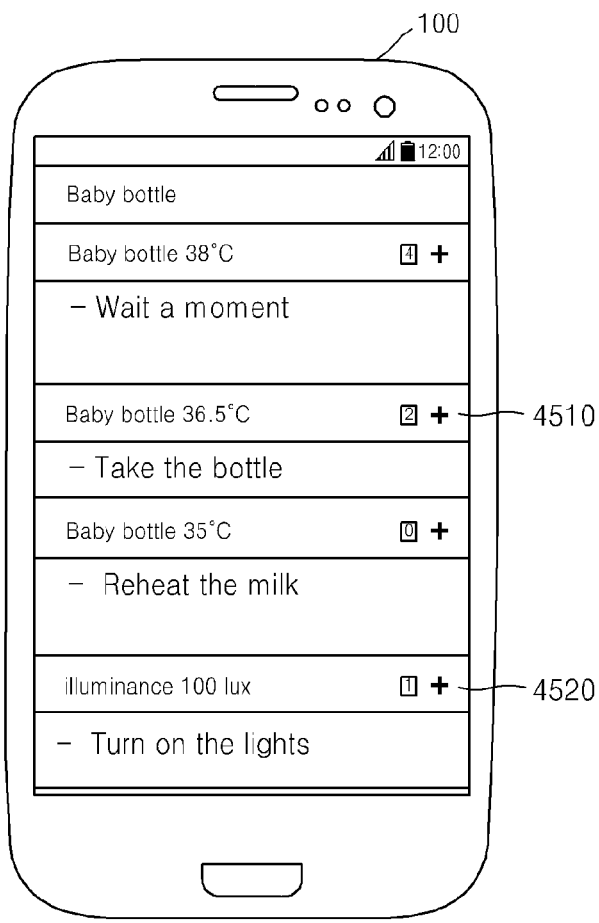

FIGS. 45A, 45B, and 45C are diagrams illustrating a screen for receiving an input of a plurality of pieces of notification information regarding one multiplex sensor based BLE device according to an embodiment of the present disclosure.

Referring to FIG. 45A, the mobile terminal 100 may display a list of registered BLE devices on the screen according to a user request for selecting at least one registered BLE device. In this regard, the mobile terminal 100 may detect a user's selection of one multiplex sensor based BLE device 4500 attached to a baby bottle from among the list of registered BLE devices. According to various embodiments of the present disclosure, the one multiplex sensor based BLE device 4500 may include at least two different types of sensors. For example, the one multiplex sensor based BLE device 4500 may include a temperature sensor and an illuminance sensor.

Referring to FIG. 45B, the mobile terminal 100 may provide a notification setting window for setting a notification regarding the one multiplex sensor based BLE device 4500. In this regard, the mobile terminal 100 may receive an input of a plurality of pieces of notification information (a plurality of pieces of reference sensing information and a plurality of notification messages) regarding the temperature sensor and the illuminance sensor of the one multiplex sensor based BLE device 4500. The mobile terminal 100 may map and store the plurality of pieces of notification information and identification information of the one multiplex sensor based BLE device 4500 in the memory 160.

For example, referring to FIG. 45C, the mobile terminal 100 may map and store first notification information 4510 (in a case in which a temperature of a baby bottle is "36.5° C.", the mobile terminal 100 outputs "Take the bottle") regarding the temperature sensor of the one multiplex sensor based BLE device 4500 and second notification information 4520 (in a case in which illuminance is 100 lux, the mobile terminal 100 outputs "Turn on the lights") regarding the illuminance sensor of the one multiplex sensor based BLE device 4500 and identification information (e.g., TAG S/N: SAMSUNG_BLE_multi_Temp&Illu_001) of the one multiplex sensor based BLE device 4500.

According to various embodiments of the present disclosure, the temperature information and/or the illuminance information measured by the one multiplex sensor based BLE device 4500 may be included in an MSD field of an advertising packet and broadcasted.

A method of remotely controlling the mobile terminal 100 using the BLE device 200 will now be described below. A process of connecting at least one function, which is supported by the mobile terminal 100, with a BLE device previously registered in the mobile terminal 100 will now be described below with reference to FIGS. 46 through 49.

Figure 46:
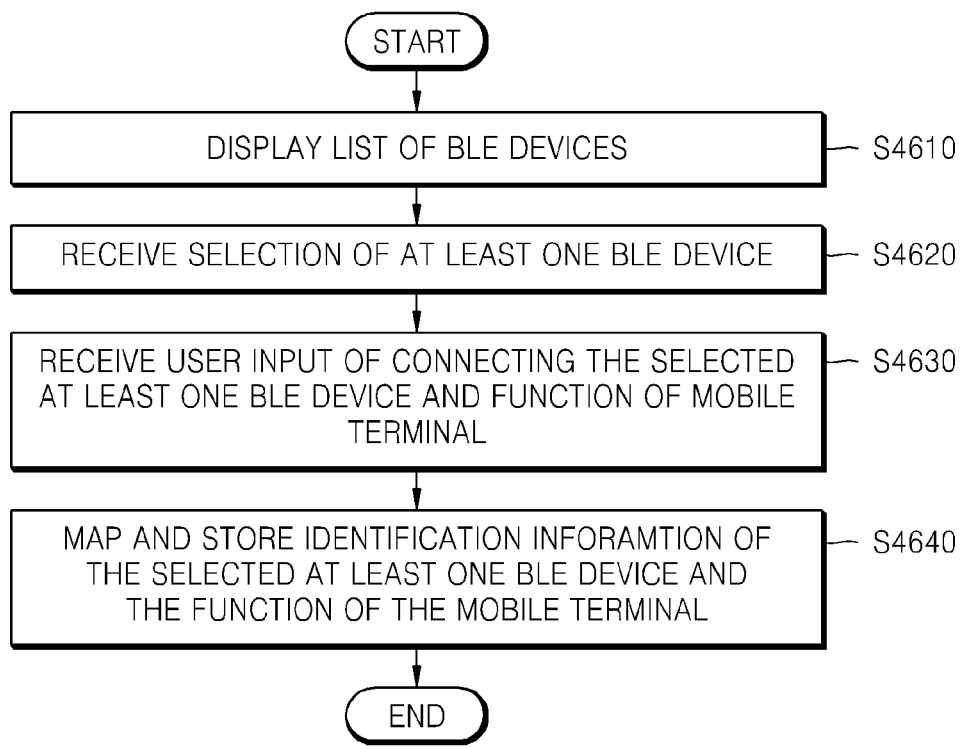
FIG. 46 is a flowchart illustrating a method of mapping functions of a registered BLE device and a mobile terminal according to an embodiment of the present disclosure.

FIG. 46 is a flowchart illustrating a method of mapping functions of a registered BLE device and a mobile terminal according to an embodiment of the present disclosure.

Referring to FIG. 46, a user may select a BLE device used to remotely control at least one function of the mobile terminal 100. In this regard, the user may select at least one registered BLE device from a list of BLE devices previously registered in the mobile terminal 100 or may select at least one BLE device by personally inputting identification information of a registered BLE device. An example of a case in which the user selects at least one registered BLE device from the list of BLE devices previously registered in the mobile terminal 100 will now be described below. However, a method of selecting the registered BLE device is not limited thereto but may vary.

At operation S4610, the mobile terminal 100 may display the list of previously registered BLE devices. The list of previously registered BLE devices may include identification information of a sensor based BLE device including a sensor and identification information of a registered BLE device not including the sensor.

For example, in a case in which the mobile terminal 100 receives a user input that requests a list of registered BLE devices, the mobile terminal 100 may display the list of previously registered BLE devices on a screen. In this regard, the mobile terminal 100 may configure and display a list of registered BLE devices including an ID, a nickname, category information, and/or the like that are input by the user in such a manner that the user may easily identify the registered BLE devices.

At operation S4620, the mobile terminal 100 may receive a selection of at least one registered BLE device. For example, the mobile terminal 100 may detect a tap gesture, which is applied by the user, or a swipe gesture, a flick gesture, and/or the like, or may recognize a voice command of the user, so as to select the at least one registered BLE device from among the list of registered BLE devices.

At operation S4630, the mobile terminal 100 may receive a user input for connecting the selected registered BLE device with the at least one function supported by the mobile terminal 100. The mobile terminal 100 may support various functions. For example, functions supported by the mobile terminal 100 may include a texting function, a call connection function, a content playback function, a mode automatic setting function, a webpage access function, a game play function, a capture function, a browsing function, and/or the like. However, various embodiments of the present disclosure are not limited thereto.

According to various embodiment of the present disclosure, the mobile terminal 100 may provide a list of functions supported by the mobile terminal 100 and receive a user input of at least one function from among the list of functions. According to various embodiments of the present disclosure, the mobile terminal 100 may provide the list of functions in a GUI form.

At operation S4640, the mobile terminal 100 may map and store identification information of the registered BLE device and the at least one function of the mobile terminal 100 in the memory 160. For example, the mobile terminal 100 may map and store the notification information (e.g., a device ID, S/N, MAC address, and/or the like) and the at least one function of the mobile terminal 100 selected by the user in the memory 160.

In this regard, according to various embodiments of the present disclosure, the mobile terminal 100 may further map and store the at least one function of the mobile terminal 100 selected by the user and property information (e.g., color information regarding an appearance, shape information, sensor information, and/or the like) of the registered BLE device in the memory 160. In addition, the mobile terminal 100 may further map and store the at least one function of the mobile terminal 100 selected by the user and user additional information (e.g., an ID, a nickname, a category, a memo, and/or the like set by the user) of the registered BLE device in the memory 160.

Meanwhile, according to various embodiments of the present disclosure, the mobile terminal 100 may further map and store a single registered BLE device and a plurality of functions in the memory 160. For example, the mobile terminal 100 may classify and store the plurality of functions corresponding to the single registered BLE device with respect to time. For example, the user may classify and set the plurality of functions corresponding to the single registered BLE device as morning/afternoon, morning/noon/evening, 7-9 AM/11-12 AM/3-5 PM/8-10 PM, or the like.

According to various embodiments of the present disclosure, the mobile terminal 100 may classify and store the plurality of functions corresponding to the single registered BLE device according to sensing information. For example, in a case in which a single multiplex sensor based BLE device includes a temperature sensor, a motion sensor, a weight sensor, and/or the like, the mobile terminal 100 may map and store a first function related to the temperature sensor, a second function related to the motion sensor, and a third function related to the weight sensor and identification information of the single multiplex sensor based BLE device in the memory 160.

According to various embodiments of the present disclosure, the user may change a previously set function of the mobile terminal 100 that is mapped to the registered BLE device. In this case, the mobile terminal 100 may update function information regarding the registered BLE device stored in the memory 160.

FIGS. 47A, 47B, 47C, 47D, and 47E are diagrams illustrating a process in which a mobile terminal receives a user input for connecting a registered BLE device with a function of a mobile terminal according to an embodiment of the present disclosure.

Figure 47A:
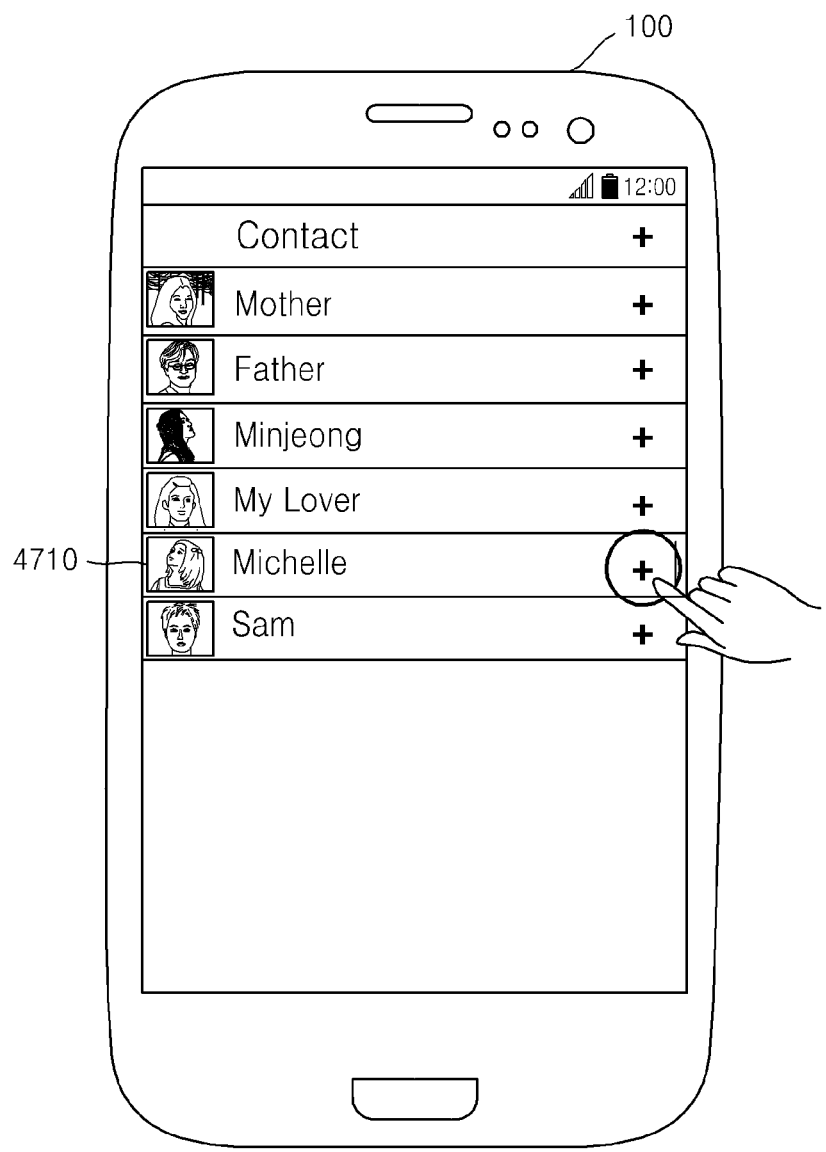
FIGS. 47A, 47B, 47C, 47D, and 47E are diagrams illustrating a process in which a mobile terminal receives a user input for connecting a registered BLE device with a function of a mobile terminal according to an embodiment of the present disclosure.

Referring to FIG. 47A, the mobile terminal 100 may provide a list of registered BLE devices. The mobile terminal 100 may configure and display the list of registered BLE devices as an ID, a nickname, category information, and/or the like that are set by a user (e.g., for the user's convenience). According to various embodiments of the present disclosure, the mobile terminal 100 may provide the list of registered BLE devices through an address book application. For example, the mobile terminal 100 may provide an identification information list of users carrying the registered BLE devices as the list of registered BLE devices.

According to various embodiments of the present disclosure, the mobile terminal 100 may detect a user selection of a registered BLE device 4710 carried by another user (e.g., Michelle) through the address book application.

Figure 47B:

Referring to FIG. 47B, the mobile terminal 100 may provide information regarding the other user (e.g., Michelle) carrying the registered BLE device 4710 selected through the address book application. For example, the mobile terminal 100 may display basic information (e.g., a name, a job, an age, a photo, a relationship with the user, an address of an SNS server used by the other user, and SNS account information) regarding the other user and identification information (e.g., TAG S/N: SAMSUNG_BLE_MICHELLEL001) of the registered BLE device 4710 carried by the other user.

Meanwhile, the mobile terminal 100 may detect a user selection of a function setting button 4720 displayed on a screen. For example, the mobile terminal 100 may recognize a touch gesture (e.g., a tap gesture, a flick gesture, and/or the like) applied by the user or a voice command of the user and thus detect the user selection of the function setting button 4720.

Figure 47C:
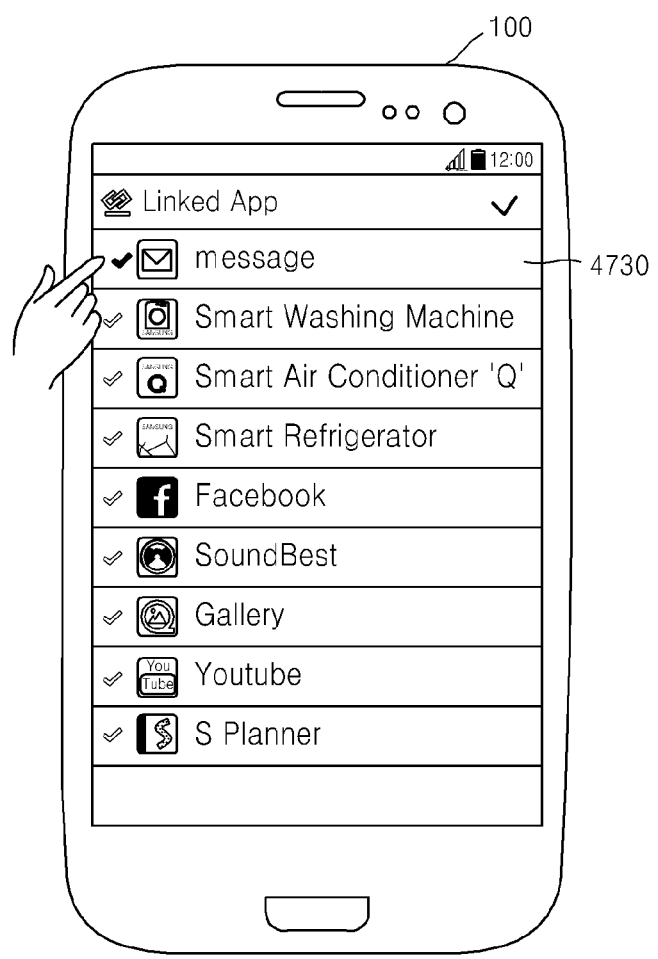

Referring to FIG. 47C, the mobile terminal 100 may provide a list of functions supported by the mobile terminal 100 in response to the user selection of the function setting button 4720. According to various embodiments of the present disclosure, the mobile terminal 100 may display identification information of an application that performs each function of the list of functions. For example, the mobile terminal 100 may display the application, an SNS (e.g., Facebook) application, a schedule management application, a photo application, and/or the like.

According to various embodiments of the present disclosure, the mobile terminal 100 may detect a user selection of a message sending function 4730. For example, a user of the mobile terminal 100 may select the message sending function 4730 as a function interworking with the registered BLE device 4710 carried by another user (e.g., Michelle). In this regard, the user may select the message sending function 4730 through a tap gesture, a flick gesture, a swipe gesture, a voice command, and/or the like.

Figure 47D:
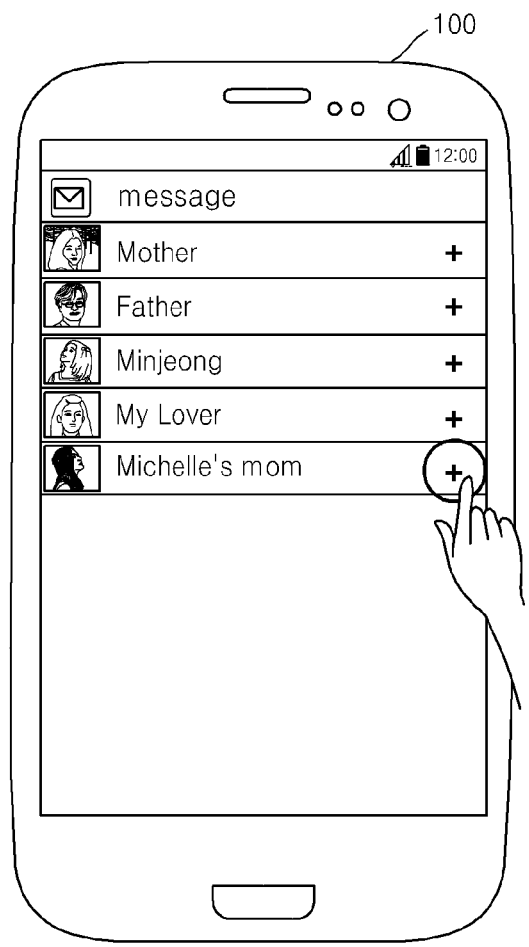

Referring to FIG. 47D, according to various embodiments of the present disclosure, the mobile terminal 100 may provide an address book in response to the user selection of the message sending function 4730. The user may select Michelle's mom from the address book as the other party to whom a message is sent.

Figure 47E:
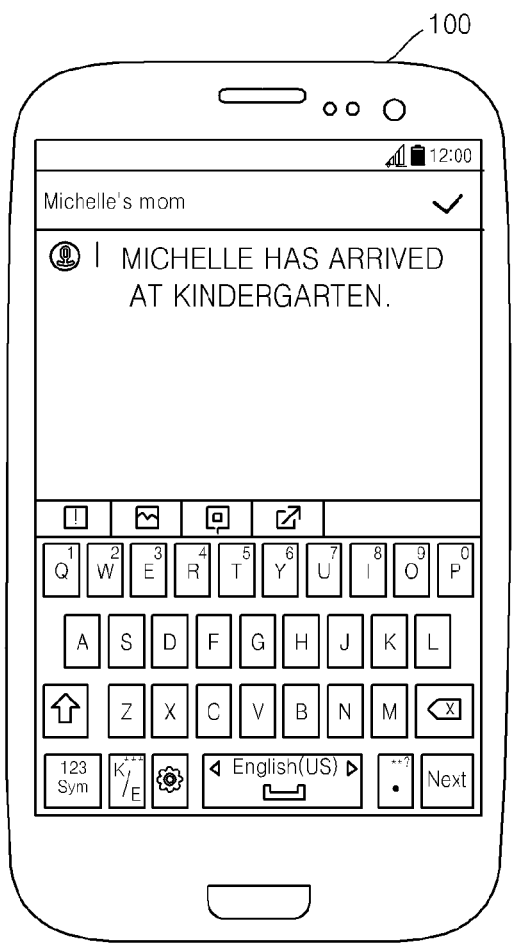

Referring to FIG. 47E, the mobile terminal 100 may receive an input of message content (e.g., Michelle has arrived at kindergarten) that is going to be sent to a Michelle's mom's device in the future from the user.

In this regard, according to various embodiments of the present disclosure, the mobile terminal 100 may map and store identification information (e.g., TAG S/N:SAMSUNG_BLE_MICHELLE001) of the registered BLE device 4710 carried by the other user (e.g., Michelle) and the message sending function 4730 (e.g., the other party's device: Michelle's mom, message content: Michelle has arrived at kindergarten) in the memory 160 as function information of the registered BLE device 4710.

FIGS. 48A, 48B, 48C, 48D, and 48E are diagrams illustrating a process of mapping a sensor based BLE device and a function of a mobile terminal according to an embodiment of the present disclosure.

A user may select the sensor based BLE device used to remotely control at least one function of the mobile terminal 100. An example of a case in which the user selects at least one sensor based BLE device from a list of BLE devices previously registered in the mobile terminal 100 will now be described below. However, a method of selecting the sensor based BLE device is not limited thereto but may vary.

Figure 48A:
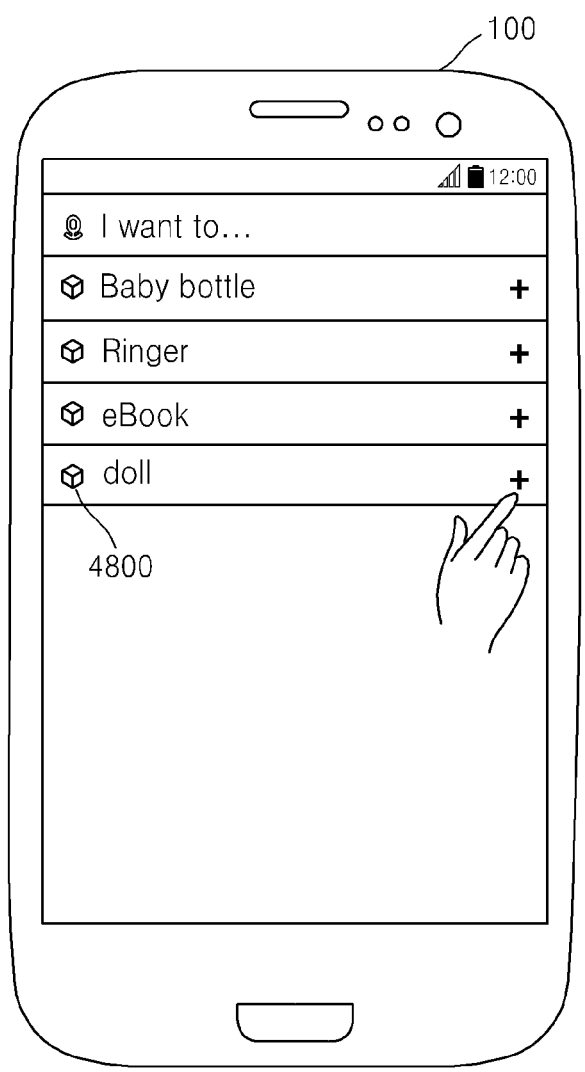
FIGS. 48A, 48B, 48C, 48D, and 48E are diagrams illustrating a process of mapping a sensor based BLE device and a function of a mobile terminal according to an embodiment of the present disclosure.

Referring to FIG. 48A, the mobile terminal 100 may provide a list of registered BLE devices. The mobile terminal 100 may configure and display the list of registered BLE devices as an ID, a nickname, category information, etc. that are input by the user for convenience of the user. For example, the mobile terminal 100 may display a registered BLE device attached to a bag of a Ringer's solution as "Ringer", a registered BLE device attached to an e-Book terminal as "eBook", a registered BLE device attached to a baby bottle as "Baby bottle", and a registered BLE device attached to a doll as "Doll". The mobile terminal 100 may detect a user selection of a motion sensor based BLE device 4800 attached to the doll from among the list of registered BLE devices.

Figure 48B:
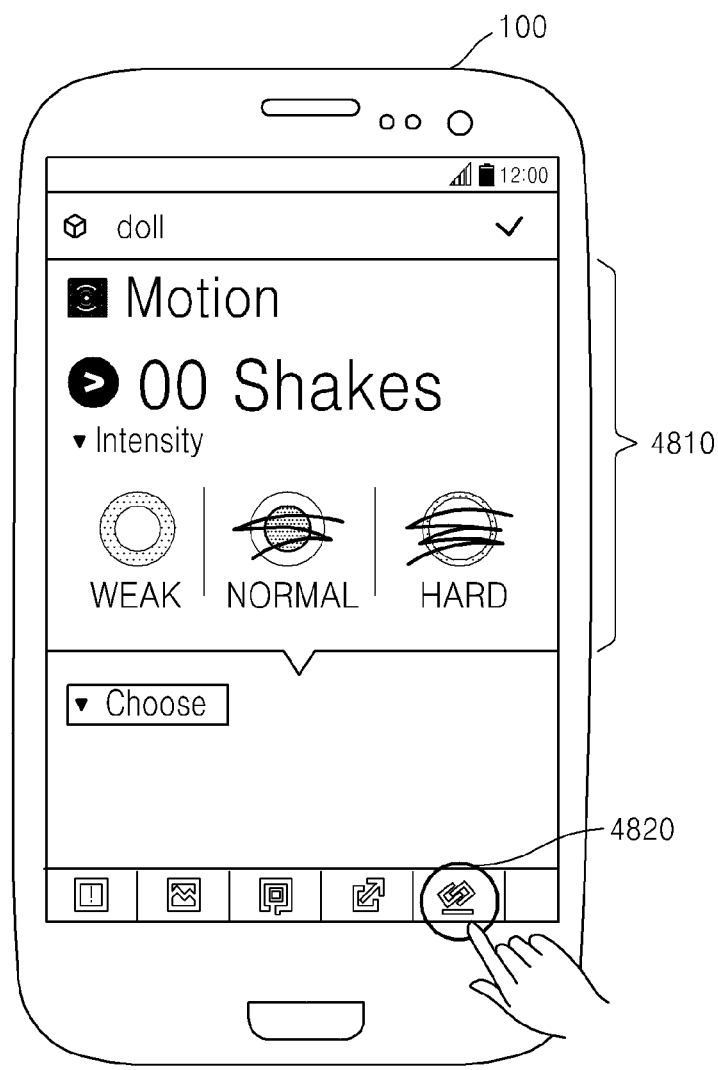

Referring to FIG. 48B, the mobile terminal 100 may provide a sensing information setting window 4810 for setting a reference sensing value in response to the user selection of the motion sensor based BLE device 4800. The reference sensing value means a sensing value that is a reference for the mobile terminal 100 to automatically perform at least one function corresponding to the sensor based BLE device.

According to various embodiments of the present disclosure, as an example, the user may set the reference sensing value as "2 shakes" so that the mobile terminal 100 may perform a function corresponding to the motion sensor based BLE device 4800 in a case in which the doll attached to the motion sensor based BLE device 4800 shakes twice.

Meanwhile, the mobile terminal 100 may detect a user selection of a function setting button 4820 displayed on a screen. For example, the mobile terminal 100 may recognize a touch gesture (e.g., a tap gesture, a flick gesture, and/or the like) applied by the user or a voice command of the user and detect the user selection of the function setting button 4820.

Figure 48C:
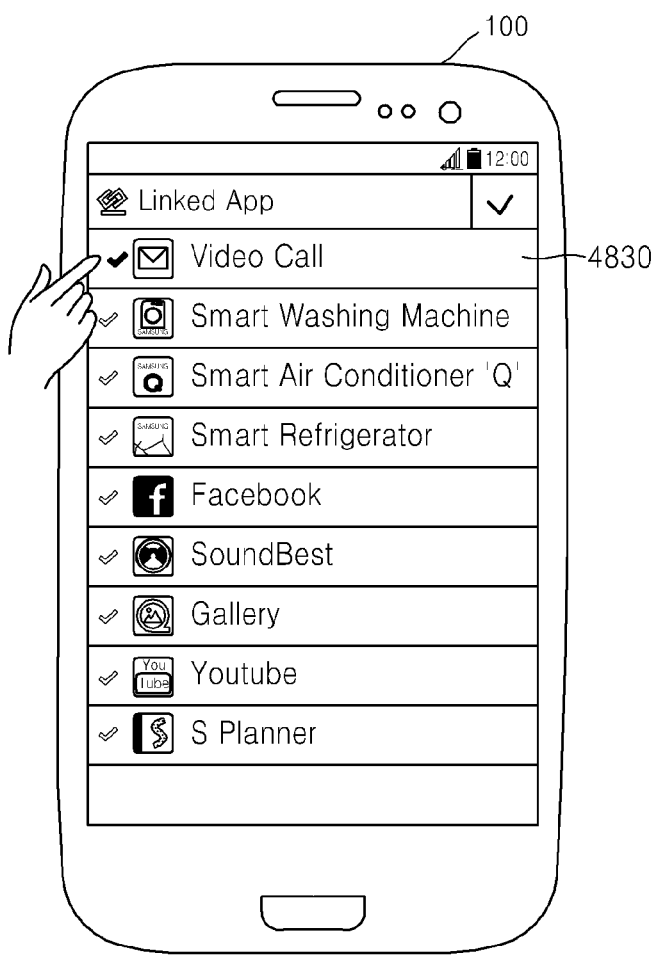

Referring to FIG. 48C, the mobile terminal 100 may provide a list of functions supported by the mobile terminal 100 in response to the user selection of the function setting button 4820. According to various embodiments of the present disclosure, the mobile terminal 100 may display identification information of an application that performs each function of the list of functions.

According to various embodiments of the present disclosure, the mobile terminal 100 may detect a user selection of a call connection function 4830. For example, the user of the mobile terminal 100 may select the call connection function 4830 as a function corresponding to the registered BLE device 4800 carried by another user (e.g., mom). In this regard, the user may select the call connection function 4830 through the tap gesture, the flick gesture, a swipe gesture, a voice command, and/or the like.

Figure 48D:
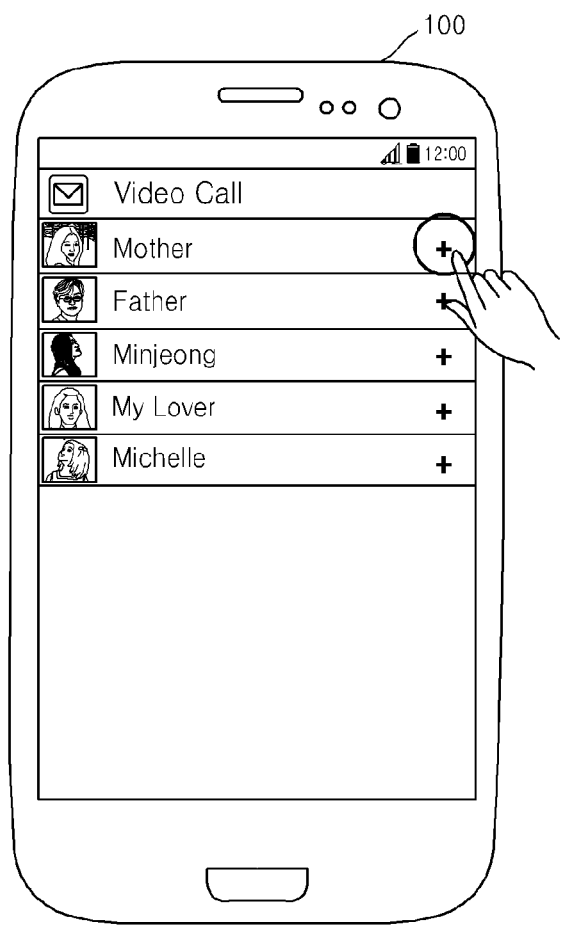

Referring to FIG. 48D, according to various embodiments of the present disclosure, the mobile terminal 100 may provide an address book in response to a user selection of the call connection function 4830. The user may select "Mother" from the address book as a call connection party.

Figure 48E:
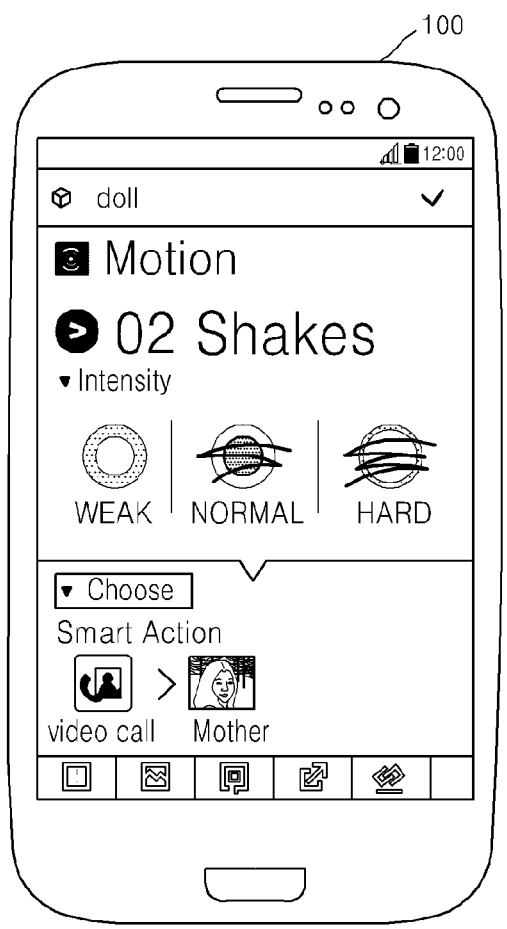

Referring to FIG. 48E, according to various embodiments of the present disclosure, the mobile terminal 100 may map and store identification information (e.g., TAG S/N: SAMSUNG_BLE_Motion_005) of the motion sensor based BLE device 4800 attached to the doll, the reference sensing value (e.g., motion: 2 Shakes), and the call connection function 4830 in the memory 160 as function information of the motion sensor based BLE device 4800.

According to various embodiments of the present disclosure, the mobile terminal 100 may receive a setting of a function corresponding to the sensor based BLE device after receiving an input of the reference sensing value of the sensor based BLE device or may receive the input of the reference sensing value of the sensor based BLE device after receiving the setting of the function corresponding to the sensor based BLE device.

FIGS. 49A, 49B, 49C, 49D, and 49E are diagrams illustrating a process of mapping a sensor based BLE device and a function of a mobile terminal according to an embodiment of the present disclosure.

Figure 49A:
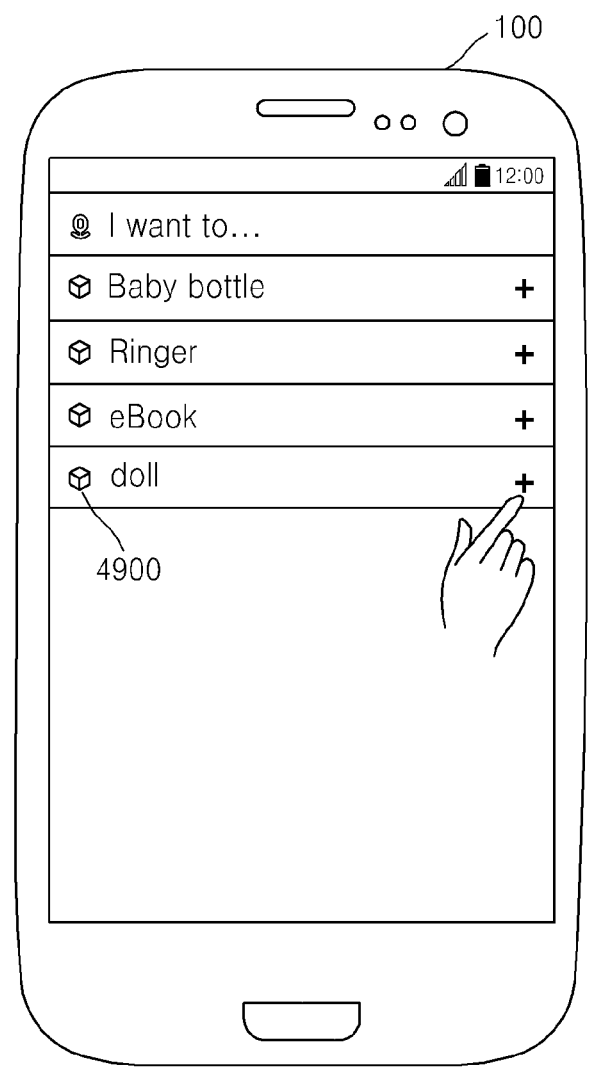
FIGS. 49A, 49B, 49C, 49D, and 49E are diagrams illustrating a process of mapping a sensor based BLE device and a function of a mobile terminal according to an embodiment of the present disclosure.

Referring to FIG. 49A, the mobile terminal 100 may provide a list of registered BLE devices in such a manner that a user may select at least one sensor based BLE device. The mobile terminal 100 may configure and display the list of registered BLE devices as an ID, a nickname, category information, and/or the like that are input by the user for convenience of the user. The mobile terminal 100 may detect a user selection of an illuminance sensor based BLE device 4900 attached to a doll from among the list of registered BLE devices.

Figure 49B:
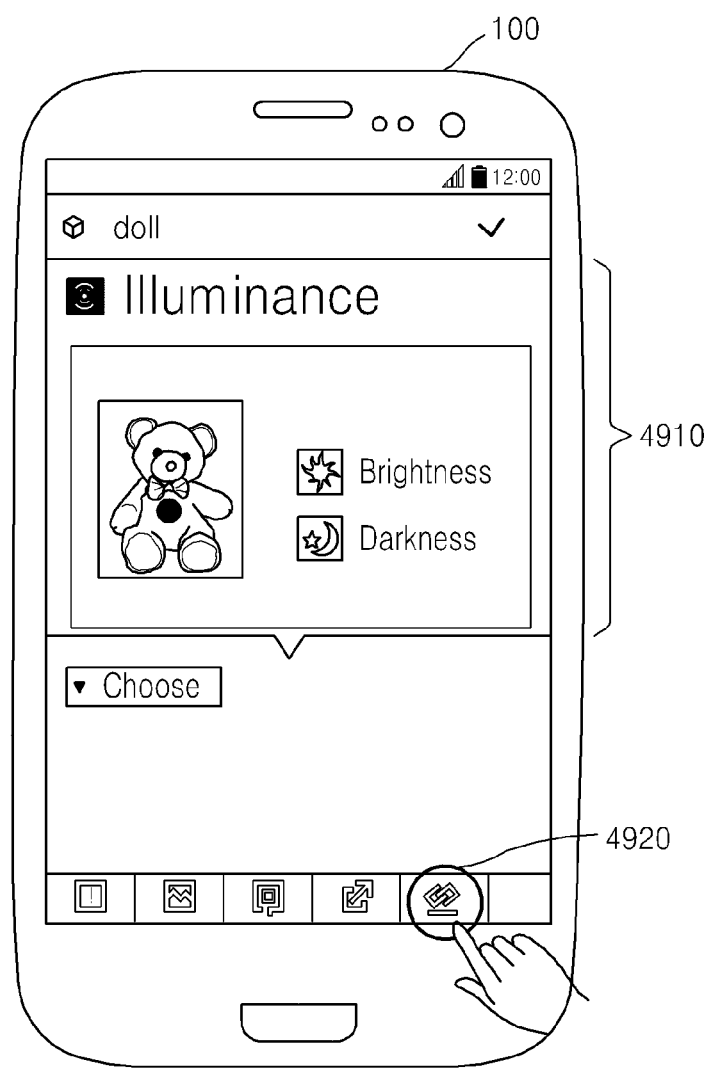

Referring to FIG. 49B, the mobile terminal 100 may provide a sensing information setting window 4910 for setting a reference sensing value in response to the user selection of the illuminance sensor based BLE device 4900.

According to various embodiments of the present disclosure, the user may set the reference sensing value as "Darkness" in such a manner that the mobile terminal 100 may perform a function corresponding to the illuminance sensor based BLE device 4900 in a case in which a surrounding environment becomes dark.

Meanwhile, the mobile terminal 100 may detect a user selection of a function setting button 4920 displayed on a screen. For example, the mobile terminal 100 may recognize a touch gesture (e.g., a tap gesture, a flick gesture, and/or the like) applied by the user or a voice command of the user and detect the user selection of the function setting button 4920.

Figure 49C:
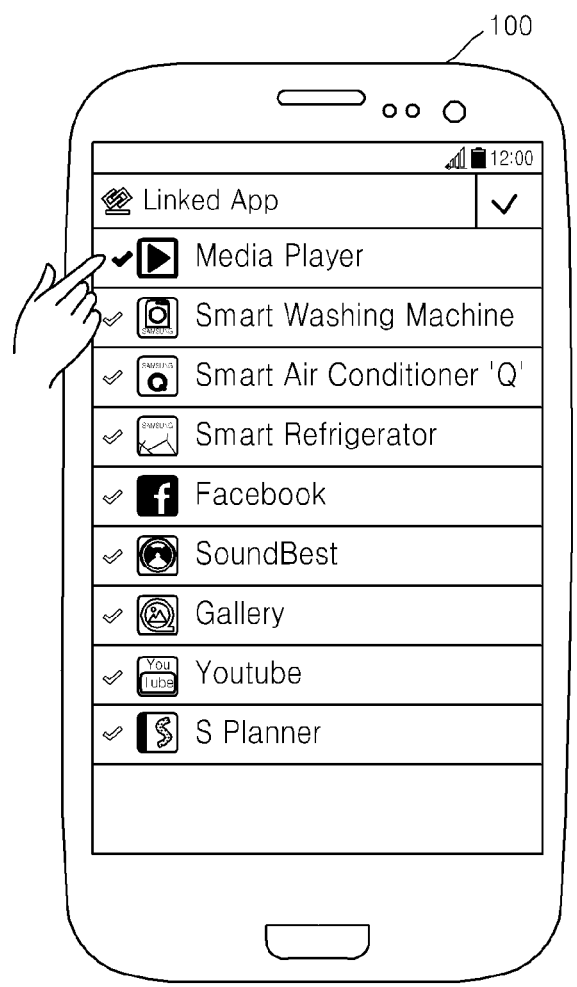

Referring to FIG. 49C, the mobile terminal 100 may provide a list of functions supported by the mobile terminal 100 in response to the user selection of the function setting button 4920. According to various embodiments of the present disclosure, the mobile terminal 100 may display identification information of an application that performs each function of the list of functions.

According to various embodiments of the present disclosure, the mobile terminal 100 may detect a user selection of a content playback function 4930. For example, the user of the mobile terminal 100 may select the content playback function 4930 as a function corresponding to the illuminance sensor based BLE device 4900. In this regard, the user may select the content playback function 4930 through a tap gesture, a flick gesture, a swipe gesture, a voice command, and/or the like.

Figure 49D:
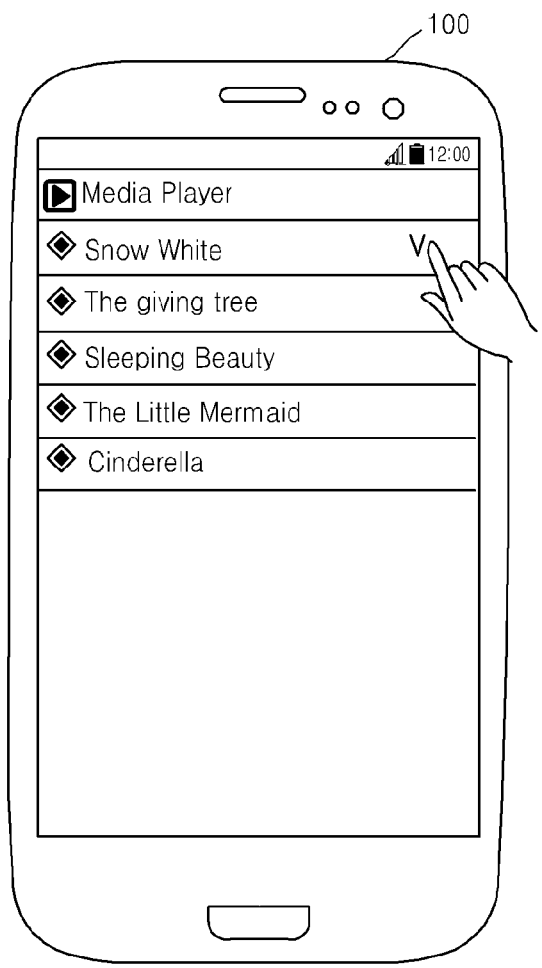

Referring to FIG. 49D, according to various embodiments of the present disclosure, the mobile terminal 100 may provide a list of playable content in response to a user selection of the content playback function 4930. The user may select "Snow White" from the list of playable content.

Figure 49E:
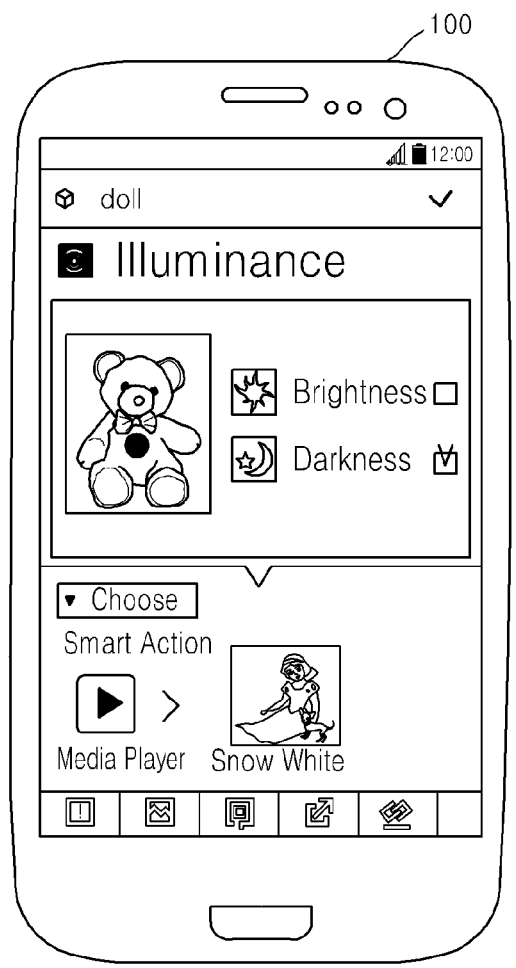

Referring to FIG. 49E, according to various embodiments of the present disclosure, the mobile terminal 100 may map and store identification information (e.g., TAG S/N: SAMSUNG_BLE_ILLUMINANCE_005) of the illuminance sensor based BLE device 4900 attached to the doll, the reference sensing value (e.g., Darkness), and the content (e.g., Snow White) playback function 4930 in the memory 160 as function information of the illuminance sensor based BLE device 4900.

Figure 50:
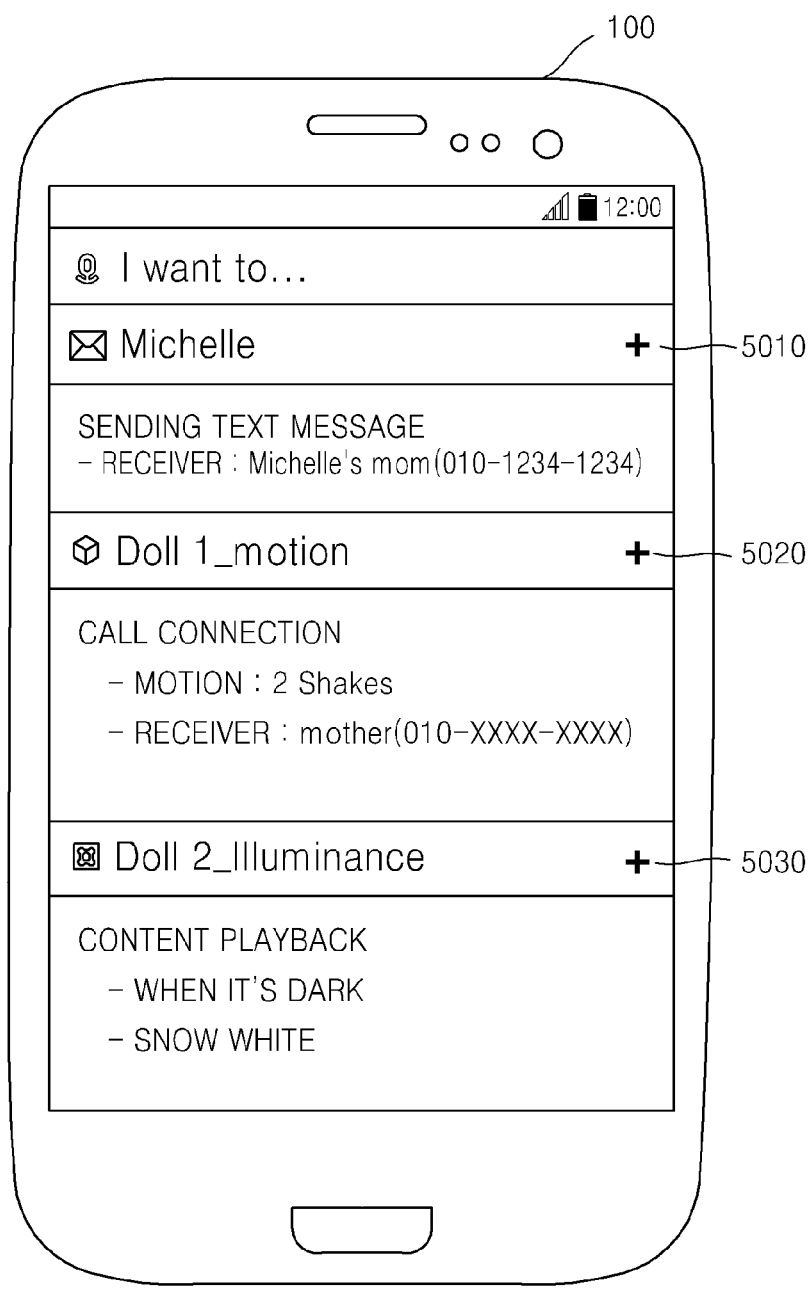
FIG. 50 is a diagram illustrating a screen of a function information list according to an embodiment of the present disclosure.

FIG. 50 is a diagram illustrating a screen of a function information list according to an embodiment of the present disclosure.

Referring to FIG. 50, in a case in which a user request for the function information list is detected, the mobile terminal 100 may output the function information list on the screen. According to various embodiments of the present disclosure, the mobile terminal 100 may display functions set for each of registered BLE devices 5010, 5020, and 5030 on the function information list. In this regard, the mobile terminal 100 may display the registered BLE devices 5010, 5020, and 5030 as an ID, a nickname, category information, and/or the like that are input by a user for the purpose of distinction.

According to various embodiments of the present disclosure, the function information list shows that the user of the mobile terminal 100 may set a text message sending function with respect to a registered BLE device 5010 carried by Michelle, a call connection function with respect to a motion sensor based BLE device 5020 attached to a doll 1, and a content playback function with respect to an illumination sensor based BLE device 5030 attached to a doll 2.

Figure 51:
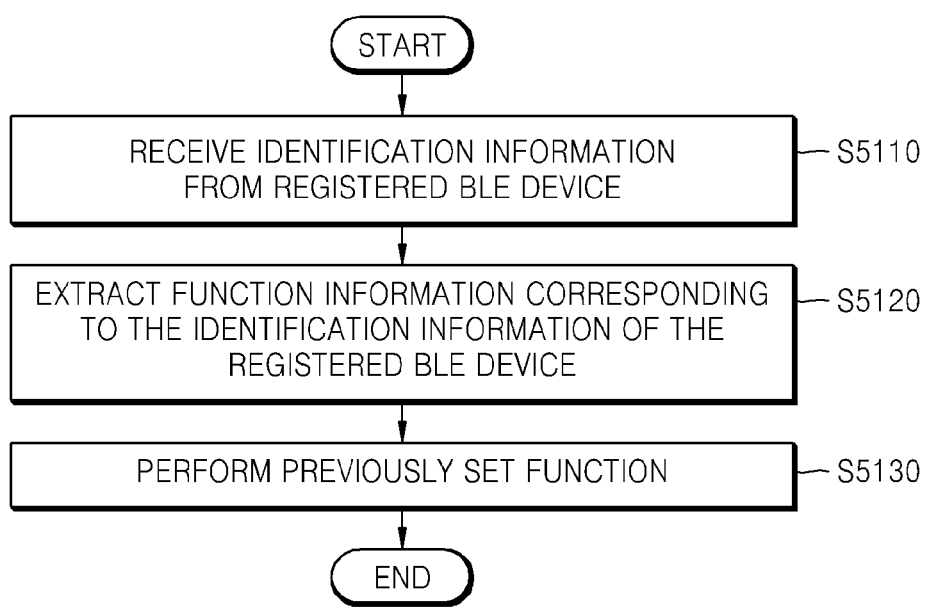
FIG. 51 is a flowchart illustrating a method of controlling a function of a mobile terminal by using a registered BLE device according to an embodiment of the present disclosure.

FIG. 51 is a flowchart illustrating a method of controlling a function of a mobile terminal by using a registered BLE device according to an embodiment of the present disclosure.

At operation S5110, in a case in which the mobile terminal 100 comes within a communication range of the registered BLE device, the mobile terminal 100 may receive identification information from the registered BLE device. For example, in a case in which a user carries the mobile terminal 100 and approaches within the communication range of the registered BLE device, the mobile terminal 100 may receive identification information (e.g., a device ID, an S/N, a MAC address, and/or the like) of the registered BLE device which is broadcast by the registered BLE device. In addition, in a case in which another user carries the registered BLE device and approaches the mobile terminal 100, the mobile terminal 100 may receive the identification information from the registered BLE device.

According to various embodiments of the present disclosure, the identification information of the registered BLE device may be included in a UUID field or an MSD field of an advertising packet broadcasted from the registered BLE device.

At operation S5120, the mobile terminal 100 may extract function information corresponding to the identification information of the registered BLE device. According to various embodiments of the present disclosure, the mobile terminal 100 may extract function information corresponding to the identification information of the registered BLE device from the memory 160 or an external server (e.g., a cloud server) linked to the mobile terminal 10. For example, the mobile terminal 100 may search for the function information corresponding to the identification information of the registered BLE device from a previously set function information list.

According to various embodiments of the present disclosure, the function information may include at least one previously set function mapped to the identification information of the registered BLE device. According to various embodiments of the present disclosure, the previously set function may include a text message sending function, a call connection function, a content playback function, and/or the like. However, various embodiments of the present disclosure are not limited thereto.

At operation S5130, the mobile terminal 100 may perform the previously set function mapped to the identification information of the registered BLE device. According to various embodiments of the present disclosure, the mobile terminal 100 may extract an application for performing the previously set function. The mobile terminal 100 may perform the extracted application. According to various embodiments of the present disclosure, the application may include a call application, a message application, an E-book application, a game application, a moving picture playback application, a map application, a broadcasting application, and/or the like. However, various embodiments of the present disclosure are not limited thereto.

Meanwhile, in a case in which a plurality of previously set functions are included in function information corresponding to identification information of a single registered BLE device, the mobile terminal 100 may perform the previously set functions additionally in consideration of a time when the identification information of the single registered BLE device is received in addition to the identification information of the single registered BLE device. For example, in a case in which the time when the identification information (e.g., BLE_ITEM_001) of the single registered BLE device is received is in the morning, the mobile terminal 100 may perform the text message sending function, and, in a case in which the time when the identification information (e.g., BLE_ITEM_001) of the single registered BLE device is received is in the afternoon, the mobile terminal 100 may perform the content playback function.

According to various embodiments of the present disclosure, even though the user does not personally manipulate the mobile terminal 100, in a case in which the mobile terminal 100 comes within the communication range of the registered BLE device, the user may allow the mobile terminal 100 to automatically perform the previously set function (e.g., call connection, text message sending, content playback, or the like). This will be described in more detail with reference to FIG. 52.

Figure 52A:
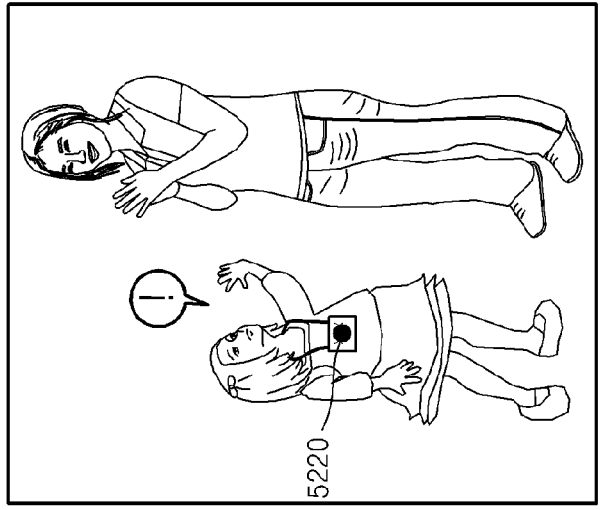
FIGS. 52A, 52B, and 52C are diagrams for explaining a method of automatically sending a text message by using a registered BLE device according to an embodiment of the present disclosure.
Figure 52B:
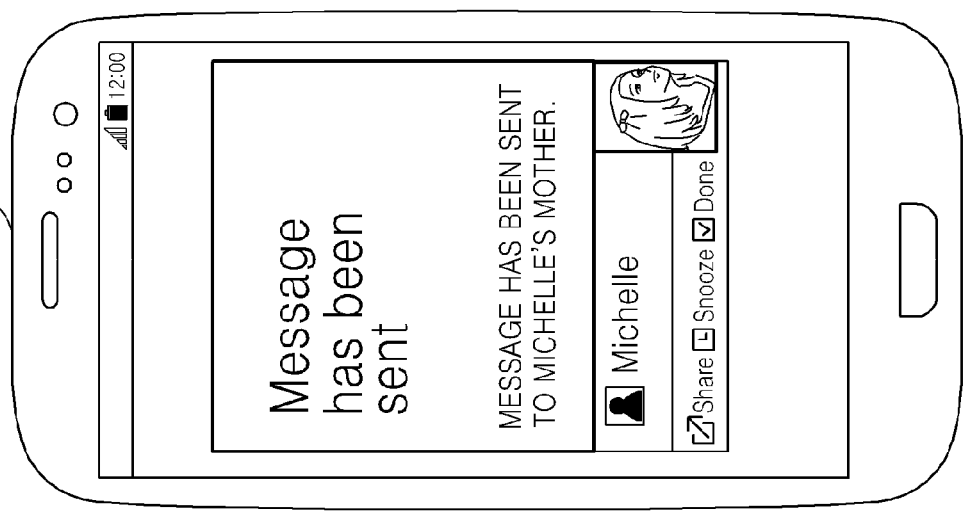
Figure 52C:
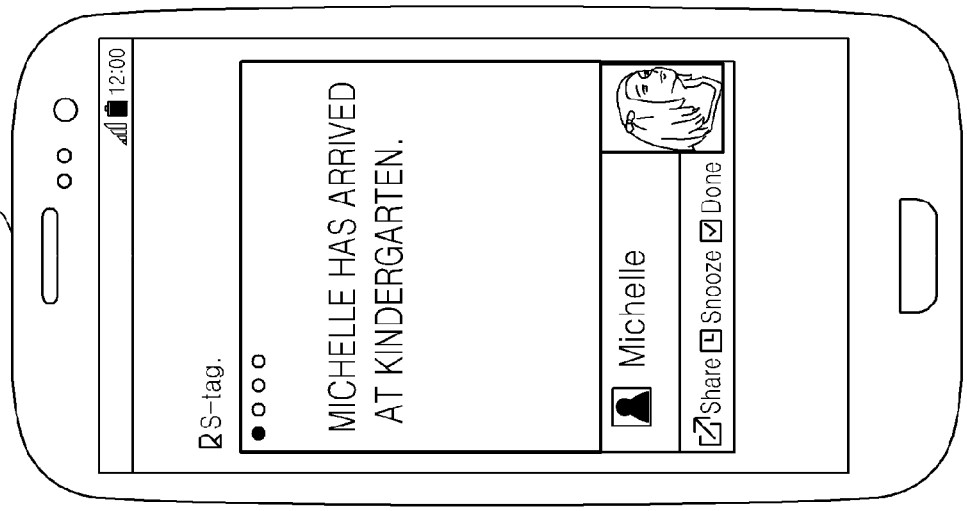

FIGS. 52A, 52B, and 52C are diagrams for explaining a method of automatically sending a text message by using a registered BLE device according to an embodiment of the present disclosure.

According to various embodiments of the present disclosure, an example of a case in which a user (e.g., a kindergarten teacher) of a mobile terminal 5210 may map and set a registered BLE device 5220 of another user (e.g., a kindergartener Michelle) and a message sending function (e.g., the other party's device: a device 5230 of Michelle's mother, message content: Michelle has arrived at a kindergarten) as function information of the registered BLE device 5220 of the other user (e.g., a kindergartener Michelle) will now be described.

Referring to FIG. 52A, in a case in which the other user (e.g., a kindergartener Michelle) carries the registered BLE device 5220 and comes to the kindergarten, the mobile terminal 5210 of the kindergarten teacher may receive identification information from the registered BLE device 5220 carried by the kindergartener Michelle. In this regard, the identification information of the registered BLE device 5220 may be included in a UUID field or an MSD field of an advertising packet broadcasted from the registered BLE device 5220.

Referring to FIG. 52B, the mobile terminal 5210 of the kindergarten teacher may compare identification information of the registered BLE device 5220 and a previously set function information list and extract previously set function information (e.g., sending a message to the device 5230 of Michelle's mother) corresponding to the identification information of the registered BLE device 5220 carried by the kindergartener Michelle. In this case, the mobile terminal 5210 of the kindergarten teacher may automatically send a previously set message "Michelle has arrived at a kindergarten" to the device 5230 of Michelle's mother.

Thus, according to various embodiments of the present disclosure, even though the kindergarten teacher does not particularly manipulate her own mobile terminal 5210, in a case in which the kindergartener Michelle carrying the registered BLE device 5220 comes to the kindergarten, the kindergarten teacher may send a notification message indicating the arrival of the kindergartener Michelle to the device 5230 of Michelle's mother.

Meanwhile, according to various embodiments of the present disclosure, when the user sets a function of the registered BLE device, the user may add time condition information. For example, the kindergarten teacher may add a time condition that her own mobile terminal 5210 sends a message to the device 5230 of Michelle's mother only in a case in which the identification information of the registered BLE device 5220 carried by the kindergartener Michelle is received at 9-12 AM.

Therefore, according to various embodiments of the present disclosure, the mobile terminal 5210 may perform a function corresponding to the identification information of the registered BLE device 5220 in consideration of a time when the identification information of the registered BLE device 5220 is received.

Referring to FIG. 52C, Michelle's mother who has sent Michelle to the kindergarten may confirm the message (e.g., "Michelle has arrived at a kindergarten") automatically sent by the mobile terminal 5210 of the kindergarten teacher through her device 5230 at home.

Figure 53:
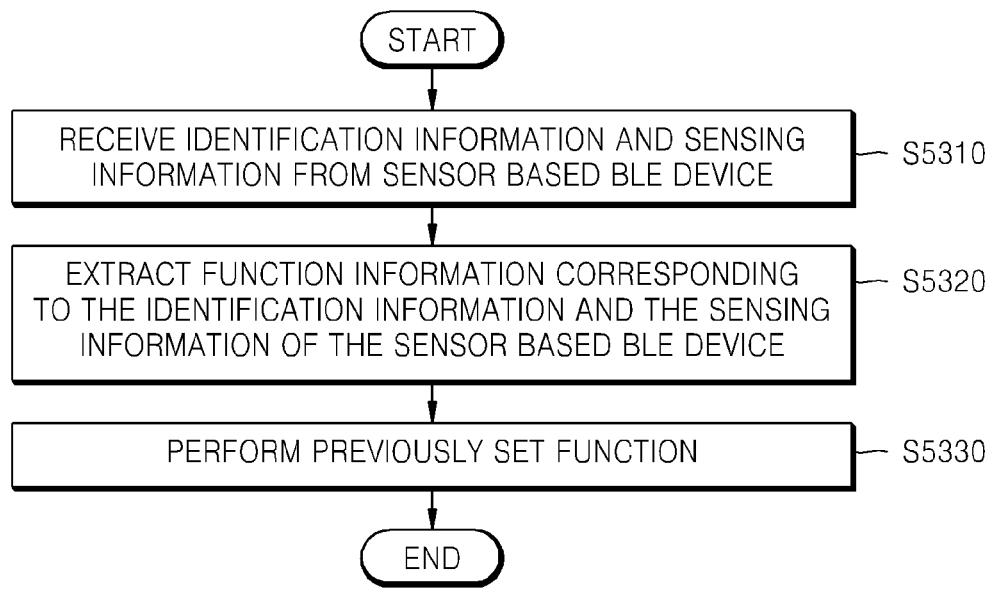
FIG. 53 is a flowchart illustrating a method of controlling a function of a mobile terminal by using a sensor based BLE device according to an embodiment of the present disclosure.

FIG. 53 is a flowchart illustrating a method of controlling a function of mobile terminal by using a sensor based BLE device according to an embodiment of the present disclosure.

At operation S5310, the mobile terminal 100 may receive identification information and sensing information from the sensor based BLE device. For example, in a case in which the mobile terminal 100 comes within a communication range of the sensor based BLE device, the mobile terminal 100 may receive the identification information (e.g., a device ID, an S/N, and a MAC address) and the sensing information from the sensor based BLE device.

The sensing information means information about a property detected by the sensor based BLE device through a sensor. For example, according to various embodiments of the present disclosure, the sensing information may include motion information, weight information, illuminance information, temperature information, humidity information, acceleration information, proximity information, and/or the like. However, various embodiments of the present disclosure are not limited thereto. In addition, according to various embodiments of the present disclosure, the motion information may include a motion pattern, a motion frequency, a motion occurrence time, a motion speed, a motion direction, and/or the like. However, various embodiments of the present disclosure are not limited thereto.

According to various embodiments of the present disclosure, the mobile terminal 100 may receive the sensing information from the sensor based BLE device according to a previously set period. In this regard, the previously set period may be changed.

Meanwhile, according to various embodiments of the present disclosure, the mobile terminal 100 may receive the identification information and the sensing information of the sensor based BLE device in advertising packet form. For example, in a case in which the sensor based BLE device is a tag having a blue color and including a temperature sensor, the mobile terminal 100 may receive the identification information (e.g., "SAMSUNG_Temp_TAG001_blue") of the sensor based BLE device included in a UUID field of the advertising packet or in an MSD field thereof. In addition, the mobile terminal 100 may receive the sensing information (e.g., "0X06000024" in a case in which a current temperature measured by the temperature sensor is 36° C.) included in the MSD field of the advertising packet.

According to various embodiments of the present disclosure, in a case in which the mobile terminal 100 receives the identification information from the sensor based BLE device, the mobile terminal 100 may compare the received identification information of the sensor based BLE device and a list of registered BLE devices previously stored in the memory 160 and determine whether the sensor based BLE device that transmits the identification information is one of the list of registered BLE devices.

At operation S5320, the mobile terminal 100 may extract function information corresponding to the identification information and the sensing information of the sensor based BLE device. For example, the mobile terminal 100 may compare the received identification information and the sensing information of the sensor based BLE device and a previously set function information list stored in the memory 160 and extract the function information. According to various embodiments of the present disclosure, the previously set function information list may have a form of a table to which the identification information (e.g., BLE_temp_Item001) of the sensor based BLE device, a reference sensing value (e.g., 2 rotations), a previously set function (e.g., a call connection function), the other party's phone number (e.g., 010-1234-1234), and the like are mapped (see FIG. 50).

At operation S5330, the mobile terminal 100 may perform a previously set function corresponding to the identification information and the sensing information of the sensor based BLE device. In this regard, the mobile terminal 100 may extract an application for performing the previously set function. The mobile terminal 100 may execute the extracted application to perform the previously set function.

Therefore, according to various embodiments of the present disclosure, even though the user does not personally manipulate the mobile terminal 100, the user may remotely control the mobile terminal 100 to perform the previously set function by using the sensor based BLE device. This will be described in more detail with reference to FIGS. 54 and 55.

Figure 54A:
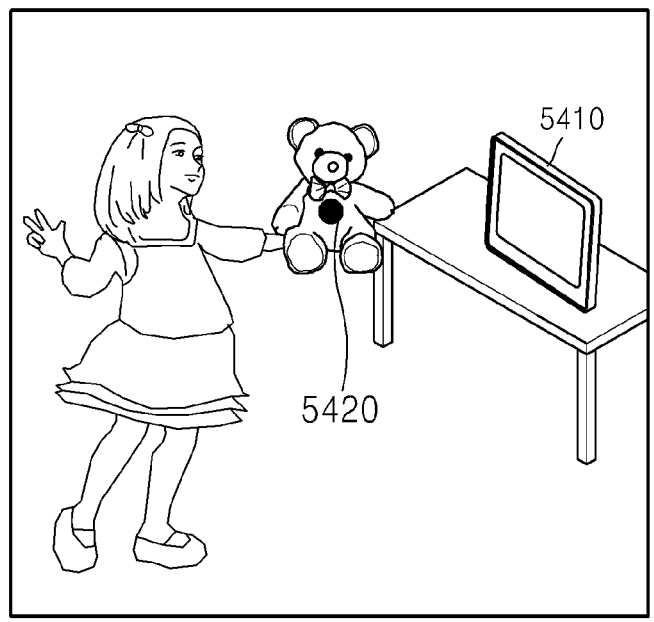
FIGS. 54A and 54B are diagrams for explaining a method of automatically connecting a call by using a sensor based BLE device according to an embodiment of the present disclosure.
Figure 54B:
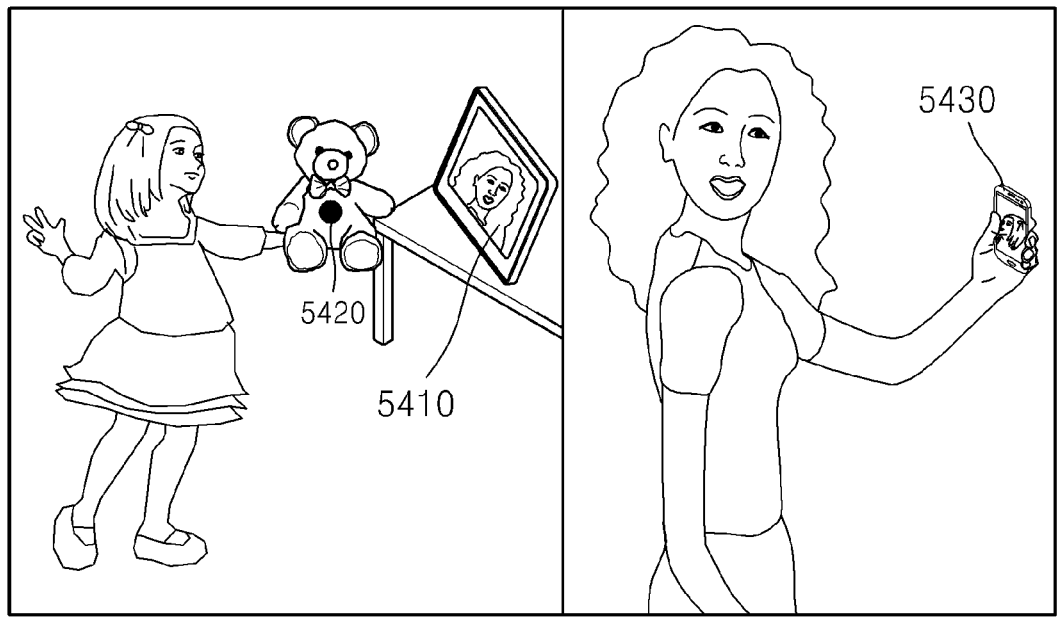

FIGS. 54A and 54B are diagrams for explaining a method of automatically connecting a call by using a sensor based BLE device according to an embodiment of the present disclosure.

An example of a case in which identification information (e.g., BLE_motion_001) of a motion sensor based BLE device 5420 and a reference motion value (e.g., 2 shakes) are mapped to a call connection function and stored in a mobile terminal 5410 of a user (e.g., Michelle). in such a manner that a call of the mobile terminal 5410 of the user (e.g., Michelle) is connected to a previously set external device (e.g., a device 5430 of Michelle's mother) in a case in which the user (e.g., Michelle) shakes a doll, to which the motion sensor based BLE device 5420 is attached, twice will now be described as shown in FIGS. 48A, 48B, 48C, 48D, and 48E.

Referring to FIG. 54A, the motion sensor based BLE device 5420 attached to the doll may detect a motion of the doll through a motion sensor. The motion sensor based BLE device 5420 may broadcast the detected motion information and identification information (e.g., BLE_motion_001) in advertising data packet form. For example, the motion sensor based BLE device 5420 may include the motion information in an MSD field, include the identification information (e.g., BLE_motion_001) in a UUID field or the MSD field, and broadcast the motion information and the identification information.

For example, in the case in which the user (e.g., Michelle) shakes the doll twice, the mobile terminal 5410 of the user (e.g., Michelle) disposed within a communication range of the motion sensor based BLE device 5420 may receive the motion information (e.g., 2 shakes) and the identification information (e.g., BLE_motion_001) broadcast by the motion sensor based BLE device 5420. In this regard, the mobile terminal 5410 of the user (e.g., Michelle) may extract a "call connection function" corresponding to the received motion information (e.g., 2 shakes) and identification information (e.g., BLE_motion_001) from a previously set function information list.

Referring to FIG. 54B, the mobile terminal 5410 of the user (e.g., Michelle) may perform the extract call connection function. Thus, the mobile terminal 5410 of the user (e.g., Michelle) may execute a call application and request a call connection to the device 5430 of Michelle's mother by using a previously stored phone number. According to various embodiments of the present disclosure, even a user who is not accustomed to using the mobile terminal 5410 or has a difficulty in using the mobile terminal 5410 may easily control the function of the mobile terminal 5410 remotely.

Figure 55A:
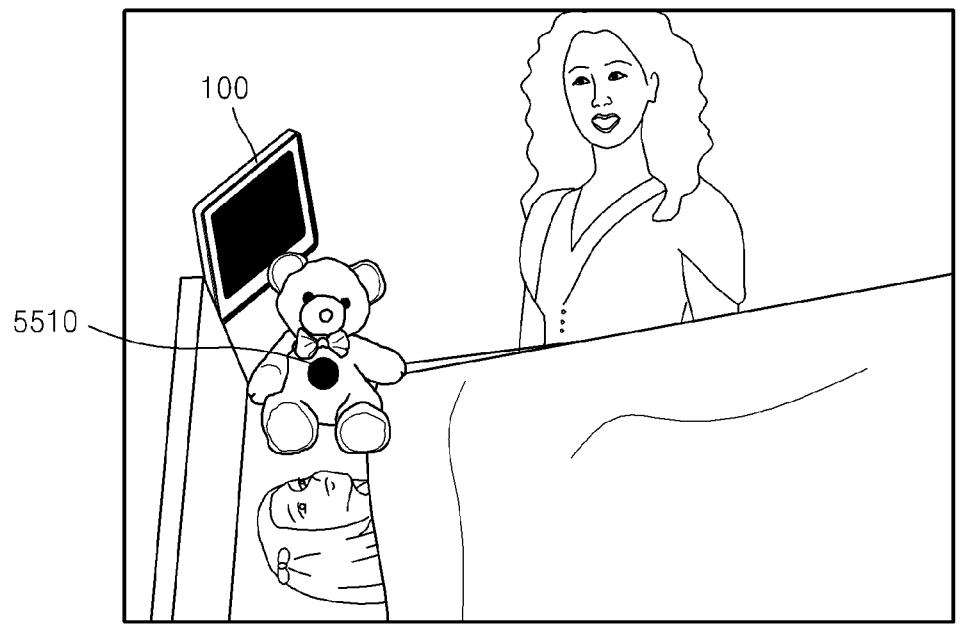
FIGS. 55A and 55B are diagrams for explaining a method of automatically playing content by using an illuminance sensor based BLE device according to an embodiment of the present disclosure.
Figure 55B:
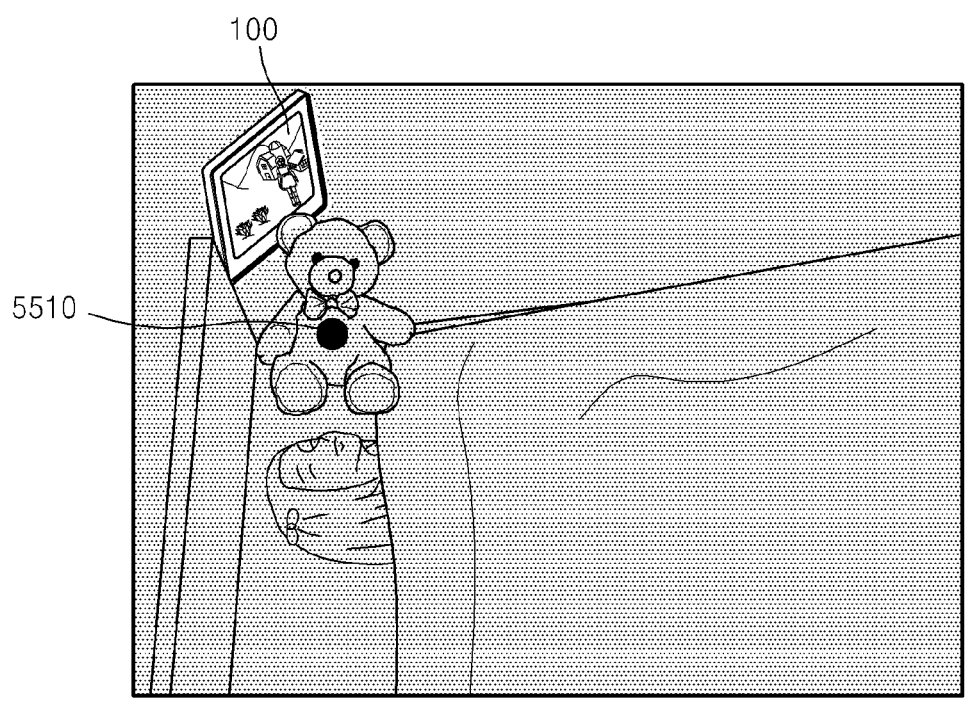

FIGS. 55A and 55B are diagrams for explaining a method of automatically playing content by using an illuminance sensor based BLE device according to an embodiment of the present disclosure.

An example of a case in which identification information (e.g., BLE_light_Item_005) of the illuminance sensor based BLE device 5510 and a reference illuminance value (e.g., lower than 100 lux) are mapped to a Snow White moving picture playback function and stored in the mobile terminal 100 of a user in such a manner that the mobile terminal 100 of the user plays previously set content (e.g., a moving picture "Snow White") in a case in which the user darkens surroundings of a doll to which the illuminance sensor based BLE device 5510 is attached will now be described as FIGS. 49A, 49B, 49C, 49D, and 49E.

Referring to FIG. 55A, the illuminance sensor based BLE device 5510 attached to the doll may detect the illuminance of surroundings through an illuminance sensor. The illuminance sensor based BLE device 5510 may broadcast detected illumination information and identification information (e.g., BLE_light_Item_005) in advertising data packet form. For example, the illuminance sensor based BLE device 5510 may include the illumination information in an MSD field, include the identification information (e.g., BLE_light_Item_005) in a UUID field or the MSD field, and broadcast the illumination information and the identification information.

For example, in a case in which the user (e.g., Michelle's mother) turns a light off in the room, the mobile terminal 100 of the user (e.g., Michelle's mother) disposed within a communication range of the illuminance sensor based BLE device 5510 may receive the illumination information (e.g., 50 lux) and the identification information (e.g., BLE_light_Item_005) broadcast by the illuminance sensor based BLE device 5510. In this regard, the mobile terminal 100 of the user (e.g., Michelle's mother) may extract the "Snow White moving picture playback function" corresponding to the received illuminance information (e.g., 50 lux) and identification information (e.g., BLE_light_Item_005) from a previously set function information list.

Referring to FIG. 55B, the mobile terminal 100 of the user (e.g., Michelle's mother) may execute an e-Book application and automatically play Snow White moving picture content. For example, according to various embodiments of the present disclosure, the mobile terminal 100 of the user (e.g., Michelle's mother) may automatically play a moving picture even without any special manipulation by the user (e.g., Michelle's mother) if the user (e.g., Michelle's mother) turns the light off in the room to make the illuminance lower than the reference illuminance value.

According to various embodiments of the present disclosure, the mobile terminal 100 may play content additionally in consideration of time information regarding a time when the identification information of the illuminance sensor based BLE device 5510 and sensing information are received. For example, even though the light is turned off in the room and the illuminance information received from the illuminance sensor based BLE device 5510 is lower than 100 lux, the mobile terminal 100 may play the content only between at 20 and at 22.

Meanwhile, in a case in which the time when the identification information of the illuminance sensor based BLE device 5510 and the sensing information are received is between 20 hours and 21 hours, the mobile terminal 100 may play the moving picture "Snow White", and in a case in which the time when the identification information of the illuminance sensor based BLE device 5510 and the sensing information are received is between 21 hours and 22 hours, the mobile terminal 100 may play a moving picture "Sleeping Beauty".

Figure 56:
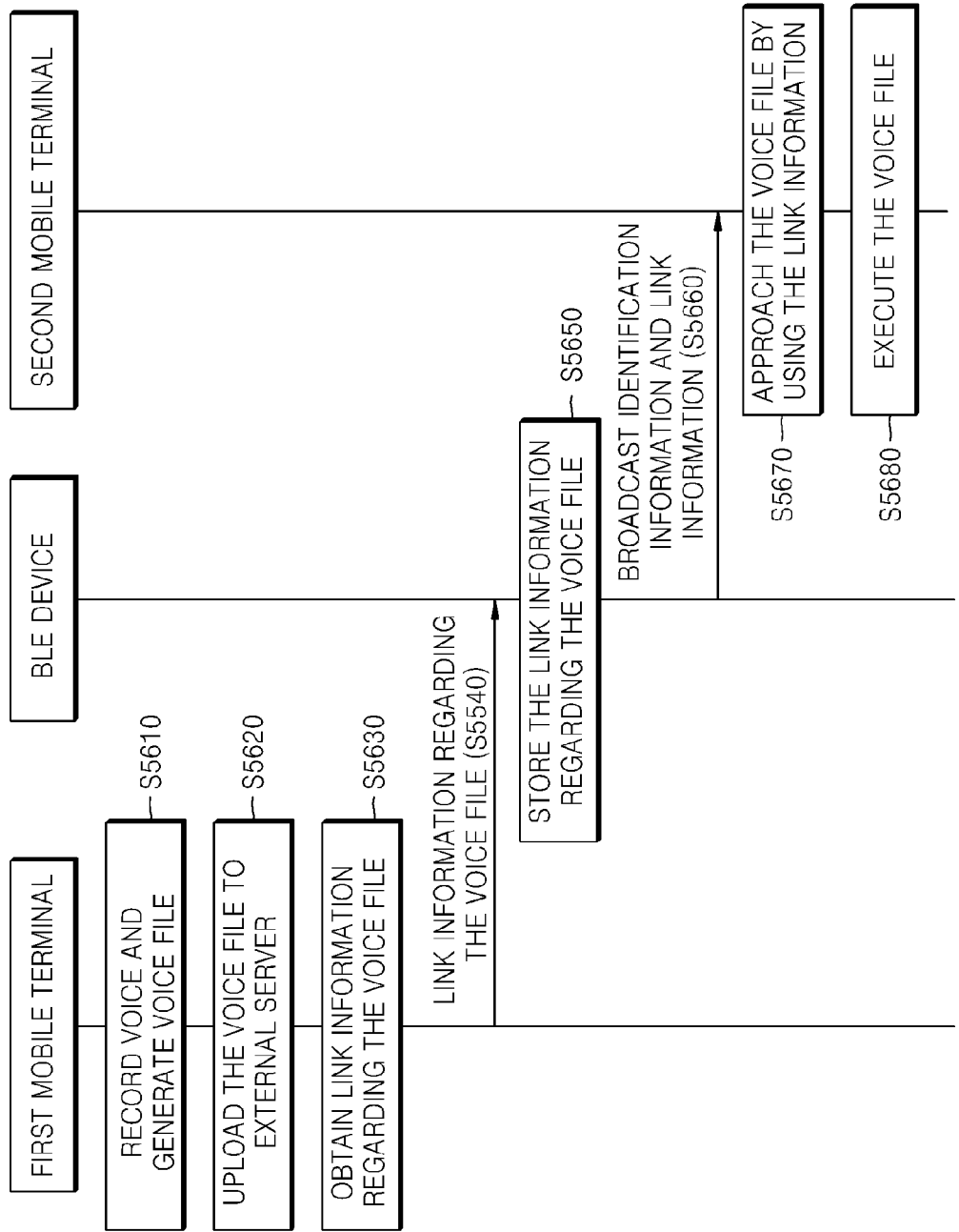
FIG. 56 is a flowchart illustrating a method of executing a voice file by using a registered BLE device according to an embodiment of the present disclosure.

FIG. 56 is a flowchart illustrating a method of executing a voice file by using a registered BLE device according to an embodiment of the present disclosure.

Referring to FIG. 56, at operation S5610, a first mobile terminal may record a voice input from a user and generate the voice file.

At operation S5620, the first mobile terminal may upload the generated voice file to an external server.

At operation S5630, the first mobile terminal may obtain link information (e.g., URI: Uniform Resource Identifier) regarding the voice file uploaded to the external server.

At operation S5640, the first mobile terminal may transmit the link information regarding the voice file to the registered BLE device.

At operation S5650, the registered BLE device may store the link information regarding the voice file received from the first mobile terminal.

At operation S5660, the registered BLE device may broadcast identification information and the link information regarding the voice file in advertising packet form. For example, the registered BLE device may include the identification information and the link information regarding the voice file in a UUID field of the advertising packet or in an MSD field thereof and may broadcast the identification information and the link information.

In this regard, in a case in which a second mobile terminal is disposed within a communication range of the registered BLE device, the second mobile terminal may receive the identification information and link information regarding the voice file broadcast by the registered BLE device.

At operation S5670, the second mobile terminal may approach the voice file by using the link information received from the registered BLE device.

At operation S5680, the second mobile terminal may execute the voice file. The second mobile terminal may execute the voice file uploaded to the external server in a downloading manner or in a streaming manner.

Figure 57B:
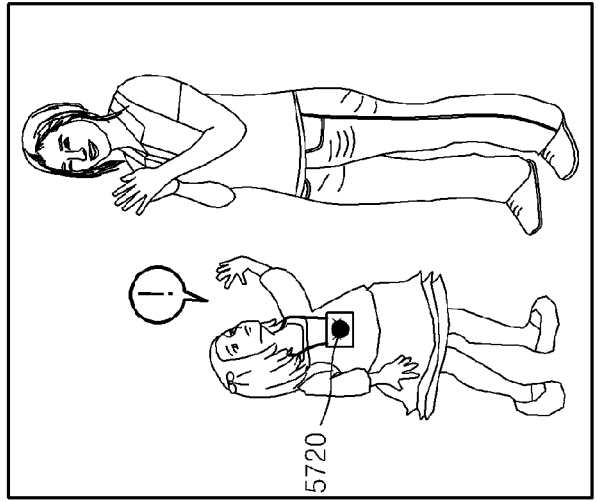
FIGS. 57A, 57B, and 57C are diagrams illustrating a process of executing a voice file recorded by others by using a registered BLE device according to an embodiment of the present disclosure.
Figure 57A:
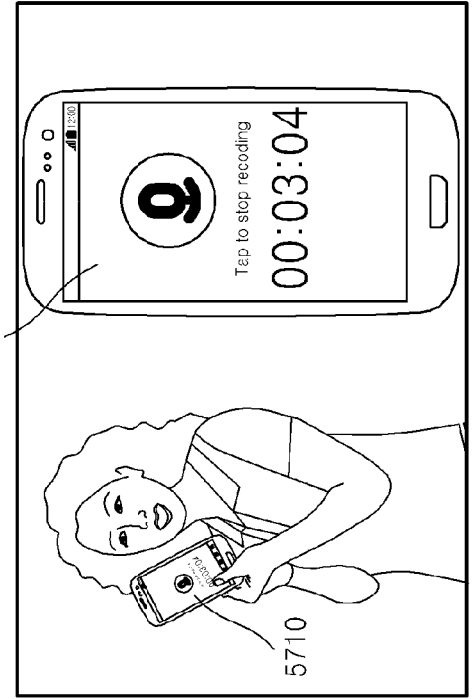
Figure 57C:
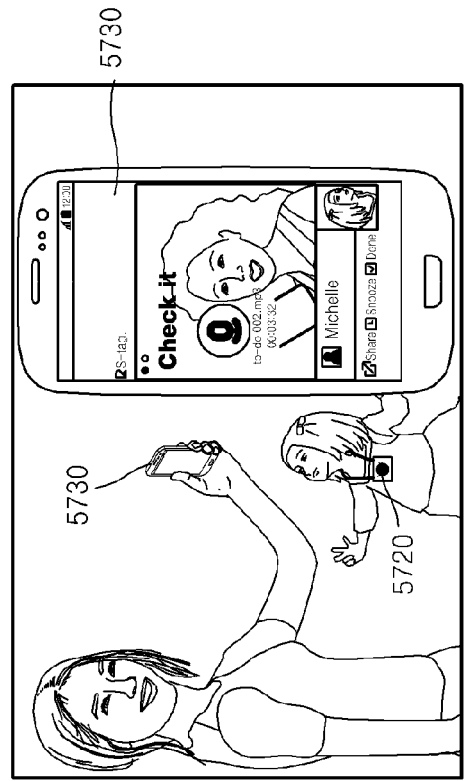

FIGS. 57A, 57B, and 57C are diagrams illustrating a process of executing a voice file recorded by others by using a registered BLE device according to an embodiment of the present disclosure.

Referring to FIG. 57A, a user (e.g., Michelle's mother) of a first mobile terminal 5710 may input a user's voice in the first mobile terminal 5710. For example, the Michelle's mother may input a voice "please get Michelle to take cold medicine" in her mobile terminal 5710. In this case, the first mobile terminal 5710 may record the voice input from the Michelle's mother, generate the voice file, and upload the generated voice file to an external server. The first mobile terminal 5710 may obtain link information (e.g., URI: Uniform Resource Identifier) regarding the voice file uploaded to the external server and record the link information in the registered BLE device 5720 carried by Michelle.

Referring to FIG. 57B, in a case in which Michelle who is carrying the registered BLE device 5720 arrives at a kindergarten, a second mobile terminal 5730 carried by a kindergarten teacher may receive the link information regarding the voice file recorded by Michelle's mother from the registered BLE device 5720 carried by Michelle.

In this regard, according to various embodiments of the present disclosure, the second mobile terminal 5730 may receive identification information of the registered BLE device 5720 carried by Michelle and the link information regarding the voice file recorded by Michelle's mother in advertising packet form. For example, the second mobile terminal 5730 may receive the identification information and the link information of the registered BLE device 5720 that are included in a UUID field of the advertising packet or in an MSD field thereof.

Referring to FIG. 57C, the second mobile terminal 5730 carried by the kindergarten teacher may approach the voice file uploaded to the external server by using the link information received from the registered BLE device 5720. The second mobile terminal 5730 may reproduce the voice file "please get Michelle to take cold medicine" recorded by Michelle's mother. In this regard, the second mobile terminal 5730 may reproduce the voice file uploaded to the external server in a downloading manner or in a streaming manner.

Figure 58:
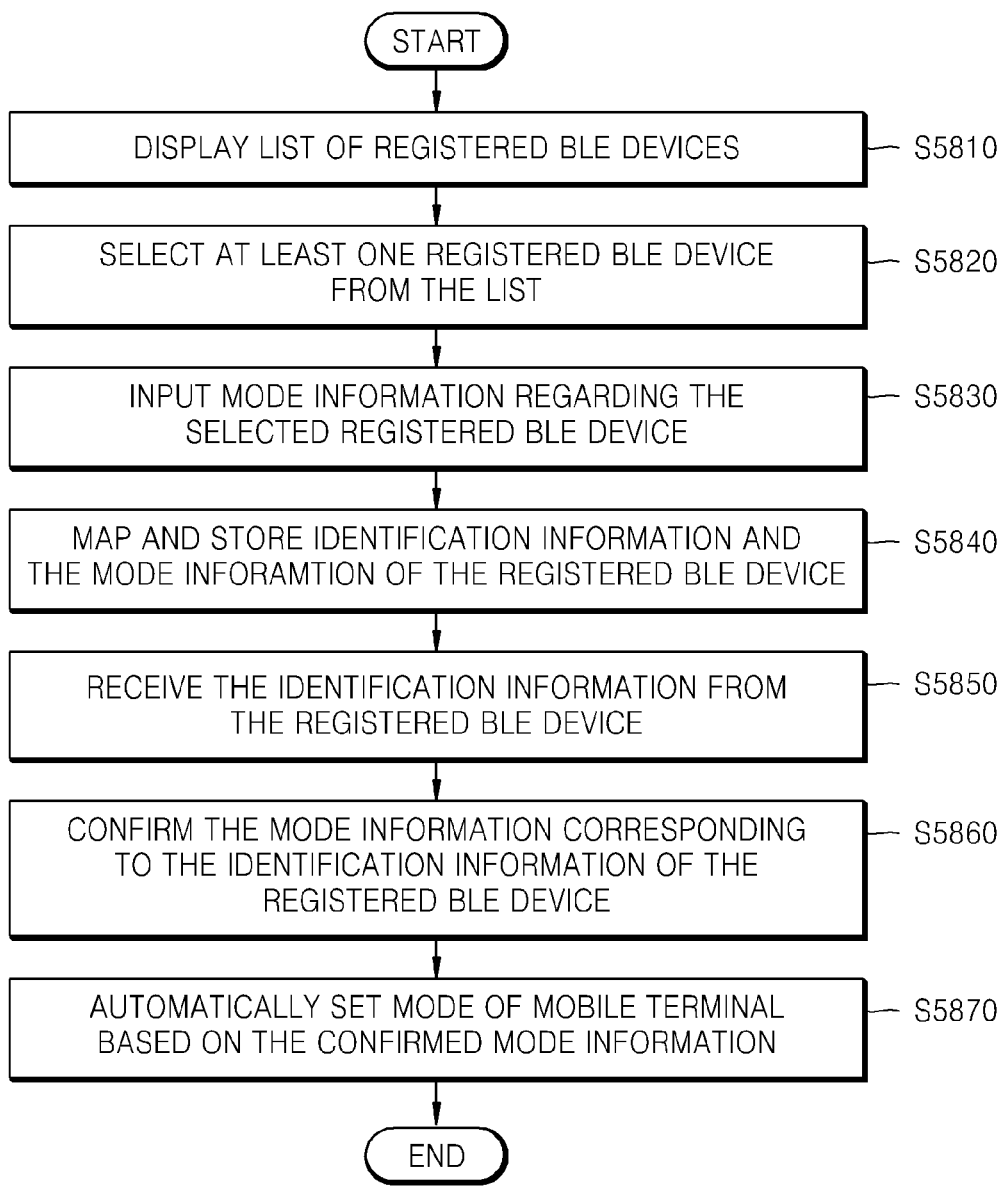
FIG. 58 is a flowchart illustrating a method of setting a mode of a mobile terminal according to an embodiment of the present disclosure.

FIG. 58 is a flowchart illustrating a method of setting a mode of a mobile terminal according to an embodiment of the present disclosure.

At operation S5810, the mobile terminal 100 may display a list of registered BLE devices. For example, in a case in which a user input that requests the list of registered BLE devices list is received, the mobile terminal 100 may display a list of previously registered BLE devices on a screen. In this regard, the mobile terminal 100 may configure and display the list of registered BLE devices, which includes an ID, a nickname, and category information which are input by a user to easily identify the registered BLE devices.

At operation S5820, the mobile terminal 100 may receive a selection of at least one registered BLE device from the list of registered BLE devices. For example, the mobile terminal 100 may detect a tap gesture, which is applied by the user, or a swipe gesture, a flick gesture, and/or the like, or recognize a voice command of the user, so as to select the at least one registered BLE device from among the list of registered BLE devices.

At operation S5830, the mobile terminal 100 may receive an input of mode information regarding the registered BLE device selected by the user.

According to various embodiments of the present disclosure, the mode information may mean information regarding a mode set for the mobile terminal in a case in which the mobile terminal 100 comes within (or goes beyond) a communication range of the registered BLE device. According to various embodiments of the present disclosure, the mode may include a Wi-Fi On/Off mode, a Bluetooth ON/OFF mode, a sound ON/OFF mode, a vibration mode, an airplane mode, a driving mode, a data transmission/reception mode (e.g., a synchronization mode), a brightness control mode, and/or the like. However, various embodiments of the present disclosure are not limited thereto.

According to various embodiments of the present disclosure, the mobile terminal 100 may receive an input of a single piece of mode information regarding a single registered BLE device or an input of the same mode information regarding a plurality of registered BLE devices. Meanwhile, the mobile terminal 100 may receive an input of a plurality of pieces of mode information regarding a single registered BLE device. In this regard, according to various embodiments of the present disclosure, the mobile terminal 100 may receive the input of the plurality of pieces of mode information regarding the single registered BLE device, which are classified with respect to time. For example, the user may classify and set the plurality of mode information regarding the single registered BLE device as morning/afternoon, morning/noon/evening, 7-9 AM/11-12 AM/3-5 PM/8-10 PM, or the like. However, various embodiments of the present disclosure are not limited thereto.

At operation S5840, the mobile terminal 100 may map and store identification information and the mode information of the registered BLE device in the memory 160. According to various embodiments of the present disclosure, the mobile terminal 100 may further map and store the mode information and property information (e.g., color information regarding an appearance, shape information, sensor information, and/or the like) of the registered BLE device in the memory 160. In addition, the mobile terminal 100 may further map and store the mode information and user additional information (e.g., an ID, a nickname, a category, a memo, and/or the like set by the user) in the memory 160.

Meanwhile, in a case in which the user changes the mode setting with respect to the registered BLE device, the mobile terminal 100 may update the mode information regarding the registered BLE device stored in the memory 160.

At operation S5850, in a case in which the mobile terminal 100 comes within the communication range of the registered BLE device, the mobile terminal 100 may receive identification information from the registered BLE device. For example, in a case in which the user carries the mobile terminal 100 and comes within the communication range of the registered BLE device, the mobile terminal 100 may receive the identification information (e.g., a device ID, an S/N, and a MAC address) of the registered BLE device broadcast by the registered BLE device.

According to various embodiments of the present disclosure, the mobile terminal 100 may receive the identification information of the registered BLE device in advertising packet form. For example, the mobile terminal 100 may receive the identification information (e.g., BLE_motion_003) of the registered BLE device included in a UUID field of the advertising packet or in an MSD field thereof.

At operation S5860, the mobile terminal 100 may confirm the mode information corresponding to the identification information of the registered BLE device. For example, the mobile terminal 100 may search for a mode information list by using the identification information of the registered BLE device. In this regard, the mobile terminal 100 may extract at least one piece of mode information that is stored after being mapped with the identification information of the registered BLE device.

According to various embodiments of the present disclosure, the mobile terminal 100 may extract the mode information corresponding to the identification information of the registered BLE device from the memory 160, and may receive the mode information from an external server (e.g., a cloud server) linked to the mobile terminal 100.

At operation S5870, the mobile terminal 100 may automatically set the mode of the mobile terminal 100 based on the confirmed mode information. According to various embodiments of the present disclosure, the mobile terminal 100 may change a communication mode based on the confirmed mode information. According to various embodiments of the present disclosure, the communication mode may include a Wi-Fi mode, a Bluetooth mode, a global positioning system (GPS) mode, and/or the like. However, various embodiments of the present disclosure are not limited thereto.

For example, in a case in which identification information of a registered BLE device attached to a porch door of a house and a Wi-Fi enable mode are mapped with each other, the mobile terminal 100 may enable a Wi-Fi module when receiving the identification information of the registered BLE device attached to the porch door of the house.

In contrast, in a case in which the identification information of the registered BLE device attached to the porch door of the house and a Wi-Fi disable mode are mapped with each other, the mobile terminal 100 may disable the Wi-Fi module when receiving the identification information of the registered BLE device attached to the home porch door.

In addition, in a case in which the identification information of the registered BLE device attached to the home porch door and a Bluetooth enable mode or a GPS disable mode are mapped with each other, the mobile terminal 100 may enable a Bluetooth module or disable a GPS module when receiving the identification information of the registered BLE device attached to the porch door of the house.

Meanwhile, according to various embodiments of the present disclosure, the mobile terminal 100 may change the mode of the mobile terminal 100 to a more accurate mode by using location information (e.g., GPS information or Wi-Fi information, and/or the like) of the mobile terminal 100 as well as the identification information of the registered BLE device.

According to various embodiments of the present disclosure, the mobile terminal 100 may adjust a sound output mode or a vibration mode of the mobile terminal 100 according to the confirmed mode information. For example, in a case in which identification information of a registered BLE device attached to an office desk and the vibration mode are mapped with each other, the mobile terminal 100 may change the sound output mode to the vibration mode when receiving the identification information of the registered BLE device attached to the office desk. In addition, the mobile terminal 100 may adjust a sound output intensity or a vibration intensity of the mobile terminal 100 based on the confirmed mode information.

According to various embodiments of the present disclosure, the mobile terminal 100 may set the mode of the mobile terminal 100 as the airplane mode or the driving mode based on the confirmed mode information. In the airplane mode, the mobile terminal 100 may automatically block a communication connection. In the driving mode, the mobile terminal 100 may automatically execute a navigation application.

According to various embodiments of the present disclosure, the mobile terminal 100 may set the data transmission and reception mode that transmits and receives data to and from a previously determined external device based on the confirmed mode information. For example, in a case in which identification information of a registered BLE device attached to a study and the data transmission and reception mode are mapped with each other, the mobile terminal 100 may transmit and receive data to and from a previously determined external device (e.g., a personalized server) and automatically synchronize data when receiving the identification information of the registered BLE device attached to the study.

Meanwhile, in a case in which a plurality of pieces of mode information regarding a single registered BLE device exist, according to various embodiments of the present disclosure, the mobile terminal 100 may set the mode of the mobile terminal 100 additionally in consideration of time information regarding a time when the identification information of the registered BLE device is received.

For example, first mode information (in a case in which the identification information is received at 7:30 AM, "the Wi-Fi disable mode and the vibration mode are set"), second mode information (in a case in which the identification information is received at 4:00 PM, "the Wi-Fi enable mode is set"), and third mode information (in a case in which the identification information is received at 9:00 PM, "the sound output mode is set") may be mapped with identification information (e.g., TAG S/N: SAMSUNG_BLE_Item101) of a single registered BLE device attached to a porch door. In this regard, in a case in which the user carries the mobile terminal 100 and comes in an office at 7:30 AM, the mobile terminal 100 may disable the Wi-Fi module and change the sound output mode to the vibration mode based on the first mode information when receiving the identification information of the single registered BLE device attached to the porch door.

Figure 59A:
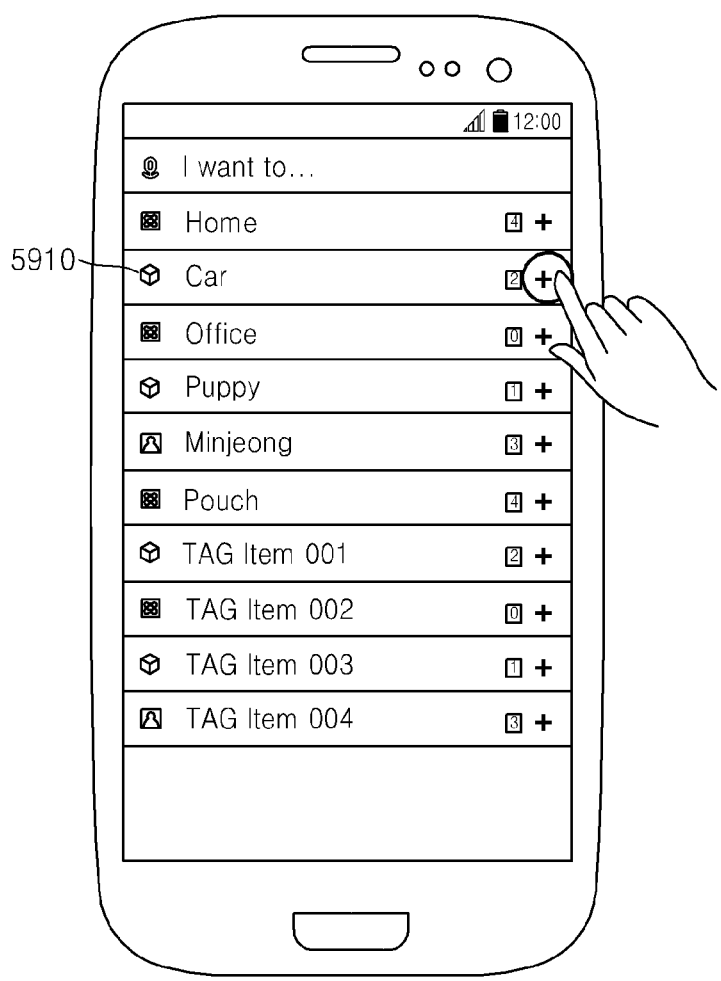
FIGS. 59A, 59B, and 59C are diagrams illustrating a mode setting screen according to an embodiment of the present disclosure.
Figure 59B:
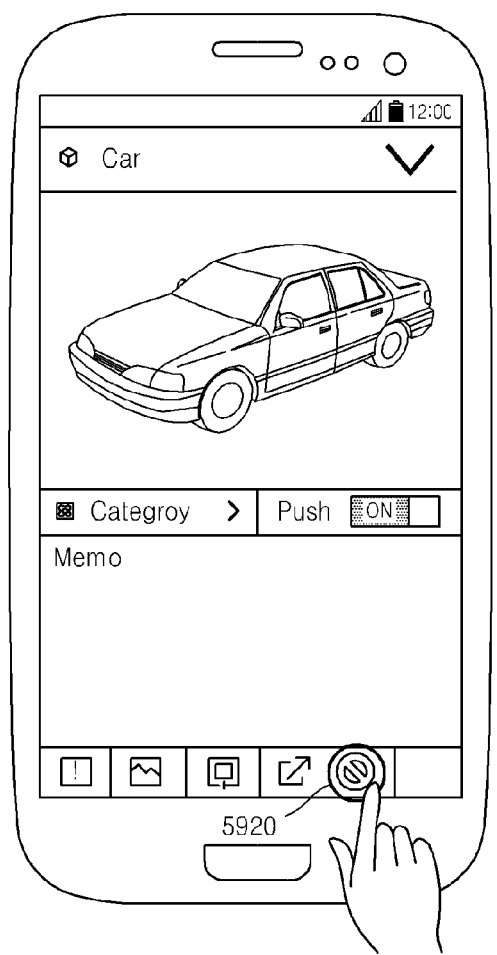
Figure 59C:
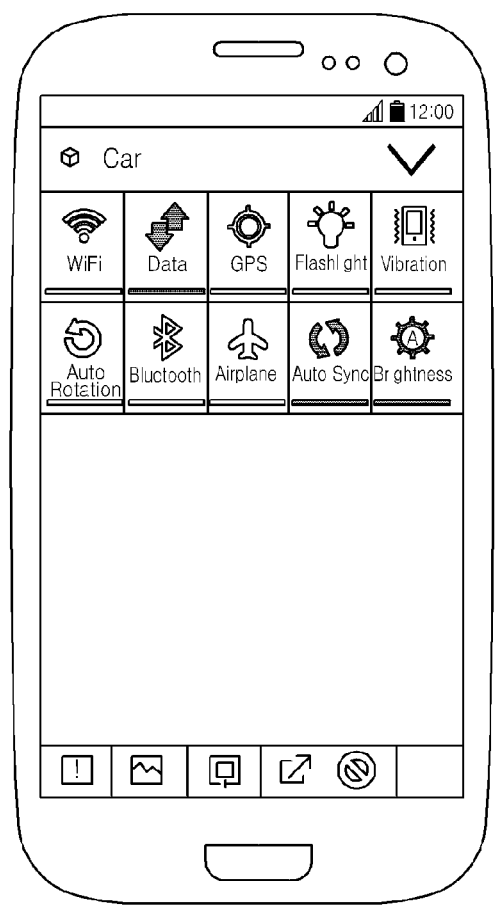

FIGS. 59A, 59B, 59C are diagrams illustrating a mode setting screen according to an embodiment of the present disclosure.

Referring to FIG. 59A, the mobile terminal 100 may provide a list of registered BLE devices. In this regard, the mobile terminal 100 may detect a user selection of a registered BLE device 5910 attached to a car from among the list of registered BLE devices.

Referring to FIG. 59B, the mobile terminal 100 may provide profile information of the registered BLE device 5910 attached to the car in response to the user selection. The profile information may include at least one of unique identification information (e.g., a device ID, an S/N, and a MAC address), property information (e.g., appearance color information, image information, and sensor information), and additional user information (e.g., an ID, a nickname, a category, and a memo which are set by the user). According to various embodiments of the present disclosure, the mobile terminal 100 may provide a mode setting button 5920 as well as the profile information of the registered BLE device 5910 attached to the car.

Referring to FIG. 59C, the mobile terminal 100 may provide a mode setting window in a case in which a user selects the mode setting button 5920. The user may map the mode setting window and the registered BLE device 5910 attached to the car and select a mode of the mobile terminal 100 that is to be set. For example, the user may select a GPS mode. In this case, the mobile terminal 100 may map and store identification information of the registered BLE device 5910 attached to the car and the GPS mode in the memory 160 as mode information of the registered BLE device 5910 attached to the car.

In a case in which the identification information of the registered BLE device 5910 attached to the car is received later, the mobile terminal 100 may automatically enable a GPS module.

In a case in which the identification information of the registered BLE device 5910 attached to the car and a "Bluetooth enable mode", a "music application execution mode", and a "navigation execution mode" are mapped with each other, if the identification information of the registered BLE device 5910 attached to the car is received, the mobile terminal 100 may execute a Bluetooth module, a music application, and a navigation application. In this regard, according to various embodiments of the present disclosure, the mobile terminal 100 may receive the identification information of the registered BLE device 5910 attached to the car in advertising packet form. A data format of the advertising packet broadcasted by the BLE device 200 will now be described in more detail below.

Figure 60:
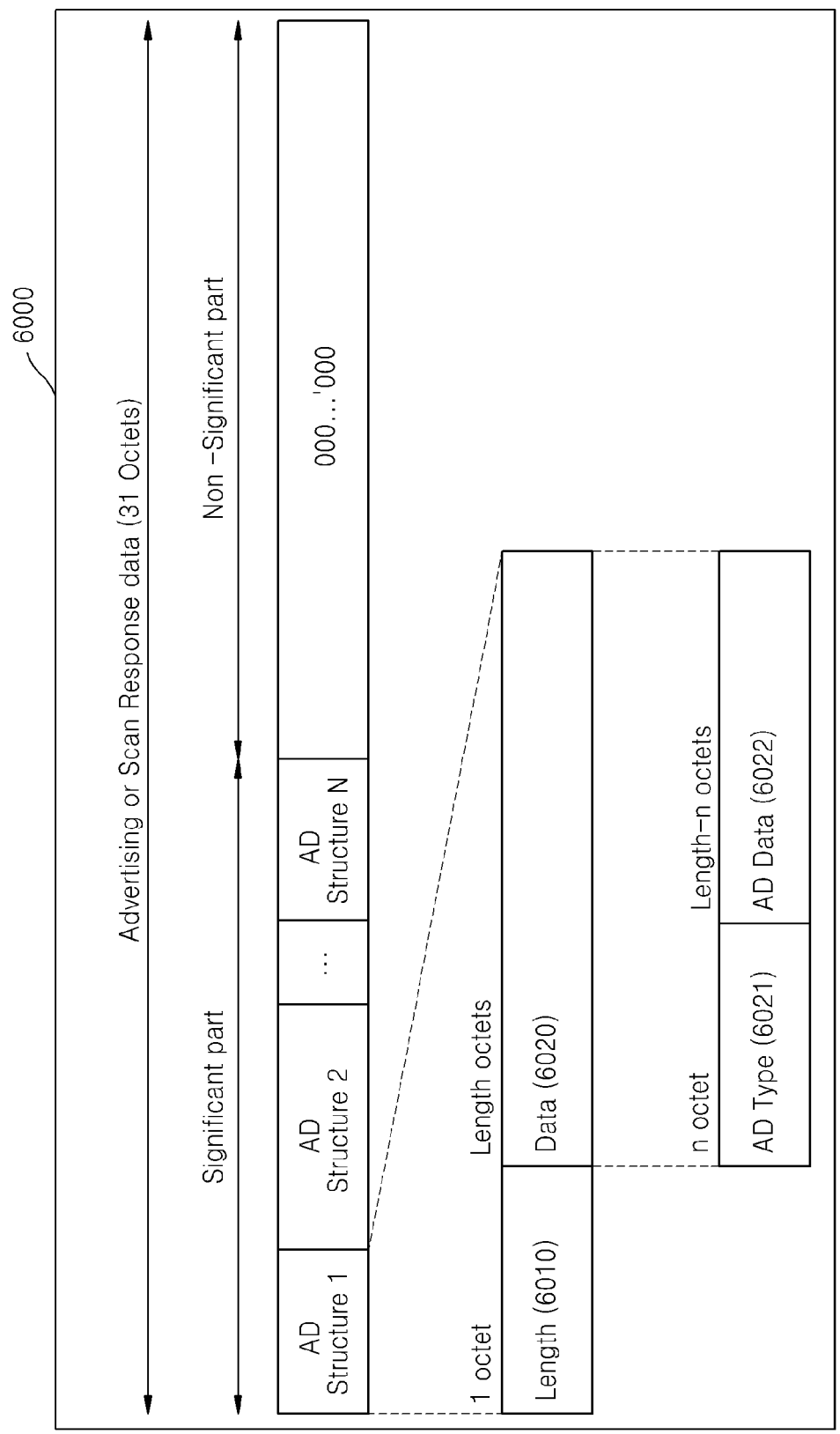
FIG. 60 is a diagram illustrating a data format of an advertising packet broadcasted by a BLE device according to an embodiment of the present disclosure.

FIG. 60 is a diagram illustrating a data format of an advertising packet broadcasted by the BLE device 200 according to an embodiment of the present disclosure.

Referring to FIG. 60, the data format 6000 shows a payload excluding a header of the advertising packet broadcasted by the BLE device 200. According to various embodiments of the present disclosure, advertising data (hereinafter referred to as "AD") included in the payload of the advertising packet may be composed of 31 octets (Bytes).

Meanwhile, according to various embodiments of the present disclosure, a plurality of AD structures may be included in the payload of the advertising packet, and each of the plurality of AD structures may include a length part 6010 and a data part 6020. Information regarding a length of the data part 6020 may be included in the length part 6010. Substantial data that is to be broadcasted by the BLE device 200 may be included in the data part 6020.

In this regard, according to various embodiments of the present disclosure, the data part 6020 may include an AD type 6021 and AD data 6022. A value for identifying a type of the AD data 6022 may be included in the AD type 6021. The AD type 6021 will now be described in more detail with reference to FIG. 61.

FIG. 61 is a table for explaining an AD type according to an embodiment of the present disclosure.

Referring to FIG. 61, the AD type 6120 that may be included in an advertising data packet may be diverse. For example, the AD type 6120 may include <<Flags>>, <<Incomplete List of 16-bit Service Class UUIDs>>, <<Complete List of 16-bit Service Class UUIDs>>, <<Incomplete List of 32-bit Service Class UUIDs>>, <<Complete List of 32-bit Service Class UUIDs>>, <<Incomplete List of 128-bit Service Class UUIDs>>, <<Complete List of 128-bit Service Class UUIDs>>, <<Shortened Local Name>>, <<Complete Local Name>>, <<TX Power Level>>, <<Class of Device>>, <<Simple Pairing Hash C>>, <<Simple Pairing Randomizer R>>, <<Device ID>>, <<Security Manager TK Value>>, <<Security Manager Out of Band Flags>>, <<Slave Connection Interval Range>>, <<List of 16-bit Service Solicitation UUIDs>>, <<List of 128-bit Service Solicitation UUIDs>>, <<Service Data>>, <<Public Target Address>>, <<Random Target Address>>, <<Appearance>>, <<Manufacturer Specific Data>>, and the like.

Meanwhile, the AD type 6120 may be expressed as a previously set value 6110 that may be included in the advertising data packet in such a way that a scanner (e.g., the mobile terminal 100) may identify the AD type 6120. Meanwhile, one of ordinary skill in the art may obviously identify a definition 6130 of the AD type 6120 from a table of FIG. 61, and thus a detailed description of the definition 6130 of the AD type 6120 will be omitted here.

FIGS. 62A and 62B are tables for explaining data broadcasted by the BLE device 200 according to an embodiment of the present disclosure.

Referring to FIGS. 62A and 62B, the tables include information such as necessary AD type 6210, an indication of a byte 6220, a purpose 6230, and an embodiment 6240.

The BLE device 200 may broadcast necessary data by using a specific AD type. For example, in a case in which the BLE device 200 is a smart phone manufactured by Samsung Electronics Co., Ltd., the BLE device 200 may include and broadcast TX Power Level (e.g., +4 dBm), Shortened Local Name (e.g., GT-N8000, Samsung Mobile), Class of Device (e.g., Major: Phone, Minor: Smart phone, Service: Object Transfer), Random Target Address (e.g., Samsung Mobile), List of Service Solicitation (e.g., 0X1105), Manufacturer Specific Data<<Protocol>> (e.g., 0X0075: a previously defined code indicating Samsung Electronics), Manufacturer Specific Data<<Capability>> (e.g., OX00ff: Bluetooth BR/EDR, Bluetooth AMP, Bluetooth LE, WiFi, WiFi Direct, WiFi Display, DLSN (All-share), NFC, RFID support), Manufacturer Specific Data<<Sensor>> (e.g., 0X06000024: Temperature 36° C.), and Manufacturer Specific Data<<Others>> (e.g., Silent mode, Screen Rotation, Power Saving, Notification, Mobile Data, Driving mode, Sync mode, Privacy/Flight mode, and/or the like which indicate a current status of the BLE device 200) in an advertising data packet.

In this regard, because a length of AD is limited to 31 bytes, the BLE device 200 may broadcast only essential data by using an advertising data packet and additionally respond to optional data such as Local Name through SCAN_RSP. In addition, according to various embodiments of the present disclosure, the advertising data packet may further include an encryption field.

Meanwhile, according to various embodiments of the present disclosure, the BLE device 200 may broadcast property information (e.g., information regarding a sensor included in the BLE device 200 or appearance color information of the BLE device 200) through the advertising data packet.

For example, in a case in which the BLE device 200 is a blue tag including a temperature sensor, the BLE device 200 may include identification information (e.g., "SAMSUNG_Temp_TAG001_blue") indicating property information in a UUID field or an MSD field thereof and may broadcast the identification information.

According to various embodiments of the present disclosure, the BLE device 200 may include and broadcast sensing information measured by a sensor in an MSD field. For example, in a case in which the BLE device 200 includes the temperature sensor and a current temperature measured by the temperature sensor is 36° C., the BLE device 200 may include a code ("0X06000024") indicating that the temperature is 36° C. in the MSD <Sensor> field and may broadcast the code.

Meanwhile, according to various embodiments of the present disclosure, the BLE device 200 may use a random device address, instead of a Bluetooth device address BD_ADDR or a MAC address, for privacy. In addition, according to various embodiments of the present disclosure, the BLE device 200 may have been previously included in a White/Black list before broadcasting the advertising packet and may disregard a connect request sent by an apparatus of an address that is not allowed. In addition, the BLE device 200 may additionally perform an authentication operation on a scanner (e.g., the mobile terminal 100) through an internal and external server and reinforce security. In contrast, according to various embodiments of the present disclosure, the mobile terminal 100 may perform the authentication operation on the BLE device 200 through the internal and external server.

Meanwhile, according to various embodiments of the present disclosure, the BLE device 200 may adjust an advertising interval according to a state of the BLE device 200 such as stop, or move (walking or moving by vehicle, or the like) and increase connectivity to the mobile terminal 100. For example, the BLE device 200 may lengthen the advertising interval in a sleep mode and shorten the advertising interval while moving.

In addition, according to various embodiments of the present disclosure, the BLE device 200 may adjust a transmission (TX) power level for each status. For example, in a case in which the BLE device 200 broadcasts data requiring security, the BLE device 200 may reduce the transmission (TX) power level.

FIG. 63 is a diagram illustrating an example of an AD packet according to an embodiment of the present disclosure.

Referring to FIG. 63, the total length of AD is 29 bytes. If AD "0X0000FFFF040201FF030075FF0-3840A02303030384E5F54710809040102" is analyzed from the back thereof, the AD of 29 bytes may be divided into 6 AD structures.

In a first AD structure (①), "02" indicates a length (2 bytes) of an AD type and AD data, "01" indicates an AD type (Flags), and "04" indicates substantial data (LE and BR/EDR simultaneous availability (Host)).

In a second AD Structure (②), '09' indicates a length (9 bytes) of the AD type and the AD data, '08' indicates an AD type (Shortened Local Name), and '71 54 5F 4E 38 30 30 30' indicates substantial data (G T—N 8 0 0 0).

In a third AD Structure (③), '02' indicates a length (2 bytes) of the AD type and the AD data, '0A' indicates an AD type (Tx Power Level), and '84' indicates substantial data (132(+4 dBm)).

In a fourth AD Structure (④), '03' indicates a length (3 bytes) of the AD type and the AD data, 'FF' indicates an AD type (Manufacturer Specific Data), and '75 00' indicates substantial data (Company ID: 0X0075=Samsung Electronics).

In a fifth AD Structure (⑤), '03' indicates a length (3 bytes) of the AD type and the AD data, 'FF' indicates an AD type (Manufacturer Specific Data), and '01 02' indicates substantial data (Protocol ID: 0X0201).

In a sixth AD Structure (⑥), '04' indicates a length (4 bytes) of the AD type and the AD data, 'FF' indicates an AD type (Manufacturer Specific Data), and 'FF 00 00' indicates substantial data (Capability state: 0X0000FF=Bluetooth BR/EDR, Bluetooth AMP, Bluetooth LE, WiFi, WiFi Direct, WiFi Display, DLSN (All-share), NFC, RFID support).

The various embodiments of the present disclosure can be implemented in the form of executable program commands through a variety of computer means and recordable to non-transitory computer readable media. The non-transitory computer readable media may include solely or in combination, program commands, data files and data structures. The program commands recorded to the media may be components specially designed for the present disclosure or may be usable by one of ordinary skill in the art of computer software. The non-transitory computer readable record media include magnetic media such as a hard disk, a floppy disk, and a magnetic tape, optical media such as CD-ROM and DVD, magneto-optical media such as floppy disk and hardware devices such as ROM, RAM flash memory, and/or the like, specially designed to store and carry out programs. Program commands include not only machine language code generated by a complier but also high level code that can be used by an interpreter, or the like, which is executed by a computer.

While the present disclosure has been shown and described with reference to various embodiments thereof, it will be understood by those skilled in the art that various changes in form and details may be made therein without departing from the spirit and scope of the present disclosure as defined by the following claims and their equivalents.

What is claimed is:

1. A method of controlling a function of a mobile terminal, the method comprising:
    placing the mobile terminal within a communication range of a Bluetooth low energy (BLE) device previously registered in the mobile terminal;
    receiving identification information of the BLE device from the BLE device;
    extracting function information corresponding to the received identification information of the BLE device; and
    performing a previously set function corresponding to the extracted function information.

2. The method of claim 1, further comprising:
    receiving a user input for connecting at least one function supported by the mobile terminal with the BLE device; and
    mapping and storing the identification information of the BLE device and the at least one function based on the user input.

3. The method of claim 2,
    wherein the receiving of the user input comprises receiving a user input for connecting the BLE device with a plurality of functions, and
    wherein the mapping and storing of the identification information comprises mapping and storing the identification information of the BLE device and the plurality of functions.

4. The method of claim 3, wherein the receiving of the user input further comprises:
    receiving a user input for classifying and connecting the BLE device with the plurality of functions according to time.

5. The method of claim 1, wherein the previously set function comprises at least one of a text sending function, a call connection function, and a content playback function.

6. The method of claim 1, wherein the performing of the previously set function comprises:
    extracting an application for performing the previously set function; and
    executing the extracted application.

7. The method of claim 1, wherein the extracting of the function information comprises:
    receiving sensing information detected by the BLE device from the BLE device; and
    extracting the function information additionally in consideration of the received sensing information.

8. The method of claim 7, wherein the sensing information comprises at least one of motion information, weight information, illuminance information, temperature information, humidity information, acceleration information, and proximity information which are detected by the BLE device.

9. The method of claim 8, wherein the motion information comprises at least one of a motion pattern, a motion frequency, a motion occurrence time, a motion speed, and a motion direction.

10. The method of claim 1,
    wherein the extracting of the function information comprises confirming mode information corresponding to the identification information of the BLE device, and
    wherein the performing of the previously set function comprises automatically setting a mode of the mobile terminal based on the confirmed mode information.

11. The method of claim 10, wherein the automatic setting of the mode comprises:
    setting at least one of a communication mode related to a communication method of the mobile terminal, a sound output mode, a vibration mode, an airplane mode, a driving mode, and a data transmission/reception mode in which data is transmitted and received to and from a previously determined external device based on the confirmed mode information.

12. A non-transitory computer-readable storage medium storing instructions that, when executed, cause at least one processor to perform the method of claim 1.

13. A mobile terminal, comprising:
    a communication unit configured to, when the mobile terminal is disposed within a communication range of a Bluetooth low energy (BLE) device previously registered in the mobile terminal, receive identification information from the BLE device;
    processor configured to:
        extract function information corresponding to the received identification information of the BLE device, and
        perform a previously set function corresponding to the extracted function information; and
    a memory configured to map and store the identification information of the BLE device and at least one function supported by the mobile terminal.

14. The mobile terminal of claim 13, further comprising:
a user input unit configured to receive a user input for connecting the at least one function supported by the mobile terminal with the BLE device.

15. The mobile terminal of claim 14, wherein the user input unit is further configured to receive a user input for classifying and connecting the BLE device and a plurality of functions according to time.

16. The mobile terminal of claim 13, wherein the processor is further configured to:
extract an application for performing the previously set function; and
execute the extracted application.

17. The mobile terminal of claim 13,
wherein the communication unit is further configured to receive sensing information detected by the BLE device from the BLE device, and
wherein the processor is further configured to extract the function information additionally in consideration of the received sensing information.

18. The mobile terminal of claim 17, wherein the processor is further configured to request a call connection to a previously set external device based on the identification information and sensing information of the BLE device.

19. The mobile terminal of claim 13, wherein the processor is further configured to:
confirm mode information corresponding to the identification information of the BLE device, and
automatically set a mode of the mobile terminal based on the confirmed mode information.

20. The mobile terminal of claim 19, wherein the processor is further configured to set at least one of a communication mode related to a communication method of the mobile terminal, a sound output mode, a vibration mode, an airplane mode, a driving mode, and a data transmission/reception mode in which data is transmitted and received to and from a previously determined external device based on the confirmed mode information.

21. A method of controlling a function of a mobile terminal, the method comprising:
detecting a Bluetooth low energy (BLE) device previously registered in the mobile terminal;
receiving identification information from the BLE device; and
performing a previously set function corresponding to the received identification information of the BLE device,
wherein the previously set function is previously set by a user.

22. The method of claim 21,
wherein the BLE device comprises a sensor based BLE device, and
wherein the receiving of identification information comprises, when the sensor based BLE device is detected:
receiving identification information; and
sensing information from the sensor based BLE device.

23. The method of claim 21,
wherein the previously set function comprises a mode changed and performed by the mobile terminal, and
wherein the mode comprises at least one of a communication mode related to a communication method of the mobile terminal, a sound output mode, a vibration mode, an airplane mode, a driving mode, and a data transmission/reception mode in which data is transmitted and received to and from a previously determined external device.

* * * * *